(12) United States Patent
Daneman et al.

(10) Patent No.: US 7,183,633 B2
(45) Date of Patent: Feb. 27, 2007

(54) OPTICAL CROSS-CONNECT SYSTEM

(75) Inventors: Michael J. Daneman, Pacifica, CA (US); Franklin Wall, Vacaville, CA (US); Behrang Behin, Berkeley, CA (US); Murali Chaparala, Vancouver, WA (US); Mark W. Chang, Palos Verdes, CA (US); Scott Dalton, Berkeley, CA (US); Timothy Beerling, Los Angles, CA (US); Stephen Panyko, Novato, CA (US); Meng-Hsiung Kiang, Albany, CA (US); Boris Kobrin, Walnut Creek, CA (US); Chuang-Chia Lin, Fremont, CA (US)

(73) Assignee: Analog Devices Inc., Norwood, MA (US)

( * ) Notice: Subject to any disclaimer, the term of this patent is extended or adjusted under 35 U.S.C. 154(b) by 350 days.

(21) Appl. No.: 10/469,516

(22) PCT Filed: Mar. 1, 2002

(86) PCT No.: PCT/US02/09038

§ 371 (c)(1),
(2), (4) Date: May 27, 2004

(87) PCT Pub. No.: WO02/091464

PCT Pub. Date: Nov. 14, 2002

(65) Prior Publication Data

US 2006/0049826 A1 Mar. 9, 2006

Related U.S. Application Data

(63) Continuation-in-part of application No. 09/989,905, filed on Nov. 20, 2001, now abandoned, and a continuation-in-part of application No. 09/992,531, filed on Nov. 6, 2001, now abandoned, and a continuation-in-part of application No. 09/992,530, filed on Nov. 6, 2001, now abandoned, and a continuation-in-part of application No. 09/949,210, filed on Sep. 7, 2001, now Pat. No. 6,873,756, and a continuation-in-part of application No. 09/900,841, filed on Jul. 7, 2001, now Pat. No. 6,514,781, and a continuation-in-part of application No. 09/891,760, filed on Jun. 25, 2001, now Pat. No. 6,859,577, and a continuation-in-part of application No. 09/853,870, filed on May 11, 2001, now Pat. No. 6,891,988, and a continuation-in-part of application No. 09/853,868, filed on May 11, 2001, now abandoned, and a continuation-in-part of application No. 09/853,869, filed on May 11, 2001, now abandoned, and a continuation-in-part of application No. 09/851,587, filed on May 8, 2001, now Pat. No. 6,906,511, and a continuation-in-part of application No. 09/798,129, filed on Mar. 1, 2001, now Pat. No. 6,528,887.

(60) Provisional application No. 60/303,755, filed on Jul. 7, 2001.

(30) Foreign Application Priority Data

Apr. 4, 2001 (US) .................. 01/011,046
Apr. 4, 2001 (US) .................. 01/011,047

(51) Int. Cl.
*H01L 23/02* (2006.01)
*G02B 26/08* (2006.01)
*G02B 6/42* (2006.01)

(52) U.S. Cl. .............. 257/678; 257/730; 359/196; 359/320; 359/388; 385/15; 385/16; 385/17; 385/18; 385/19

(58) Field of Classification Search .......... None
See application file for complete search history.

(56) References Cited

U.S. PATENT DOCUMENTS

| | | | |
|---|---|---|---|
| 4,153,329 A | 5/1979 | Gillette | 350/96.13 |
| 4,580,873 A | 4/1986 | Levinson | 350/96.2 |
| 4,935,700 A | 6/1990 | Garbini et al. | 324/687 |
| 5,043,043 A | 8/1991 | Howe et al. | 156/645 |
| 5,059,783 A | 10/1991 | Stranjord | 250/227.19 |
| 5,138,309 A | 8/1992 | Gonzalez et al. | 340/783 |
| 5,206,983 A | 5/1993 | Guckel et al. | 29/598 |

| | | | |
|---|---|---|---|
| 5,302,886 A | 4/1994 | Jacobsen et al. ............ 318/568 |
| 5,327,033 A | 7/1994 | Guckel et al. ................ 310/40 |
| 5,369,361 A | 11/1994 | Wada .................... 324/207.2 |
| 5,477,376 A | 12/1995 | Iwatsuka ................... 359/283 |
| 5,493,177 A | 2/1996 | Muller et al. ............... 313/578 |
| 5,617,023 A | 4/1997 | Skalski ................. 324/207.17 |
| 5,629,918 A | 5/1997 | Ho et al. .................... 369/112 |
| 5,637,539 A | 6/1997 | Hofmann et al. ............. 438/20 |
| 5,638,946 A | 6/1997 | Zavracky .................. 200/181 |
| 5,644,177 A | 7/1997 | Guckel et al. ................ 310/40 |
| 5,645,684 A | 7/1997 | Keller .................... 256/643.1 |
| 5,646,464 A | 7/1997 | Sickfus ........................ 310/40 |
| 5,648,618 A | 7/1997 | Neukermans et al. .... 73/862.08 |
| 5,662,771 A | 9/1997 | Stoupe ........................ 438/52 |
| 5,692,084 A | 11/1997 | Roff ............................ 385/88 |
| 5,717,631 A | 2/1998 | Carley et al. ............... 365/174 |
| 5,774,604 A | 6/1998 | McDonald .................. 385/18 |
| 5,839,722 A | 11/1998 | Berlin et al. ........... 271/265.01 |
| 5,841,917 A | 11/1998 | Jungerman et al. ............ 385/17 |
| 5,842,106 A | 11/1998 | Thaler et al. .................. 419/8 |
| 5,866,281 A | 2/1999 | Guckel et al. ................ 430/22 |
| 5,867,202 A | 2/1999 | Knipe et al. ................ 347/239 |
| 5,867,302 A | 2/1999 | Fleming .................... 359/291 |
| 5,881,598 A | 3/1999 | Sapuppo et al. .............. 74/5.6 |
| 5,908,719 A | 6/1999 | Guckel et al. ................. 430/5 |
| 5,914,507 A | 6/1999 | Polla et al. ................. 257/254 |
| 5,929,542 A | 7/1999 | Ohnstein et al. .............. 310/40 |
| 5,943,155 A | 8/1999 | Goosen et al. .............. 359/247 |
| 5,945,898 A | 8/1999 | Judy et al. ..................... 335/78 |
| 5,949,571 A | 9/1999 | Goosen et al. .............. 359/291 |
| 5,959,338 A | 9/1999 | Youngner et al. ........... 257/419 |
| 5,960,132 A | 9/1999 | Lin ............................. 385/18 |
| 5,963,788 A | 10/1999 | Barron et al. ................. 438/48 |
| 5,966,066 A | 10/1999 | Mehgrany et al. ............ 337/70 |
| 5,969,848 A | 10/1999 | Lee et al. .................... 359/298 |
| 5,971,355 A | 10/1999 | Biegelsen et al. ...... 251/129.06 |
| 5,998,906 A | 12/1999 | Jerman et al. .............. 310/309 |
| 6,025,951 A | 2/2000 | Swart et al. ................. 359/245 |
| 6,028,331 A | 2/2000 | Mastromatteo et al. ..... 257/253 |
| 6,075,239 A | 6/2000 | Aksyuk ........................ 250/229 |
| 6,078,100 A | 6/2000 | Duesman et al. ........... 257/690 |
| 6,087,747 A | 7/2000 | Dhuler et al. ................. 310/90 |
| 6,094,293 A | 7/2000 | Yokoyama et al. ......... 359/280 |
| 6,112,273 A | 8/2000 | Kau ............................ 710/260 |
| 6,122,232 A | 9/2000 | Schell et al. ............. 369/41.11 |
| 6,123,410 A | 9/2000 | Beerling et al. ............. 347/42 |
| 6,160,928 A | 12/2000 | Schroeder .................... 385/18 |
| 6,188,301 B1 | 2/2001 | Kornrumpf et al. ........ 333/262 |
| 6,188,814 B1 | 2/2001 | Bhalla ......................... 385/15 |
| 6,198,856 B1 | 3/2001 | Schroeder et al. ............ 385/16 |
| 6,215,318 B1 | 4/2001 | Schoefthaler et al. ....... 324/658 |
| 6,215,921 B1 | 4/2001 | Lin ............................. 358/18 |
| 6,248,565 B1 | 6/2001 | Belfatto et al. .......... 361/168.1 |
| 6,252,395 B1 | 6/2001 | Aoyama et al. ....... 324/207.12 |
| 6,259,835 B1 | 7/2001 | Jing ............................. 385/18 |
| 6,265,781 B1 | 7/2001 | Andreas ..................... 257/765 |
| 6,266,306 B1 | 7/2001 | Schell et al. ............. 369/44.34 |
| 6,303,885 B1 | 10/2001 | Shook ........................ 257/680 |
| 6,314,887 B1 | 11/2001 | Robinson ................... 102/262 |
| 6,321,654 B1 | 11/2001 | Robinson ................... 102/251 |
| 6,359,741 B1 | 3/2002 | Bilotti et al. ................ 455/90 |
| 6,366,186 B1 | 4/2002 | Hill et al. ..................... 335/78 |
| 6,387,793 B1 | 5/2002 | Yap et al. ................... 438/612 |
| 6,388,631 B1 | 5/2002 | Livingston ................. 343/767 |
| 6,388,789 B1 | 5/2002 | Bernstein et al. ........... 359/198 |
| 6,396,975 B1 | 5/2002 | Wood et al. ................. 385/18 |
| 6,396,976 B1 | 5/2002 | Little et al. ................... 385/18 |
| 6,404,942 B1 | 6/2002 | Edwards et al. ............. 385/18 |
| 6,417,807 B1 | 7/2002 | Hsu et al. ............ 343/700 MS |
| 6,445,840 B1 | 9/2002 | Fernandez .................. 385/17 |
| 6,445,841 B1 | 9/2002 | Gloeckner et al. ........... 385/17 |
| 6,456,273 B1 | 9/2002 | Want ......................... 345/108 |
| 6,498,870 B1 | 12/2002 | Wu et al. ..................... 385/18 |
| 6,504,968 B1 | 1/2003 | Zhu et al. ..................... 385/18 |
| 6,514,781 B2 | 2/2003 | Chang et al. ................ 438/19 |
| 6,523,961 B2 | 2/2003 | Ilkov et al. .................. 353/99 |
| 6,528,887 B2 * | 3/2003 | Daneman et al. ........... 257/774 |
| 6,529,652 B1 | 3/2003 | Brener ........................ 385/16 |
| 6,563,975 B2 | 5/2003 | Towery ...................... 385/18 |
| 6,586,841 B1 | 7/2003 | Daneman et al. ........... 257/774 |
| 6,600,591 B2 | 7/2003 | Anderson et al. ........... 359/291 |
| 2001/0055831 A1 | 12/2001 | Daneman et al. ........... 438/599 |
| 2002/0017834 A1 | 2/2002 | Macdonald ................ 310/328 |
| 2002/0021860 A1 | 2/2002 | Ruan et al. ................... 385/18 |
| 2002/0075551 A1 | 6/2002 | Daneman et al. ........... 385/18 |
| 2002/0076139 A1 | 6/2002 | Kobrin ........................ 385/15 |
| 2002/0076140 A1 | 6/2002 | Kobrin ........................ 385/18 |
| 2002/0114558 A1 | 8/2002 | Nemirovsky ................ 385/18 |
| 2002/0163053 A1 | 11/2002 | Behin et al. ................ 257/415 |
| 2002/0167307 A1 | 11/2002 | Chaparala .................. 385/16 |
| 2002/0167309 A1 | 11/2002 | Chaparala .............. 324/207.21 |
| 2002/0168130 A1 | 11/2002 | Chaparala .................... 385/16 |
| 2002/0171420 A1 | 11/2002 | Chaparala et al. .......... 324/225 |
| 2002/0197002 A1 | 12/2002 | Daneman et al. ............ 385/18 |
| 2003/0002265 A1 | 1/2003 | Simmons .................... 361/749 |
| 2003/0048979 A1 | 3/2003 | Beerling et al. ............. 385/18 |
| 2003/0117027 A1 | 6/2003 | Rybnicek ..................... 310/28 |

FOREIGN PATENT DOCUMENTS

| | | |
|---|---|---|
| EP | 0683414 | 11/1995 |
| EP | 1120677 | 8/2001 |
| JP | 11-145585 | 5/1999 |
| JP | 2000-049357 | 2/2000 |
| WO | WO 9321536 A1 | 10/1993 |
| WO | WO 9835258 | 8/1998 |
| WO | WO 9936941 A2 | 7/1999 |
| WO | WO 9936941 A3 | 7/1999 |
| WO | WO 0057233 | 9/2000 |
| WO | WO 0073840 | 12/2000 |
| WO | WO 0073841 | 12/2000 |
| WO | WO 0073842 | 12/2000 |
| WO | WO 0075710 | 12/2000 |

OTHER PUBLICATIONS

"Magnetically Actuated Micromirrors for Fiber Optic Switching" Solid State Sensor and Actuator Workshop, Hilton Head Island, South Carolina, Jun. 8-11, 1998, pp. 273-276.

U.S. Appl. No. 60/123,496 to Berhand Behin, Kam Lau and Richard Muller, entitled "Global mechanical Mechanical Stop for Precise Mirror Positioning", no date.

U.S. Appl. No. 09/511,428 to Behrang Behin et al., "Cantilevered Microstructure Methods and Apparatus," Feb. 23, 2000, p. 1-28.

Storement, C. *Flexible Dry-Released Process for Aluminum Electrostatic Actuators*, Sep. 1994, pp. 90-96.

H. Toshioshi et al. "Electrostatic Micro Torsion Mirrors for an Optical Switch Matrix" Journal of Microelectromechanical Systems, vol. 5, No. 4, 231-7 Dec. 1996.

L. Y. Lin et al. "Free-Space Micromachined Optical Switches with Sub-Millisecond Switching Time for Large-Scale Optical Cross Connects" OFC '98 and IEEE Photonics Technol. Lett. , Apr. 1998.

E. K. Chan et al, "Characterization of Contact Electromechanics Through Capacitance-Voltage Measurements and Simulations" Journal of Microelectromechanical Systems, vol. 8, No. 2, Jun. 1999.

E. K. Chan et al, "Electrostatic Micromechanical Actuator with Extended Range of Travel" Journal of Microelectromechanical Systems Dec. 2000.

P. Cheung et al. Design, Fabrication, Position Sensing, and Control of Electrostatically-driven Polysilicon Microactuator, IEEE Transactions on Magnetics, vol. 32, No. 1, Jan. 1996.

A. Selvakumar, "A High-Sensitivity Z-Axis Capacitive Silicon Microaccelerometer with a Torsional Suspension", Journal of Microelectromechanical Systems vol. 7, No. 2, Jun. 1998.

S.E. Vargo et al, "Knudsen Compressor as a Micro and Macroscale Vacuum Pump Without Moving Parts or Fluids", J. Vac. Sci. Technol. A, Jul./Aug. 1999, pp. 2308-2313.

P. Cheung et al. "Batch Fabrication of Pneumatic Valve Arrays by Combining MEMS with Printed Circuit Board Technology" DSC-vol. 62/HTD-vol. 354, Microelectromechancal Systems (MEMS) ASME, 1997.

L.O.S. Ferreira et al., "Torsional Scanning Mirrors Actuated by Electromagnetic Induction and Acoustic Waves", ICMP98-International Conference on Microelectronics and Packaging, XIII SBMICRO, pp. 155-162, no date.

J.P. Hobson, D.B. Salzman, "Review of pumping by thermal molecular pressure", J. Vac. Sci. Technol. A, vol. 18, No. 4, Jul./Aug. 2000, pp. 1758-1765.

Eyre et al. *"MEMS Magnetic Sensor in Standard CMOS, Science Closure and Enabling Technologies for Constellation Class"* [online], [retrieved on Mar. 17, 2002]. Retrieved from the Internet <URL:http:sprg.ssl.Berkeley.edu/ConstellationClassMissions/eyre.pdf>.

Miller R. et al. *A Megnetically Actuated MEMS Scanning Mirror*', International Society for Optical Engineering, vol. 2687 (Mar. 1996), pp. 47-52.

U.S. Appl. No. 09/489,264 of Robert L. Wood et al, "MEMS Optical Cross-Connect Switch", filed Jan. 20, 2000.

J. Minowa, Y, Fujii, Y. Nagata, Nonblocking 8x8 Optical Matrix Switch For Fibre-Optic Communication, Apr. 22, 1990, pp. 422-423.

L. Y. Lin, et al, "High-Density Micromachined Polygon Optical Crossconnects Exploiting Network Connection-Symmetry", IEEE Photonics Technology Letters, vol. 10, No. 10, Oct. 1998.

D.E. Ludwig, "Multilayererd Focal Plane Structures with Self-Aligning Detector Assembly", Infrared Readout Electronics III, SPIE, vol. 2745, 1996, pp. 149-158.

W.R. Imler et al, Precision Flip-Chip Solder Bump Interconnects for Optical Packaging, IEEE Transactions on Components, Hybrids, and Manufacturing Tech., vol. 15, #6, 1992, pp. 997-982.

M. Itoh, et al. "Use of AuSn Solder Bumps in Three-Dimensional Passive Aligned Packaging of LD/PD Arrays on Si Optical Benches", IEEE Electronic Components and Technology Conf., 1996, pp. 1-7.

C. Kallmayer, et al., "Experimental Results on the Self-Alignment Process Using Au/Sn Metallurgy and on the Growth of the ζ-Phase During the Reflow", Flip-Chip, BGA, TAB & AP Symposium, 1995, pp. 225-236.

R.D. Deshmukh, et al. "Active Atmosphere Solder Self-Alignment and Bonding of Optical Components", Intl. Hournal of Microcircuits and Electronic Packaging, vol. 16, #2, 1993, pp. 97-107.

M. Oda, M Shirashi, "Mechancially Operated Optical Matrix Switch", Fujitsu Scientific and Technical Journal, Sep. 1981.

D.M Burns, V.M. Bright, "Nonlinear Flexures for Stable Deflection of an ELectrostatically Actuated Micromirror", SPIE vol. 3226, 1997.

\* cited by examiner

*Primary Examiner*—Jasmine Clark
(74) *Attorney, Agent, or Firm*—Joshua D. Isenberg; JDI Patent

(57) ABSTRACT

An optical cross-connect switch comprises a base (216), a flap (211) and one or more electrically conductive landing pads (222) connected to the flap (211). The flap (211) has a bottom portion that is movably coupled to the base (216) such that the flap (211) is movable with respect to a plane of the base (216) from a first orientation to a second orientation. The one or more landing pads (222) are electrically isolated from the flap (211) and electrically coupled to be equipotential with a landing surface.

24 Claims, 73 Drawing Sheets

(top view)

(side view)

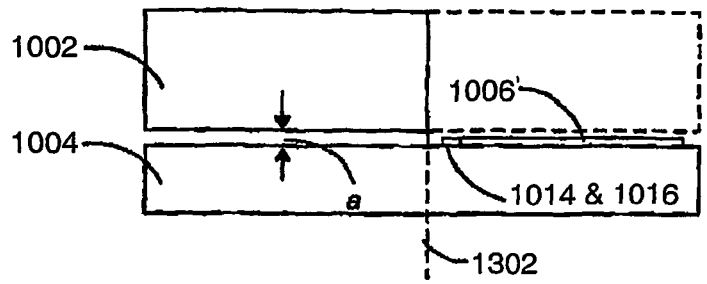
FIG. 13a
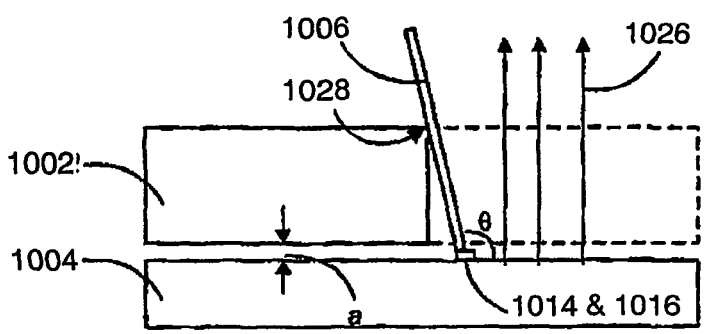
FIG. 13b
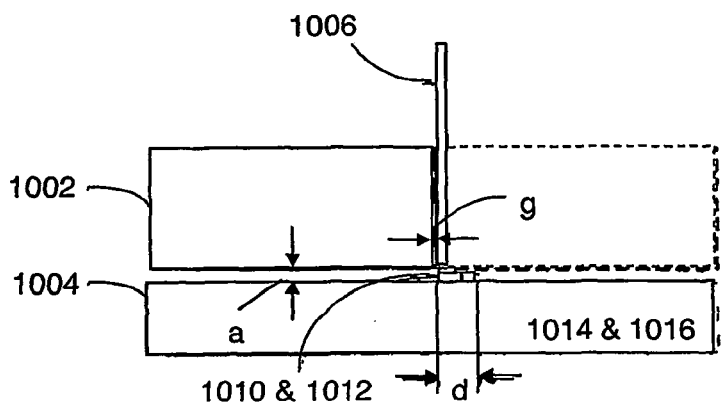
FIG. 13c (side view)
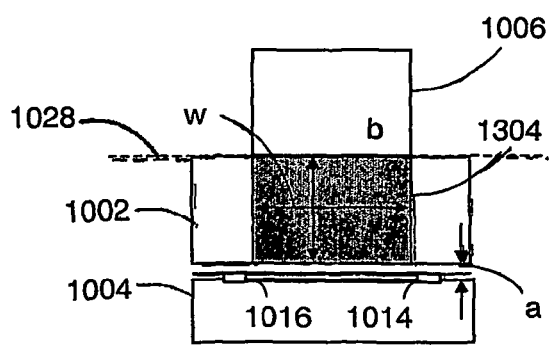
FIG. 13d (front view)

(top view)

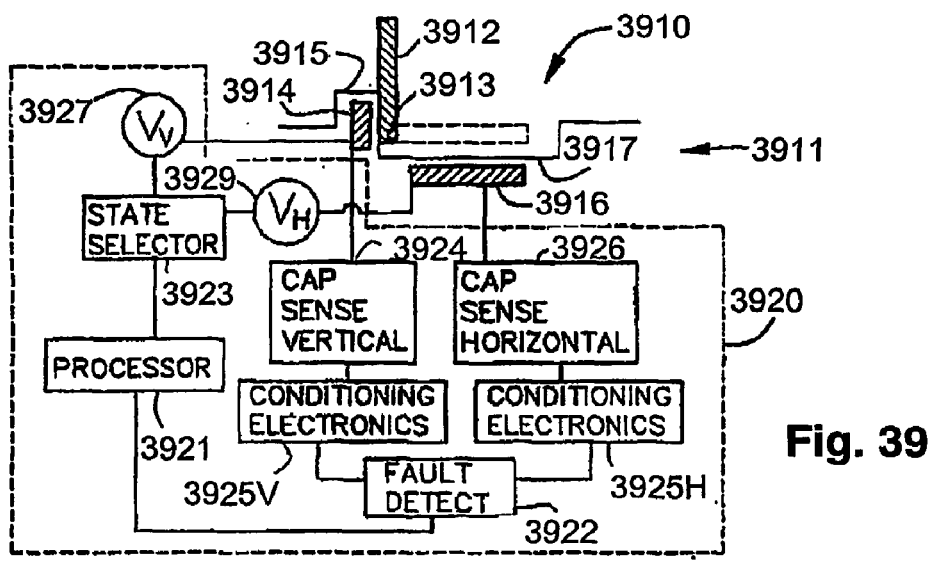
Fig. 39
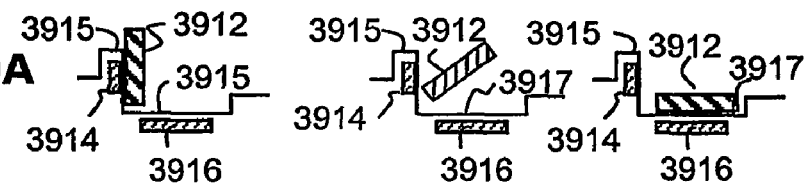
Fig. 40A
Fig. 40B
Fig. 40C

OPTICAL CROSS-CONNECT SYSTEM

This application is a 371 of PCT/US02/09038, filed Mar. 1, 2002, which was a CIP of U.S. application Ser. No. 09/798,129, filed Mar. 1, 2001, now U.S. Pat. No. 6,528,887, which was a CIP of Ser. No. 09/851,587, filed May 8, 2001, now U.S. Pat. No. 6,906,511, which was a CIP of Ser. No. 09/853,868, filed May 11, 2001, which was abandoned, which was a CIP of Ser. No. 09/853,869, filed May 11, 2001, which was abandoned, which was a CIP of Ser. No. 09/853,870, filed May 11, 2001, now U.S. Pat. No. 6,891,988, which was a CIP of Ser. No. 09/891,760, filed Jun. 25, 2001, now U.S. Pat. No. 6,859,577, which was claims benefit of Ser. No. 60/303,755, filed Jul. 7, 2001, which was a CIP of 09/900,841, filed Jul. 7, 2001, now U.S. Pat. No. 6,514,781, which was a CIP of Ser. No. 09/949,210, filed Sep. 7, 2001, now U.S. Pat. No. 6,873,756, which was a CIP of Ser. No. 09/992,530, filed Nov. 6, 2001, which was abandoned, which was a CIP of Ser. No. 09/992,531, filed Nov. 6, 2001, which was abandoned, which was a CIP of Ser. No. 09/989,905, filed Nov. 20, 2001, which was abandoned.

FIELD OF THE INVENTION

This invention is related to optical communications and more specifically to microelectromechanical systems (MEMS) optical cross-connect switches.

BACKGROUND OF THE INVENTION

Microelectromechanical systems (MEMS) are miniature mechanical devices manufactured using the techniques developed by the semiconductor industry for integrated circuit fabrication. Such techniques generally involve depositing layers of material that form the device, selectively etching features in the layer to shape the device and removing certain layers (known as sacrificial layers, to release the device. Such techniques have been used, for example, to fabricate miniature electric motors as described in U.S. Pat. No. 5,043,043.

Recently, MEMS devices have been developed for optical switching. Such systems typically include an array of mechanically actuatable mirrors that deflect light from on optical fiber to another. The mirrors are configured to translate and move into the path of the light from the fiber. Mirrors that move into the light path generally use torsion flexures to translate mirror position vertically while and changing its angular from a horizontal to a vertical orientation. MEMS mirrors of this type are usually actuated by magnetic interaction, electrostatic interaction, thermal, pneumatic actuation or some combination of these. The design, fabrication, and operation of magnetically actuated micromirrors with electrostatic clamping in dual positions for fiber-optic switching applications are described, e.g., by B. Behin, K. Lau, R. Muller in "Magnetically Actuated Micromirrors for Fiber-Optic Switching," Solid-State and Actuator Workshop, Hilton Head Island, S.C., Jun. 8–11, 1998 (p. 273–276).

When the mirror is in the horizontal position, it rests against a substrate that forms a base. Often, the mirror is subject to electromechanical forces, sometimes referred to as "stiction" that cause the mirror to stick to the substrate and prevent the mirror from moving. The same stiction forces can also prevent the mirror from being properly released from the substrate during manufacture. To overcome stiction problems, landing pads (also called dimples or bumps have been used in MEMS devices to minimize or otherwise control the contact area between the device and the underlying substrate. In the prior art, such landing pads are formed prior to deposition of a device layer either by etching pits in an underlying sacrificial layer or by depositing pads of another material prior to the deposition of the layer forming the device.

The problem of stiction with respect to an example of a MEMs mirror device 100 is shown in FIG. 1. The device 100 includes a mirror 111 formed from the device layer 112 of a substrate 110. The mirror 111 may be movably attached to the device layer by a flexure 114, actuated by an off-chip electromagnet, and individually addressed by electrostatic clamping either to a surface of the substrate 110 or to a vertical sidewall 114 of a top mounted chip 106. A first actuation force may move the mirror 111 between a rest position parallel to the substrate 110 and a position nearly parallel to the vertical sidewall 104 of the top-mounted chip 106, while the application of a second force (i.e electrostatic field) may clamp the mirror 111 in the horizontal or vertical position. The electrostatic field used to hold the mirror 111 in a position regardless of whether the first actuation force is on or off can increase the level of stiction between the mirror 111 and each landing surface.

When clamped to either the substrate 110 or the vertical side-wall surface 104, the mirror 111 may rest on a set of landing pads or dimples 122, 124, which may lie level with or protrude below or above the mirror surface, respectively. These landing pads 122, 124 may minimize the physical area of contact between the mirror 111 and the clamping surface, thus reducing stiction effects. However, since the mirror 111 and clamping surface (either the side wall 104 or the substrate 110) may be at different potentials, the landing pads 122, 124 may be made of an insulating material in order to prevent an electrical short between the mirror 111 and the clamping surface. While the insulating landing pad material does, indeed, prevent an electrical short, its inherent properties can lead to other problems. Firstly, most insulating materials have the capacity to trap electrical charge and can, in some cases, maintain that charge for long periods of time—sometimes indefinitely. As a result, the potential of the landing pads 122, 124 can drift to an arbitrary value, resulting in either parasitic clamping potential between the mirror 111 and the clamping surface, even when both are externally driven to the same voltage, or a reduced clamping force by shielding the mirror potential. Second, since the insulating landing pads 122, 124 will typically be at a potential close to the mirror potential when not in contact with the clamping surface, a rapid discharge can occur when the landing pads 122, 124 first come into the contact with the clamping surface that is a kept at a potential different than the mirror 111. This rapid discharge may be exhibited as arcing or short pulses of high current. Such surges can lead to physical damage to the landing pads 122, 124 or the clamping surface, or may produce micro-welding, where the landing pad is welded to the clamping surface—resulting in the mirror 111 being stuck.

There is a need, therefore, for a MEMS device having stiction resistant landing pads and a method of operating a MEMS device configured in a stiction reduced mode.

Modern communications systems require a level of robustness that protects the state of the optical switches from being lost in the event of a power failure. MEMS optical switches typically include an array of mechanically actuatable mirrors that deflect light from one optical fiber to another. A mirror may be retained in a specific ON or OFF state by use of an electrostatic clamping voltage. In the event of a power failure, the clamping voltage may be lost and any MEMS mirrors that were clamped in a specific state may revert to the opposing state when under the influence mechanical restoring forces. In this manner, the state of the switch may be lost in the event of a power failure.

Thus, there is a need in the art, for a method of maintaining the state of a MEMS device in the event of a power failure and an apparatus for implementing such a method.

The increasing complexity of optical switching systems has lead to development of switching fabrics that are larger than say 8×8. When scaling to such larger optical switch fabrics (e.g., 16×16, 32×32), the yield of the optical MEMS die will decrease with the increasing die size. This places a feasible upper bound on such scaling. One proposed solution to this problem is to develop a new technology with a finer pitch and, therefore, a smaller die. Unfortunately this is a lengthy development process. Another alternative solution is to use redundant mirrors on the device die. Unfortunately, this complicates the overall design of the optical switch.

It is known to tile two or more smaller dies together to form a larger device. For example, Minowa et al. uses four 4×4 arrays tiled together in a mosaic fashion to form an 8×8 array. However, for 16×16 arrays and larger, the size of the array still presents problems even if smaller devices are tiled together. For example, as the array size increases the distance between input and output fibers increases. The increased optical path between the fibers can lead to undesirable beam spreading. The beam spreading may be overcome by placing collimator lenses between the arrays. However, the alignment of the collimator lenses to the switching elements is difficult and even slight misalignment will result in optical loss that degrades switch performance. Another problem with tiling two or more dies is that the dies must be very accurately aligned with each other in order to ensure that the mirrors on one die will align with those on the other dies in the mosaic.

Prior art alignment techniques include self-alignment and active-alignment. In self-alignment, metallized bonding pads are placed on two different pieces, e.g. a MEMS device die containing rotating mirrors and a corresponding top chip. Solder is applied to the bonding pads and the two pieces are brought together such that corresponding bonding pads roughly align with each other. When solder is heated through reflow, surface tension forces between the solder and the bonding pads pull the two pieces into alignment. In active-alignment, the pieces are placed, within micron tolerances, using a pick and place tool and held in place until the solder freezes. Active-alignment allows for the use of epoxies as well as solders for attachment of the top chip to the device die. However, even using these techniques, alignment can be particularly problematic with a tiled device having four 8×8 MEMS mirror arrays totaling 256 MEMS mirrors.

Thus, there is a need in the art, for a self aligned or actively aligned optical MEMS device and a method for making it.

SUMMARY OF THE INVENTION

The disadvantages associated with the prior art are overcome by an inventive optical cross-connect switch and methods. The optical cross-connect switch comprises a base, a flap and one or more electrically conductive landing pads connected to the flap. The flap has a bottom portion that is movably coupled to the base such that the flap is movable with respect to a plane of the base from a first orientation to a second orientation. The one or more landing pads are electrically isolated from the flap and electrically coupled to be equipotential with a landing surface.

BRIEF DESCRIPTION OF THE DRAWINGS

The teachings of the present invention can be readily understood by considering the following detailed description in conjunction with the accompanying drawings, in which:

FIG. 13a is a diagrammatic side view of a movable microstructure apparatus, where a base and a stop have a slight misalignment.

FIG. 13b is a diagrammatic side view of the movable microstructure apparatus of FIG. 13a upon application of a magnetic field.

FIG. 13c is a diagrammatic side view of the movable microstructure apparatus of FIG. 13a upon application of an electrostatic bias between the plate and the stop.

FIG. 13d is a diagrammatic front view of the movable microstructure apparatus of FIG. 13c.

FIG. 15b is a diagrammatic top view of the N×M system movable microstructure apparatus of FIG. 15a.

FIG. 38A-28B depict simplified schematic diagrams of a MEMS device that incorporates capacitive state sensing according to an embodiment of the present invention;

FIG. 39 depicts a block diagram of an MEMS apparatus that incorporates capacitive sensing according to an embodiment of the present invention;

FIG. 40A depicts simplified cross sectional schematics of the apparatus of FIG. 3 in three different positions;

FIGS. 40B–40C depict capacitance values corresponding to the three positions depicted in FIG. 40A;

FIGS. 59A–59E depict fabrication of a device according to an embodiment of the present invention;

DESCRIPTION OF THE SPECIFIC EMBODIMENTS

Figure 1:
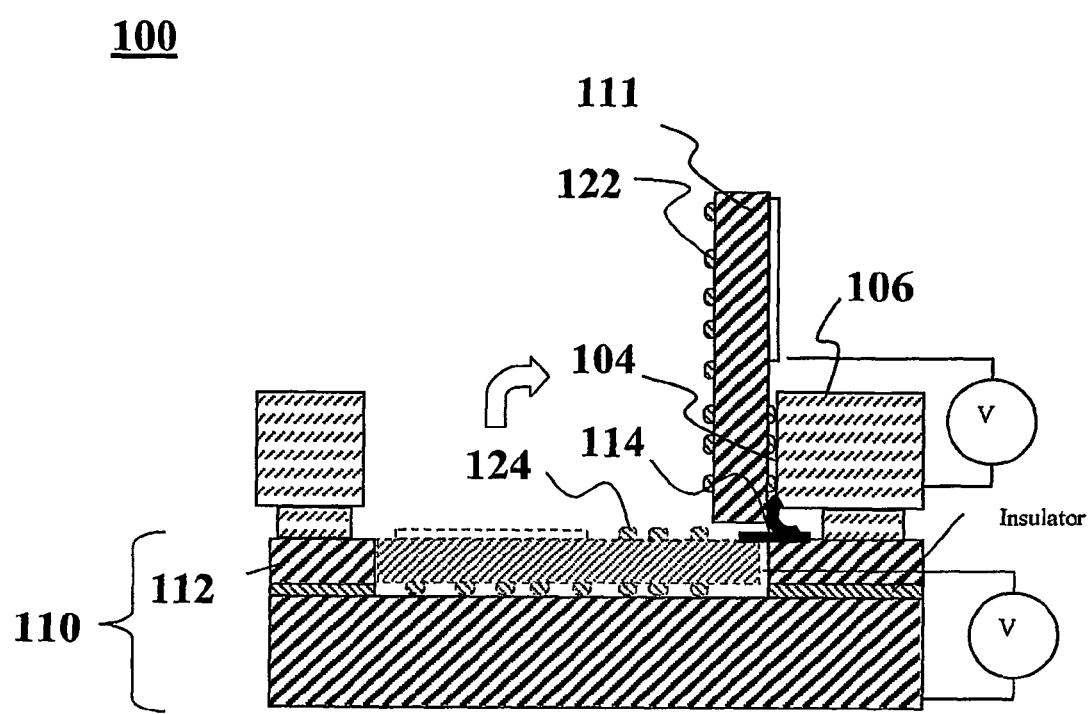
FIG. 1 depicts a cross-sectional schematic diagram of a prior art MEMS device.

Although the following detailed description contains many specific details for the purposes of illustration, anyone of ordinary skill in the art will appreciate that many variations and alterations to the following details are within the scope of the invention. Accordingly, the examples of embodiments of the invention described below are set forth without any loss of generality to, and without imposing limitations upon, the claimed invention. Like number refer to like elements throughout A. Equipotential Landing Pads FIGS. 2A and 2B respectively depict cross-sectional and top plan schematic diagrams of a MEMS device 200 having equipotential landing pads according to an embodiment of the present invention. The device 200 includes a flap 211 formed from the device layer 212 of a SOI substrate 210 containing the device layer 212 an insulating layer 215 and a base 216.

Figure 2A:
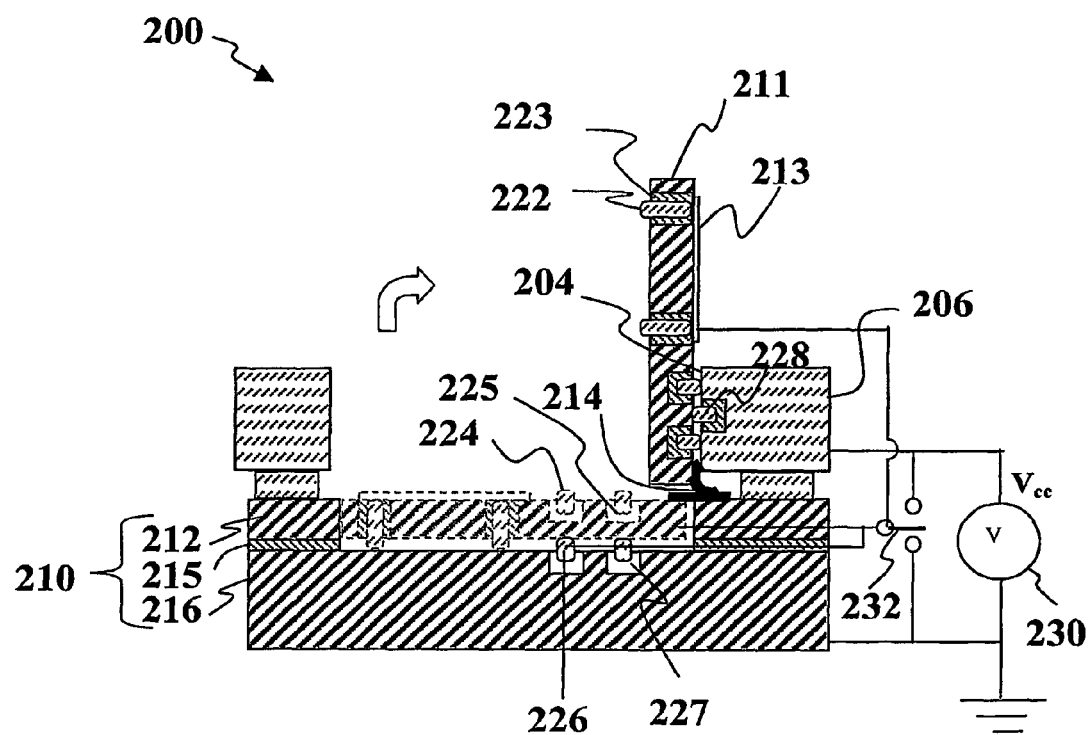
FIG. 2A depicts a cross-sectional schematic diagram of a MEMS device according to an embodiment of the present invention.
Figure 2B:
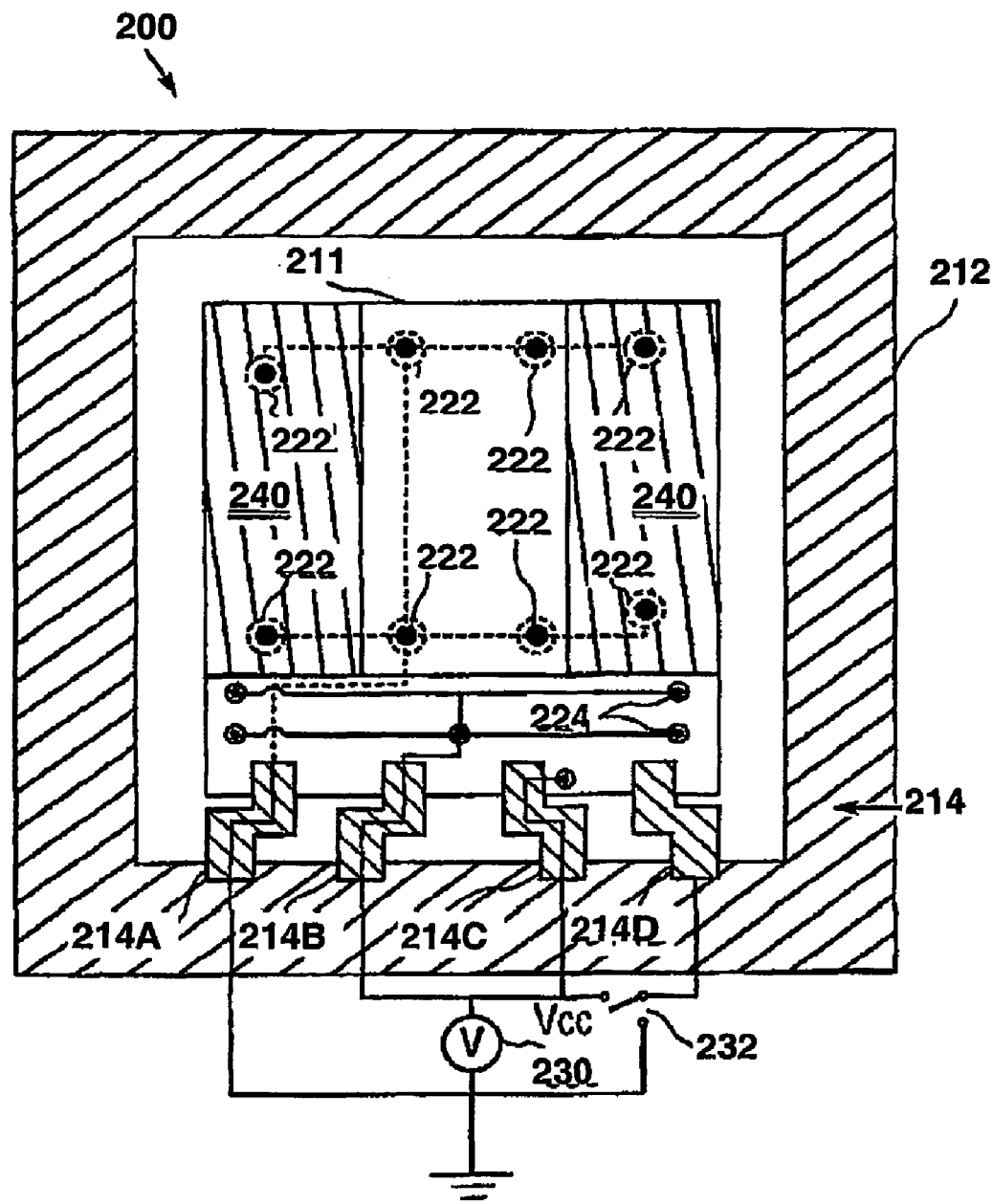
FIG. 2B depicts a top plan view schematic diagram of the MEMS device of FIG. 2A.

The flap 211 may be movably attached to the device layer 212 by one or more flexure 214. Flexure 214 may be electrically conductive and coupled to one or more topside dimples 224, one or more bottomside dimples 222 or the flap 211. Multiple flexures can provide unique electrical paths to achieve equipotential design, while MEMs springs can also be used to couple connections to a movable flap. FIG. 2B shows a configuration of three flexures 214A, 214B and 214C that provide equipotential to the dimples and clamping voltage to the flap while also providing torsion restoring force thereto. The fourth flexure 214D which may be coupled between the flap 211 and the device layer 212 may have an electrical and/or mechanical function.

While FIG. 2 illustrates a flap design having top- and bottom-side equipotential dimples, it is understood to be part of the present invention that a flap may be configured with one or more equipotential dimples that, in addition to contacting a vertical sidewall in the ON state, may also contact the substrate in the OFF state. This design combines topside and bottomside dimples into a single landing pad structure. In this configuration, it is preferred that the dimple is flat, electrically isolated from, and substantially parallel to the mirror. A single clamping voltage may be used to secure the flap in the ON and OFF states. A flap may be electrostatically held to one or more vertical sidewall structures.

The flap may include a reflecting surface 213 so that the device 200 acts as a MEMS mirror. The flap 211 may be actuated by any first actuation force (i.e. an off-chip electromagnet) and be individually addressed by electrostatic clamping either to a surface of a base 216 of the substrate 210 or to one or more vertical sidewall 204. The flap may include a metallic or magnetic material 240, e.g., Nickel. An external magnetic field produced by the electromagnet exerts forces on the magnetic material that move the flap 211 between an "off" position parallel to the substrate 210 and an "on" position nearly parallel to the vertical sidewall 204 of the top-mounted chip 206.

The sidewall 204 and a surface of the base 216 may serve as landing surfaces for the flap 211. A voltage source 230 may be coupled between the top-mounted chip 206 and the base 216. In the embodiment shown in FIGS. 2A–2B, the voltage source 230 applies a voltage $V_{CC}$, e.g., about 40 V, between the top chip 206 and the base 216. By way of example, the voltage source 230 may apply a positive $V_{CC}$ to the top chip 206 while the base 216 is grounded. However, the top chip 206 and base 216 may be held at the same potential and the flap grounded at the appropriate time instance in the switching cycle to secure the flap ON or OFF state. Similarly, the top chip 206 and base 216 may be grounded and a positive Vcc applied to the flap at the at the appropriate time instance in the switching cycle to secure the flap ON or OFF state.

Flap 211 may be selectively coupled through switch 232 to $V_{CC}$ or ground to provide electrostatic clamping. For example, if the top chip is at $V_{CC}$, and the flap 211 is in the "on" position, the switch 232 couples the flap 211 to ground, e.g., to the base 216. A voltage difference between the flap 211 and the top chip 206 produces an electric field that clamps the flap 211 in the ON position. When the flap is in the "off" position and the base 216 is grounded, the switch 232 couples the flap 211 to $V_{CC}$. A voltage difference between the base 216 and the flap 211 produces an electric field that clamps the flap 211 against a surface of the base 216. The electrostatic fields may hold the flap 211 in position regardless of whether the magnetic field is on or off.

When clamped to the landing surfaces, e.g., the surface of the base 216 or the vertical side-wall surface 204, the flap 211 may rest on a set of electrically conductive landing pads or dimples 222. These landing pads or dimples may lie level with, protrude below or protrude above the surface of an underside of the flap 211 and may insulated from the flap 211 by an insulating material 223. The landing pads 222 (Shown in phantom in FIG. 2B) may be electrically coupled to the base 216 through a first flexure 214A or an electrically conductive MEMs spring, to reduce stiction effects. The first flexure 214A may be electrically insulated from the flap 211, the device layer 212 and the top chip 206. Thus, when the flap 211 and the base 216 are at different potentials, the landing pads 222 are equipotential to, i.e., at the same potential as, the base 216. This prevents trapping of electrical charge and arcing due to different potentials. The insulating materials 223 prevent an electrical short between the flap 211 and the base.

The flap 211 may optionally include a set of electrically conductive top landing pads 224. The top landing pads may lie level with, protrude above or protrude below a top surface of the flap 211. The top landing pads 224 may be electrically connected to each other and may be electrically insulated from the flap 211 by an insulating material 225. To reduce stiction effects, the top landing pads 224 may be electrically coupled so that it is substantially equipotential to the top chip 206 through a second flexure 214B or an electrically conductive MEMs spring. The second flexure 214B may be electrically insulated from the flap 211, the device layer 212 and the base 216.

Third flexure 214C or MEMs spring may connect to mirror 213 and through programmable switch 232 to Vcc such that the voltage potential can be programmably coupled through the flap 211. When switch 232 is OFF, Vcc charges mirror 211 with a potential, flap 211 is electrostatically attracted and clamped on the base 216, and the bottomside landing pads 222 make contact with the base 216 at the ground equipotential. When switch 232 is ON, Vcc grounds the flap 211, the flap 211 is electrostatically attracted to the top chip 206 and the topside landing pads 224 make contact with top chip 206 at Vcc equipotential.

It must be stated that in an alternative design the polarity may be reversed so that a negative voltage $V_{CC}$ may be applied to the top chip 206 or the top chip may be grounded and the voltage $V_{CC}$ may be applied to the base 216.

Furthermore, it must be stated that the device 200 may optionally include one or more electrically conductive base landing pads 226 disposed on a surface of the base 216 and insulated from the base 216 by an insulating material 227. The device 200 may also optionally include one or more electrically conductive sidewall landing pads 228 that are electrically isolated from the sidewall. The base landing pads 226 and sidewall landing pads 228 may be electrically coupleable such that they may be selectively made substantially equipotential to the flap 211, e.g., by a third flexure 214C and the switch 232.

The landing pads 222, 224, 226, 228 may be in the form of a plug that protrudes through an opening in the insulating material 223, 225, 227. Alternatively, the landing pads 222, 224, 226 may be in the form of plugs with flanges attached to the flap by a layer of electrically insulating support material similar to that shown in FIGS. 7A–7B. Alternatively, the device 200 may optionally include conductive sidewall landing pads 228 disposed on the sidewall 204 that are electrically isolated from the sidewall 204 and electrically coupled to the flap 211, e.g. via an insulated connector on the flexure 214C.

The conductive landing pads 222, 224, 226, 228 may be made from those materials that exhibit conductive properties, as one skilled in the art would be capable of applying. Such materials include, but are not limited to polysilicon, amorphous silicon, single crystal silicon, conductive diamond films, silicon germanium, and metals. The insulating materials 223, 225, 227 may be any of those materials that exhibit insulative properties, as one skilled in the art would be capable of applying. Such materials include, but are not limited to silicon nitride, silicon oxide, undoped single crystal silicon, undoped polysilicon and undoped silicon germanium.

Figure 3A:
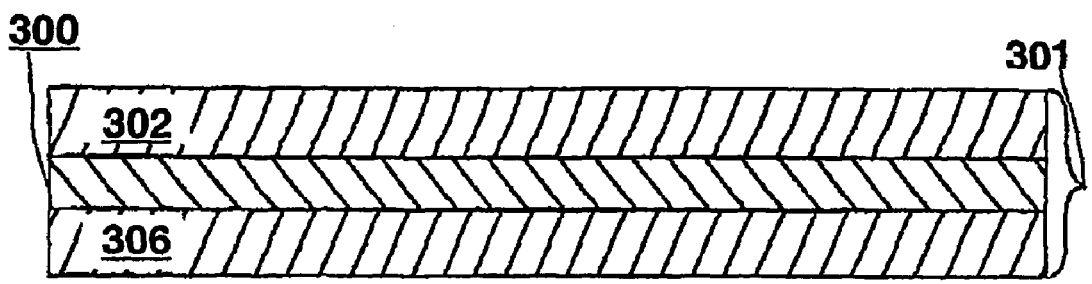
FIGS. 3A–3F depict simplified cross sectional schematic diagrams depicting the fabrication of a MEMS device according to an embodiment of the invention.
Figure 3B:
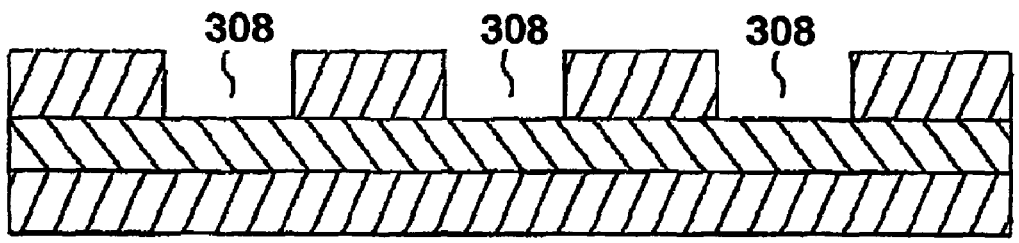
Figure 3:
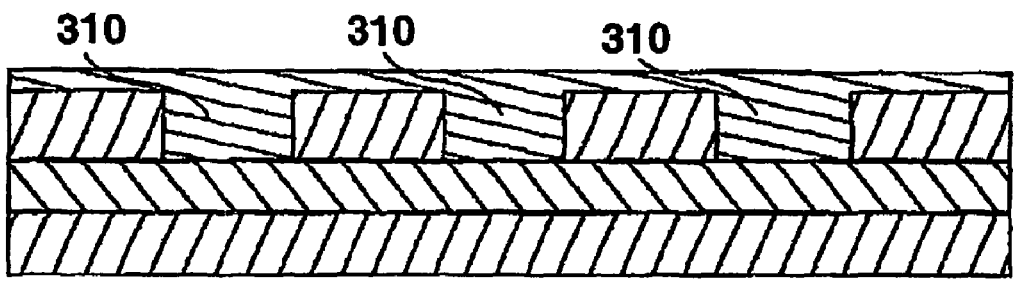
Figure 3D:
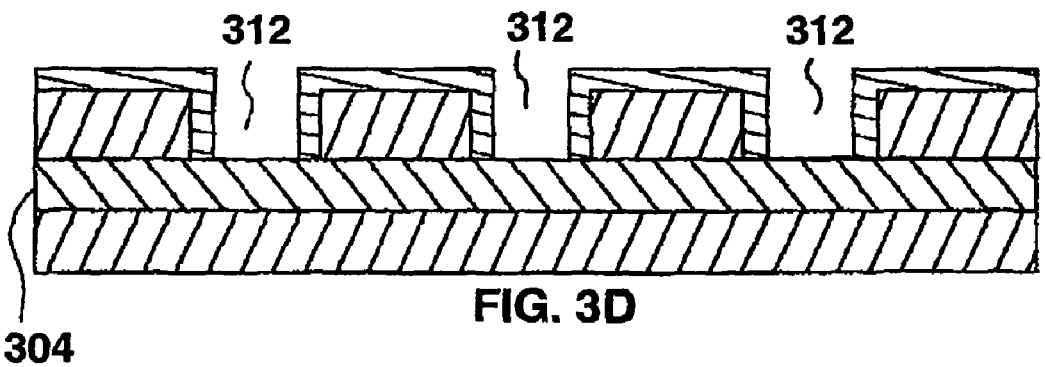
Figure 3E:
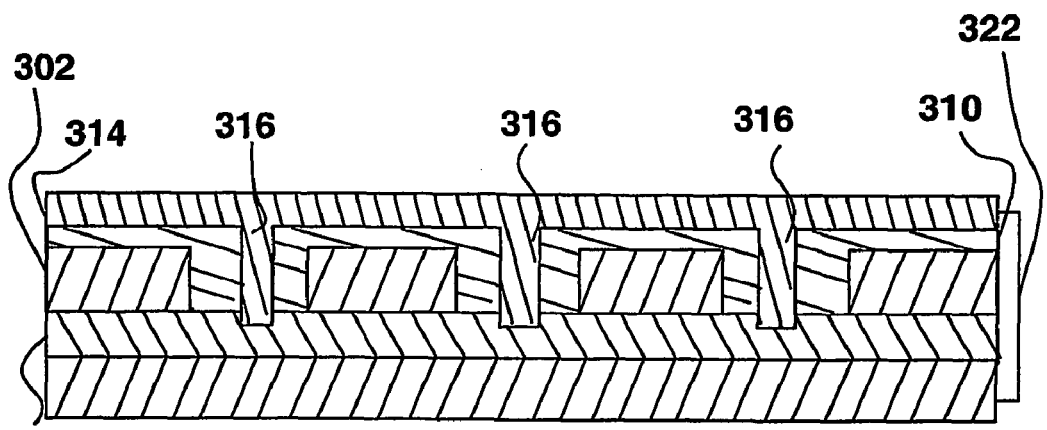
Figure 3F:
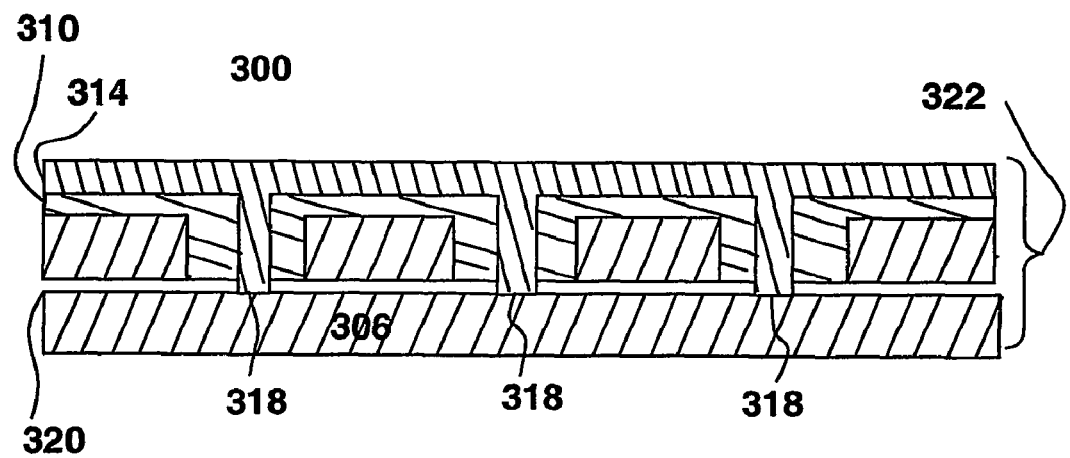

FIGS. 3A–3F depict simplified cross sectional schematic diagrams depicting the fabrication of a MEMS device of the type shown in FIG. 2. The method starts at FIG. 3A with a SOI substrate 301 having a device layer 302, a sacrificial insulating layer 304 and a base layer 306. Next, as shown in FIG. 3B, several openings 308 are made in the device layer 302. The openings 308 are filled with an insulating material 310 as shown in FIG. 3C. The insulating material 310 may also cover the surface of the device layer 302. Next vias 312 are formed through the insulating material 310 that fills the openings 308 as shown in FIG. 3D. The vias may be formed by a dry etch process or an anisotropic wet etch process. The vias 312 penetrate partly into the sacrificial insulating layer 304. Next the vias 312 are filled with a conducting material 314 to form conducting plugs 316. The conducting material 314 may also cover the surface of the insulating material 310 that overlies the device layer 302 to provide a common electrical connection between the conductive plugs 316. The sacrificial insulating layer 304 is removed, e.g. by isotropic etch, as shown in FIG. 3F. The ends of the conductive plugs 316 project slightly beyond a lower surface of the device layer 302 and insulating material 310 to form landing pads 318 that are electrically isolated from the device layer 302. The landing pads 318 may then be electrically coupled to a landing surface of the base layer 306 by an electrical connection 322 coupled to the conducting material 314. The electrical connection 322 may be formed contemporaneously with the layer of conducting material 314 and electrically insulated from the device layer 302, e.g., by the insulating material 310.

B. Capacitive Latching

A method and/or system for maintaining the state of a MEMS device in the event of a power failure may be incorporated into the MEMS optical cross-connect switch to sustain the state of the switch during a power outage.

Figure 4:
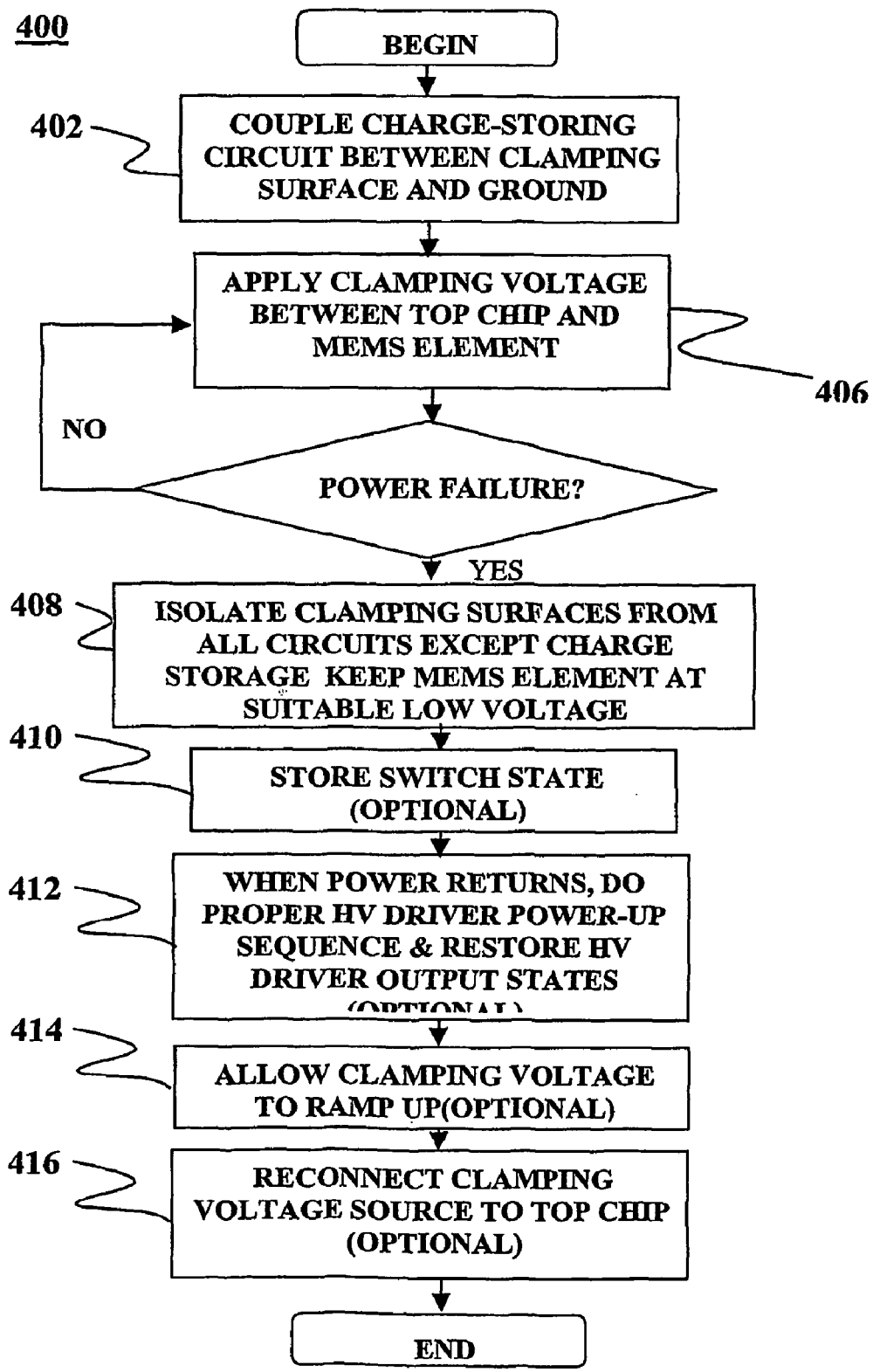
FIG. 4 is a flow diagram of a method of maintaining the state of a MEMS device in the event of a power failure.
Figure 5:
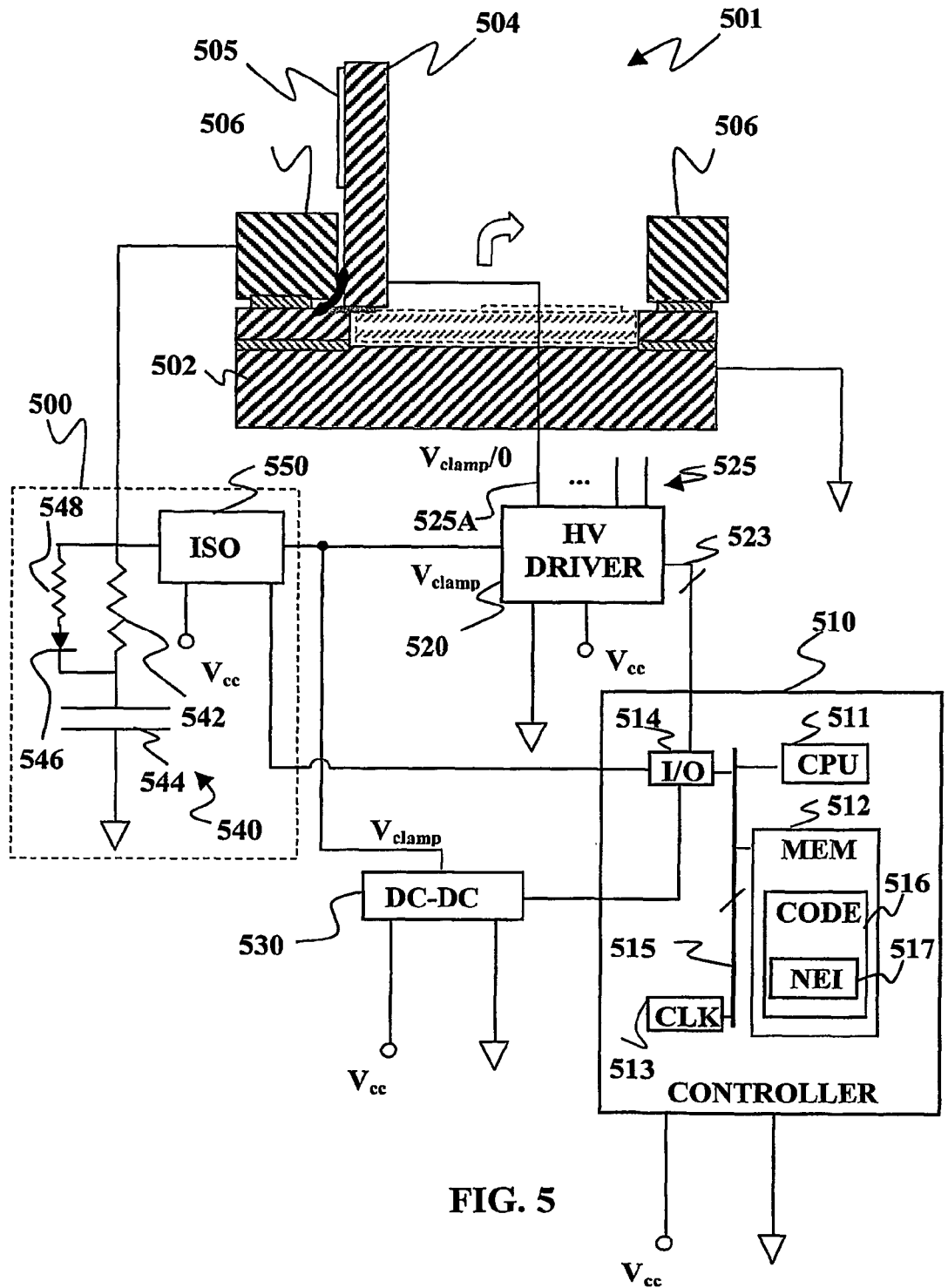
FIG. 5 is a schematic diagram of an apparatus for maintaining the state of a MEMS device in the event of a power failure.

An example capacitive latching method 400 of the present invention is depicted in the flow diagram of FIG. 4, and FIG. 5 depicts a schematic diagram of an apparatus 500 that may implement the method of FIG. 4. The apparatus 500 generally includes a charge-storing circuit 540 and an isolator circuit (ISO) 550 that operates with a MEMS optical switch 501. More specifically, the optical switch 501 has a substrate 502, a moveable element 504 moveably coupled to the substrate 502. By way of example, the moveable element 504 may move between a horizontal "OFF" position (shown in phantom) and a vertical "ON" position. In the "ON" position, the moveable element 504 may be retained against a clamping surface 506 whose height is lower than the movable element 504. The moveable element 504 may include one or more equipotential landing pads of the type described above.

The optical switch 501 may operate in response to signals from a controller 510. Controller 510 may execute code 516 for implementing certain steps of the method 400. The code 516 may conform to any one of a number of different programming languages such as Assembly, C++, JAVA or a number of other languages.

The switch 501, controller 510, high voltage (HV) driver 520, DC-DC converter 530, charge-storing circuit 540 and isolator element 550 may be subsystems or components of a network element e.g., as shown below with respect to FIG. 8. Switch 501 may be configured on a removable card and the network element may be part of a network (see FIG. 6). The controller 510 may include network element interface 517 which may be implemented in software e.g. in a subroutine in memory 512 or hardware to allow the controller 510 to communicate with the network element. Such communication may include, but is not limited to, switching commands issued from the network element to the switch 501 and switch state data transmitted from the switch 501 to the network element.

In the example depicted in FIG. 5, the clamping surface 506 may be a "top chip" having one or more openings that receive the moveable element 504 and/or others like it. The openings may have sidewalls against which the moveable element 504 may be retained. It should also be understood that the term "top chip", as referenced herein, refers to any platform attached to a substrate containing one or more moveable elements to which a movable element may be clamped. One top chip design may be comprised of a single fabricated MEMS structure having an array of 8×8, 16×16 or 32×32 openings that align with each movable element in a corresponding array of moveable elements such as moveable element 504. Another top chip design may be a single or multiple array of high aspect vertical sidewalls; in this case two walls may be associated with each movable element. While it should be understood that a top chip may be located at the bottom or side of the movable element as anticipated by the plurality of design abstractions, it should also be stated that the clamping surface 506 may be part of a single-layer device as opposed to a chip layer bonded to a substrate or base such as substrate 502.

The clamping surface 506 may be electrically charged to an electrostatic potential $V_{clamp}$ with respect to 0 volts (ground), as well as isolated from the substrate 502 and all other MEMS elements. The moveable element 504 may be selectively coupled to either a source of clamping voltage $V_{clamp}$ or to a ground potential, e.g. 0 volts. In an 8×8 switching fabric, a high voltage driver 520 may be a 64 channel latch such as the Supertex HV58908 which contains 64 channels of output 525, each of which may couple to movable switch element such as moveable element 504. Commands sent by the microcontroller 510 are received by the high voltage driver via bus 523 to configure each of the 64 outputs to a HIGH or LOW value. In the example shown in FIG. 5, when channel 525A is set HIGH, the clamping voltage $V_{clamp}$, e.g., 40 volts, is applied to movable element 504 and no electrostatic clamping is realized since the adjacent clamping surface 506 is also at the clamping voltage $V_{clamp}$. However, when channel 525A is set LOW, the movable element 504 is grounded, resulting in electrostatic attraction to the adjacent clamping surface 506 which is set at $V_{clamp}$.

The charge-storing circuit 540 is electrically coupled between a clamping surface and ground to hold a clamping charge on the clamping surface to sustain switch state in the event of power failure. The example charge-storing circuit 540 has a capacitor 544 and an optional series resistor 542. In the event of a power failure, the capacitor 544 sustains a voltage potential on the clamping surface 506 in the event of a power failure to ensure that the configuration of the optical cross connect switch is maintained. In a particular embodiment of the invention, the capacitor 544 has a capacitance that is less than about 20 microfarads (μF). Although a capacitive charge-storing circuit 540 is depicted in FIG. 5, the charge-storing circuit 540 may alternatively include a battery or other circuit element that is capable of storing an electrical charge.

The series resistor 542 is employed to limit the charge rate of the capacitor at power-up, thus preventing overloading or performance degradation of the clamping voltage source (e.g., DC-DC converter 530). In the case where it is desirable to limit the discharge current flowing from the capacitor 544 into the clamping surface 506 (say, for example, to protect the clamping surface 506 and/or MEMS moveable element 504 from further damage should a short suddenly occur), the series resistor 542 could be suitably modified to provide such limiting. If, as a result of this modification, the resistance of the series resistor 542 becomes so large as to increase the charge time of the capacitor 544 to an unreasonably long period of time, then a diode 546 in series with an additional resistor 548 may optionally be connected across the series resistor 542 in order to control the charging rate of the capacitor 544 independently of the discharge rate.

In some cases it may be desirable for the charge-storing circuit 540 to charge up quickly if this will not overload the DC-DC converter 530 with the charging current To facilitate this, the charge-storing circuit 540 may optionally include a "one-way" short circuit around the resistor 542, e.g., in the form of a diode configured to provide a low resistance path for charging the capacitor 544 and a high resistance path (compared to that of resistor 542) for discharging the capacitor 544.

The clamping voltage $V_{clamp}$ from the DC-DC converter 530 is coupled to the clamping surface 506 through the isolator circuit 550. In the event of a power failure, the isolator circuit 550 prevents charge from leaking to ground through the DC-DC converter 530 and/or the HV driver 520. The isolator circuit 550 may be coupled to the microcontroller 510. The isolator circuit 550 may be configured to electrically isolate the DC-DC converter 530 and the HV driver 520 from the clamping surface 506 in the event power is lost to the controller 510. The isolator 550 may optionally include connections to a logic voltage $V_{cc}$ and/or ground to facilitate isolation when the logic voltage $V_{cc}$ drops due to a power failure. Furthermore, the isolator 550 may include a connection to the microcontroller 510 so that the controller 510 may signal the isolator circuit 550 to isolate the DC-DC converter 530 and the HV driver 520 from the clamping surface 506 if power is lost to the DC-DC converter 530.

Preferably, the charge-storing circuit 540 and the isolator element 550 have a total current leakage that is low enough that the clamping surface 506 retains sufficient charge to clamp the moveable element 504 for a sufficient period of time depending upon the requirements of the system of which the switch 501 is a part. By way of example this could be as short as a few milliseconds or as long as several days. During this period of time, the clamping voltage $V_{clamp}$ may drop below its initial value. The movable element 504 will still be retained against the clamping surface 506 as long as the clamping voltage remains above some minimum value. The capacitor 544 preferably has a low current leakage across its leads and is made using a high resistance dielectric. Capacitors are generally rated by a capacitance, and a maximum voltage. In general, capacitors having a higher maximum voltage rating tend to exhibit a lower leakage current. A particular example of a capacitor 544 that is suitable for use with a clamping voltage $V_{clamp}$ of about 40V is a model ECQE(F) 10-microfarad (µF) 250-volt metallized polyester capacitor made by Panasonic of Osaka, Japan. Testing has shown this device to sustain over 168 hours of clamping voltage to 64 movable mirror elements in a prototype 8×8 optical cross-connect switching fabric.

Figure 6:
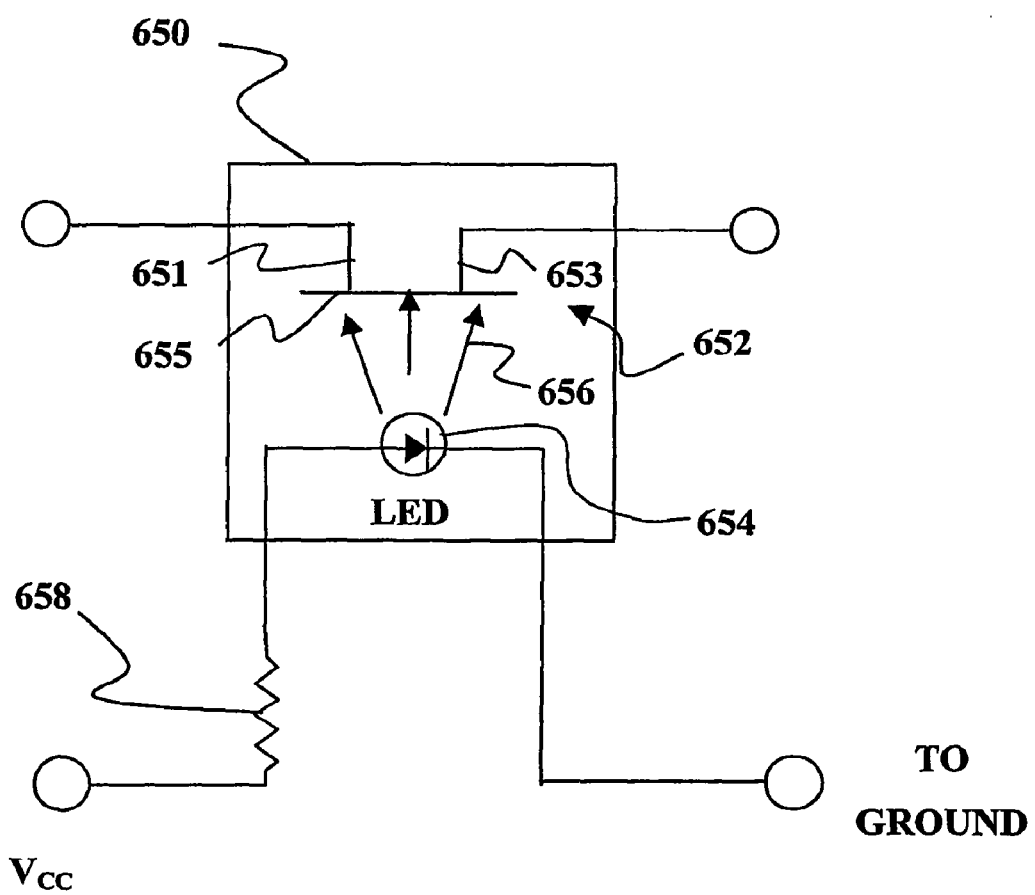
FIG. 6 is a schematic diagram of a first alternative isolator circuit that may be used in the apparatus of FIG. 6.

By way of example, the isolator element 550 may be an opto-isolator. FIG. 6 depicts a schematic diagram of an example of an opto-isolator 650 that may be used as the isolator element 550 of FIG. 5. The opto-isolator 650 generally includes a phototransistor 652 and a source 654 of light 656. As used herein, the term "phototransistor" refers to a circuit element that is electrically conductive in response to light and electrically isolating in the absence of light. By way of example, the phototransistor 652 includes a source 651, a drain 653 and a gate 655. As long as light 656 from the source 654 impinges on the gate 655 of the phototransistor 652 electric current may flow between the source 651 and the drain 653. As used herein the term "light" generally refers to electromagnetic signals that may be transmitted through free space or through a dielectric medium. As such, the term "light" includes, but is not limited to, infrared light, visible light, ultraviolet light, and the like. The source 654 provides light 656 as long as long as power is on, e.g., there is a voltage difference across the LED. Thus current may flow through the phototransistor as long as the power is on. By way of example, the source 654 may be a light emitting diode (LED). The LED may be coupled between $V_{CC}$ and ground. The $V_{CC}$ connection may be provided by one of the I/O functions 514 of the controller 510 or a separate power supply. Furthermore the ground connection may be provided through the controller 510 or a separate ground connection. A resistor 658 may be coupled in series with the LED to limit an electrical current through the LED. For a clamping voltage $V_{clamp}$ of 40 V, an example of a suitable opto-isolator is a model AQV225N(A) Photo-MOS relay manufactured by Aromat Corporation of San Jose, Calif.

Figure 7:
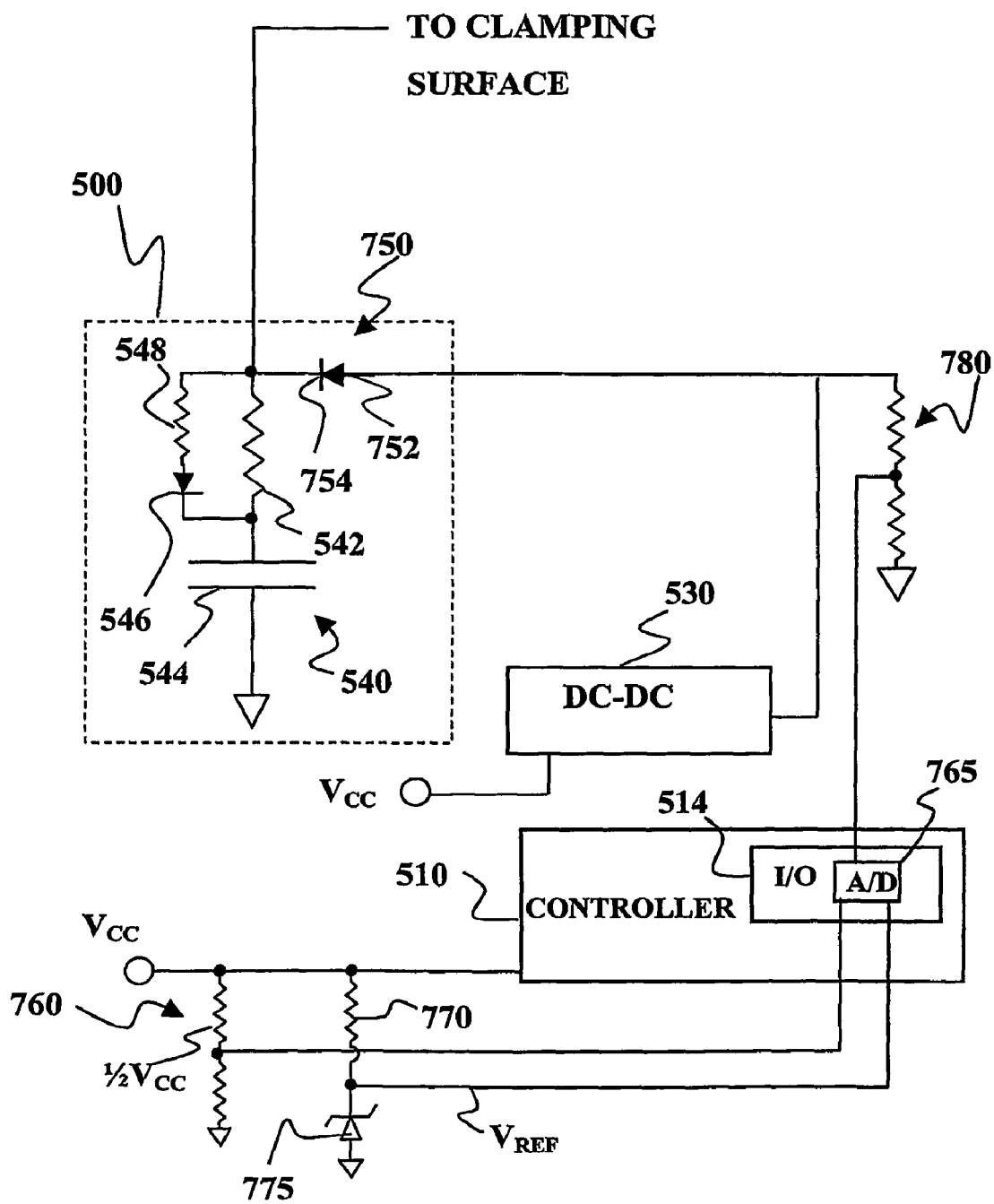
FIG. 7 is a schematic diagram of a second alternative isolator circuit that may be used in the apparatus of FIG. 6.

Alternatively, the isolator element 550 may be a low leakage diode. If the isolator element 550 is a low leakage diode, connection to the controller 510 is not required. FIG. 7 depicts a partial schematic diagram illustrating the how a low leakage diode 750 would be incorporated into the apparatus of FIG. 5 as the isolator element 550. The diode 750 has an anode 752 and a cathode 754. The diode 750 easily conducts electric charge flowing from the anode to the cathode and is highly isolating for electric charge attempting to flow from the cathode 754 to the anode 752. The anode may be connected to the DC-DC converter 530 and the high voltage driver 520. The cathode 754 may connect to the charge-storing circuit 540 such that the resistor 542 and the capacitor 544 are between the cathode 754 and ground. The cathode 754 may be connected to the clamping surface 506. In this configuration, the diode 750 allows electric charge to flow to the clamping surface 506 from the DC-DC converter 530 but inhibits charge from flowing from the clamping surface 506 through the DC-DC converter 530 or through the HV driver 520 to ground. For a clamping voltage $V_{clamp}$ of about 40 V, an example of a suitable low leakage diode is a model BAS116 Low Leakage Diode manufactured by Phillips Corporation of Eindhoven, The Netherlands. Alternatively, the diode 750 may be replaced with a high isolation transistor, such as a field effect transistor (FET) or bipolar transistor having sufficiently low leakage. Alternatively an Analog Switch or Multiplexer (MUX) may be used to provide an equivalent function to that of the diode 750.

Power failure detection may be implemented by real-time monitoring of voltage levels through an A/D pin on controller 510. The code 516 may include software for analyzing voltage over time to calculate slope trends and track the sharp voltage drop that occurs at the instant that power is failing so that the system controller can take action in response to the power failure event. Monitoring may be facilitated by an analog to digital (A/D) converter 765, which may be implemented as one or more of the I/O circuits 514 of the controller 510. By way of example, the controller 510 may sense a loss of power by comparing the logic voltage level $V_{CC}$ to a reference voltage level $V_{REF}$. Such a comparison may be implemented, for example, by use of a voltage divider network 760, a resistor 770, and a Zener diode 775. The voltage divider network 760 is coupled between a source of logic voltage $V_{CC}$ and ground. The voltage divider network 760 is coupled to the controller 510, e.g., through the A/D converter 765. The voltage divider network 760 provides a voltage that is some known fraction of the actual voltage from the source of logic voltage, e.g., $\frac{1}{2}V_{CC}$. Thus, if the source provides a $V_{CC}$ level of 5 volts, the voltage divider network 760 provides 2.5 volts. If the $V_{CC}$ level drops to 4.0 volts, the voltage divider network 760 provides 2.0 volts. The resistor 770 and Zener diode 775 provide a reference voltage $V_{REF}$ that is substantially fixed, e.g., at 2.5 volts. An example of a suitable Zener diode is a model ZRC250F01 from Zetex of Oldham, United Kingdom. The reference voltage $V_{REF}$ is also provided from the Zener diode 775 to the controller 510, e.g. via the A/D converter 765. The controller 710 may then compare the value of $\frac{1}{2}V_{CC}$ to the reference voltage $V_{REF}$. If the value of $V_{CC}$ drops due to a power failure the value of $\frac{1}{2}V_{CC}$ also drops, but the Zener diode 775 retains the reference voltage $V_{REF}$ at a sufficiently fixed value so that the controller 510 can sense a power failure by comparing $\frac{1}{2}V_{CC}$ to $V_{REF}$.

The controller 510 may also monitor the clamping voltage $V_{clamp}$ provided by the DC-DC converter 530. This is useful, for example, where the controller stabilizes the value of $V_{clamp}$. However, the clamping voltage $V_{clamp}$ may be higher than a maximum voltage that can safely be applied to the A/D converter 765. In such a case it is useful to reduce the voltage provided to the controller 510, e.g., through the use of a voltage divider network 760. Although the voltage divider network 760 and A/D converter 765 are shown in the low leakage diode example of FIG. 7, those skilled in the art will also recognize that a similar voltage divider network may be used with an opto-isolator or other type of isolator 550.

The method 400 of the present inventions begins at step 402 by coupling the charge-storing circuit 540 between the clamping surface 406 and ground. By way of example, the charge-storing circuit 540 may be hard wired to a circuit board containing the controller 510, high voltage driver 520, DC-DC converter 530, or it may be located externally and coupled there said components via standard I/O ports as one skilled in the art would be capable of applying. The isolator element 550 may be hard wired to the circuit board. It is desirable to have a high impedance and low leakage current between the components and ground. To reduce leakage currents it is often desirable to ensure that the various components of the apparatus 500, and the board or substrate to which they are mounted, are clean.

At step 406, a clamping voltage is applied to the clamping surface 506 via the isolator 550, which couples the DC-DC converter 530 to the clamping surface 506. In the example shown, if the moveable element 504 is to be retained in the "ON" position, the high voltage driver 520 may electrically couple the moveable element 504 to ground. The clamping voltage $V_{clamp}$ produces an electric force that retains the moveable element 504 in the "ON" position when the moveable element is connected to ground e.g., through the high voltage driver 520. Although the charge-storing circuit 540 is designed to hold the charge on the clamping surface 506 in the event of a power failure, charge may leak to ground through the DC-DC converter 530 and/or the high voltage driver 520. Therefore, at step 408 it is important to electrically isolate the source of clamping voltage from the clamping surface 506 in the event of a power failure. Furthermore, it is important to keep the MEMS element 504 at a suitably low voltage if the MEMS element 504 is to be clamped to the clamping surface. By way of example, the high voltage driver 520 may simply operate in a "fail safe" mode, in which it couples the MEMS element 504 to ground automatically in the event of a power failure.

Additional actions may be taken in association with step 408, e.g., where the MEMS optical switch 501 is part of a network. Examples of such steps may be understood by simultaneously referring to FIG. 4 and FIG. 8, which illustrates a system 790 according to an alternative embodiment of the present invention. The system 790 generally includes a network element 799 which may be coupled to one or more other network elements 870, 880 via a network 890. The network elements 799, 870, 880 may operate in response to instructions from a network management software 892 coupled to the network 890. The network element 799 includes a switch fabric 800 and other network element components 860. The switch fabric 800 includes an optical switch 801, a controller 810, a high voltage driver 820, a DC-DC converter 830, a charge-storing circuit 840 and an isolator 850. These components may have features in common with the corresponding components described above with respect to FIG. 5 and/or FIG. 7 and may be configured in a similar fashion. The optical switch 801 may include an array of moveable elements 804 that are moveably coupled to a substrate 802. The moveable elements 804 may be selectively clamped to a clamping surface 806, e.g. at top chip, as described above with respect to FIG. 5. For example, the high voltage driver 820 may have a set of outputs 825 that are coupled to the moveable elements 804. The optical switch 801 may operate in response to signals from a controller 810 having features in common with the controller 510 described above. By way of example, the controller 810 may be configured to include a CPU 811, memory 812 input/output (I/O) functions 514, and an analog to digital (A/D) I/O function 819, all of which may communicate with each other via a system bus 815. The A/D I/O function 819 may be coupled to the HV driver 820 and or DC-DC converter 830 to facilitate power failure monitoring. The memory 812 may contain instructions, e.g., in the form of the program code 816. The code 816 may include instructions for implementing certain steps of the method 400. The program code 816 may include network element interface 817 which may be implemented in software e.g. in a subroutine in memory 812 or hardware to allow the controller 810 to communicate with the network element 799 and/or the network 890. Such communication may include, but is not limited to, switching commands issued from the network element 799 to the switch fabric 800 and switch state data transmitted from the switch fabric 800 to the network element 799.

The other network element components 860 may include, but are not limited to multiplexers, demultiplexers, photo detectors, variable optical attenuators, optical amplifiers, packet routers, optical-electronic-optical (OEO) components, such as non-optical routers, port cards, and the like.

Figure 8:
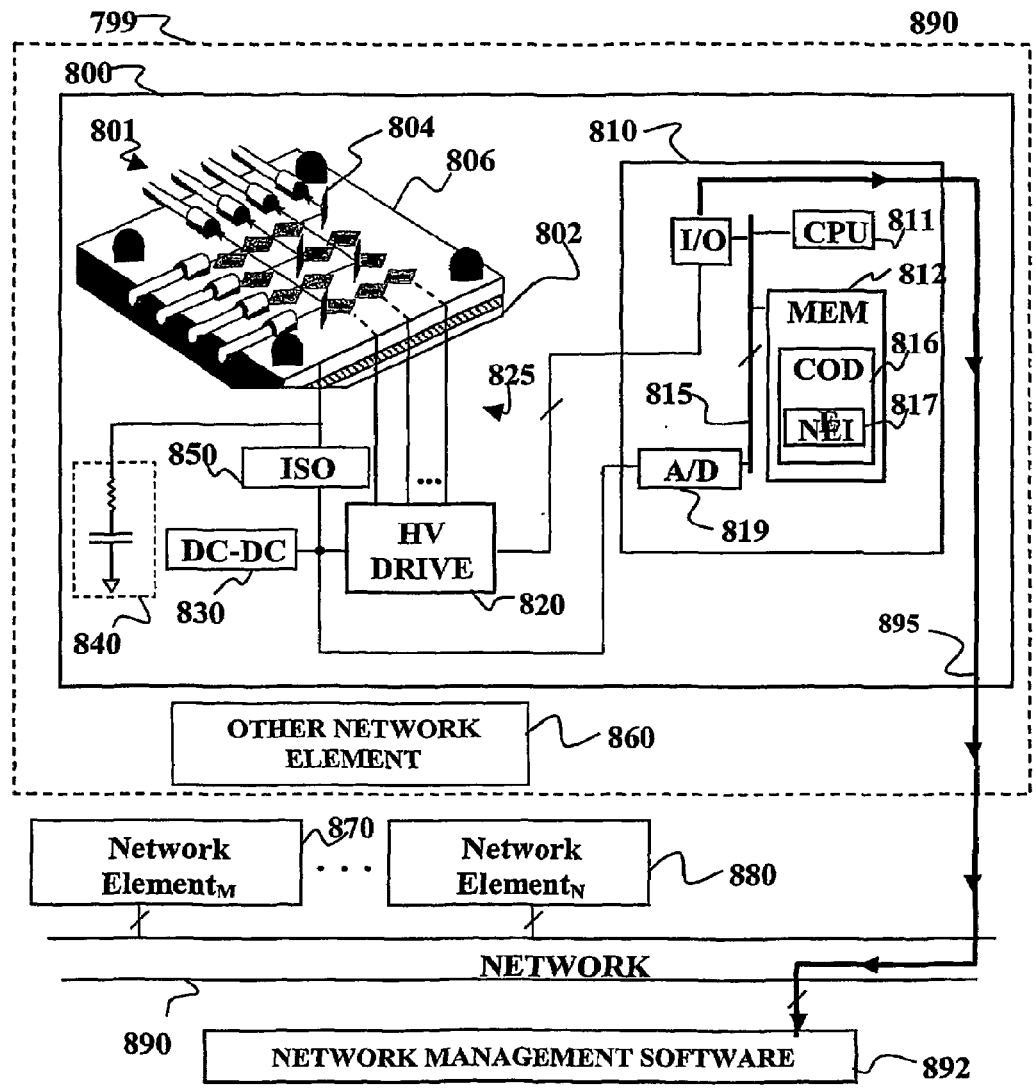
FIG. 8 is a schematic diagram of a system for maintaining the state of a MEMS device in the event of a power failure according to an alternative embodiment of the invention.
Figure 9:
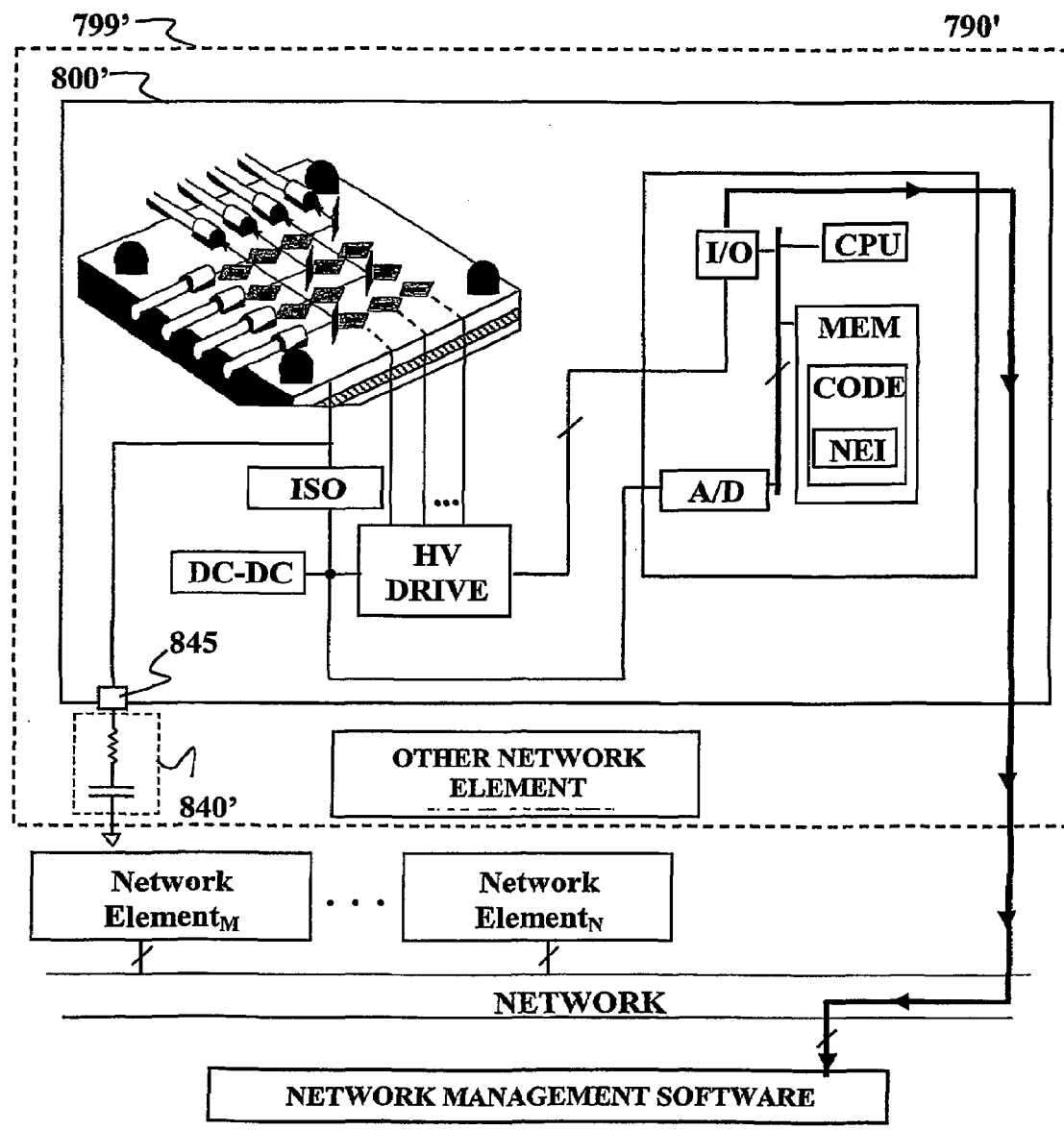
FIG. 9 is a schematic diagram of an alternative system for maintaining the state of a MEMS device in the event of a power failure according to an alternative embodiment of the invention.

An alternative system 790' is depicted in FIG. 9. The system 790' has features in common with the system 790 of FIG. 8. Specifically, the system 790' has a network element 799' and switch fabric 800' with a charge storage circuit 840'. These elements are configured in a substantially similar fashion to that shown and described with respect to FIG. 8. However, the charge storage circuit 840' is separate from the switch fabric 800' and is coupled to it through a port 845. Thus, the charge storage circuit may be provided, e.g., sold, separately from the switch fabric 800' and the other components in the system 790'.

Referring back to FIG. 4, at optional step 410 the controller 810 may implement a controlled shutdown feature during power failure. The controlled shutdown may include, but is not limited to, saving the state of the switch 801 in the memory 812 and communicating to the host Network Element 799 the fact that the switch 801 lost power at a particular time, e.g., mm:dd:yy at hh:mm:ss. This is useful because it allows the Network Element 799 or higher-level switch that controls the switch fabric 800, of which the switch 801 may be a part, to trigger maintenance alarms 895 with respect to the discharge and time remaining in the latching period. The alarms 895 may be communicated to the network management software 892 or to the network element 799. Flags triggered by the alarms 895 can also be stored in the memory 812, e.g. FLASH memory, with the state of the switch to enable certain actions to be taken on power up after the switch has recovered power. These actions may include informing the Network Element that power has been recovered.

The method 400 may also optionally include related features such as a controlled shutdown and boot-up. During power failure detect, the controlled shutdown feature may save the current state of the switch 801. In the event of a power failure, there is often a time lag, e.g. al milliseconds of clock cycle time remaining before the value of $V_{CC}$ drops below a level at which the controller ceases to function. During this interval, the controller program code 816 may execute instructions for the controller 810 to signal the host Network Element 799 with the event, date and time the switch fabric lost power. By signaling the Network Element 799 during shutdown, the Network Element 799 can prioritize maintenance alarms with respect to discharge period and track the time remaining in the latching period, i.e., the time remaining before charge leaks from the clamping surface 806 to the point that there is no longer sufficient force to clamp the moveable element in the "ON" position. With reference to FIG. 8, the signal alarm 895 transmitted to the Host Network Element 799 may be relayed to the network 890 so that network management control software 892 that manages control of the network elements 799,870, 880 can manage network resources in a contingency plan. The network management software 892 generally keeps track of and controls the inventory of network element assets. When a signal alarm 892 is transmitted from the network element 799, it may contain a node I.D. enabling network management software 892 to reference in a database those features associated with the network element node. As so the network management software 892 may derive from the signal alarm the amount of latching time associated with the network element 799 which can then be used to trigger and prioritize maintenance schedules and redirect traffic in response to the downed system. It should be understood that the signal alarm 895 itself may include data encoding the latching duration associated with downed system.

In addition to notification of power failure, the program code in the system of FIG. 3 may also direct the controller 810 to flag the power failure event in a non-volatile memory, e.g., a FLASH memory, to enable a smart boot-up of the fabric, so that the fabric can handle special circumstances and signal the network element on power recovery, such as signaling an alarm to the host network element so that itself and/or the network management software can be configured in response thereto.

Referring to both FIG. 5 and FIG. 8, when the power returns after a power failure, the DC-DC converter 530, 830 may require some finite amount of time to ramp up to the clamping voltage $V_{clamp}$. To restore the state of the switch 501, 801 it is often desirable to include in the method 400 an optional step 412 of doing a proper power-up sequence for the HV driver 520, 820 and restoring the states of the HV driver outputs 525, 825. Furthermore, when the power returns after a power failure, the DC-DC converter 530, 830 may require some finite amount of time to ramp up to the clamping voltage $V_{clamp}$. The method 400 may include a step 414 of waiting for a voltage provided by the source of clamping voltage $V_{clamp}$ (e.g., the DC-DC converter 530) to ramp up to the clamping voltage level $V_{clamp}$ in the event power returns after the power failure. This step is useful if an opto-isolator, photoMOS relay, or other such bi-directional current switching device is used to isolate the clamping surface from the DC-DC converter. If the output of the DC-DC converter 530, 830 were applied to the top chip 506, 806 in this manner before the output voltage has reached the minimum clamping voltage $V_{clamp}$, the top chip 506, 806 will experience a sudden dropout in clamping voltage and the moveable elements 504, 804 being held up may drop. By way of example, the controller 510, 810 may be programmed to read the voltage produced by the DC-DC converter 530, 830 to ensure that the desired clamping voltage level has been attained. Alternatively, the controller 510, 810 may be programmed to wait for a predetermined amount of time that is sufficient to allow the DC-DC converter to ramp up to the clamping voltage level. In either case, the source of clamping voltage may subsequently be reconnected to the clamping surface 506, 806 in step 416. Some systems may require all of steps 402–416 to ensure that the moveable elements 504, 804 do not fall in the event of a power failure. In the diode switching implementation of FIG. 7, however, clamping voltage dropout is less likely due to the unidirectional current regulation characteristic of the diode 750 and thus step 416 is unnecessary for this case.

It is possible to use various alternatives, modifications and equivalents. It should be understood that the clamping voltages may take on various values and that the polarity of clamping components may be reversed; for example the clamping surface 506, 806 may be held at ground, the substrate 502, 802 may be held at 30 volts, and 30 volts may be applied to the movable element(s) 504, 804 to clamp it in the ON state. It should be understood that the clamping surface 506, 806 may exert an electric force on the movable element such that the moveable element(s) 504, 804 need not make physical contact with the respective clamping surface 506, 806. It should also be understood that, though specific example applications are shown that relate to a specific sub-field of optical communications, the present invention may be applied to maintain the state of a MEMS device in a variety of other applications within optical communications as well as other applications utilizing MEMS moveable elements. Such applications may include or relate to, but are not limited to, waveguides, relays, mixers, pumps, accelerometers, RFMEMS, bioMEMS etc.

C. Cantilevered Microstructures

Equipotential landing pads of the type described above with respect to FIGS. 2A–2B may be incorporated into a cantilevered microstructure. Cantilevered microstructures are particularly useful for optical cross-connect (OXC) applications such as crossbar switches. An optical crossbar switch can provide interchange of data paths between different fibers, at multi-gigabit data rates, without having to first convert them into the electronic domain as is being done in existing networks. An N×N optical crossbar switch consists of N input and N output optical fiber ports, with the capability of selectively directing light from any input port to any output port in a "non-blocking" fashion. Currently, switches deployed in the communication infrastructure operate by converting the input optical signals to electronic signals, directing the electronic signals to the proper output channels, and converting them back into optical signals. In an all-optical OXC, the light is directly deflected from an input fiber port into an output fiber port without any electrical conversion. Each of the optical beams can be expanded and collimated by inserting a microlens at the tip of each input and output fiber port. By propagating an array of optical beams in free space and selectively actuating reflectors in an array of movable reflectors, any one of the N input optical beams can be directed to any one of the N output fibers ports. The core of each input and output fiber port is the region in which most of the optical beam travels. Due to the small diameter of the core, the optical crossbar switch requires the reflectors to be maintained at a precise position in order to direct each optical beam from one fiber port to another.

Figure 10:
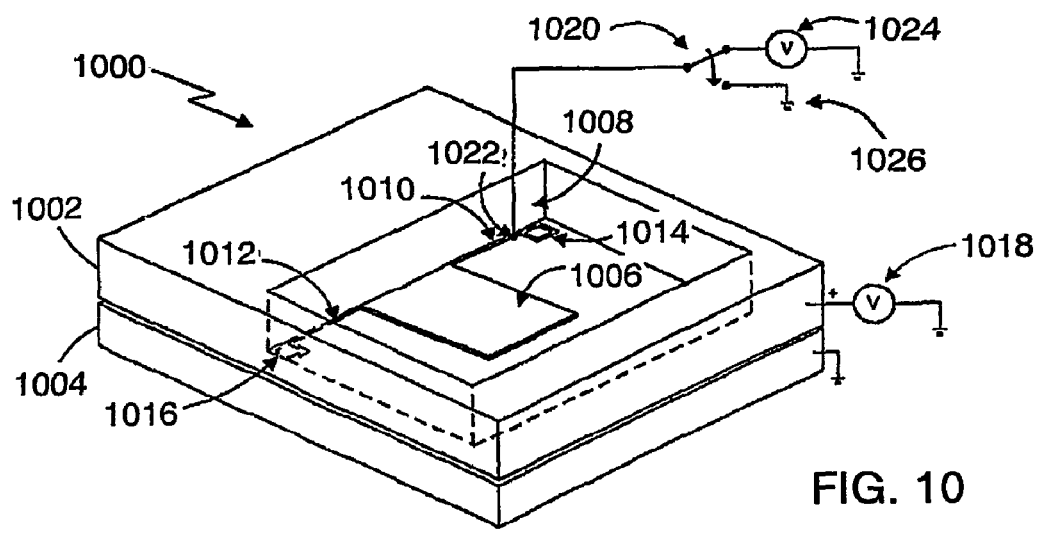
FIG. 10 is a diagrammatic perspective view of a movable microstructure apparatus.
Figure 11A:
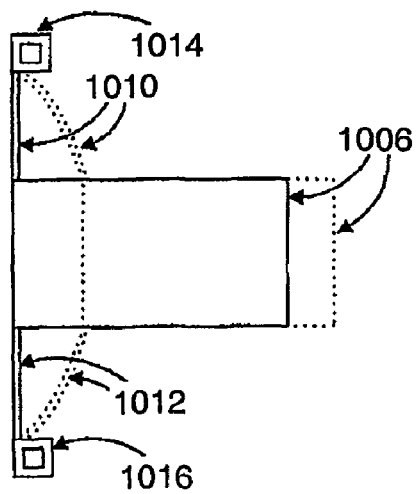
FIG. 11a is a diagrammatic top view of a movable microstructure apparatus having a different lateral position with respect to an anchor location and a different angular orientation about an anchor location with respect to a first angular orientation.
Figure 11B:
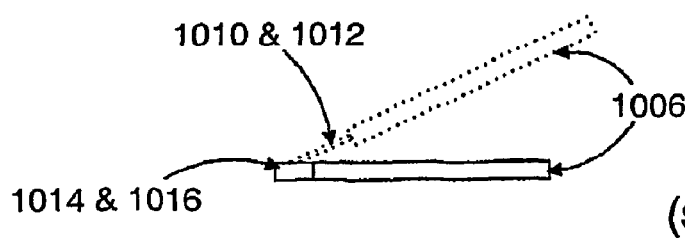
FIG. 11b is a diagrammatic side view of a movable microstructure apparatus having a different lateral position with respect to an anchor location and a different angular orientation about an anchor location with respect to a first angular orientation.

An example of a cantilevered microstructure apparatus is depicted in FIGS. 10–11b. FIG. 10 shows an apparatus 1000 having a stop 1002, a base 1004 and a plate 1006. The plate 1006 is coupled to the base 1004 and is movable between a first angular orientation and a second angular orientation. The stop 1002 has at least one substantially planar sidewall 1008 that is configured to contact the plate 1006 in a contact area when the plate 1006 is in the second angular orientation. In one implementation, a substantially planar sidewall 1008 is constructed to lie in a plane which is orthogonal to the top surface of the base 1004.

The apparatus 1000 is fabricated by a MEMS process. The base 1004 may be composed of an insulating layer disposed over a semiconductor substrate; for example, silicon nitride, silicon oxide, or a combination of both, may be disposed over a silicon substrate. The plate 1006 may be a rectangular beam formed from a conductive material or a semiconductive material such as polycrystalline silicon. A layer of magnetic material may be plated onto the plate 1006. More than one region of the plate 1006 may be so plated. The magnetic material may be one of various combinations of nickel, iron, or other elements, and is usually ferromagnetic characterized by a high saturation magnetization.

The plate 1006 may be coupled through flexures 1010 and 1012 to the base 1004 at anchor locations. In one implementation, insulative anchors 1014 and 1016 are used to attach the flexures 1010 and 1012 to the base 1004. The flexures 1010 and 1012 may be formed from a flexible and resilient conductive or semiconductive material (e.g., polycrystalline silicon). The flexible material provides the flexures 1010 and 1012 with a degree of elasticity. The flexures 1010 and 1012 allow the plate 1006 to change its angular orientation about the anchors 1014 and 1016 with respect to the first angular orientation and its lateral position with respect to the anchors 1014 and 1016, as shown in FIGS. 11*a* and 11*b*.

In one implementation, the stop 1002 is coupled to a voltage source 1018 and the base 1004 is electrically grounded. An electrostatic clamping circuit can be formed from a switch 120, a contact 1022 for forming a connection between the switch 1020 and the flexure 1010, the plate 1006, the flexure 1012, and the anchor 1016, and is switchable between a voltage source 1024 and electrical ground 1026. The voltage sources 1018 and 1024 may be external sources such as power supplies or batteries, or internal sources on the apparatus 1000. An electrostatic bias can be created between the plate 1006 and one of the clamping surfaces (base 1004 and stop 1002) depending on the position of the switch 1020.

Figure 12A:
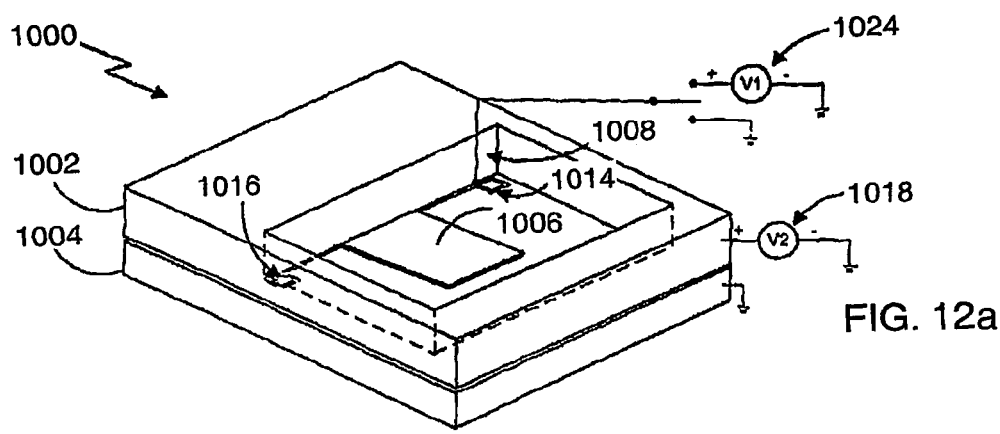
FIGS. 12a–12f are diagrammatic perspective views of the movable microstructure apparatus of FIG. 10 upon application of various combinations of a magnetic field and an electrostatic bias.
Figure 12B:
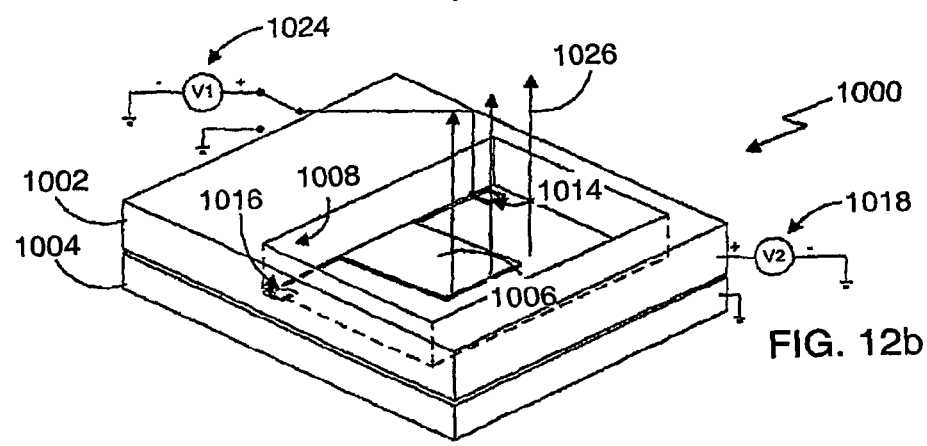
Figure 12C:
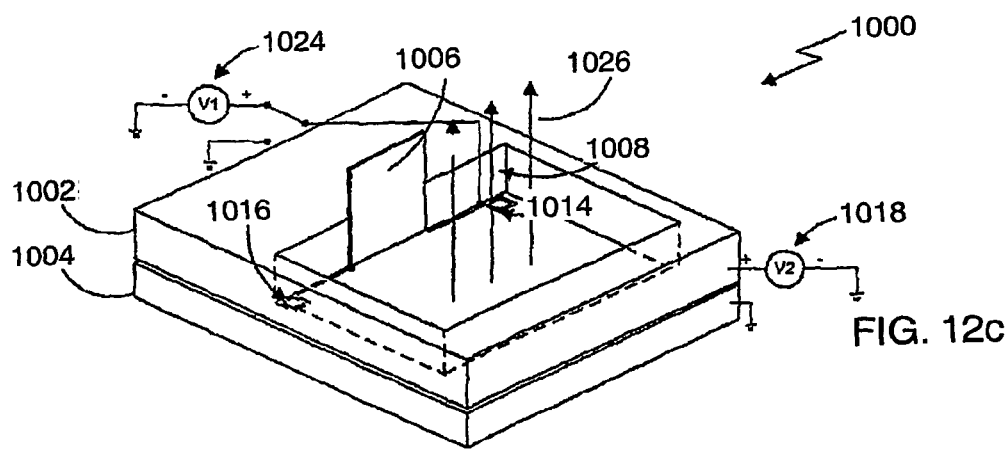
Figure 12D:
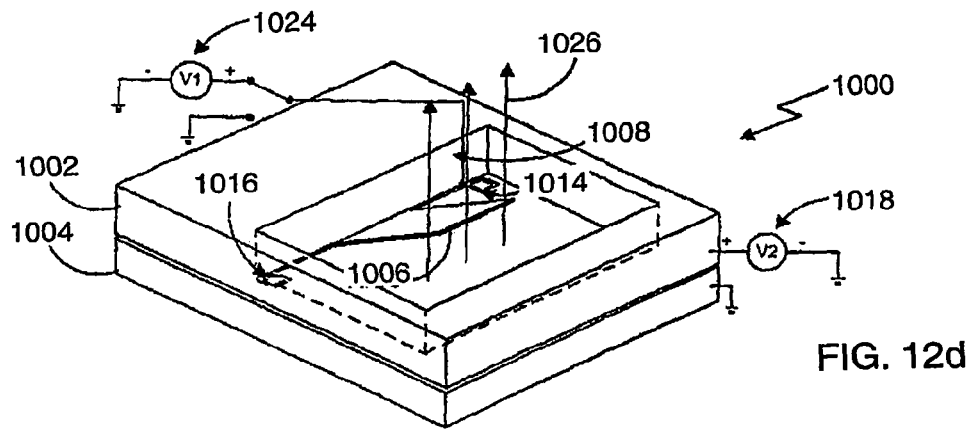
Figure 12E:
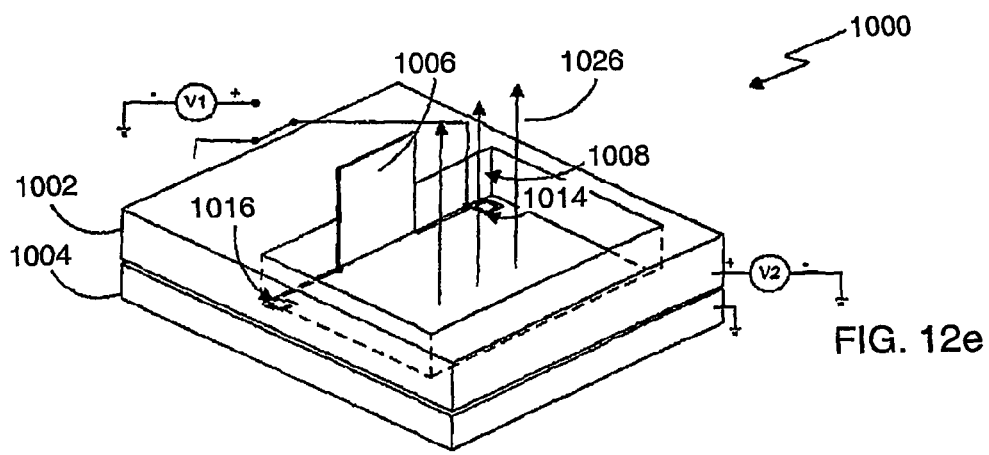
Figure 12F:
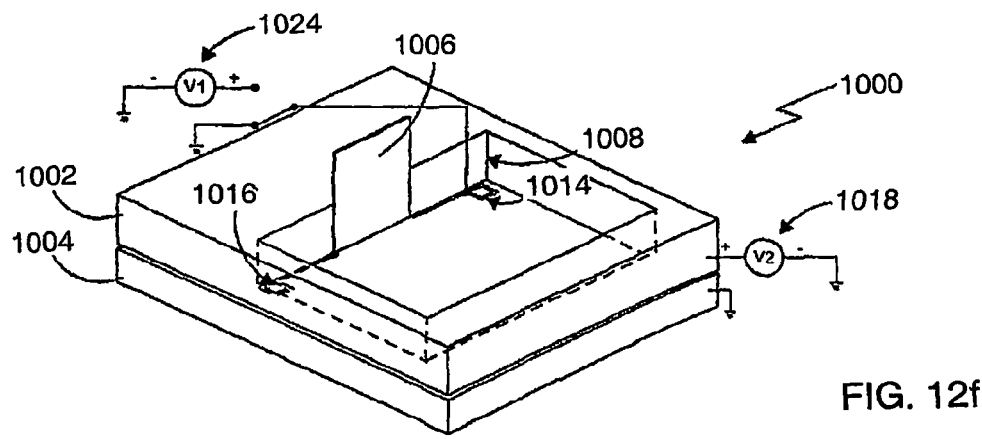

Referring to FIG. 12*a*, in the absence of any applied force, the plate 1006 lies in the first angular orientation substantially parallel to the base 1004. The voltage source 1024 may be coupled to the electrostatic clamping circuit to create an electrostatic bias between the plate 1006 and the base 1004 upon application of a voltage V1. If a sufficient voltage V1 is applied, the plate 1006 is "clamped" to the base 1004 and restrains the plate 1006 from rotating in the presence of an applied force, for example, a magnetic field 1026 as shown in FIG. 12*b*. If the plate 1006 is not clamped to the base 1004, application of the magnetic field 1026 would cause the plate 1006 to be rotated about the anchors 1014 and 1016 between the first angular orientation and the second angular orientation until there is an equilibrium between the resultant torque from the torsional stretching of the flexures 1010 and 1012 and the force on the plate 1006 caused by the magnetic field 126. The angular orientation of the plate 1006 at the equilibrium point defines a static equilibrium position. In one implementation, the static equilibrium position is the second angular orientation, as shown in FIG. 12*c*. In another implementation, the static equilibrium position is between the first angular orientation and the second angular orientation, as shown in FIG. 12*d*. In this implementation, the force on the plate 1006 resulting from the application of the magnetic field 1026 can be time-varying, such that the plate 1006 is provided with a momentum that rotates the plate 1006 beyond the static equilibrium position to the second angular orientation. The time-varying force on the plate 1006 may have a step profile, a ramp profile, a sinusoidal profile or a pulse profile. Once the plate 1006 is in the second angular orientation, an electrostatic bias may be created between the plate 1006 at electrical ground and the stop 1002 having a voltage V2, as shown in FIG. 12*e*. The plate 1006 clamps to the sidewall 1008 in a contact area characterized by a height b and a width w provided the following condition is satisfied:

torque about axis defined through anchors torque resulting from torsional 1014 and 1016 resulting from electrostatic bias≧stretching of flexures 1010 and created between plate 1006 and stop 102 1012

$$\frac{\varepsilon w V^2}{2g^2} \times \frac{b^2 + 2ab}{2} \geq k_\theta \theta \qquad (1)$$

where $\varepsilon$ is a constant representing the permittivity of a material separating the electrically conductive portion of the plate 1006 and the electrically conductive portion of the stop 1002 when plate 1006 is in contact with the stop 1002, V is a voltage applied to create an electrostatic bias between the plate 1006 and the stop 1002, g is a distance separating the electrically conductive portion of the plate 1006 and the electrically conductive portion of the stop 1002 when the plate 1006 is in contact with the stop 1002, $k_\theta$ is a torsional spring constant of the flexures 1010 and 1012, $\theta$ is the angular orientation of the plate 1006 about the anchors 1014 and 1016 with respect to the first angular orientation, and a is a distance separating the stop 1002 and the base 1004. Once the plate 1006 is clamped to the sidewall 1008, removing the magnetic field 1026 has no effect on the angular orientation of the plate 1006, as shown in FIG. 12*f*.

FIG. 13*a* shows the stop 1002 coupled to the base 1004 with a slight misalignment In this example, the anchors 1014 and 1016 are offset from a plane 1302 defined through the contact area of stop 1002. The plate 1006 is movable through an obtuse angle $\theta$ about the anchors 1014 and 1016 with respect to the first angular orientation. In the absence of an applied force, the plate 1006 lies in the first angular orientation substantially parallel to the base 1002. If the plate 1006 is not clamped to the base 1004, application of the magnetic field 1026 may rotate the plate 1006 about the anchors 1014 and 1016 until the plate 1006 contacts a top edge 1028 of the stop 1002 in the second angular orientation, as shown in FIG. 13*b*. The plate 1006 clamps to the sidewall 1008 in a contact area characterized by a height b and a width w as shown in FIGS. 4*c* and 4*d* provided two conditions are satisfied: (i) condition 1 defined above; and (ii) the following condition:

ti torque about axis defined through top torque resulting from the lateral edge 1028 resulting from electrostatic bias≧stretching of flexures 1010 and 1012 created between plate 1006 and stop 1002

$$\frac{\varepsilon w V^2}{2g^2} \times \frac{b^2}{2} \geq kd(a+b) \qquad (2)$$

where k is a lateral spring constant of the flexures 1010 and 1012, and d is a distance separating the location of the anchors 1014 and 1016 and a plane defined by the contact or overlap area 1304 of the stop 1002.

Figure 14A:
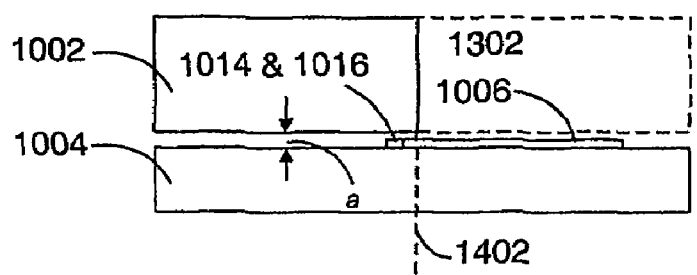
FIG. 14a is a diagrammatic side view of a movable microstructure apparatus, where a base and a stop have a slight misalignment.
Figure 14B:
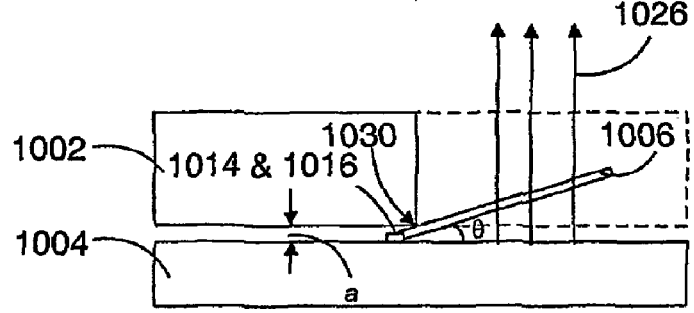
FIG. 14b is a diagrammatic side view of the movable microstructure apparatus of FIG. 14a upon application of a magnetic field.
Figure 14C:
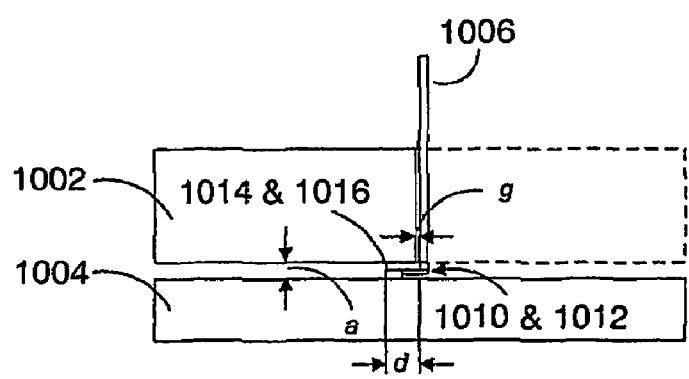
FIG. 14c is a diagrammatic side view of the movable microstructure apparatus of FIG. 14a upon application of an electrostatic bias between the plate and the stop.

FIG. 14*a* shows the stop 1002 coupled to the base 1004 with an alternative misalignment. In this example, the anchors 1014 and 1016 are offset from a plane 1402 defined through the contact area of the stop 1002. The plate 1006 is movable through an acute angle θ about the anchors 1014 and 1016 with respect to the first angular orientation. In the absence of an applied force, the plate 1006 lies in the first angular orientation substantially parallel to the base 102. If the plate 1006 is not clamped to the base 1004, application of the magnetic field 1026 may rotate the plate 1006 about the anchors 1014 and 1016 until the plate 1006 contacts a bottom edge 1030 of the stop 1002 in the second angular orientation, as shown in FIG. 14*b*. The plate 1006 clamps to the sidewall 1008 in a contact area characterized by a height b and a width w as shown in FIG. 14*c* provided two conditions are satisfied: (i) condition 1 defined above; and (ii) the following condition:

torque about axis defined through bottom torque resulting from the lateral edge 1030 resulting from electrostatic bias≧stretching of flexures 1010 and created between plate 1006 and stop 1002 1012

$$\frac{\varepsilon w V^2}{2g^2} \times \frac{b^2}{2} \geq kda \quad (3)$$

In the three cases described above and shown in FIGS. 12*f*, 13*c* and 14*c*, in the absence of an applied force, the plate 1006 returns to the first angular orientation substantially parallel to the base 1004 as the torsional and lateral stretching of the flexures 1010 and 1012 are relaxed.

Figure 15A:
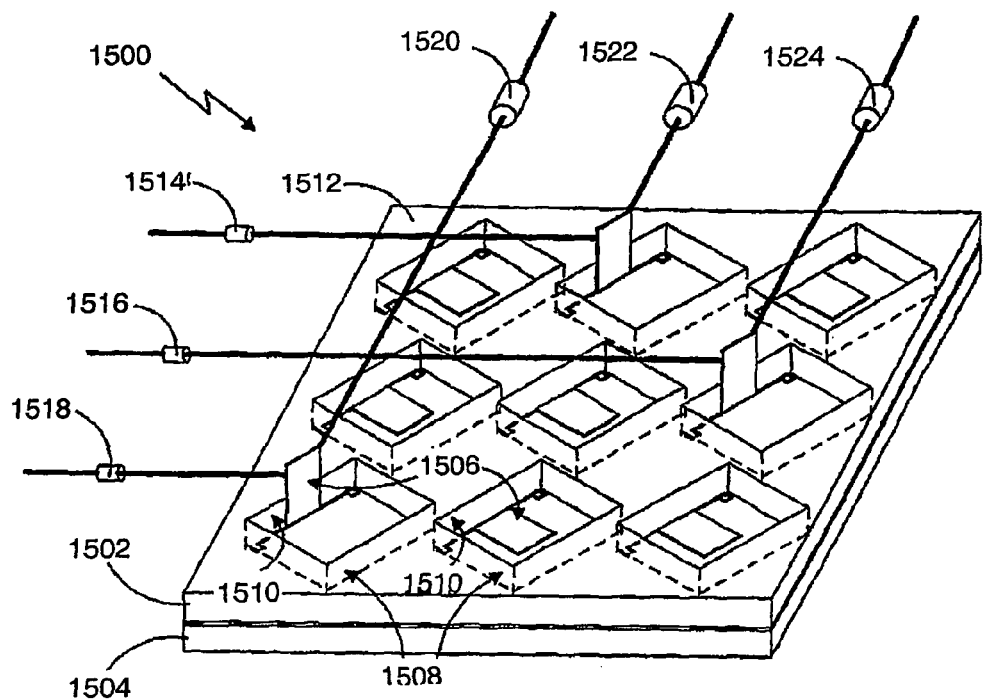
FIG. 15a is a diagrammatic perspective view of an N×M system movable microstructure apparatus used as an optical switch.
Figure 15B:
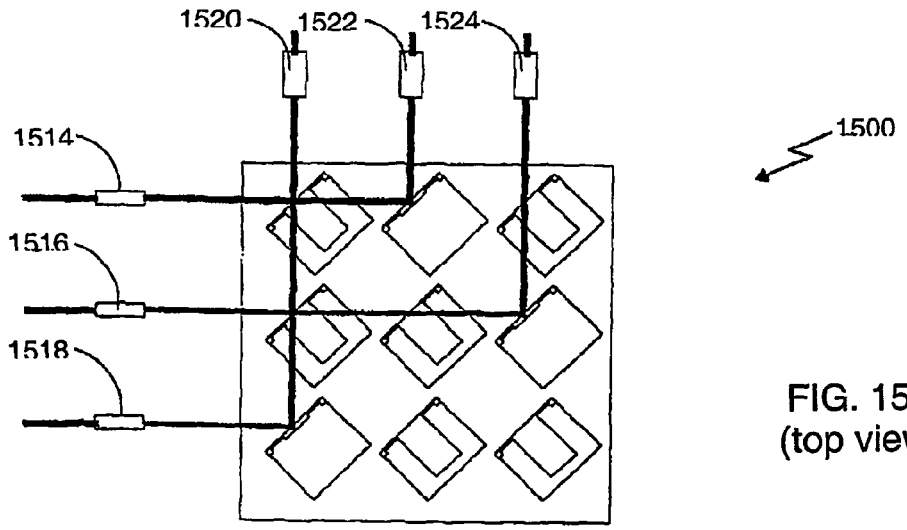

FIGS. 15*a* and 15*b* show an apparatus 1500 having a stop assembly 1502 coupled to a base assembly 1504. The base assembly 1504 has an array of plates 1506. Each plate may be coupled to the base assembly 1504 by at least one flexure which permits each plate to change its angular orientation and lateral position. The stop assembly 1502 may have an array of substantially planar surfaces. Each substantially planar surface may be configured to contact a respective plate in a contact area sized so that, upon application of a force to the plate substantially normal to the substantially planar surface of the stop assembly 1502, a sufficient force holds the plate against the stop assembly 1502 in a plane substantially parallel to the substantially planar surface of the stop assembly 1502. In one implementation, the stop assembly 1502 defines an array of apertures 1508, as shown in FIG. 15*a*. Each aperture has at least one substantially planar surface 1510 that contacts a respective plate in a contact area. Each substantially planar surface 1510 is constructed to lie in a plane normal to the base assembly 1504. The array of plates 1506 may be coupled to an electrostatic clamping circuit such that each plate may be individually selected to be clamped to its respective surface 1510 or to the base assembly 1504. In an alternative implementation (not shown), the stop assembly may define an array of cavities, each cavity having at least one substantially planar surface that contacts a respective plate in a contact area.

One application of the apparatus 1500 is an optical switch. In one implementation, the array of plates 1506 act as reflectors. A suitable reflector coating may be deposited on the portion of each plate above the plane of a top surface 1512 of the stop assembly 1502 to enhance reflectivity if desired. In an alternative implementation, the array of plates 1506 act as beam splitters. Each plate may be constructed from a material that transmits and reflects different parts of an optical beam. Each plate may be similarly sized and constructed such that each sidewall 1510 contacts a bottom portion of its respective plate.

FIG. 15*a* shows the apparatus 1500 having three optical inputs 1514, 1516, and 1518, and three optical outputs 1520, 1522, and 1524. The N inputs (1514, 1516, and 1518) are along one side of the apparatus 1500 and the M outputs (1520, 1522, and 1524) are along an adjacent side. The switching elements are the array of plates 1506. Each plate is oriented at a similar angle, for example, 45 degrees to an incoming optical beam. If the mth plate along one of the N input beams is clamped to its respective sidewall, that beam is reflected into the mth of the M outputs. All but one plate in a given input line may be held down by the electrostatic bias applied between the plate and the base assembly 1504. The plate that is clamped to its respective sidewall selects the output for that input line.

The materials from which the apparatus 1500 is fabricated, the voltage sources, the applied electrostatic bias, and the applied magnetic fields may be chosen by a user to adjust the sensitivity of the apparatus 1500 for any particular purpose or application. The apparatus 1500 may be fabricated using techniques including "lithographic, galvanoformung and abformung" (LIGA), traditional machining, deep anisotropic plasma etching and laser machining. The stop assembly 1502 may be fabricated by anisotropic etching of (110)-oriented silicon which ensures the angular uniformity of all the sidewalls 1510 on the stop assembly 1502. The array of plates 1506, sidewalls 1510 and the base assembly 1504 may be fabricated to have textured surfaces on one or more surfaces to reduce sticking when a plate is clamped to its respective sidewall or to the base assembly 1504. The textured surface may include dimples, bumps, and ridges such that the contact area may include the overlap area between the plate and the stop at a distance gap generally equal to the effective height of the texture. The number of plates defining the N-by-M array of plates 1506 may be adjusted based on the application of the apparatus 1500. The apparatus 1500 may be fabricated in a single batch-process and consist of a single stop-base module. Alternatively, the apparatus 1500 may be fabricated in a two-part process, one process for fabricating the stop assembly 1502 and the other process for fabricating the base assembly 1504. The stop assembly 1502 may be aligned with the base assembly 1504 in a separate alignment step.

The applied electrostatic bias may be an attractive force applied by the electrostatic clamping circuit described above or by other means, where the attractive force is defined as any force that pushes or pulls a plate towards a stop.

Figure 16A:
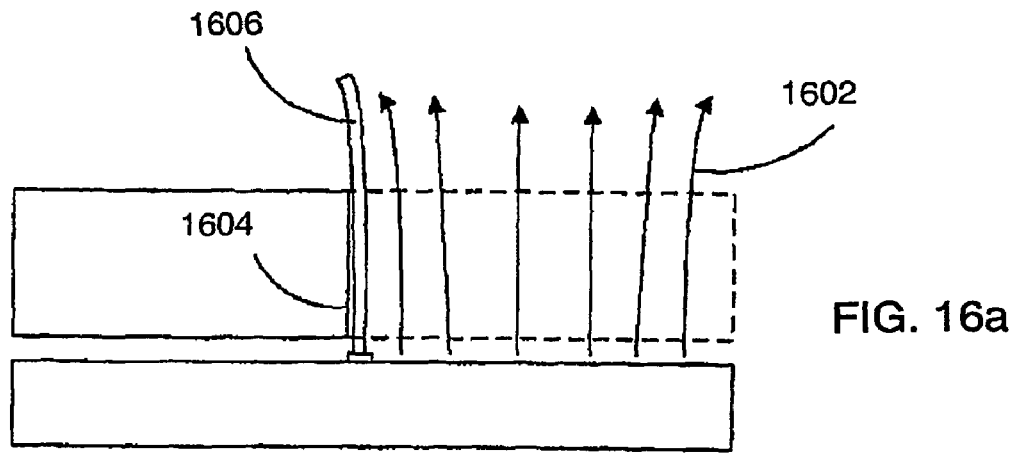
FIG. 16a is a diagrammatic side view of the movable microstructure apparatus of FIG. 10 upon application of a magnetic field, where the magnetic field is not parallel to a sidewall of a stop.
Figure 16B:
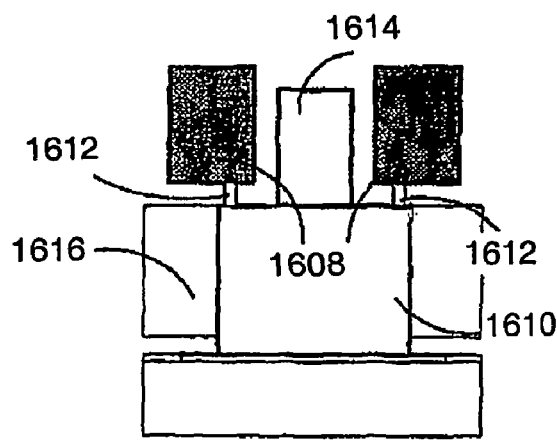
FIG. 16b is a diagrammatic front view of an alternate embodiment of a movable microstructure apparatus.
Figure 16C:
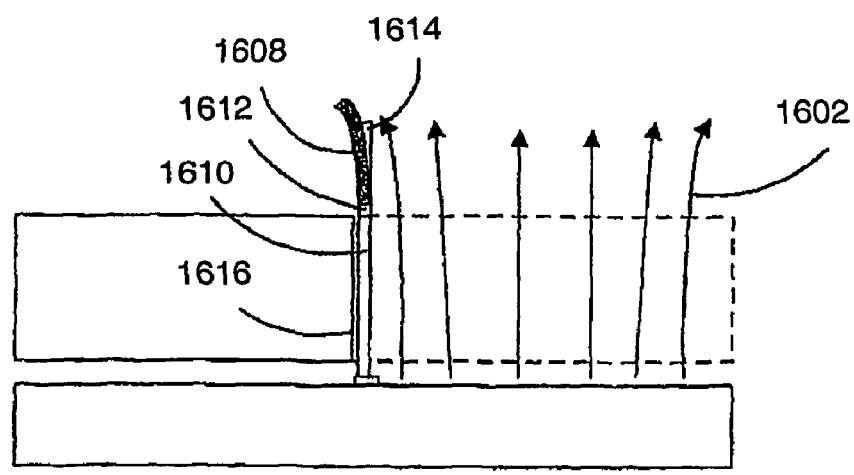
FIG. 16c is a diagrammatic side view of the movable microstructure apparatus of FIG. 16b upon application of a magnetic field, where the magnetic field is not parallel to a sidewall of a stop.

The magnetic fields may be applied using coils located internal or external to the apparatus 1500, or a permanent magnet located internal or external to the apparatus 1500. Current-carrying coils, hard magnetic materials, soft magnetic materials, or a combination of the three formed on each of the array of plates 1506 may apply a force to the plate in the presence of magnetic fields. Rotational magnetic fields may be used to apply torque to the flap. An applied magnetic field 1602 that is not perfectly parallel to the sidewall 1604 may induce a slight torque and resultant bending in the portion of the plate 1606 containing a reflective surface when the plate 1606 is clamped to the sidewall 1604, as shown in FIG. 16*a*. The resultant bending may cause a misalignment of a reflected beam. FIG. 16*b* shows an alternative implementation to the plate 1606 that reduces the bending effects on optical performance. The magnetic portion 1608 of the plate 1610 is connected to the rest of the plate 1610 by support arms 1612. The support arms 1612 isolate the portion of the plate 1610 containing a reflective surface 1614 from the magnetic field 1602 that is applied on the magnetic portion 1608 of the plate 1610. In this implementation, when the plate 1610 is clamped to the sidewall 1616, application of the magnetic field 1602 that is not perfectly parallel to the sidewall 1616 results in minimal bending in the portion of the plate 1610 containing the reflective surface 1614 as shown in FIG. 16c.

Other embodiments are within the scope of the present invention. For example, the steps of the method can be performed in a different order and still achieve desirable results.

D. Mosaic Tiling

Problems associated with large scale MEMS arrays may be overcome by tiling two or more MEMS device dies together to form a tiled MEMS device. Such a tiled device generally includes a substrate with two or more device dies attached to the substrate. Each device die includes one or more microelectromechanical (MEMS) optical elements. A common clamping die is attached to the device dies such that each MEMS optical element aligns with a corresponding clamping surface on the common clamping die. Such tiling techniques may be applied to MEMS devices that include equipotential landing pads of the type described above.

Figure 17A:
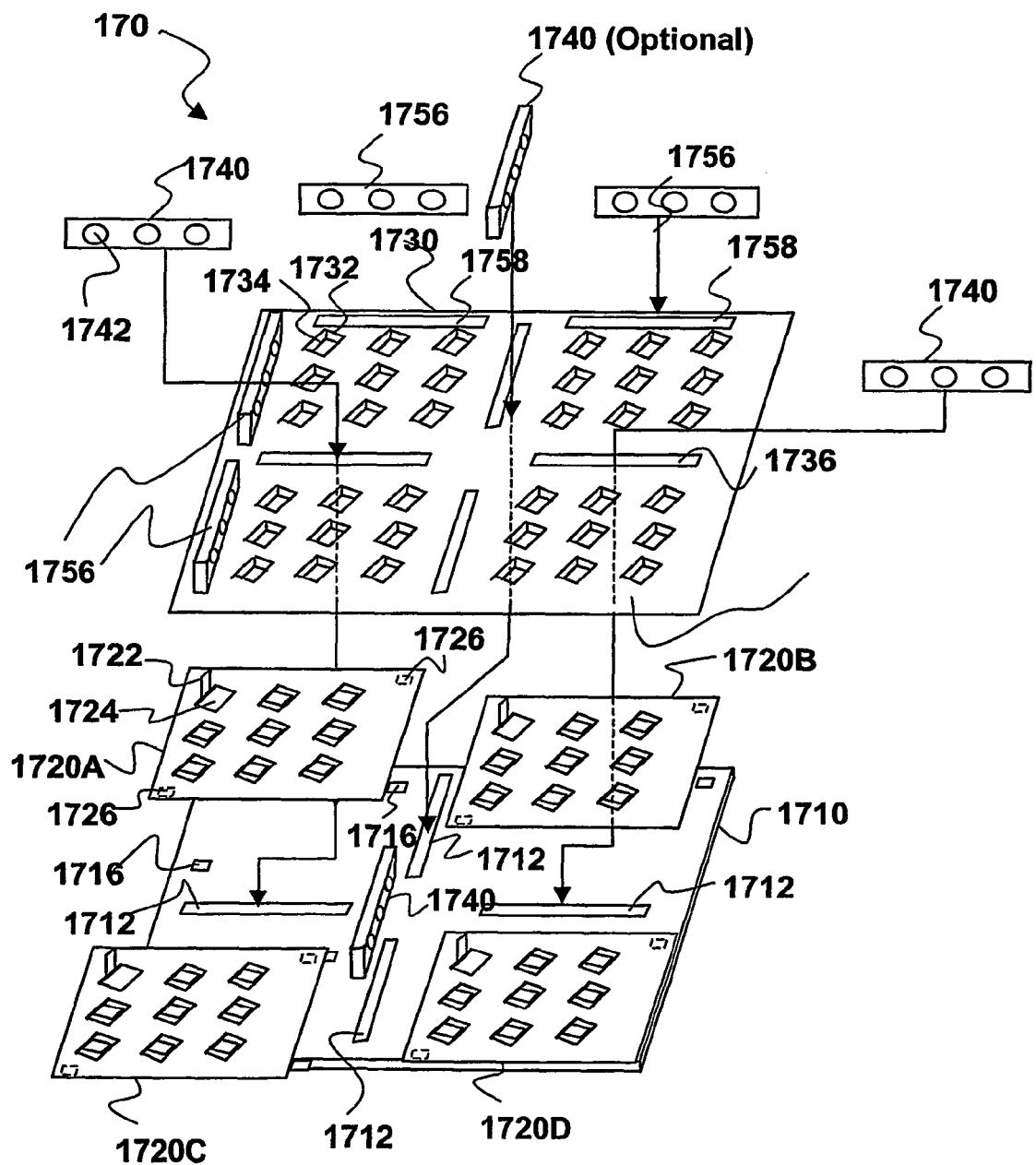
FIG. 17A is an exploded isometric diagram of a MEMS device according to an embodiment of the present invention.
Figure 17B:
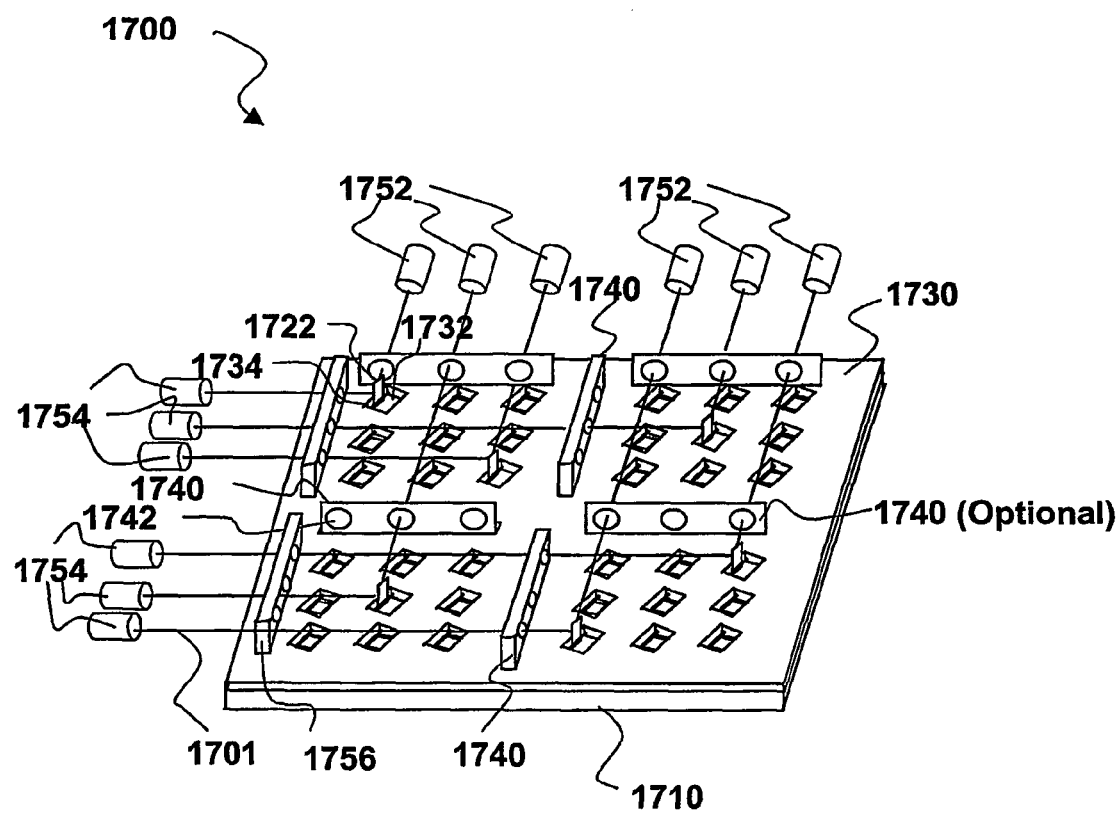
FIG. 17B is an isometric assembly diagram of the MEMS device of FIG. 17A.

FIG. 17A depicts an exploded isometric diagram of a MEMS device 1700 according to a first embodiment of the present invention. An assembly diagram of the device 1700 is depicted in FIG. 17B. The device 1700 may be used, for example, as an optical switch, as shown in FIG. 17B. The device 1700 may selectively couple optical signals 1701 between a first set of optical input/output (I/O) ports 1752 and a second set of I/O ports 1754 as shown in FIG. 17B. The I/O ports 1752, 1754 may be collimator lenses, such as graded refractive index (GRIN) lenses that couple the optical signals 1701 to and from optical fibers (not shown). To facilitate optical coupling to the I/O ports 1752, 1754, the device 1700 may include collimator arrays 1756 that are disposed along the perimeter of the device 1700. The device 1700 generally includes a substrate 1710, MEMS device dies 1720A, 1720B, 1720C, 1720D, and a common clamping die 1730. Each MEMS device die 1720A, 1720B, 1720C, 1720D may have an array of MEMS optical elements 1722. By way of example, each optical element 1722 may be in the form of a flap attached to the rest of the device die by one or more flexures 1724. The flap may include a reflective surface so that it may act as a MEMS mirror. The optical element 1722 may move between an "OFF" position and an "ON" position under the influence of an actuating force, such as a magnetic force. By way of example the optical elements 1722 may be oriented substantially parallel to the substrate 1710 in the "OFF" position and substantially perpendicular to the substrate in the "ON" position. In the "ON" position, the optical elements 1722 deflect the optical signals 1701.

By way of example each of the four device dies 1720A, 1720B, 1720C, 1720D includes a 3×3 array of MEMS optical elements 1722. When assembled the four device dies are arranged in a 2×2 tiled configuration to provide a device 1700 with a 6×6 array of MEMS optical elements. The tiling concept may be extended to encompass any number of device dies greater than one. The device dies 1720A, 1720B, 1720C, 1720D may be of almost identical appearance and construction, with the possible exception of the routing of electrical circuits to the MEMS optical elements 1722 and or the placement of bond pads (not shown).

The device dies 1720A, 1720B, 1720C, 1720D are attached to the substrate 1710. The device dies 1720A, 1720B, 1720C, 1720D may be accurately self-aligned to the substrate 1710, e.g., to within a few microns using known solder attachment processes. Alternatively, the device dies may be accurately aligned by active-alignment and bonded using a solder or epoxy. Because each device die contains a relatively small number of MEMS optical elements 1722, each of the device dies may be manufactured by a process having a higher yield than a process for producing a larger single device die having the same total number of MEMS optical elements as the device 1700. Thus, the overall yield for the tiled MEMS device 1700 is greater than for MEMS device made with a single large device die covering the same area and having the same number of MEMS elements.

To facilitate attachment to the substrate 1710, each device die may include on a backside one or more metallized bonding pads 1726 (shown in phantom). The bonding pads 1726 may align with corresponding metallized bonding pads 1716 on the substrate 1710.

The common clamping die 1730 may be in the form of a "top chip" having openings 1732 that may receive all of the optical elements 1722 of the device dies 1720A, 1720B, 1720C, 1720D. The openings 1732 may include clamping surfaces 1734 in the form of sidewalls. The clamping surfaces 1734 provide reference stopping-planes for the MEMS optical elements 1722. The clamping die 1730 may include clamping surfaces 1734 in the form of a single vertical wall or two vertical walls with a hole therebetween to allow light to pass. Such a vertical wall or walls may be higher than the MEMS optical elements 1722. Clamping die 1730 may also contain a magnetic pole piece and/or be bonded to substrate 1710 at perimeter referential locations to enable clamping surface 1734 positioning structures that extend downward second substrate clamping die 1730. Finally, positioning structure clamping surface walls 1734 may form an air gap between the substrate 1710 and the optical elements (not shown).

A voltage may be applied between individual optical elements 1722 and the common clamping die 1730 to electrostatically clamp the optical elements 1722 in the "ON" position. The voltage may be applied through an elongated oval shaped hairpin tether device or any flexure 1724 to optical elements 1722. Optical elements 1722 may contain restriction tabs that contact the positioning structure walls or clamping surfaces 1734 when in the "ON" position. The optical elements 1722 may be electrically insulated from the clamping surfaces 1734 by an insulating gap, such as an air gap.

The larger common clamping die 1730 may be manufactured by a simple semiconductor process, and thus does not present the same yield problems as the more complicated MEMS device dies 1720A, 1720B, 1720C, 1720D. Furthermore, since the clamping surfaces 1734 are all formed on the same clamping die 1734 the common clamping die 1730 very accurately registers the individual MEMS optical elements 1722 on the different device dies 1720A, 1720B, 1720C, 1720D. This facilitates accurate alignment of the MEMS optical elements 1722 to the I/O ports 1752, 1754. Even if one or more of the device dies is slightly misaligned with respect to the others, the optical elements 1722 will still register to the clamping die 1730 as long as there is sufficient play in the flexures 1724 to accommodate the misalignment. The collimators 1756 may be disposed along the sides of the device 1700.

The collimators 1756 may couple light into and out of fiber associated with each switching channel. Device 1700 may be configured with two, three or four sides of switching channels and collimators 1756 may be in the form of collimator arrays or individual collimator lenses, e.g., ball lenses, microlenses, and the like. The collimators 1756 may fit into slots 1758 in the clamping die 1730 to align them with the optical elements 1722. Collimators 1756 may also be actively aligned whereby each lens manipulated actively via control signals to optimize coupling into the fiber input/output channels.

Depending upon the size of the device dies 1720A, 1720B, 1720C, 1720D it may be desirable to counteract beam spreading over long optical path lengths through the device 1700. To facilitate this collimators 1740 may optionally be disposed between adjacent device dies. Each collimator includes lenses 1742. The lenses 1742 may be any suitable type of lens such as GRIN lenses, ball lenses, microlenses, and the like. The collimators 1740 may be in the form of pre-assembled collimator arrays or individual lenses. The collimators 1740 may be aligned with the optical elements 1722 using through-slots 1736 in the clamping die 1730. The through-slots 1736 allow the collimators 1740 to be inserted after the clamping die 1730 has been attached to the device dies 1720A, 1720B, 1720C, 1720D. The substrate 1710 may include corresponding slots 1712 to allow some vertical adjustment in the positioning of the collimators.

Depending upon the configuration of the optical switch, it may be desirable to accommodate signal regeneration, attenuation, power monitoring, wavelength switching and wavelength detection feature functions. To facilitate these and other feature functions, collimators 1740 and/or collimators 1756 may be replaced with a feature module that includes the suitable type of detectors, filters, actuators and sensors to support the accommodated function. Feature module may perform collimation in addition to its feature function and be aligned with the optical elements 1722 using through-slots 1736 in the clamping die 1730. The through-slots 1736 allow the feature modules to be inserted after the clamping die 1730 has been attached to the device dies 1720A, 1720B, 1720C, 1720D. The substrate 1710 may include corresponding slots 1712 to allow some vertical adjustment in the positioning of the feature module.

Figure 18:
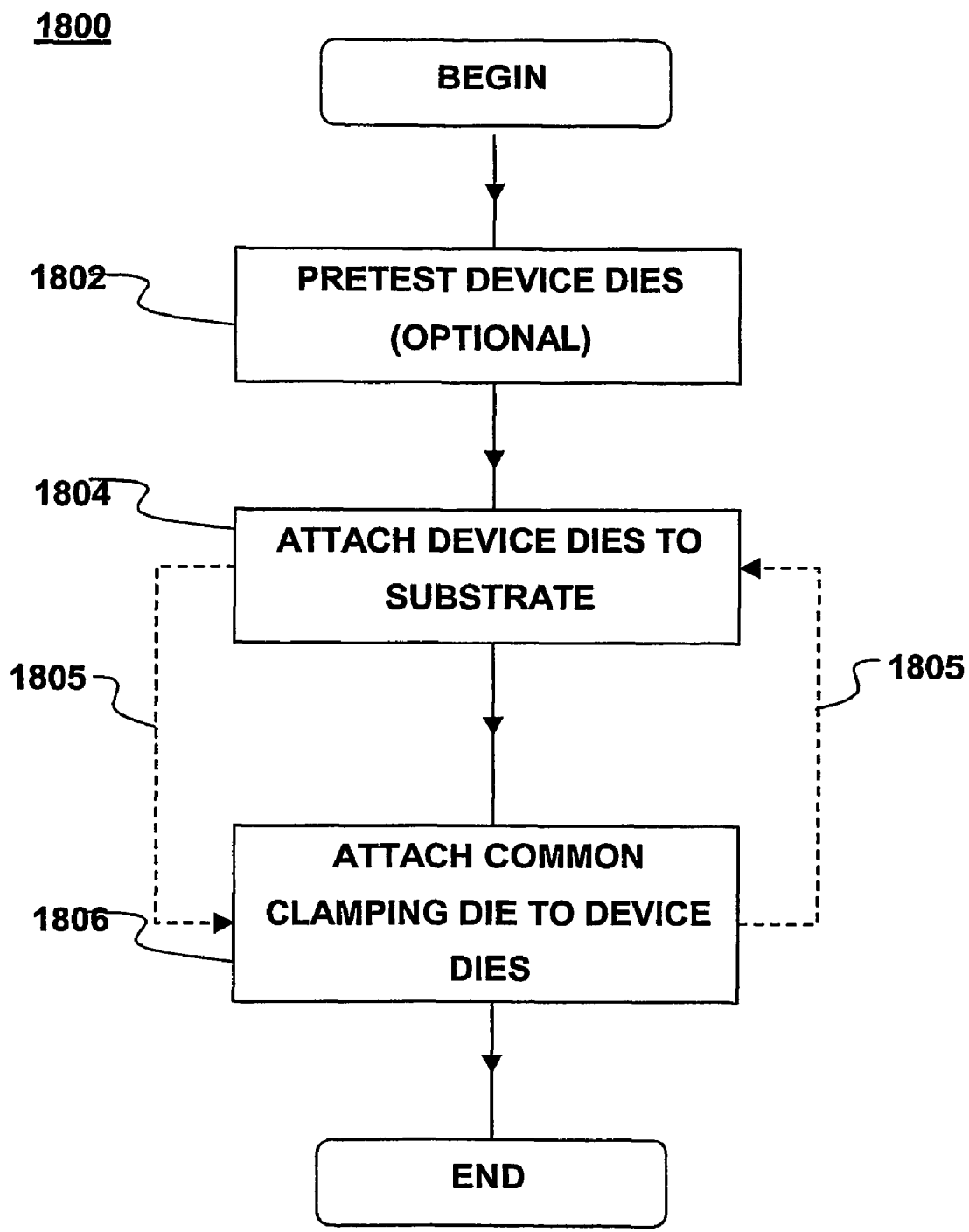
FIG. 18 is a flow diagram of a method of making a MEMS device according an embodiment of the present invention

MEMS devices of the type shown in FIGS. 17A–17B may be manufactured according to an inventive method 1800 according to a second embodiment of the invention. The steps of the method 1800 are illustrated in the flow diagram of FIG. 18. For the purposes of example, the steps of the method 1800 are described below with respect to the device 1700 of FIGS. 17A–17B. The method begins with the fabrication of MEMS device dies 1720A, 1720B, 1720C, 1720D by standard semiconductor processes. At an optional step 1802, the device dies may be tested prior to further assembly to ensure proper operation.

At step 1804, the device dies are attached to the substrate 1710. By way of example, the device dies 1720A, 1720B, 1720C, 1720D may be attached with a solder attachment process. For example, the metallized bonding pads 1716, 1726 react with a solder to form strong self-aligned bonds. The bonding pads 1716 on the substrate 1710 are preferably defined with the highest resolution processes available (e.g., thin film technology on ceramic substrate). In addition, the metallized bonding pads 1726 on the backside of the MEMS device die 1720 may be formed by patterning and etching with semiconductor photolithographic processes. The type of metal used in the bonding pads may depend on the type of solder. For example, if a Pb/Sn eutectic is used as the solder, a Cr/Ni/Au layer could be used as the patterned metal thin film on the device dies 1720A, 1720B, 1720C, 1720D and substrate 1710. Once the metallized bonding pads 1716, 1726 are defined, the solder may be applied, e.g., in paste form, to the substrate 1710 or device dies 1720A, 1720B, 1720C, 1720D. The device dies are then placed on the substrate 1710, such that the bonding pads 1716 on the substrate 1710 align with the bonding pads 1726 on substrate 1720. This may be accomplished, e.g., with a standard "pick and place" tool. The solder is heated through reflow, e.g., with a belt furnace. This allows the solder to react to the metal, of the bonding pads, pulling the device die into a preferred alignment, accurate, e.g., to a few microns.

Preferably, the bonding pad pattern on the substrate and die will maximize the surface to volume ratio of solder after reflow. A large number of small solder bumps (and thus small metal pads) are preferred. This tends to enhance the solder surface tension effects for a given amount of solder. Furthermore, to improve angular alignment of a given device die, it is desirable to place the solder acting to align the device die as far from the centroid of the die as possible. In addition, a sufficient amount of solder must be used to obtain sufficient alignment.

Alternatively, the device dies 1720A, 1720B, 1720C, 1720D may be attached to the substrate 1710 using an active-alignment process. For example, each of the device dies may be accurately placed, e.g., to within a few microns, on the substrate 1710 using a pick and place tool. An example of a suitable pick and place tool is a KS model number FC150 manufactured by Karl Suss of Germany. The device dies 1720A, 1720B, 1720C, 1720D may be held in place by surface tension with respect to the substrate 1710. A solder, placed e.g., on the bonding pads 1716, 1726, is heated through reflow. The device dies are held in place until the solder cools and freezes. Alternatively, an epoxy may be used to bond the device dies to the substrate. If an epoxy is used, the device dies may be aligned without the use of metallized bonding pads.

After the device dies 1720A, 1720B, 1726C, 1720D are attached to the substrate 1710, the common clamping die 1730 may be attached to the device dies in step 206. In order to improve the inter-die alignment of the MEMS optical elements 1722, when in the "ON" state, a single monolithic clamping die 1730, e.g., a "top chip", can be used. The semiconductor processes typically used to fabricate a top chip are simple, and so yields for large clamping die are less of a concern than for device dies. The clamping die 1730 may be bonded to the MEMS device dies, again using a technique that provides very accurate alignment. In a preferred embodiment, the clamping die 1730 is attached using an active alignment process in which a pick and place tool places the clamping die 1703 over the device dies and holds it there as solder is heated and cooled. The attachment method for the clamping die 1730 must be at a lower temperature than the temperature used for attaching the optical MEMS die to the substrate e.g., to keep the solder holding the device dies 1720A, 1720B, 1720C, 1720D to the substrate 1710 below the solder reflow temperature. Provided there is enough "play" in the mechanical flexures 1724 of the MEMS optical elements 1722, the optical elements 1722 will be able to register to the clamping die (clamping is most likely achieved electrostatically). As the clamping die 1730 is a monolithic structure, the inter-die alignment of the MEMS optical elements 1722 will be superior. Subsequent assembly of the device 1700 may proceed according to standard processes.

The order of steps 1804 and 1806 is not critical and may be reversed as indicated by the dashed arrows 1805. Specifically, the common clamping die 1730 may be attached to the device dies (or vice versa) before attaching the device dies to the substrate 1710. Of course, if step 1806 takes place before step 1804 it is important that the device dies are attached to the substrate by a process that takes place at a lower temperature than the process for attaching the clamping die 1730 to the device dies. The device dies 1720A, 1720B, 1720C, 1720D may be self aligned to the common clamping die 1730 using solder and metallized bonding pads on the backside of the clamping die and the front sides of the device dies.

It is possible to use various alternatives, modifications and equivalents on the embodiments described above. For example, in the embodiment depicted in FIGS. 17A–17B each of four device dies 1720A, 1720B, 1720C, 1720D contains a 3×3 array of optical elements 1722. The device 1700 is shown this way for the sake of clarity. The invention is not limited to four device dies having 3×3 arrays of MEMS optical elements. For example four device dies each having an NXN array of MEMS optical elements may be arranged in a 2×2 tiled configuration to form a MEMS device having a 2N×2N array, where N is an integer greater than or equal to 1. Furthermore, two or more device dies having any number of optical elements may be used without departing from the scope of the present invention.

E. Anti-Stiction Bars

Figure 19A:
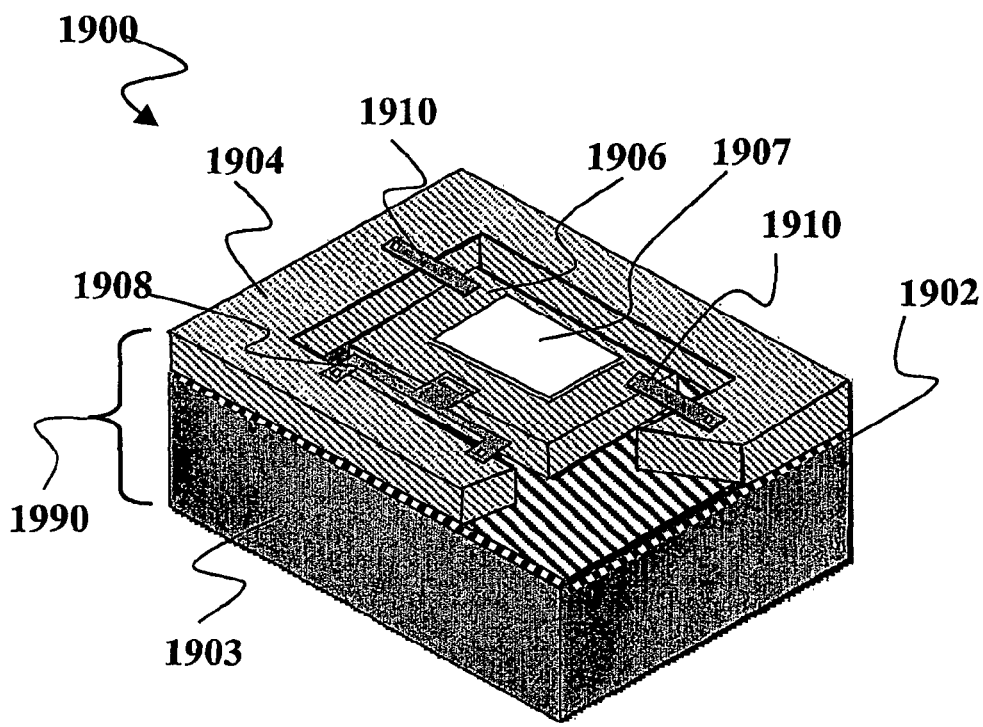
FIGS. 19A depict an isometric diagram illustrating an apparatus for reducing stiction in a MEMS device according to an embodiment of the present invention.

Although the equipotential landing pads described above with respect to FIGS. 2A–2B can reduce stiction in MEMS devices, other stiction-reducing techniques may be used in conjunction. Such techniques may include interposing an anti-stiction member between the moveable element and the substrate. Such a technique is particularly useful, e.g., to prevent the mirror from being properly released from the substrate during manufacture. FIG. 19A depicts an example of an apparatus 1999 for reducing stiction according to an embodiment of the present invention. The apparatus 1999 generally includes a MEMS device 1900 having a moveable element 1906 moveably coupled to a substrate 1901. In the example depicted in FIG. 19A the MEMS device 1900 is formed from a silicon-on-insulator (SOI) substrate 1901. The SOI substrate 1901 includes an insulator layer 1902 disposed between a support layer 1903 and a device layer 1904. The apparatus 1999 includes one or more an anti-stiction members 1910 that are interposable between the moveable element 1906 and the support layer 1903. The moveable element 1906 may be formed from a portion of the device layer 1904. The moveable element 1906 may include a light-deflecting component 1907 so that the apparatus 1900 may operate as part of a MEMS optical switch. By way of example, the light-deflecting component 1907 may be a simple plane reflecting (or partially reflecting) surface, curved reflecting (or partially reflecting) surface, prismatic reflector, refractive element, prism, lens, diffractive element, e.g. grating or fresnel lens, a dichroic coated surface for wavelength specific and bandpass selectivity, a waveguide or some combination of these.

A hinge 1908 moveably attaches the moveable element 1906 to the rest of the device layer 1904. The hinge 1908 is attached to the device layer and the moveable element The hinge. 1908 may be made of a flexible material that flexes when a force or torque is exerted on the moveable element 1906. In the embodiment shown, the hinge 1908 allows the moveable element 1906 to rotate with respect to the substrate 1901. The hinge 1908 may provide a torque that counters rotation of the movable element 1906 with respect to the plane of the substrate 1901. The hinge may be any suitable structure such as one or more torsion hinges, cantilever flexures, serpentine flexures, or pin-and-staple hinges combined with one or more springs. The hinge 1908 may also be a flexible member that allows vertical movement of the movable element with respect to the plane of the substrate.

The anti-stiction members significantly decrease the area of contact between the moveable element 1906 and the substrate 1901. Many designs are possible for the anti-stiction members 1910. In the example depicted in FIG. 19A, the anti-stiction members 1910 are in the form of cantilevered bars that are attached to the device layer 1902 but not to the moveable element 1906. The anti-stiction members 1910 substantially overhang the moveable element 1906. The anti-stiction members 1910 may be made from a flexible material such as polysilicon or metals commonly used in the semiconductor industry, e.g., Nickel, Tungsten, and the like. Alternatively, the anti-stiction members 1910 may be made from a suitable polymer material. Furthermore, if the moveable element 1906 is formed using a lithography and etch process, it is often desirable that the anti-stiction members 1910 are made from a material that is resistant to the final release etch process that forms the moveable element 1906. For example, polysilicon is resistant to hydrofluoric acid (HF). Although bar-shaped anti-stiction members are depicted in FIG. 19A, the invention is not limited to this particular configuration. Anti-stiction members having other shapes, such as serpentine, U-shaped, or L-shaped may also be used.

Figures 19B, 19C, 19D:
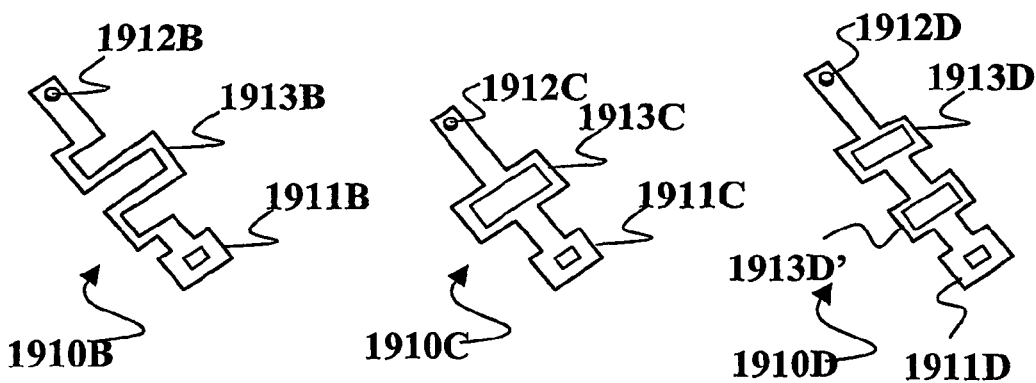
FIGS. 19B–19D depict schematic diagrams illustrating alternative configurations for anti-stiction members for use with an apparatus of the type depicted in FIG. 19A.

As used herein, the term flexible means that the anti-stiction members 1910 have at least one portion that is capable of flexing. Although, flexibility may often be imparted by choice of material, the shape of the anti-stiction member may also impart some degree of flexibility. By way of example, and without loss of generality, FIGS. 19B–19D depict possible alternative shapes for the anti-stiction member 1910. In FIG. 19B an anti-stiction member 1910B has a serpentine portion 1913B disposed between an anchor 1911B and a stand-off 1912B. The serpentine portion may impart flexibility to the anti-stiction member 1910B. The anti-stiction member 1910B may be attached to a substrate at the anchor 1911B. The stand-off 1912B at a free end of the anti-stiction member 1910B reduces the contact area between the anti-stiction member and the underside of a MEMS device.

A serpentine shape such as that depicted in FIG. 19B may have an undesirable tendency to twist. To overcome this an anti-stiction member 1910C may have double-serpentine hinge portion 1913C located between a fixed end 1911C and a free end 1912C, as shown in FIG. 19C. The double-serpentine hinge portion 1913C may be formed by making a hole in a widened portion of the anti-stiction member 1910C. The double-serpentine hinge 1913C is less susceptible to undesired twisting that the serpentine portion 1913B depicted in FIG. 19B. Additional flexibility may be imparted by using two double-serpentine hinges 1913D as shown in FIG. 19D. The double-serpentine hinges 1913D are disposed between a fixed end 1911D and a free end 1912D of an anti-stiction member 1910D.

Figure 19E:
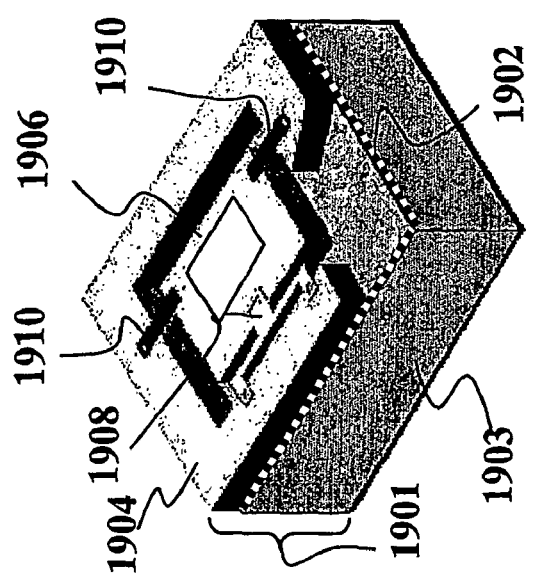
FIGS. 19E–19G depict a series of isometric diagram illustrating a method for reducing stiction in a MEMS device according to an embodiment of the present invention.
Figure 19F:
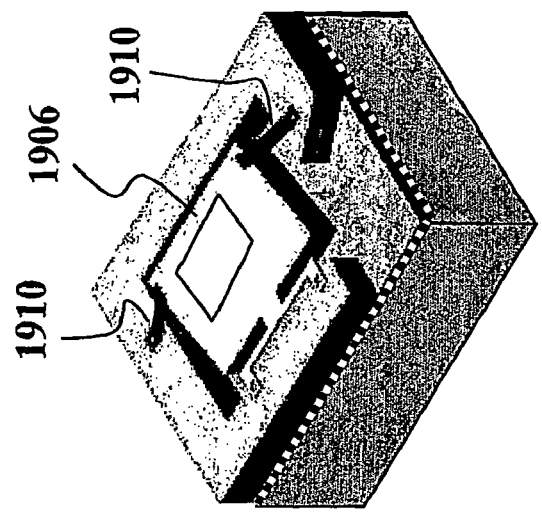
Figure 19G:
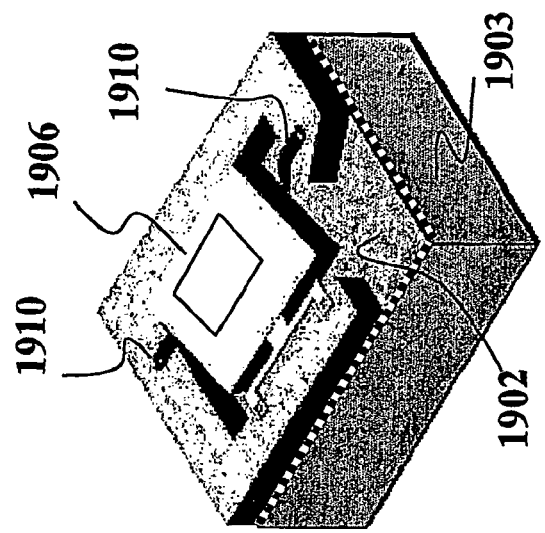

The operation of the anti-stiction bars is best understood by reference to FIGS. 19E–19G, which depict an example of a method of reducing stiction in a MEMS device according to an embodiment of the invention. The method begins at FIG. 19E by providing the substrate 1901 with one or more anti-stiction members 1910. The anti-stiction members 1910 are then interposed between the moveable element 1906 and the substrate 1901 as illustrated in FIGS. 19F–19G. By way of example, the anti-stiction members 1910 may be interposed between the moveable element 1906 and the substrate 1901 as follows. First, the moveable element 1906 is actuated such that it engages the anti-stiction members 1910, thereby causing them to flex. Any suitable mechanism may be used to actuate the moveable element 1906. For example, a magnetic force or an electrostatic force may actuate the moveable element 1906. The actuating force may cause the moveable element to rotate as shown in FIG. 19F. The more the moveable element 1906 rotates, the more the anti-stiction members 1910 flex. At some point the moveable element 1906 will move so far that the anti-stiction members 1910 flex past the moveable element 1906 and snap into place between the moveable element 1906 and the substrate 1901. More specifically, the anti-stiction members 1910 flex into position between the moveable element 1906 and the support layer 1903 as shown in FIG. 19G. In this position, the anti-stiction members 1910 support the moveable element 1906 and inhibit direct contact between the moveable element 1906 and the underlying portion of the substrate 1901, e.g. either the support layer 1903 or the oxide layer 1902. Although the anti-stiction members 1910 may bias the moveable element 1906 in a position that is slightly out of the plane and/or out of parallel with respect to the device layer 1904 this is not a serious drawback. In MEMS applications, this position may correspond to an "OFF" state where the alignment of the moveable element is not critical. The out-of-parallel orientation may be corrected by using many pairs of anti-stiction members 1910 to bias the moveable element 1906 in a position that is substantially parallel to the device layer 1904.

In a particular version of the method, the moveable element 1906 may be actuated while it is immersed in a liquid. The surface tension forces that tend to cause stiction between the moveable element 1906 and the substrate 1901 may be eliminated when both are immersed in a liquid. Such actuation may be motivated, e.g., by a magnetic field provided by a magnet located outside the liquid. Post release stiction problems may be avoided by actuating the moveable element 1906 in liquid and interposing the anti-stiction members 1910 between the movable element 1906 and the substrate 1901 before removing the moveable element 1906 and substrate 1901 from the liquid. Such a procedure is useful, for example, after a wet etching process that releases the moveable element 1906.

It is often desirable to electrically isolate the moveable element 1906 from the substrate 1901. The moveable anti-stiction member 1910 must not create an undesirable short circuit between the moveable element 1906 and the substrate 1901. For example, if the moveable element 1906 is to be electrostatically clamped to the substrate 1901 a short circuit between them will undesirably cause a current to flow. The moveable element 1906 may be electrically isolated, e.g., by an insulating material disposed between the anti-stiction member 1910 and the device layer 1904. Alternatively, a portion of the oxide layer 1902 may electrically isolate the moveable element 1906 from the support layer 1903.

Figure 19H:
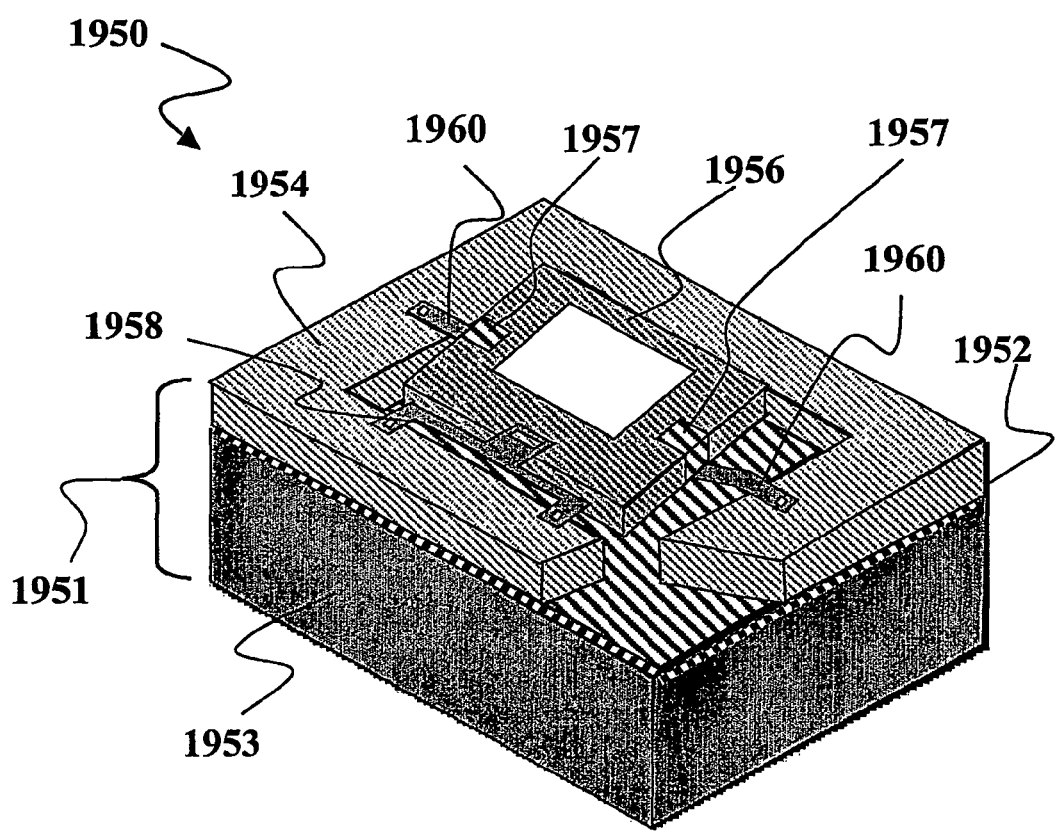
FIG. 19H depicts an isometric diagram illustrating an alternative version of an apparatus for reducing stiction in a MEMS device according to an embodiment of the present invention.

An alternative scheme for electrically insulating a moveable element from anti-stiction members is depicted in FIG. 19H, which shows an apparatus 1950 that has features in common with the apparatus 1900 of FIG. 19A. In the apparatus 1950 a moveable element 1956 is formed from a device layer 1954 of a substrate 1951, which may also include an insulating layer 1952 and a support layer 1953. A hinge 1958 moveably connects the moveable element to the device layer 1954. Anti-stiction members 1960 are interposeable between the moveable element 1956 and the rest of the substrate 1951. The moveable element 1956 includes insulating portions 1957 that contact anti-stiction members 1960. The insulating portions 1960 electrically isolate the anti-stiction members 1960 from an electrically conductive portion of the moveable element 1956 thereby electrically isolating the anti-stiction members 1960 from the device layer 1954. The insulating portions 1957 may be formed by etching out sections of the moveable element 1956 and filling in the etched out sections with insulating material. Similar insulating portions may be used to isolate the hinge 1958 from the device layer 1954.

The present invention also includes embodiments directed to MEMS devices. An example of such a MEMS device 2000 is depicted in the cross-sections shown in FIGS. 20A–20C. The MEMS device 2000 generally includes a moveable element 2006, a substrate 2001 and one or more an anti-stiction members 2010 that are interposable between the moveable element 2006 and the substrate 2001. A hinge 2008 moveably attaches the moveable element 2006 to the rest of the device layer 2004. The hinge 2008 is attached to the device layer and the moveable element 2006. The hinge 2008 may be made of a flexible material that flexes when a torque is exerted on the moveable element 2006. In the example depicted in FIGS. 20A–20C the MEMS device 2000 is formed from a silicon on insulator (SOI) substrate 2001 having an insulator layer 2002 disposed between a support layer 2003 and a device layer 2004. The moveable element 2006 is formed from a portion of the device layer 2004. The moveable element 2006 may include a light-deflecting component 2007 of any of the types described above with respect to FIGS. 19A–19D. A magnetic material 2009 such as nickel may be deposited on the moveable element 2006 for magnetic actuation. The moveable element 2006 may optionally include one or more standoffs 2013 formed on an underside of the moveable element.

Figure 20A:
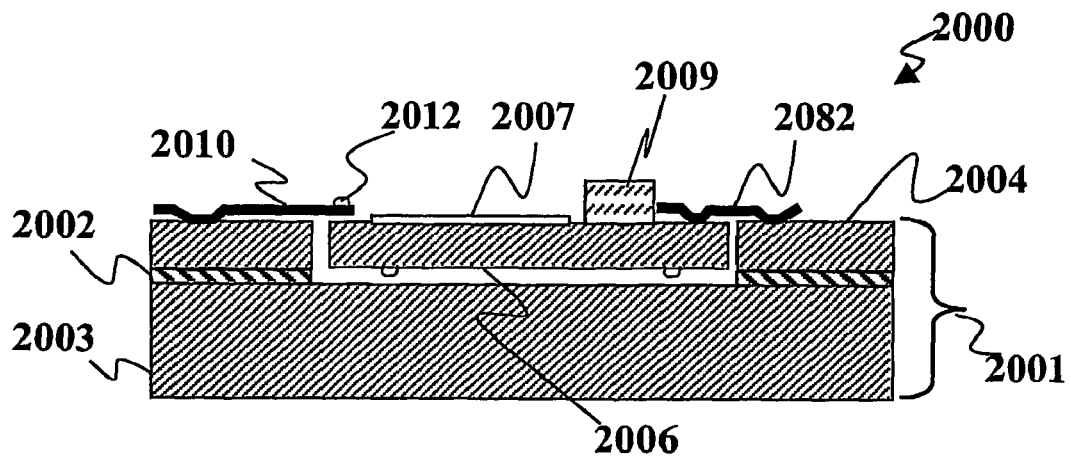
FIGS. 20A–20C depict cross-section schematic diagrams illustrating a MEMS device according to an embodiment of the invention.

The anti-stiction member 2010 significantly decreases the area of contact between the moveable element 2006 and the underlying portion of the substrate 2001, e.g. insulating layer 2004 and/or support layer 2003. In the example depicted in FIGS. 20A–20C, the anti-stiction member 2010 is in the form of a cantilevered bar that is attached to the device layer 2004 but not to the moveable element 2006. The anti-stiction member 2010 substantially overhangs the moveable element 2006. The overlap between the anti-stiction member 2010 and the moveable element is preferably smaller than the overlap between the anti-stiction member and the device layer 2004. The anti-stiction member may include a standoff 2012 that minimizes the contact area between the anti-stiction member and the moveable element 2006. The standoff 2012 may be made from an insulating material to help electrically isolate the moveable element 2006 from the substrate 2001. The anti-stiction members 2010 may be made from a flexible material and may have any suitable shape as described above. Although bar-shaped anti-stiction members are depicted in FIGS. 20A–20C, the invention is not limited to this particular configuration.

Figure 20B:
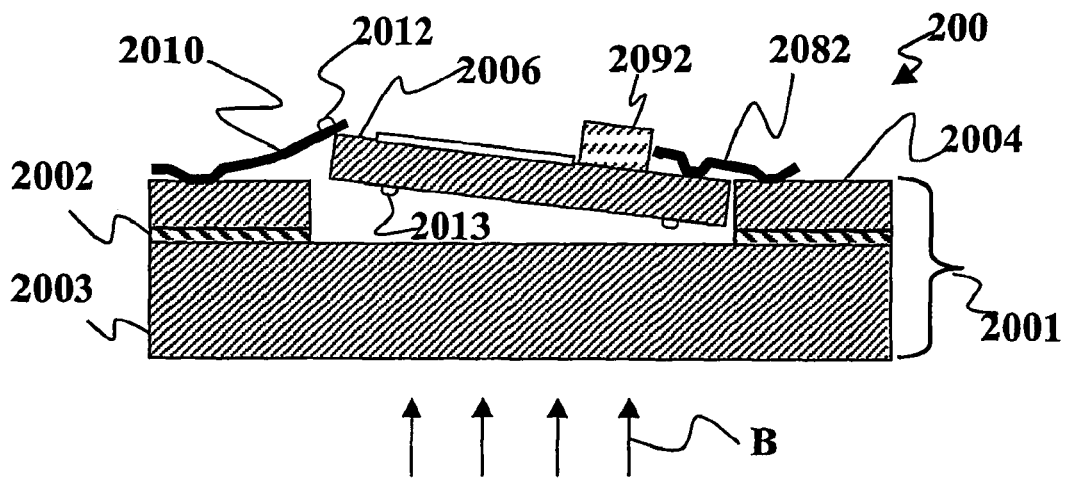
Figure 20C:
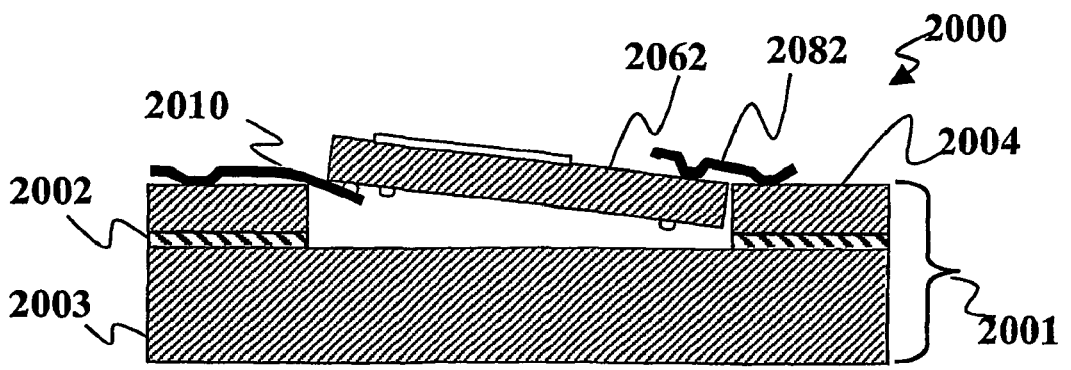

The operation of the anti-stiction members 2010, as illustrated in FIGS. 20B–20C, proceeds substantially as described above with respect to FIGS. 19B–19D. Specifically, the anti-stiction members 2010 may be interposed between the moveable element 2006 and the substrate 2001 by actuating the moveable element 2006 such that it engages the anti-stiction members 2010, thereby causing them to flex as shown in FIG. 20B. For example, a magnetic field B may exert a force on the magnetic material 2009 to actuate the moveable element 2006. At some point the moveable element 2006 will move so far that the anti-stiction members 2010 flex past the moveable element 2006 and snap into place between the moveable element 2006 and the substrate 2001. In this position, the anti-stiction members 2010 inhibit direct contact between the moveable element 2006 and the underlying portion of the substrate 2001, e.g. the oxide layer 2002.

Figure 21A:
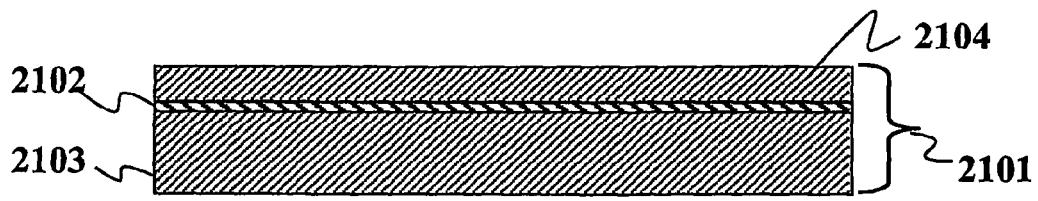
FIGS. 21A–21E depict a series of cross-sectional schematic diagrams illustrating the fabrication of a MEMS device according to an embodiment of the present invention.
Figure 21B:
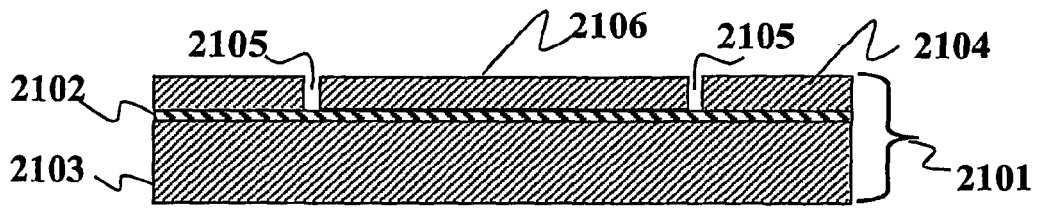
Figure 21C:
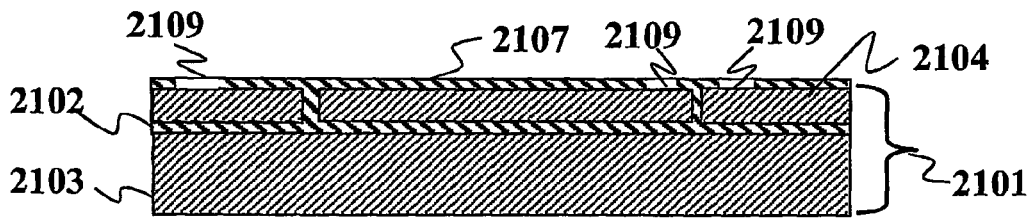

There are many ways of making a MEMS apparatus or device with anti-stiction members for reducing stiction as described above. FIGS. 21A–21E depict a series of cross-sections that illustrate an example of a method of fabricating of a MEMS device according to another embodiment of the invention. The method begins as shown in FIG. 21A with an SOI substrate 2101 having an oxide layer 2102 disposed between a support layer 2103 and a device layer 2104. One or more trenches 2105 are etched in the device layer to define a moveable element 2106 from the device layer 2104 as shown in FIG. 21B. A light-deflecting component (not shown) may be formed on the moveable element either before or after forming the trenches 2105. The trenches 2105 are formed all the way through the device layer 2104 to the oxide layer 2102. Next a sacrificial layer 2107 is formed over the device layer 2104 as shown in FIG. 21C. The sacrificial layer may be, e.g., an oxide layer such as $SiO_2$. The sacrificial layer 2107 is patterned with vias 2109A, 2109B, and 2109C.

Figure 21D:
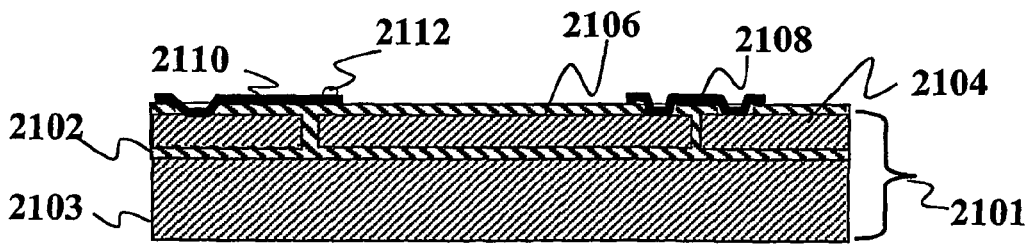

One or more patterns of flexible material are then deposited over the sacrificial layer 2107 and into the vias 2109A, 2109B, and 2109C as shown in FIG. 21D. By way of example, the flexible material may be polysilicon deposited by low pressure chemical vapor deposition (LPCVD). Alternatively, the flexible material may be a metal, such as Nickel or Tungsten that may be deposited by evaporation, sputtering, plating and the like. The flexible material provides a hinge 2108 and an anti-stiction member 2110. The anti-stiction member 2110 substantially overhangs the moveable element 2106 but is not attached to it. Via 2109A provides a point of attachment between the anti-stiction member 2110 and the device layer 2104. Via 2109B provides a point of attachment between the hinge 2108 and the moveable element 2106. Via 2109C provides a point of attachment between the hinge 2108 and the device layer 2104. The anti-stiction member 2110 and the hinge 2108 may be formed from the same flexible material and they may be formed at the same time. Alternatively, the hinge 2108 and the anti-stiction member 2110 may be formed of different materials at different times. A standoff 2112 may be formed at a free end 2111 of the anti-stiction member 2110, e.g. by patterned deposition of an insulating material.

Figure 21E:
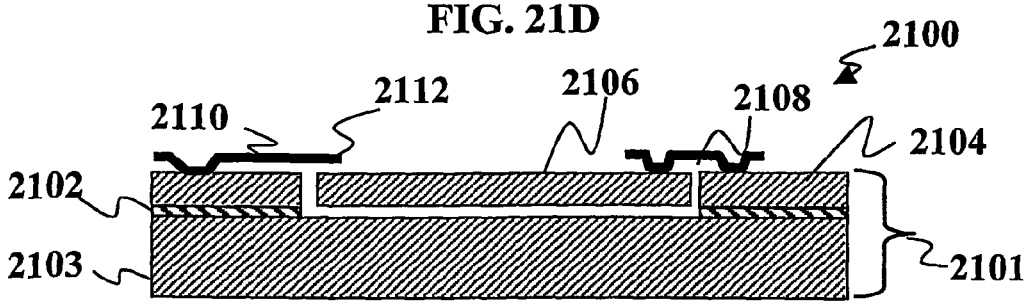

Once the anti-stiction member 2110 and hinge 2108 have been formed, the moveable element 2106 may be released by etching away the sacrificial layer 2107 as show in FIG. 21E. Such an etch process may be an isotropic etch in HF. The process that etches the sacrificial layer 2107 may also remove a portion of the oxide layer 2102. The moveable element 2106 remains attached to the device layer 2104 by the hinge 2108. The anti-stiction member 2110 is attached to the device layer 2104 but not the moveable element 2106. The free end 2111 of the anti-stiction member overhangs the moveable element 2106 and may be interposed between the moveable element 2106 and the support layer 2103 in a manner similar to that shown and described above with respect to FIGS. 19B–19D and 20A–20C.

Figure 22A:
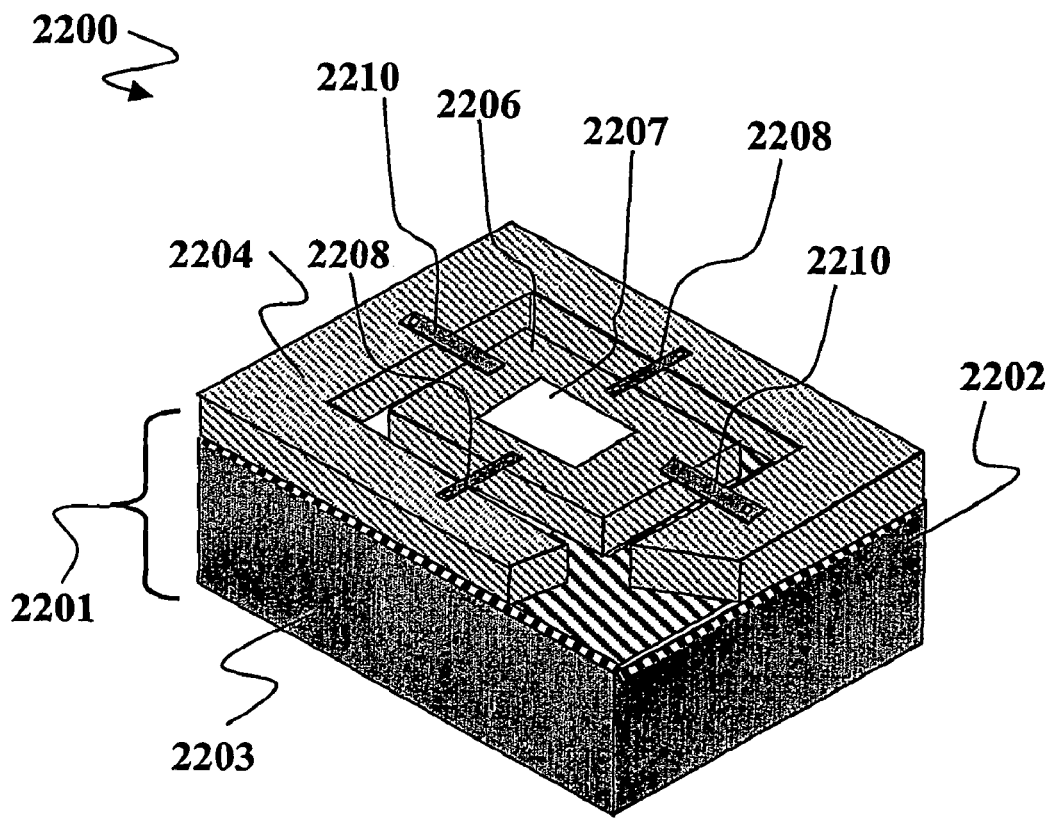
FIGS. 22A–22B depict alternative versions of MEMS devices according to an embodiment of the present invention.

The MEMS devices described above may be varied in many ways without departing from the scope of the invention. For example, anti-stiction members may be employed in beam steering MEMS elements. FIG. 22A depicts an isometric schematic diagram of such a MEMS device 2200. The device 2200 generally comprises a substrate 2201 having, e.g., an insulator layer 2202 disposed between a support layer 2203 and a device layer 2204. A moveable element 2206 is formed from the device layer 2204 and is attached to the rest of the device layer 2204 by torsion hinges 2208A, 2208B. The moveable element 2206 may include a light-deflecting element 2207. The moveable element 2206 may rotate about an axis through the torsion hinges 2208A, 2208B, e.g. under the influence of an actuating force, e.g., an electrostatic or magnetic force. Alternatively, the moveable element may move by translation, e.g., in a direction substantially perpendicular to the plane of the device layer 2204. Anti-stiction members 2210A, 2210B may be interposed between the moveable element 2206 and the support layer 2203 as described above. Specifically, the moveable element 2206 may rotate in one direction to interpose anti-stiction member 2210A and then in an opposite direction to interpose anti-stiction member 2210B. The anti-stiction members 2210A, 2210B may also provide mechanical biases to the moveable element 2206.

Figure 22B:
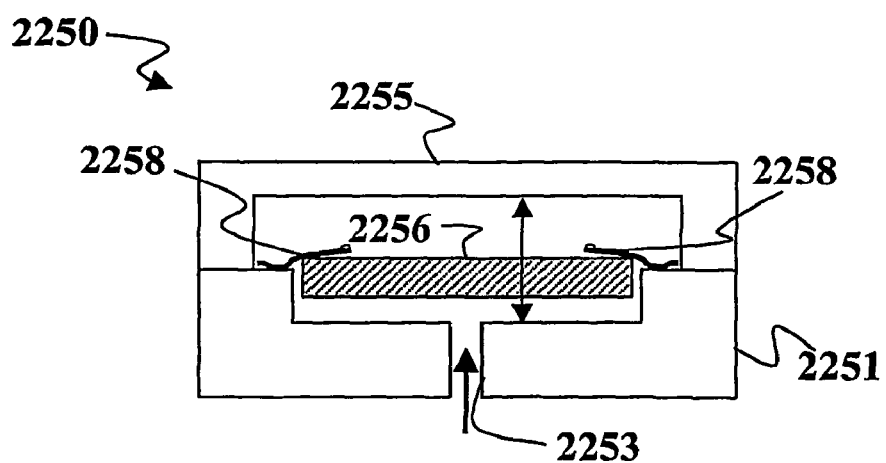

Although, moveable elements that rotate are described herein, the present invention is in no way limited to in rotating devices. An example of a MEMS device 2250 that uses anti-stiction members with a translating moveable element is depicted in FIG. 22B. The device 2250 generally comprises a substrate 2251 and a moveable element 2256. Flexible anti-stiction members 2260 are interposable between the moveable element 2206 and the substrate 2251. In the device 2250, the moveable element 2256 is configured to translate in direction substantially perpendicular to the substrate 2251 as shown by the double-ended arrow. By way of example, the moveable element is retained between the substrate 2251 and a cap 2255. The moveable element may move under the influence of a pneumatic force, e.g. provided by gas that enters the space between the substrate and the cap through a passage 2253. Alternatively, the moveable element 2256 may move under the influence of an electrostatic or magnetic force. The anti-stiction members 2260 may be interposed between the substrate 2251 and the movable element 2256 by exerting an actuating force on the moveable element 2256 causing it to move away from the substrate. Once the moveable element moves far enough, the anti-stiction members 2260 flex past the moveable element 2256 and into position between the moveable element 2256 and the substrate 2251.

Figure 23:
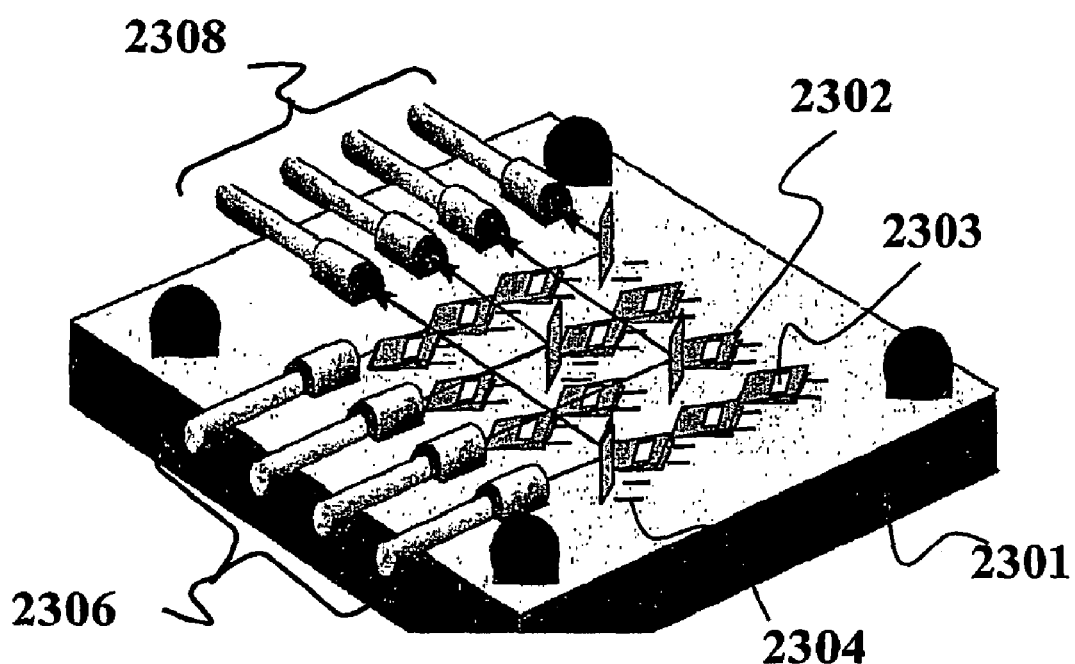
FIG. 23 depicts an isometric schematic diagram illustrating an optical switch according to an embodiment of the present invention.

The present invention also includes embodiments directed to systems that incorporate two or more MEMS apparatus, e.g. arranged in an array. An example of such an array is an optical switch 2300 depicted in FIG. 23. The switch 2300 generally comprises a substrate 2301 having an array of moveable elements 2302. Each moveable element is associated with one or more anti-stiction members 2304. The anti-stiction members 2304 are interposable between the associated moveable element 2302 and the substrate 2301. Each moveable element includes a light-deflecting component 2303, e.g. of any of the types described above. By way of example, and without loss of generality, the light deflecting component 2303 one each moveable element 2302 may be a mirror. The light deflecting components 2303 on the moveable elements 2302 selectively couple optical signals 2305 between one or more input fibers 2306 and one or more output fibers 2308.

While the above includes a description of a preferred embodiment of the present invention, it is possible to use various alternatives, modifications and equivalents. For example, the anti-stiction bar may be made of a thermal bimorph that may be actuated to lift the flap a few degrees to increase switching time. It should be understood that, though specific example applications are shown that relate to optical communications, the present invention may be applied to reduce stiction effects in a plurality of applications utilizing a moveable element. Such applications may include, but not be limited to, relays, mixers, pumps, accelerometers, RFMEMS, bioMEMS etc.

F. Actuation

1. Magnetic Actuation

Figure 24:
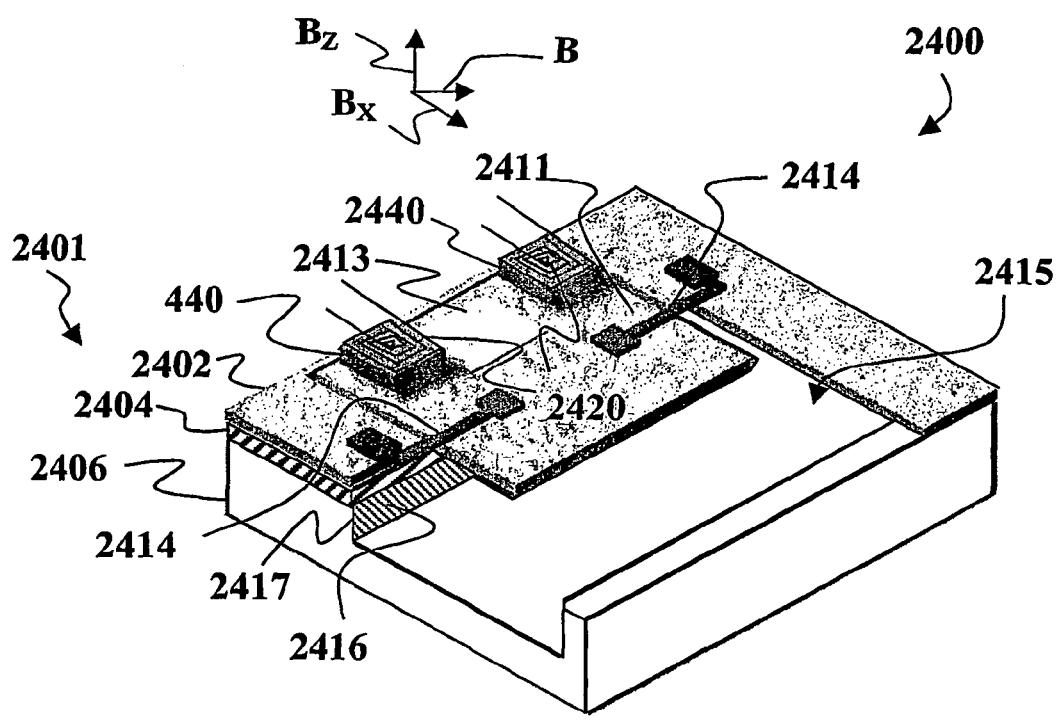
FIG. 24 is a perspective diagram of a an example of a MEMS moveable element that may be used in the magnet assembly of FIGS. 27A–27D.

In magnetic actuation schemes a magnetic field actuates one or more magnetically actuatable MEMS optical elements. FIG. 24 depicts one possible example of a magnetically actuatable MEMS 2400. The optical element 2400 generally comprises a base 2406 and a flap 2411 coupled to the base 2406, e.g. by one or more flexures 2414, so that the flap 2411 is movable out of the plane of the base 2406 from a first angular orientation to a second angular orientation. By way of example, the first position may be substantially horizontal, i.e., substantially parallel to a plane of the base, and the second position may be substantially vertical, i.e., substantially perpendicular to the plane of the base. The flap 2411 may include a light-deflecting element 2413 to deflect optical signals. By way of example, the light-deflecting element 2413 may be a mirror, e.g., a simple plane reflecting (or partially reflecting) surface, curved reflecting (or partially reflecting) surface, prismatic reflector, refractive element, prism, lens, diffractive element, e.g. fresnel lens, a dichroic coated surface for wavelength specific and bandpass selectivity, or some combination of these. The flap 2411 and the base 2406 may be formed from a portion of a starting material 2401 in order to avoid alignment problems associated with post-process bonding associated with a two wafer approach. For example, the starting material 2401 may be formed from a silicon-on-insulator (SOI) wafer having a device layer 2402, an insulator layer 2404 and a substrate layer as the base 2406. The starting material 2401 may include an opening or cavity 2415 having sidewalls 2417 that are vertical, i.e., substantially perpendicular to a plane of the base 2406. One or more of the sidewalls 2417 may contain an electrode 2416 that may be electrically isolated from the base 2406. The flap 2411, flexures 2414, and sidewalls 2417 may be positioned so that a bottom portion of the flap 2411 contacts one of the sidewalls 2417 when the flap 2411 is in the second angular orientation such that the flap 2411 may assume an orientation substantially parallel to that of the sidewall 2417. A voltage applied between the electrode and the flap may attract the flap to the sidewall to secure the flap in place.

Preferably, the flap 2411 is attracted to the electrode 2416 such that such that the flap 2411 may assume the angular orientation of the sidewall 2417. In an alternative configuration, clamping surface, such as a top chip, may be bonded to the base to provide a reference stopping plane and electrode for retaining the flap 2411.

The flap 2411 contains a magnetically active element 2440 to facilitate movement of the flap by interaction with an externally applied magnetic field. The magnetically active element 2440 may be a magnetically active material having, e.g. a fixed magnetic moment, i.e., it may be a permanent magnet. Magnetically active materials may include Nickel, Nickel-Iron, Iron-Cobalt, Aluminum-Nickel-Cobalt, Neodymium-Iron-Boron, etc., and, may be deposited in a uniform or stepped pattern. The magnetically active element 2440 may optionally include one or more coils 2420. The coils 2420 may interact with an externally applied magnetic field B produced by a magnet assembly 2450 of the type described above with respect to FIGS. 1A–3. The magnetic field B has a z-component $B_z$ and an x-component $B_x$ that is directed substantially perpendicular to the z-component $B_z$. The magnetic field B interacts with the magnetic material 2440 and/or coils 2420 in a way that causes a flap 2411 to move from one angular position to another with respect to a base 2406. In a particular configuration, the coil 2420 may interact with a magnetic material deposited in close proximity to the flap 2411'. The magnetic material e.g., Nickel, may be applied through suitable techniques such as sputtering or electroplating. In configurations where the flap 2411 includes a coil 2420, the polarity of current that runs through the coil 2420 may be reversed to apply an opposite force to the flap 2411.

Figure 25:
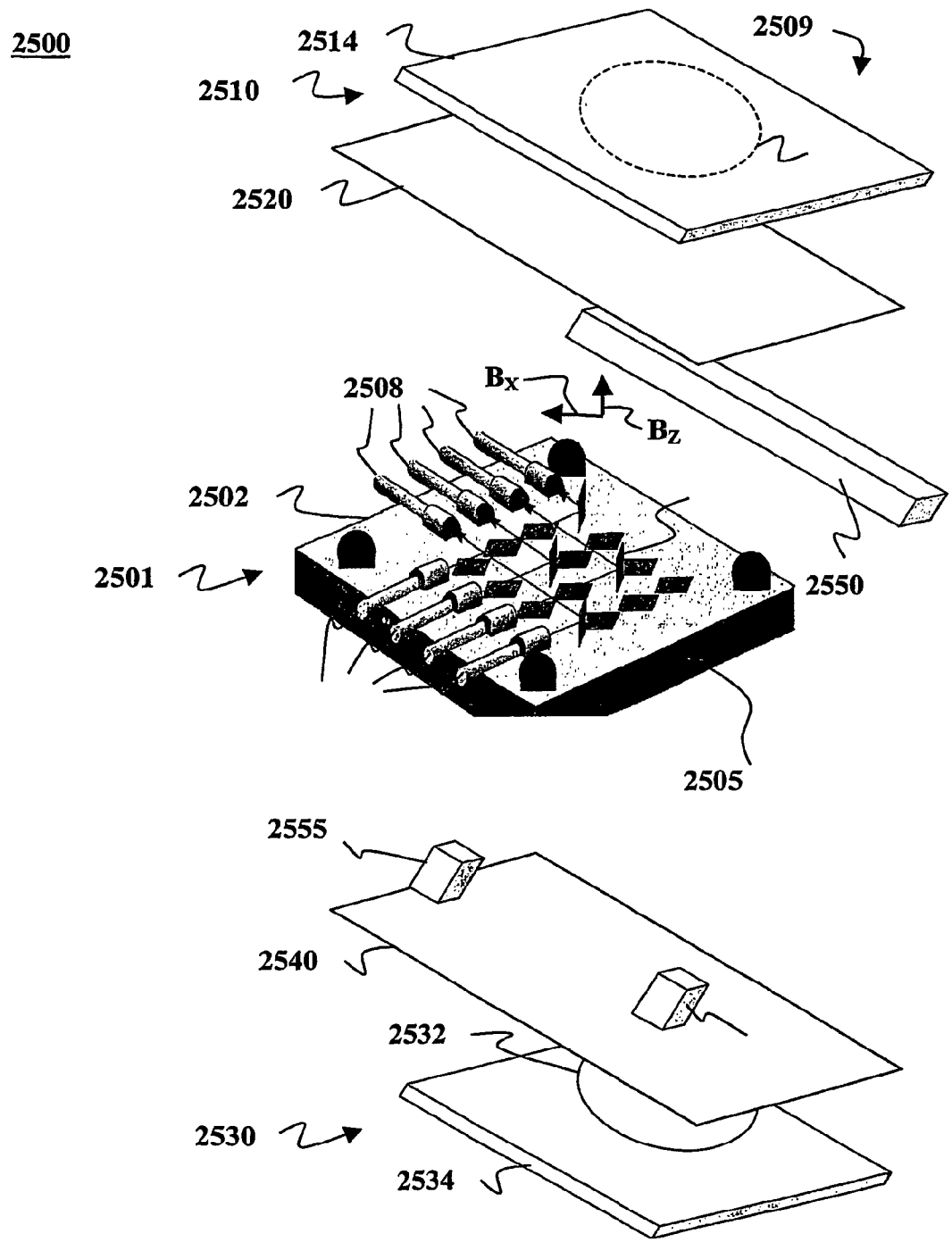
FIG. 25 is a an exploded isometric schematic diagram of a MEMS optical switch according to an embodiment of the present invention.

Two or more optical elements of the type depicted in FIG. 24 may be arranged in an N×N array to form an N×N 2-dimensional optical switch. According to an embodiment of the invention, an optical switch that may utilize a magnet assembly, e.g., of the type described below with respect to FIGS. 27A–29. A schematic diagram of such an apparatus 2500 is shown in FIG. 25. The apparatus 2500 generally includes an optical switch 2501 and a magnet assembly 2509. The optical switch 2501 includes an N×N array of magnetically actuatable MEMS optical elements 2504 that are moveably coupled to a substrate 2502. The moveable elements 2504 may have features in common with the optical element 400 described above with respect to FIG. 4. The optical elements 2504 may be actuated by a magnetic field B having an x-component $B_x$ and a z-component $B_z$. The optical elements 2504 selectively couple optical signals between a first set of optical fibers 2506 and a second set of optical fibers 2508.

The magnet assembly 2509 produces the magnetic field B. The magnet assembly 2509 generally includes first and second z-coil assemblies 2510, 2530, and first and second x-coil assemblies 2520, 2540. The first and second x-coil assemblies may have features in common with the x-coil assemblies described below with respect to FIGS. 28A–28F and 29. The first and second z-coil assemblies 2510, 2530 may have features in common with the z-coil assemblies described below with respect to FIGS. 27A–27D. In particular, the z-coil assemblies 2510, 2530 may respectively include flat spiral z-coils 2512, 2532 and magnetically permeable yoke plates 2514, 2534. A magnetically permeable rib 2550 may be connected between the yoke plates 2514, 2534 such that the rib 2550 and yoke plates 2514, 2534 form a cantilevered "C"-shape. Spacers 2555, 2557 may be coupled at the open end of the "C"-shape to provide structural rigidity. The spacers 2555, 2557 may be made of a non-magnetically permeable material, e.g. stainless steel or aluminum. The spacers 2555, 2557 may be sized and positioned such that the end and sides of the "C"-shape remain substantially open. The open end and sides of the "C"-shape provide access for the optical fibers 2506, 2508. Additional access at the back of the "C"-shape may be provided by replacing the rib 2550 with two magnetically permeable spacers with a gap in between them when assembled.

Figure 26:
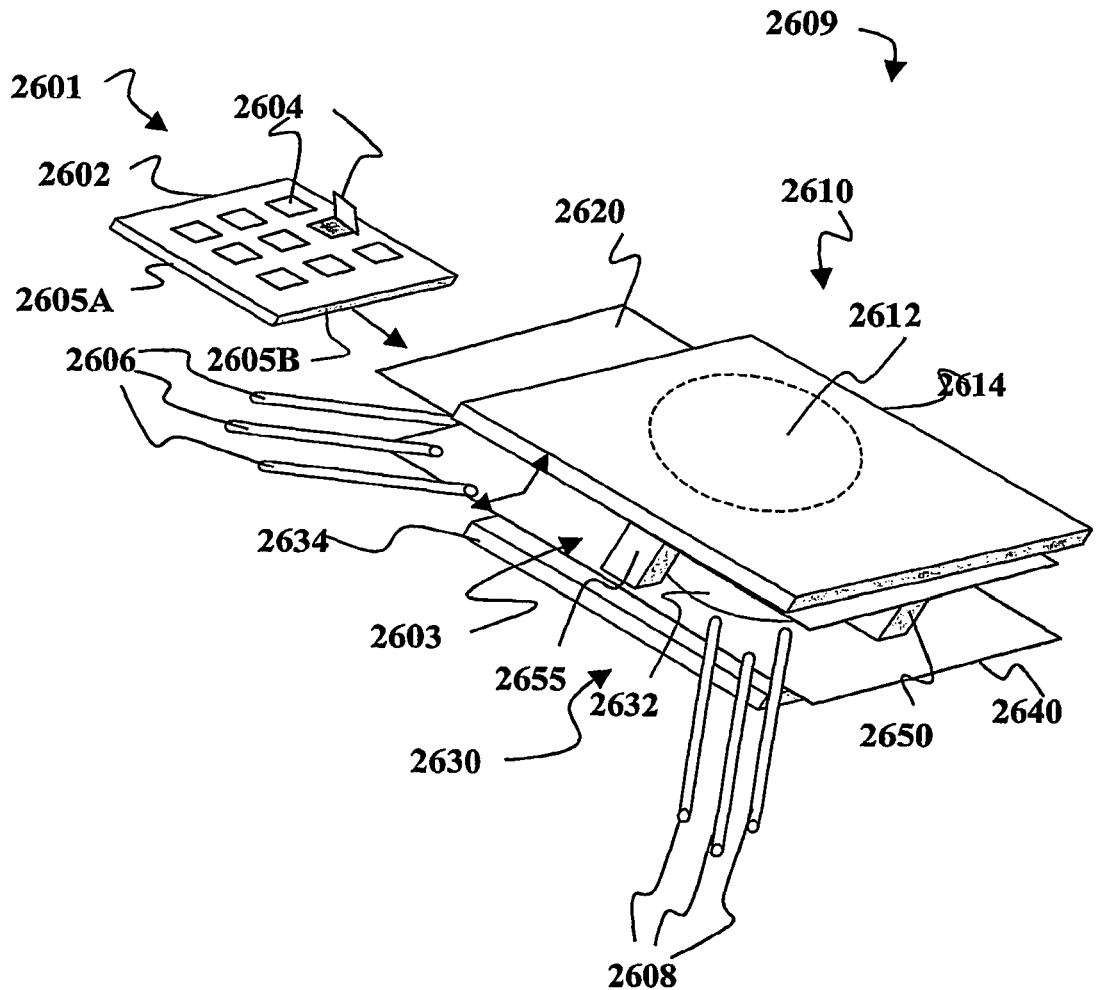
FIG. 26 is a partially exploded isometric diagram of an alternative MEMS optical switch according an embodiment of the present invention.

In the apparatus 2500 the optical elements 2504 that are oriented at approximately 45° with respect to an edge of 2505 the substrate 2501. The fibers 2506, 2508 are oriented a approximately 45° to the moveable optical elements 2504, e.g. substantially perpendicular to the edge of edges of the substrate 2501. Other configurations of the fibers and movable element are possible without departing from the scope of the present invention. For example, an apparatus 2600, which is a variation on the apparatus 2500, is depicted in FIG. 26. The apparatus 2600 generally includes an optical switch 2601 and a magnet assembly 2609. The optical switch 2601 includes an N×N array of magnetically actuatable MEMS optical elements 2604 that are moveably coupled to a substrate 2602. The optical elements 2604 may have features in common with the optical element 400 described above with respect to FIG. 4. The optical elements 2604 are oriented approximately parallel to an edge of the substrate 2602. The fibers 2606, 2608 are oriented a approximately 45° to the moveable optical elements 2604, e.g. at substantially 45° with respect to edges 2605A, 2605B of the substrate 2602. The optical elements 2604 may be actuated by a magnetic field B provided by the magnet assembly 2609. The magnetic field B may have an x-component $B_x$ and a z-component $B_z$.

The magnet assembly 2609 may generally include first and second z-coil assemblies 2610, 2630, and first and second x-coil assemblies 2620, 2640. The first and second x-coil assemblies may have features in common with the x-coil assemblies described below with respect to FIGS. 28A–28F and 29. The first and second z-coil assemblies 2610, 2630 may have features in common with the z-coil assemblies described below with respect to FIGS. 27A–27D. In particular, the z-coil assemblies 2610, 2630 may respectively include flat spiral z-coils 2612, 2632 and magnetically permeable yoke plates 2614, 2634. The optical switch 2601 may be disposed within a gap 2603 between the first and second x-coil assemblies 2620, 2640. A magnetically permeable rib in the form of a post 2650 may be connected between the yoke plates 2614, 2634 such that the post 2650 is disposed approximately midway along an edge of the yoke plates 2614, 2634. A non-magnetically permeable spacer, e.g. in the form of a post 2655, may be coupled between the two yoke plates 2614, 2634. to provide structural rigidity. This particular construction leaves the corners of the magnet assembly 2609 substantially free of obstruction in order to accommodate the optical fibers 2606, 2608.

a. Magnet Designs

A novel magnet assembly may be utilized with magnetically actuated MEMS devices that incorporate equipotential landing pads. The novel magnet assembly typically includes at least one z-coil assembly and at least one x-coil assembly attached to the at least one z-coil assembly. The at least one z-coil assembly includes a flat spiral z-coil and a magnetically permeable yoke plate. A combined thickness of the at least one z-coil assembly and the at least one x-coil assembly is approximately 0.1" or less. The at least one z-coil assembly is configured to produce a magnetic field of about 100 Gauss or greater when driven by a voltage of about 5 volts or less. The magnet assembly may be incorporated into an optical switching apparatus having an array of magnetically actuatable optical switching elements is disposed proximate the magnet assembly.

An example of a magnet assembly 2700 that may be used with embodiments of the present invention is depicted in FIGS. 27A–27D. The magnet assembly 2700 generally includes top and bottom z-coil assemblies 2710, 2730, top and bottom x-coil assemblies 2720, 2740, and a magnetically permeable rib 2750. The rib 2750 spaces apart the upper and lower z-coil assemblies 2710, 2730 and provides a path for magnetic flux between the two z-coil assemblies 2710, 2730. A MEMS optical switch 2790 may be disposed in the gap 2701. A magnetic field B is present in a gap 2701 between the upper and lower x-coil assemblies 2720, 2740 when current flows through the x-coil assemblies 2720, 2740, z-coil assemblies 2710, 2730 or both. The magnetic field may actuate one or more moveable optical elements 2794 of the optical switch 2790. The magnetic field B may have both an x-component and a z-component. For the purposes of the present discussion, the x-component may be regarded as being directed substantially parallel to a plane containing either x-coil assembly 2720, 2740 or either z-coil assembly 2710, 2730. The z-component may be regarded as being directed substantially perpendicular to a plane containing either x-coil assembly 2720, 2740 or either z-coil assembly 2710, 2730.

The upper z-coil assembly 2710 includes a first z-coil 2712 and a yoke plate 2714. The yoke plate 2714 may be attached to the rib 2750 by any suitable means, such as one or more screws 2752. To facilitate manufacturability, the upper and lower z-coil assemblies 2710, 2730 may have similar construction. More specifically, the lower z-coil assembly includes a z-coil 2732 and a yoke plate 2734. The yoke plate 2734 may be attached to the rib 2750 by any suitable means, such as one or more screws 2752. Together, the z-coils 2712, 2732, yoke plates 2714, 2734 and the rib 2750 form a magnetic circuit that concentrates magnetic flux within a gap between the upper and lower coil assemblies. The magnetic flux provides a first magnetic field component $B_z$ that is directed substantially perpendicular to the plane of the z-coils 2712, 2732. The first and second z-coils 2712, 2732 may be flat pancake type coils having multiple windings disposed substantially within the same plane. By way of example, the first and second z-coils 2712, 2732 may be aligned such that they are substantially coaxial. Flat coils can have a low inductance, which is often desirable when the current through them is AC. A low inductance means a low inductive reactance, which means that for a sufficiently low AC frequency, the power dissipated by the coil is mainly dependent on the coil resistance. The z-coils 2712, 2732 may be made from a wound flat ribbon. In a particular example the z-coils 2712, 2732 may be made from 80 turns of wire approximately 0.03" in width and 0.003" in thickness. The overall wire thickness may include an insulating material, e.g. polyimide approximately 0.00075" thick. Furthermore the turns of the z-coils 2712, 2732 may be held together with an adhesive, to keep them from unraveling after they have been wound. The z-coils 2712, 2732 may respectively include inner and outer leads 2711A, 2711B, 2731A, 2731B that provide electrical connections to the ends of the wire at the inside and outside of the z-coils 2712, 2732.

The inner lead 2711A of the lower z-coil 2732 may be connected in series to the outer lead 2731B of the upper z-coil 2712 so that the same current flows through both coils. The z-coils 2712, 2732 are preferably oriented such that the magnetic fluxes from upper and lower coils tend to reinforce each other in the gap between the two z-coil assemblies 2710, 2730. Alternatively, the upper and lower z-coils 2712, 2732 may be connected in parallel so that a lower voltage may be applied to them. The inner and outer leads 2711A, 2711B, 2731A, 2731B may be respectively insulated from the z-coils 2712, 2732, e.g., by insulating patches 2719, 2739. The yoke plates 2714, 2734 and the rib 2750 are made of magnetically permeable material, e.g., a Nickel-Iron alloy such as µ-metal or Hipernom Alloy. Hipernom is a registered trademark of Carpenter Technology Corporation of Reading, Pa. The zcoils 2712, 2732 may be respectively insulated from the yoke plates 2714, 2734, e.g. by a polymer sheets 2713, 2733 attached by adhesives 2716A, 2736A. The z-coil assemblies 2710, 2730 may be attached to the x-coil assemblies 2720, 2740 by adhesive layers 2716B, 2736B.

Figure 27A:
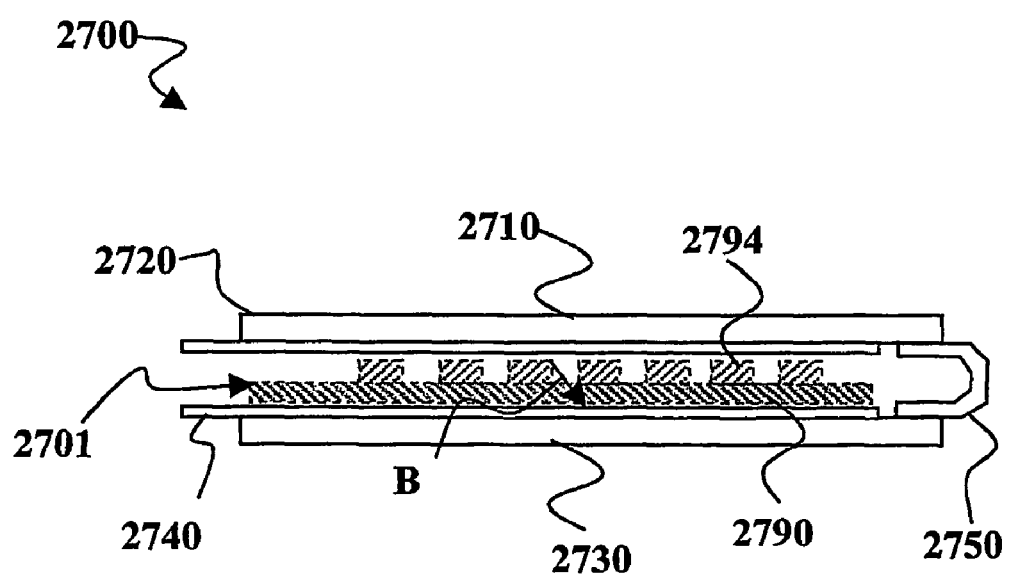
FIG. 27A is an elevational schematic view of a magnet assembly according to an embodiment of the present invention.
Figure 27B:
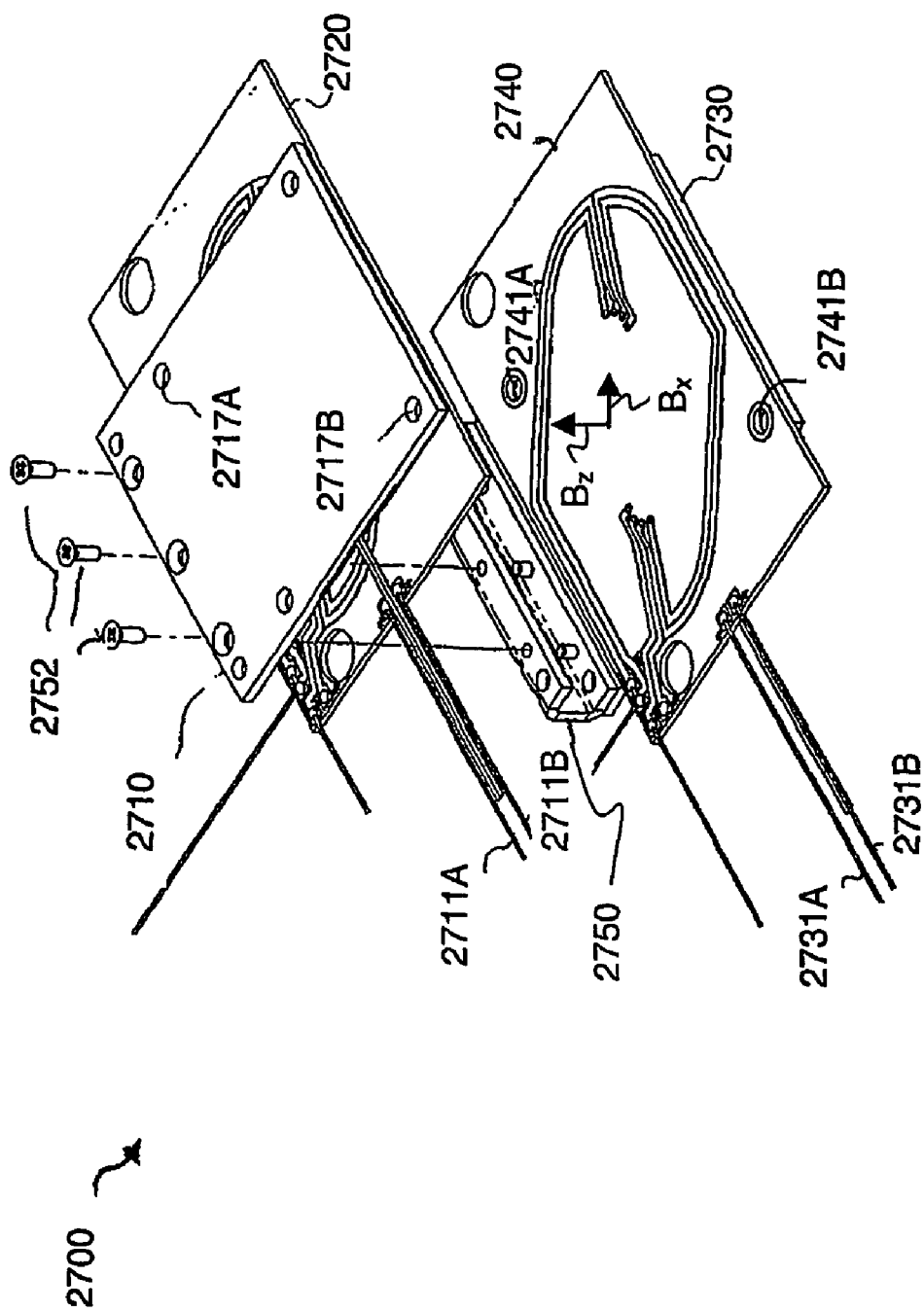
FIG. 27B is an exploded isometric view of the magnet assembly of FIG. 27A.
Figure 27C:
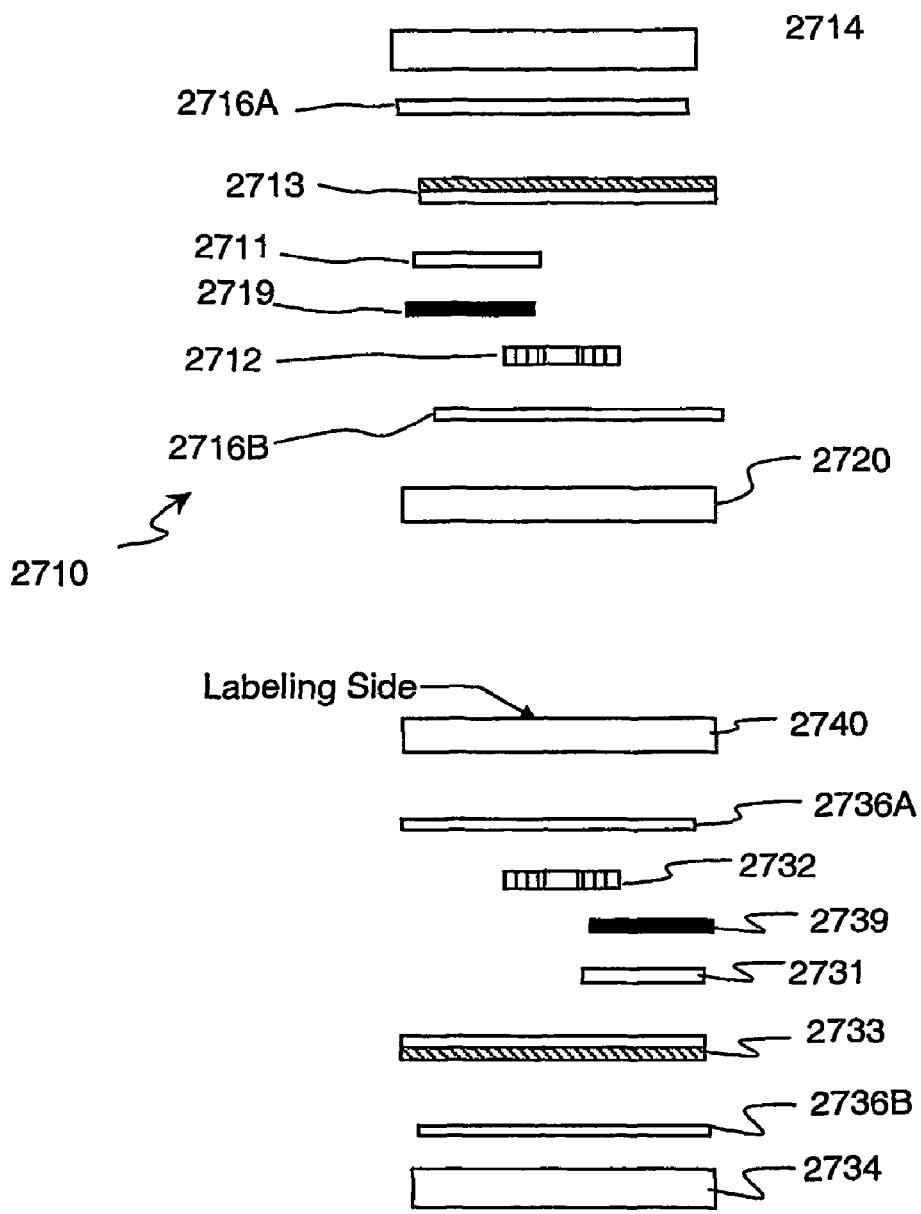
FIG. 27C is an exploded schematic cross sectional view of the magnet assembly of FIG. 27A.
Figure 27D:
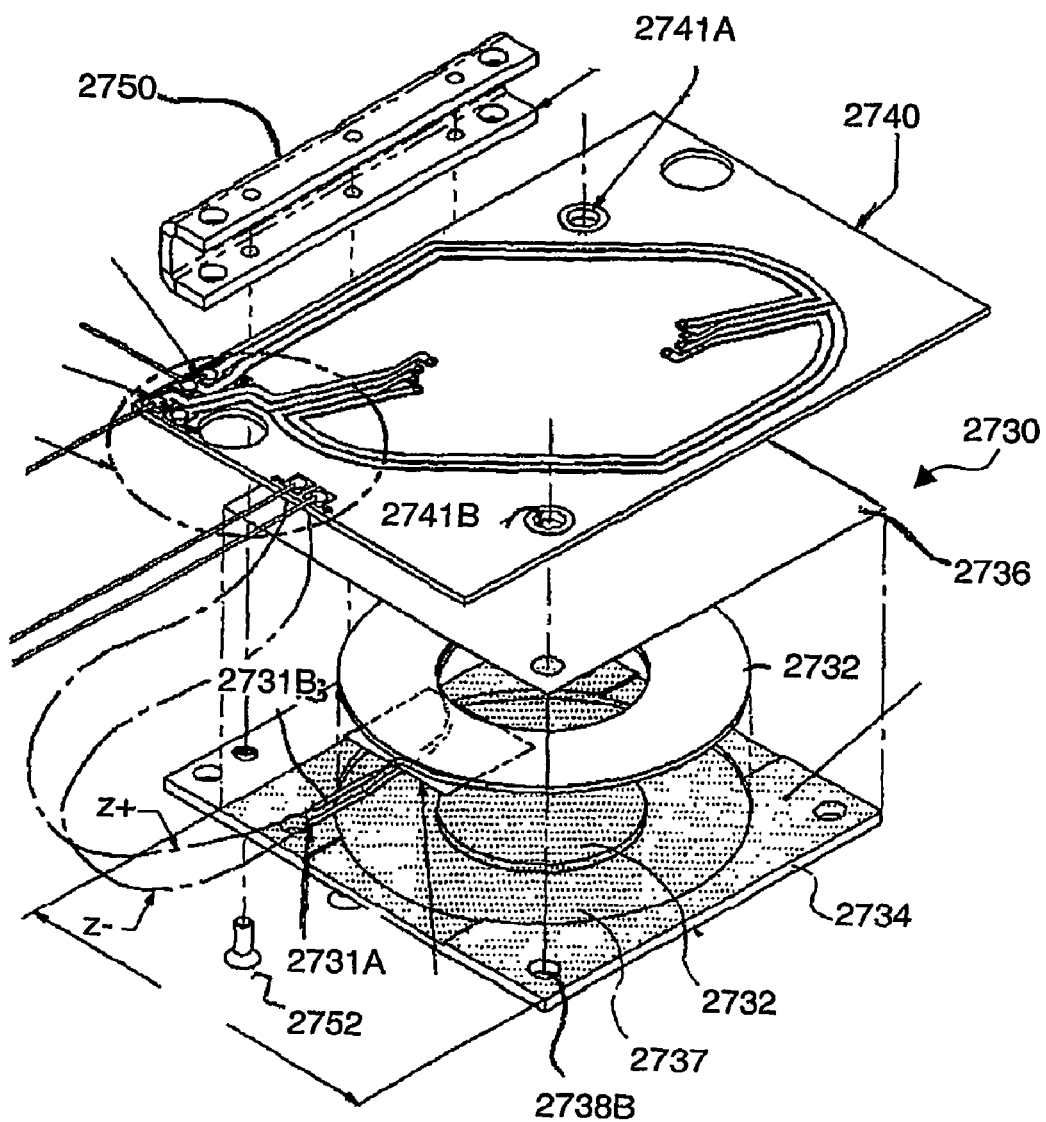
FIG. 27D is an exploded isometric view of a portion of the magnet assembly FIG. 27A.
Figure 28A:
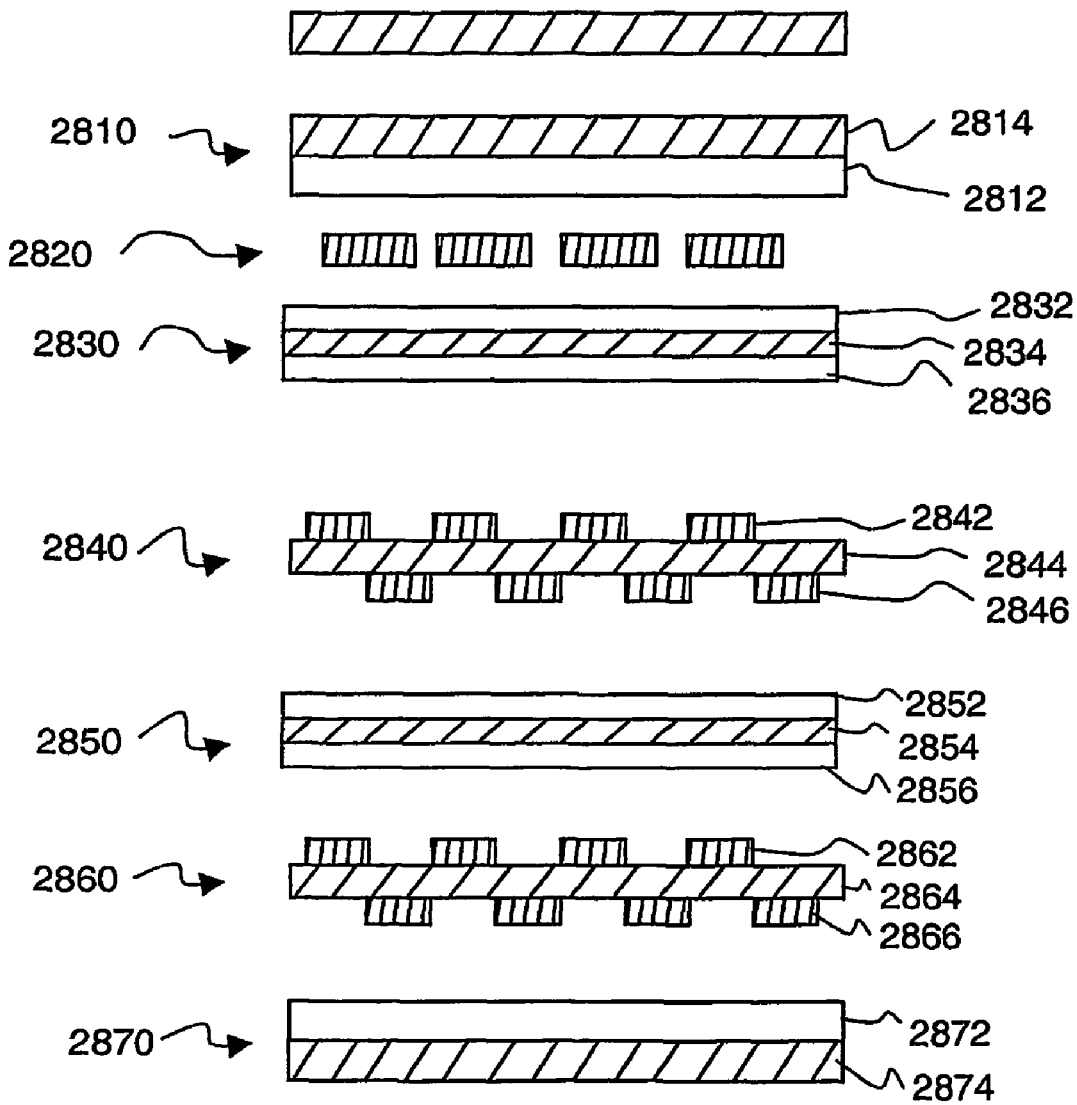
FIG. 28A is an exploded cross-sectional schematic diagram of an x-coil assembly for a magnet assembly of the type depicted in FIGS. 27A–27D.
Figure 28B:
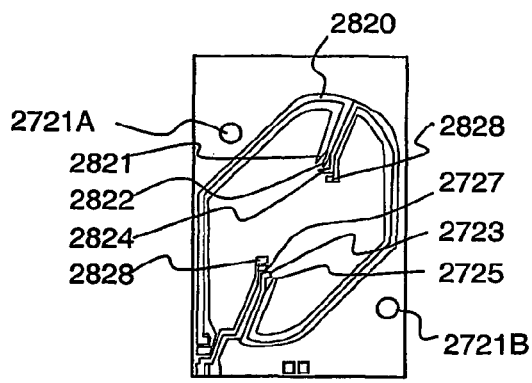
FIGS. 28B–28E are plan view of selected layers of the x-coil assembly of FIG. 28A.
Figure 28C:
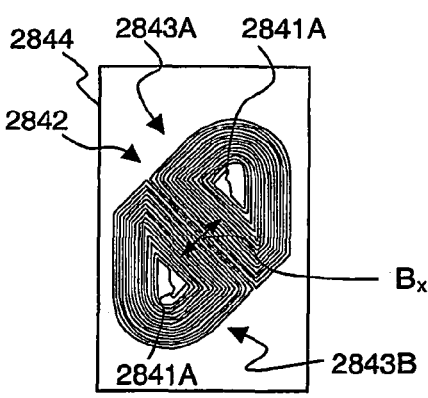
Figure 28D:
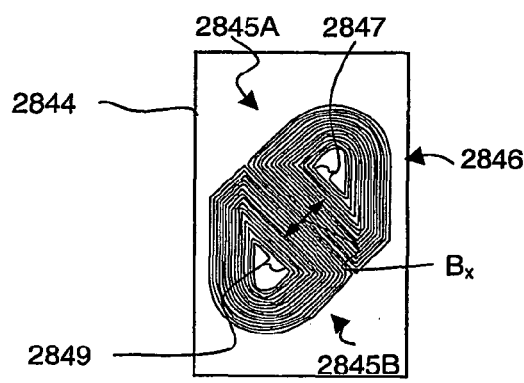
Figure 28E:
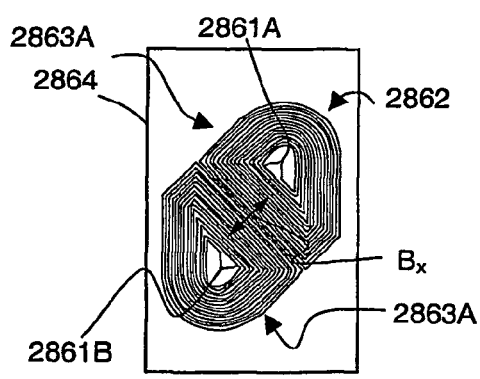
Figure 28F:
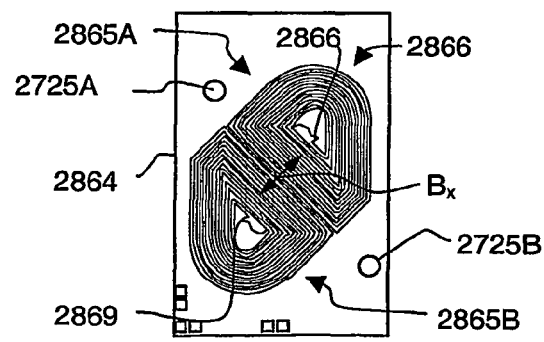

FIG. 27D provides a detailed isometric view of the lower z-coil assembly 2730. The yoke plate 2734 is made from a magnetically permeable material. The yoke plate 2734 includes a core 2735 to guide magnetic flux from the z-coil 2732. The z-coil 2732 is disposed about the core 2735, e.g. in a groove 2737 machined into the yoke plate 2734. A sheet adhesive 2736 may retain the z-coil in the groove 2737. An inside radius of the z-coil 2732 closely matches an outside radius of the core 2735 so that the z-coil 2732 closely fits about the core 2735. By closely fitting the z-coil 2732 about the core 2735 the z-coil 2732 may be aligned with respect to the yoke plate 2734. The upper z-coil assembly 2710 may be similarly manufactured so that the upper and lower z-coils 2712, 2732 are aligned with sufficient precision to optimize the magnetic field strength and magnetic field uniformity in the region between the two z-coil assemblies. For example, a set of registration holes 2717A, 2717B in the upper yoke plate 2714 may align with corresponding sets of registration holes in the lower yoke plate 2734 as well as registration holes in the two x-coil assemblies 2720, 2740, e.g. registration holes 2741A, 2741B shown in FIG. 27A and 27C and registration hole 2738B shown in FIG. 27C. A magnet assembly of the type depicted in FIGS. 27A–27D may produce a magnetic field having a z-component $B_z$ of approximately 200 gauss when approximately 1 ampere flows through each of the z-coils 2712, 2732. Such a current may be supplied e.g., by connecting a voltage source of approximately 5 volts to the leads 2711A, 2711B, 2731A, 2731B of each of the z-coils 2712, 2732. The z-component $B_z$ may be uniform to with about ±3% of a nominal value. In this particular example, the gap 2701 had a thickness of about 0.35", the z-coils 2712, 2732 each had an inner radius of about 0.43". Furthermore each z-coil was made of about 80 turns of copper ribbon wire about 0.030" wide by 0.003" thick (including an insulation thickness of 0.00075"). The upper and lower x-coil assemblies 2720, 2740 provide a second magnetic field component $B_x$ that is substantially orthogonal to the magnetic field component $B_z$ produced by the z-coil assemblies 2710, 2730. In the example illustrated in FIGS. 27A–27D, the x-coil assemblies 2720, 2740 may be fabricated as flex circuits having a layered construction. By using flex circuit construction, the x-coil assemblies may be made very thin. FIG. 2A schematically illustrates an example of layered construction in the upper x-coil assembly 2720. The lower x-coil assembly 2740 may be similarly constructed. In the example depicted in FIG. 28A, the x-coil assembly 2720 includes a conductive base layer 2820, two conductive coil layers 2840, 2860, a top coverlay 2810, first and second innerlays 2830, 2850 and a bottom coverlay 2870. The conductive base layer 2820 includes cross connections and blind vias for connecting the coil layers 2840, 2860. An example of a plan view of the base layer 2820 is depicted in FIG. 28B. The coverlays 2810, 2870 and innerlays 2830, 2850 may include registration holes that align with each other and with the registration holes 2717A, 2717B, 2738B in the yoke plates 2714, 2734 and/or with the registration holes 2741A, 2741B in the lower x-coil assembly. Examples of such registration holes include registration holes 2721A, 2721B depicted in FIG. 28B and registration holes 2725A, 2725B depicted in FIG. 28F. The first and second coil layers 2840, 2860 each include first and second flat spiral coil sublayers 2842, 2846, 2862, 2866 respectively as shown in FIGS. 28C–28F. Insulating layers 2844, 2864 are respectively disposed between spiral coil sublayers 2842, 2846 and 2862, 2866. The insulating layers 2844, 2864 may be made of a polymer such as polyimide. The insulating layers 2844, 2864 may be thin, e.g., about 1 mil (0.001") or less in thickness. The spiral coil sublayers may be stacked together in any suitable fashion. By way of example, the base layer 2820 may be disposed between the top coverlay 2810 and the first innerlay 2830. The first spiral coil sublayer 2840 may be disposed between the first and second innerlays 2830, 2850. The second spiral coil sublayer 2860 may be disposed between the second innerlay and the bottom coverlay 2870. The innerlays 2830, 2850 may respectively include insulating layers 2834, 2854 that are each disposed between corresponding adhesive layers 2832, 2836, 2852, 2856. The coverlays 2810, 2870 may each respectively include an insulating layer 2814, 2874 and an adhesive layer 2812, 2872. The insulating layers 2814, 2834, 2854, 2874 may be made from a polymer material, e.g., polyimide. The insulating layers may be about 1 mil (0.001") or less in thickness. The adhesive layers 2812, 2832, 2836, 2852, 2856, 2872 facilitate attachment of the layers of the coil assembly 28720.

The spiral coil; sublayers 2842, 2846, 2862, 2866 each respectively include first and second oppositely wound flat spiral x-coils 2843A, 2843B, 2845A, 2845B, 2863A, 2863B, 2865A, 2865B. The first and second spiral coils in each sublayer are formed e.g., by etching a pattern in a metallic layer, e.g. copper foil. The first and second spiral coils are electrically connected to each other in series such that the same electric current may flow through both coils. The coil sublayers may be connected to each other in series or in parallel through vias 2821–2828 in the base layer. By way of example, vias 2821, 2822 in the base layer 2820 are connected to each other. Via 2821 connects to spiral coil 2843A at a via 2841A in sublayer 2842. Via 2822 connects to spiral coil 2863A at a via 2861A in sublayer 2862. Spiral coil 2843B connects in series to spiral coil 2845A through via 2841B in sublayer 2842, vias 2823 and 2824 in the base layer 2820 and via 2847 in sublayer 2846. In a like fashion, spiral coil 2863B connects in series to spiral coil 2865A through via 2861B in sublayer 2862, vias 2825 and 2826 in the base layer 2820, and via 2867 in sublayer 2866. Via 2849 in sublayer 2846 and via 2869 in sublayer 2866 are respectively connected to vias 2827 and 2828 in base layer 2820. Vias 2827 and 2828 may be connected together so that sublayers 2842, 2846 are connected in parallel with sublayers 2862, 2866. The foregoing connections are set forth for the purpose of example and are not intended to limit the scope of the invention. Other connections between the sublayers 2842, 2846, 2862, 2866, e.g. all four sublayers connected in series or all four sublayers connected in parallel, may be implemented without departing from the scope of the present invention.

The spiral x-coils are all disposed substantially parallel to the same plane. The opposite windings of the spiral coils in each layer produces a magnetic flux that is partially directed parallel to the plane of the coils. Although part of the flux generated by the upper and lower x-coil assemblies 2720, 2740 may be directed through the yoke plates 2714, 2734 the flux that passes between the two yoke plates 2714, 2734 may be used to produce the x-component $B_X$ of the magnetic field.

Figure 29:
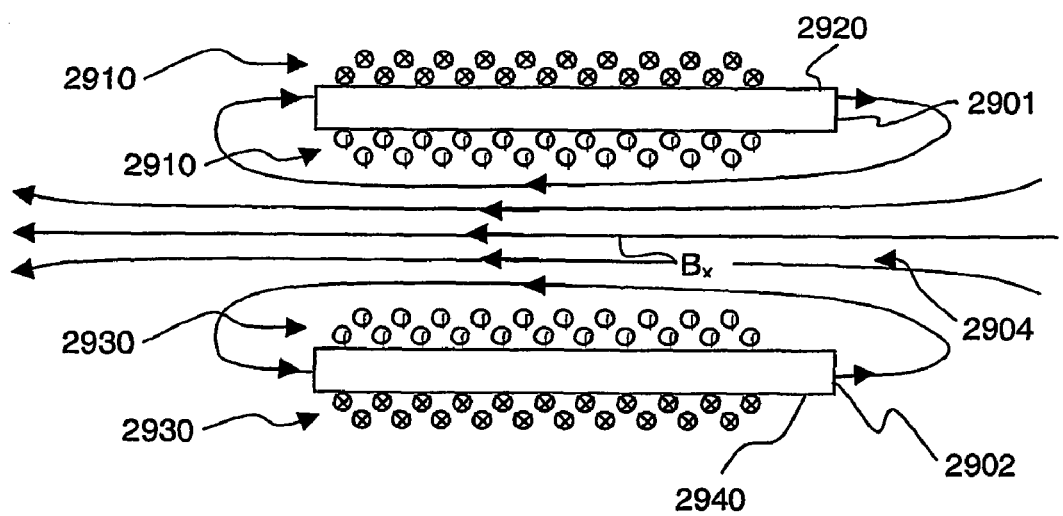
FIG. 29 is a cross-sectional schematic diagram of an alternative x-coil assembly.

An alternative configuration of an x-coil assembly 2900 that may be used with apparatus of FIGS. 27A–27D is depicted in FIG. 29. In the alternative configuration, an upper x-coil assembly 2901 plurality of windings 2910 of conductive wire are wrapped around a thin rectangular yoke plate 2920. The yoke plate may be made from a magnetically permeable material to guide the magnetic flux produced by a current flowing through the windings. The windings 2910 may be wound in multiple layers to increase the number of ampere turns surrounding the yoke plate 2920. The x-coil assembly 2900 may include a similarly constructed lower x-coil assembly 2902 having windings 2930 and a yoke plate 2940. A current flowing in the lower set of windings 2930 is directed such that the flux through the lower yoke plate 2940 is oppositely directed to the flux through the upper yoke plate 2920. The flux in a gap 2904 between the upper and lower x-coil assemblies produces a magnetic field $B_X$ that is directed substantially parallel to the yoke plates 2920, 2940.

The magnet assembly described above may be used in conjunction with a magnetically actuatable microelectromechanical systems (MEMS) device. In a particular example, a magnet assembly of the type described above may be used with a MEMS optical switch.

2. Pneumatic Actuation

Figure 30:
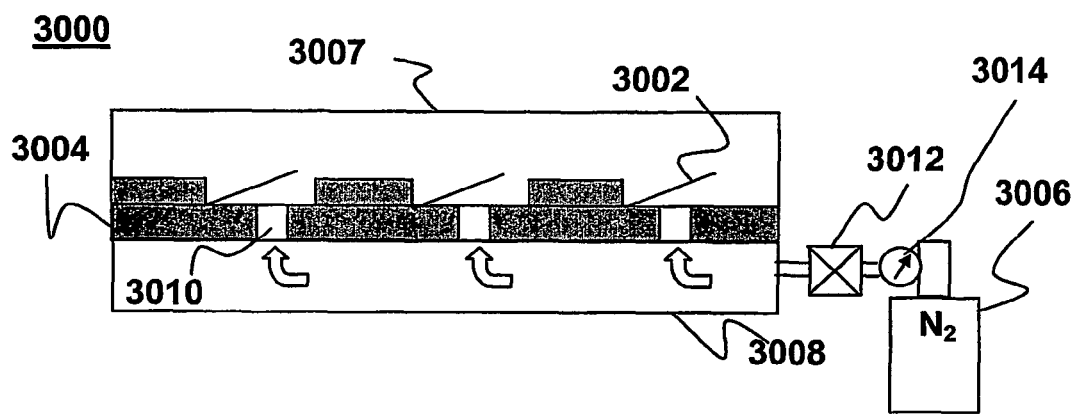
FIG. 30 depicts a simplified cross-sectional schematic diagram of a MEMS device with pneumatic actuation and common gas pulse from the backside of a substrate according to an embodiment of the present invention.

Although magnetic actuation is quite common in MEMS applications alternative actuation schemes may also be used in conjunction with the equipotential landing pads described above with respect to FIGS. 2A–2B. One possible alternative schemes involves pneumatic actuation. There are many possible ways of implementing pneumatic actuation. For example, FIG. 30 depicts an embodiment of a MEMS device 3000 with pneumatic actuation and common gas pulse from the backside of a substrate. The device generally comprises a substrate 3004 with one or more movable elements 3002, such as mirrors, mounted for rotation with respect to the substrate 3004. Alternatively, the movable elements 3002 may translate, e.g. vertically or horizontally. Gas (preferably nitrogen, although other inert gases will also work) can be supplied from a source 3006 to a device package 3007 and directed to a chamber 3008 under the movable elements 3002 through holes 3010 in the backside of the substrate 3004. In this embodiment a micro valve 3012 and gas regulator 3014 connected between the gas source 3006 and the chamber 3008 control gas pulse duration and flow. A filter may optionally be included to remove particles from the gas.

Figure 31:
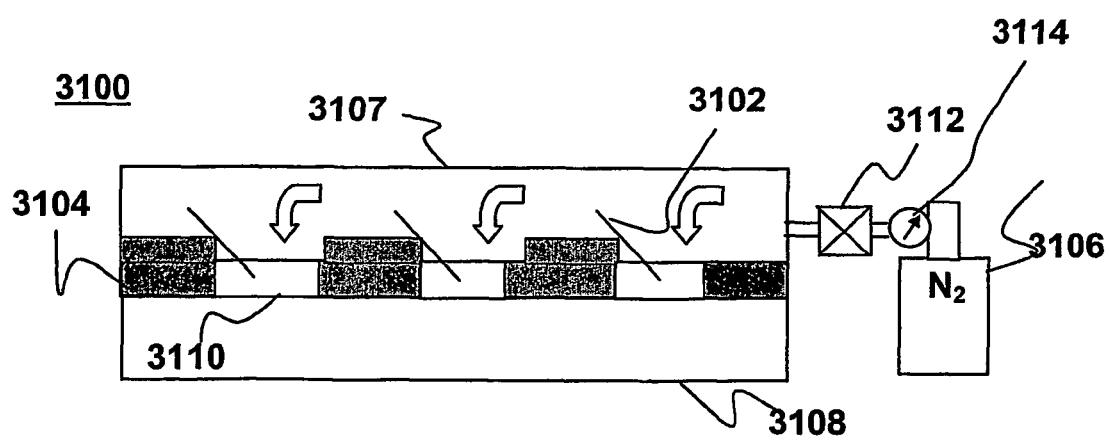
FIG. 31 depicts a simplified cross-sectional schematic diagram of a MEMS device with pneumatic actuation using a common gas pulse from above a substrate according to an embodiment of the present invention.

Different layouts of the movable elements may require a different direction of gas flow. For example FIG. 31 depicts an embodiment of a MEMS device 3100 in which a gas source 3106, microvalve 3112 and regulator 3114 feed a gas pulse to a package 3107 located above a substrate 3104 containing moveable elements 3102. The gas may then be exhausted into an exhaust chamber 3108 through holes 3110 located proximate each movable element 3102.

In the embodiments depicted in FIGS. 30–31 the gas pulse rotates all the mirrors at the same time. Individual mirrors may be held in place in an "on" position using conventional electrostatic clamping. The movable elements may further include torsional flexures that rotate the elements back to an "off" position in the absence of an actuating force, such as the gas pulse. In this fashion individual movable elements may be switched from the "on" position to the "off" position using a combination pneumatic actuation and electrostatic clamping.

In many MEMS applications it is desirable to actuate only selected movable elements in an array without actuating others. Several embodiments of the present invention may be implemented to achieve this.

Figure 32:
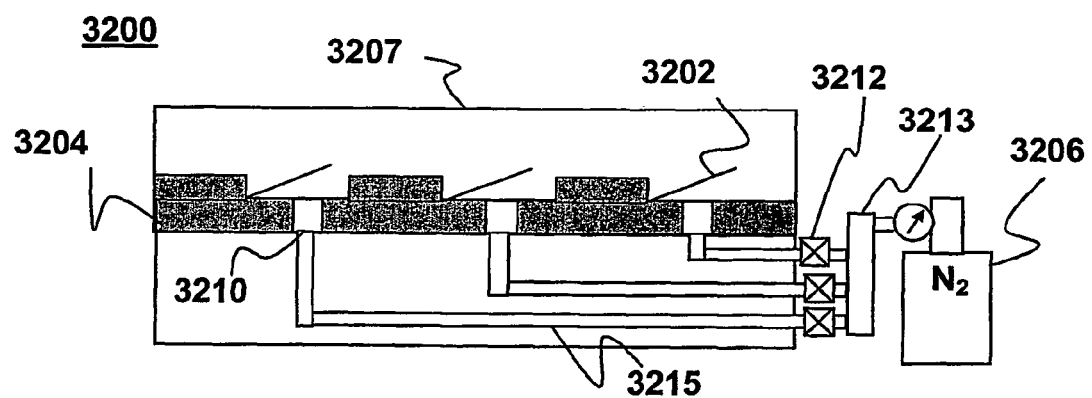
FIG. 32 depicts a simplified cross-sectional schematic diagram of a MEMS device with individual pneumatic actuation of each movable element using multiple electro-pneumatic control valves according to an embodiment of the present invention.

For example, FIG. 32 depicts a MEMS device 3200 that uses multiple electro-pneumatic control valves 3212 to allow separate actuation of each of several movable elements 3202 (or rows or columns of such elements) moveably coupled to a substrate 3204. Thus each element 3202 may be moved only when it needs to be switched between two fixed positions. This reduces number of actuations for each movable element 3202 and leads to longer lifetime of the device 3200. The control valves 3212 may be coupled to a manifold 3213 that communicates with a gas source 3206. A device package 3207 may be attached to the substrate to enclose the moveable elements 3202. Each control valve 3212 may be coupled to a corresponding hole 3210 in the substrate 3204 through a dedicated channel 3215.

Figure 33:
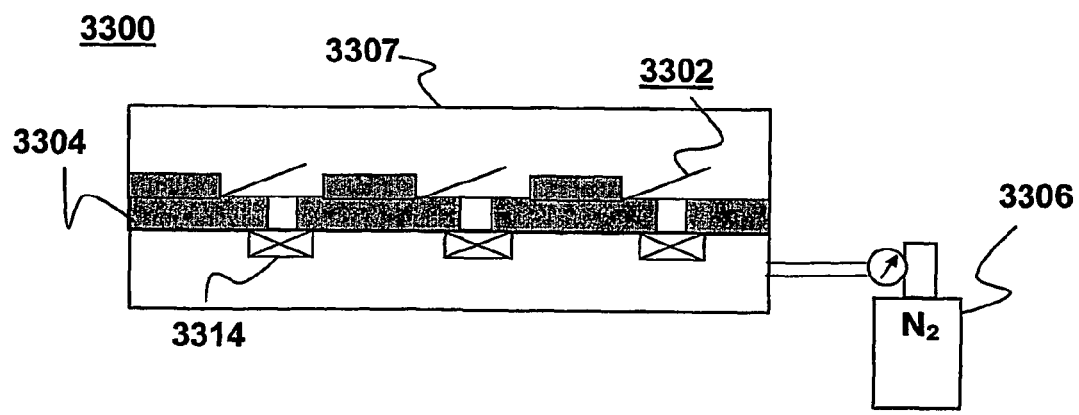
FIG. 33 depicts a simplified cross-sectional schematic diagram of a MEMS device with pneumatic actuation of each movable element using MEMS pneumatic control valves according to an embodiment of the present invention.

Alternatively, as shown in FIG. 33, a MEMS device 3300 may include individual arrayable MEMS pneumatic control valves 3314 may be used to feed gas from a source 3306 to each of several movable elements 3302 moveably coupled to a substrate 3304. A device package 3307 may be attached to the substrate to enclose the moveable elements 3302. Arrays of such valves are described in detail, for example, in "Batch Fabrication of Pneumatic Valve Arrays by Combining MEMS with Printed Circuit Board Technology," Patrick Cheung, Andrew Berlin, David Biegelsen, Warren B. Jackson, DSC-Vol 62/HTD-Vol 354, Microelectromechanical Systems (MEMS) ASME 1997. Such valves may operate in a 1–20 ms range.

Figure 34:
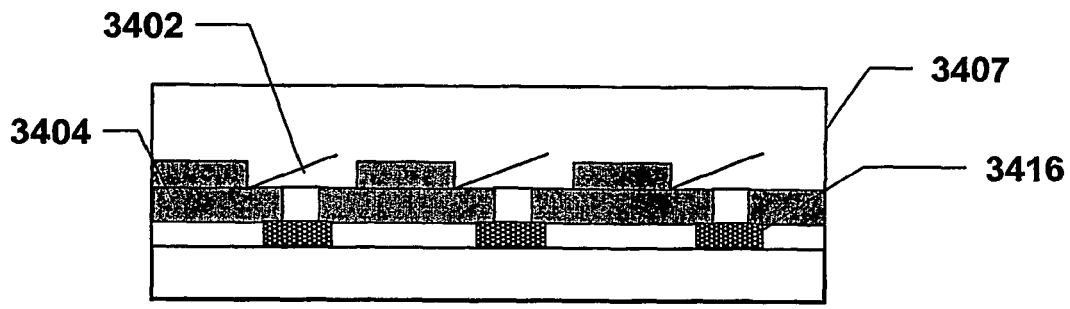
FIG. 34 depicts a simplified cross-sectional schematic diagram of a MEMS device with pneumatic actuation of each movable element using Knudsen compressors according to an embodiment of the present invention.

Alternatively, as shown in FIG. 34, a MEMS device 3400 may include one or more movable elements 3402, moveably coupled to a substrate 3404 that may be actuated by an array of Knudsen Compressor devices 3416. A device package 3407 may be attached to the substrate to enclose the moveable elements 3402. The operation of Knudsen compressors is based on thermal transpiration. In a typical Knudsen compressor two volumes of gas are separated by a thin membrane having many holes. Each of the holes is characterized by dimensions that are small compared to the mean free paths of the gas. If the two volumes are maintained at temperatures $T_1$ and $T_2$, but are otherwise undisturbed, the equilibrium pressures $p_1$ and $p_2$ of the two volumes are related by $p_1/p_2 = (T_1/T_2)^{1/2}$.

Each Knudsen compressor 3416 in the array can be aligned and attached to the backside of the substrate 3404 proximate a corresponding movable element 3402 to provide a gas pulse on demand to actuate each movable element 3402 individually. A device package 3407 may be attached to the substrate to enclose the moveable elements 3402. MEMS type Knudsen compressors are described in detail, for example, in "The Knudsen Compressor as a Micro and Macroscale Vacuum Pump Without Moving Parts or Fluids," S. E. Vargo, E. P. Muntz and G. R. Shiflett, W. C. Tang.

Figure 35:
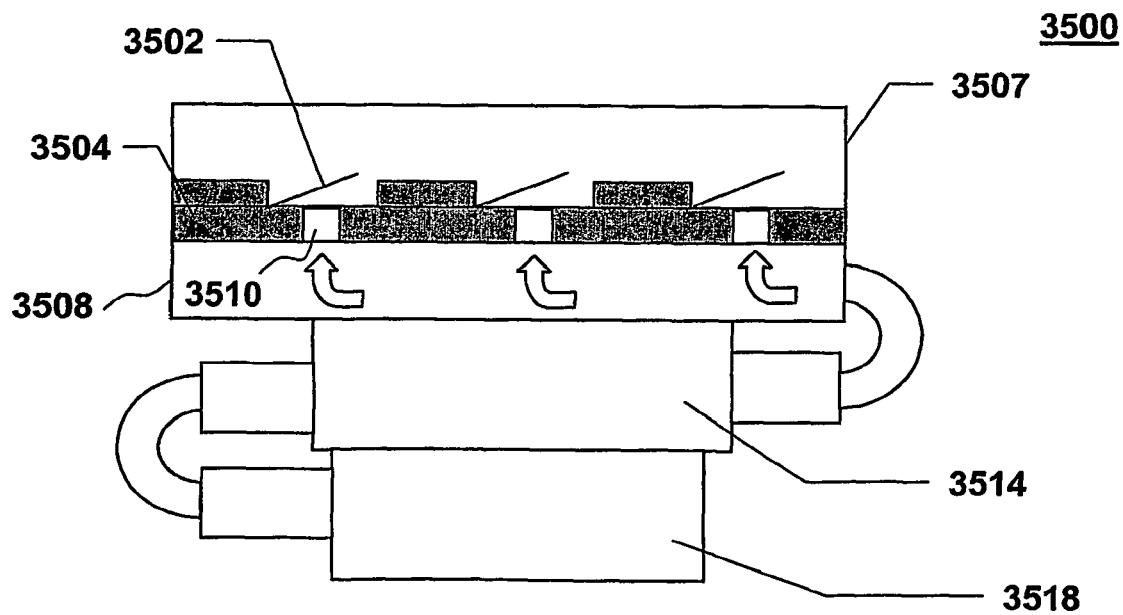
FIG. 35 depicts a simplified cross-sectional schematic diagram of a MEMS device with pneumatic actuation of elements using a micro-pump according to an embodiment of the present invention.

Instead of cylinder gas supply one can alternatively use a micro pump (compressor), which generates a positive pressure. FIG. 35 depicts an example of a MEMS device 3500 employing a micropump 3518 coupled to a chamber beneath a substrate 3504. Moveable elements 3502 are moveably coupled to the substrate 3504. Holes 3510 disposed proximate the moveable elements 3502. A device package 3507 may be attached to the substrate to enclose the moveable elements 3502. The micropump 3518 actuates the moveable elements 3502, e.g., by providing a gas pulse to the holes 3510 via a chamber 3508 disposed below the substrate 3504. A microvalve 3514 may be coupled between chamber and the micropump 3518 to control the flow of gas. Examples of suitable micro pumps include "AAA" series micro-air pump of Sensidyne, Inc., of Clearwater, Fla. (6 psi, 98% air filtration), or the NMP05 micro-diaphragm pump and compressor of KNF Neuberger, Inc of Trenton, N.J. (6 psi, 20 gr. Weight, 30×20×17 mm³ volume).

Examples of suitable micro valves 3514, include control valves of the Lee Company of Westbrook Conn., (2.5 ms response time, 12 mm dia×30 mm, power consumption—780 mW).

Any of the embodiments of pneumatic actuation means depicted in FIGS. 30–35 may be incorporated into a MEMS optical switch, such as an NXN crossbar switch of the type shown above. Such a switch typically includes a substrate and a plurality of rotatable mirrors, mounted for rotation with respect to the substrate. Advantages of such a MEMS optical switch with pneumatic actuation over similar switches with magnetic actuation are as follows:

1. The moveable elements (mirrors) do not require a magnetic pad for actuation. The manufacturing is therefore simpler due to elimination of the electroplating process used to deposit the magnetic pads.
2. The overall weight of the switch is reduced due to elimination of outside electromagnet.
3. The overall power consumption of the switch is reduced due to elimination of electromagnets normally used for magnetic actuation.
4. The size of the mirror elements may be made smaller and the scalability of the switch is enhanced since more elements may be incorporated onto the same footprint of the MEMS device due to elimination of the magnet pads.
5. Eliminating the heavy magnetic pads enhances the reliability of the switch due to reduced overall weight of the movable parts suspended on the hinges.
6. The absence of magnetic materials on a mirror makes the optical switch insensitive to external electromagnetic fields.
7. Using nitrogen gas feed for mirror actuation improves reliability of the switch by eliminating external moisture penetration into the package, which can lead to stiction problems.

3. Acoustic Pulse Actuation

Figure 36:
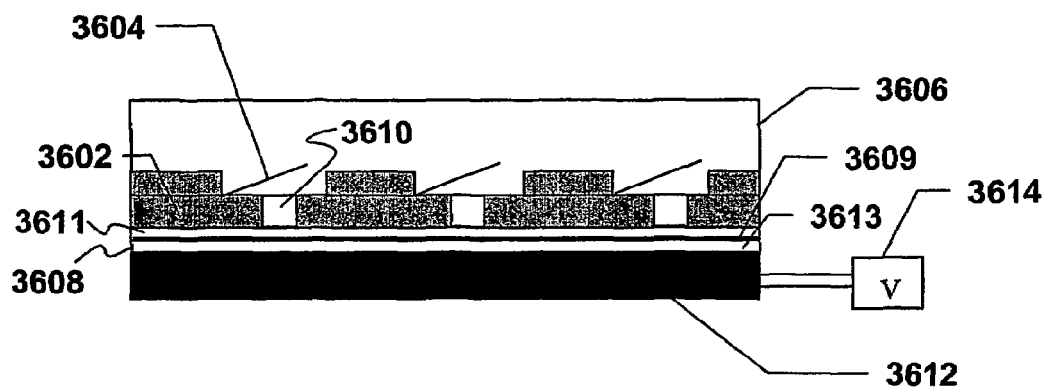
FIG. 36 depicts a simplified cross-sectional schematic diagram of a MEMS device with acoustic pulse actuation from the backside in a gaseous environment according to an embodiment of the present invention.

Another class of possible alternative schemes that may be used with equipotential landing pads involves acoustic pulse actuation. In such application schemes energy in the form of an acoustic pulse actuates a moveable portion of a MEMS device. There are many possible ways of implementing acoustic pulse actuation. For example FIG. 36 depicts an embodiment of a MEMS device 3600 with acoustic pulse actuation and from a backside of a substrate. The device 3600 generally comprises a substrate 3602 with one or more moveable elements 3604, such as mirrors, mounted for rotation with respect to the substrate 3602 between a horizontal position and a vertical position. The device 3600 may include clamping mechanisms, such as electrostatic clamping electrodes, to selectively retain each moveable element 3604 in the vertical or horizontal position. Each moveable element 3604 may be mounted to the substrate 3602 via one or more flexures that provide a torsional force that biases the moveable element 3604 to return to the horizontal position in the absence of an actuating force or clamping force. Alternatively, the movable elements 3604 may translate, e.g. vertically or horizontally. A package 3606 that covers the movable elements 3604 contains a gas (preferably nitrogen, although other inert gases will also work). Gas also fills a chamber 3608 under the movable elements 3604. Of course, the relative positions of the chamber 3608 and package 3606 may be reversed. The package 3606 and chamber 3608 are connected through holes 3610 in the backside of the substrate 3602 proximate the movable elements. An electromagnet 3612 is coupled to the chamber 3608 to provide acoustic pulse actuation. In this embodiment the chamber 3608 includes a membrane 3609 that divides the chamber into two part 3611, 3613. A first part 3611 communicates with the package via the holes 3610. A second part 3613 is proximate to the electromagnet 3612. Each part of the chamber 3608 may be filled with the same medium, e.g. the same gas or liquid. Alternatively, the two parts 3611, 3613 may be filled with different media, e.g. different gases, different liquids, gas in one part liquid in the other part, or the first part 3611 may be filled with gas or liquid and the second part 3613 may be evacuated.

A pulse generator 3614 coupled to the electromagnet 3612 provides an electromagnetic pulse. Preferably, the membrane 3609 is made of magnetic material in order to be able to interact with electromagnetic force produced by the pulsed magnetic field. The pulse of a magnetic field deforms the membrane 3609, which creates acoustic pulse (medium pressure gradient) in the first part 3611 of the chamber 3608. This acoustic pulse propagates through the gas or liquid and actuates the movable elements 3604, e.g., by turning one or more of the moveable elements 3604 90 degrees around a hinge axis.

The magnitude of a given moveable element's angular movement depends on the maximal deformation of membrane 3609, which controls local gas or liquid pressure gradient. The required amount of deformation can be obtained by properly choosing the elastic properties of the material of the membrane 3609, the membrane's geometry and size, and the strength of the electromagnetic pulse. The magnitude of angular movement depends also on the moveable element's hinge stiffness and mass as well as the viscosity of the media in the chamber 3608.

The pulse of magnetic field may be otherwise inductively coupled to the membrane 3609, which delivers an acoustic pulse to the first part 3611 of the chamber 3608. In such case the membrane 3609 may be dielectric, but could contain a coil, with electric current flowing through it, for interaction with the electromagnetic induction force. Such a coil can be deposited and patterned using photolithographic techniques.

Since to the membrane 3609 need not oscillate, but just create a single deformation from the rest state, a short DC pulse (no frequency requirements). It is desirable to make the length of the pulse as short as possible to achieve the desired power or a given amount of membrane deflection.

The acoustic pulse is transmitted to the movable elements 3604 though the holes 3610 and drives one or more of the movable elements 3604, e.g. causing it to rotate from a horizontal position towards a vertical position. Selected ones of the movable elements 3604 may then be clamped in the vertical position by electrostatic clamping. In a similar fashion, specific movable elements 3604 may be prevented from rotating, e.g. by electrostatically clamping them, e.g., against the substrate 3602, in the horizontal position.

Other means for acoustic pulse actuation may be used in alternative embodiments of the present invention. For example, a piezoelectric transducer may be used place of the electromagnet and membrane of FIG. 36. Furthermore, a miniature piezoelectric transducer may be located proximate each of the holes to provide individual acoustic pulse actuation of each of the movable elements.

Figure 37:
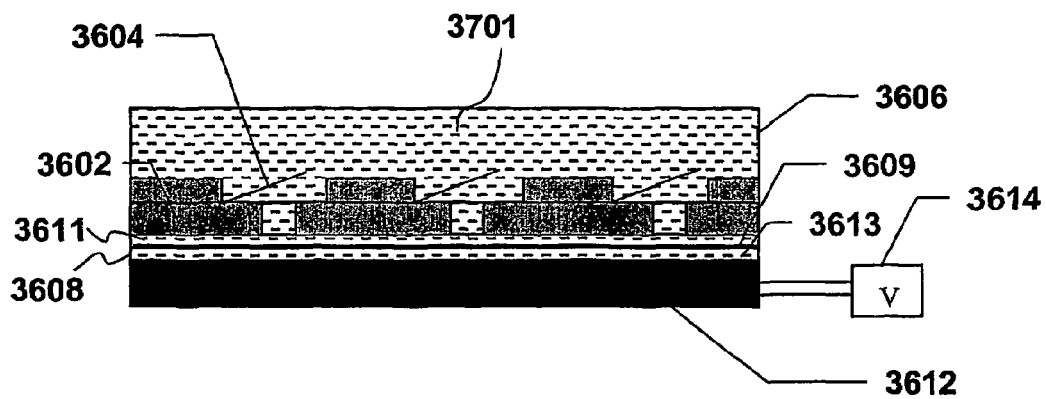
FIG. 37 depicts a simplified cross-sectional schematic diagram of a MEMS device with acoustic pulse actuation from the backside in a liquid environment according to an embodiment of the present invention.

In an alternative embodiment, depicted in FIG. 37, the sound pulse may be delivered to the movable elements 3604 through a liquid medium 3701. Such a liquid medium is preferably transparent to sound waves in the wavelength range suitable for actuation of the movable elements.

Since embodiments of the device of the present invention operate with the single pulse of pressure (acoustic pulse), rather than a continuous acoustic wave, the acoustic transparency of the medium is immaterial, as long as the medium will transfer the energy. Other parameters, such as the speed of pulse propagation through medium and decay of energy, will differ from one material to another. From this point of view, liquids are better than gases. Liquid mediums will typically give shorter response time for the switch than gases.

For optical switch applications, it is desirable that the medium in the package 3606, whether liquid or gas, be optically transparent to the wavelength of light for the optical switch operation, for example 1.3–1.5 micron.

Furthermore, it is desirable for the liquid medium 3701 to have a low viscosity. The viscosity of the liquid medium 3701 should be as low as possible. Suitable liquids include water and low viscosity oils will work if the electromagnet pulse is strong enough.

Any of the embodiments of pneumatic actuation means depicted in FIGS. 36–37 may be incorporated into a MEMS optical switch, such as an NXN crossbar switch of the type shown in FIG. 1. Such a switch typically includes a substrate and a plurality of rotatable mirrors, mounted for rotation with respect to the substrate. Advantages of such a MEMS optical switch with pneumatic actuation over similar switches with magnetic actuation are as follows:

1. The elements (mirrors) do not require a magnetic pad for actuation. The manufacturing is therefore simpler due to elimination of the electroplating process used to deposit the magnetic pads.
2. The size of the mirror elements may be made smaller and the scalability of the switch is enhanced since more elements may be incorporated onto the same footprint of the MEMS device due to elimination of the magnet pads.
3. Eliminating the heavy magnetic pads enhances the reliability of the switch due to reduced overall weight of the movable parts suspended on the hinges.
4. Absence of magnetic materials on a mirror makes optical switch insensitive to external electromagnetic fields.
5. Using acoustic pulse actuation in an inert gas environment improves reliability of the switch by eliminating external moisture penetration into the package, which can lead to stiction problems.
6. Using liquid environment eliminates stiction problems and improves the reliability of the switch.

In accordance with the foregoing, low-cost, high yield scalable MEMS devices and switches may be provided without the disadvantages attendant to magnetic actuation.

G. State Sensing

It is often desirable to allow for detection of whether a rotatable MEMS element is in a first or second position, , e.g., horizontal or vertical, and whether it is properly clamped in either of these two positions. This sensing capability is useful, for example, in fault detection. By sensing the mirror position, mirror failure can be immediately detected, and traffic through the switch can be appropriately re-routed. Such state sensing may be incorporated into MEMS devices that utilize equipotential landing pads.

1. Capacitive State Sensing

Figure 38A:
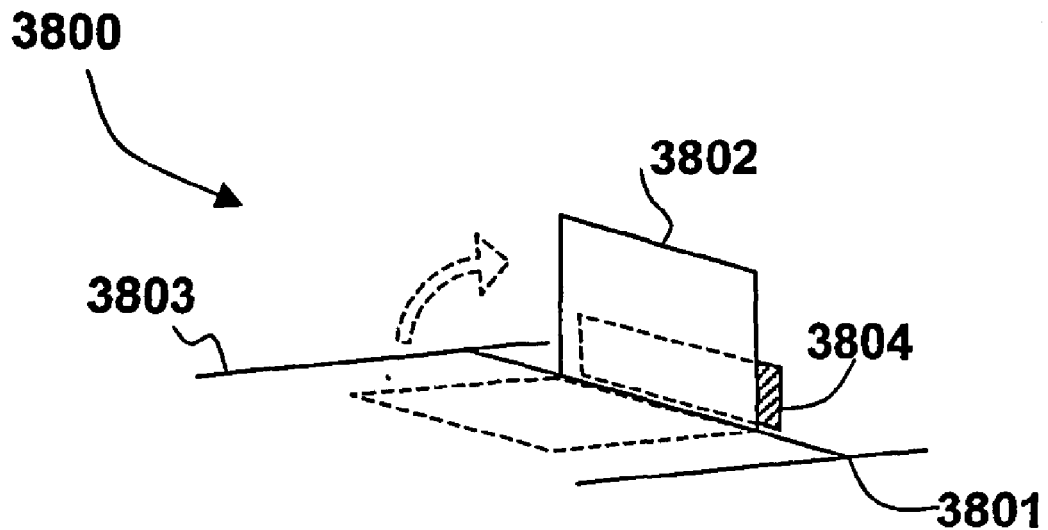
Figure 38B:
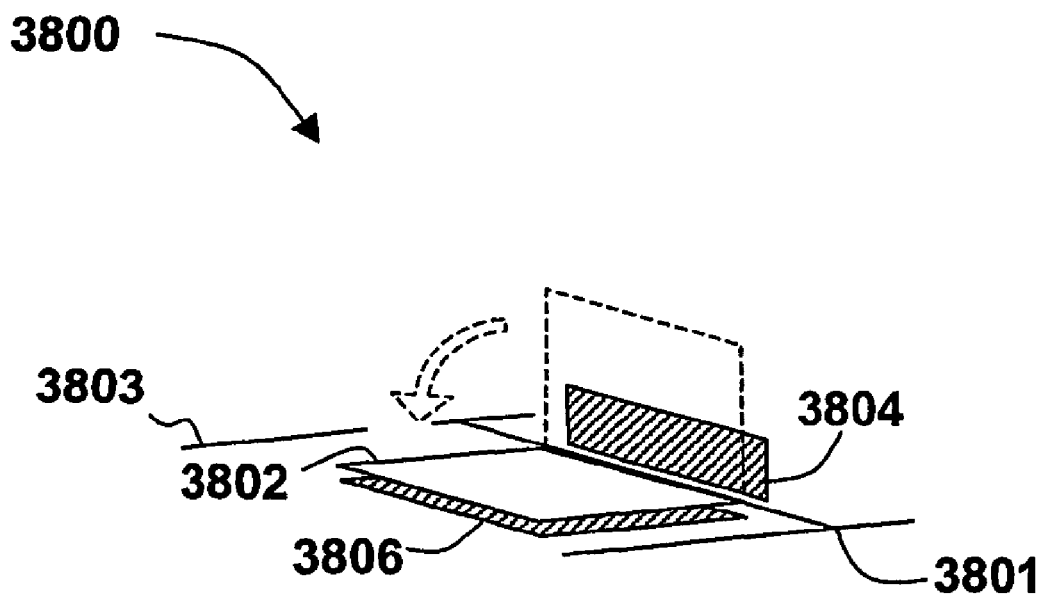

One of many possible schemes for state sensing involves sensing a capacitance, e.g., between a MEMS moveable element and a corresponding substrate, or a change in such a capacitance. FIGS. 38A–38B depict one example of an apparatus 3800 the implements capacitive state sensing according to an embodiment of the invention. Such an apparatus may be used in conjunction with MEMS devices that are equipped with equipotential landing pads. The apparatus generally comprises a rotatable element 3802, and first and second electrodes 3804, 3806. The first electrode 3804 is typically located adjacent to the element 3802 when element 3802 is in its vertical position. The second electrode 3806 is typically located adjacent to the element 3802 when element 3802 is in its horizontal position. For the purpose of example, and without loss of generality, the rotatable element 3802 may be a MEMS mirror that rotates about a substantially horizontal axis 3801 relative to a static part 3803. The rotatable element may include a separate electrode for clamping or capacitance sensing. Alternatively, if the rotatable element 3802 is electrically conductive, the element 3802 itself may be regarded as an electrode. In the embodiment depicted in FIGS. 38A–38B the rotatable element 3802 rotates between two positions that are substantially 90° apart. In particular, the rotatable element rotates between a vertical position, as shown in FIG. 38A, and a horizontal position, as shown in FIG. 38B. The vertical position defines a first or "on" control state. The horizontal position defines a second or "off" control state. In the embodiments of the present invention the capacitance between the rotatable element 3802 and the electrodes 3804,3806 depends on whether the rotatable element is in the first or second position.

The first electrode 3804 can be placed so that it is disposed close to and substantially parallel with the rotatable element 3802 in the vertical position. The capacitance between the rotatable element 3802 and the first electrode 3806 can be monitored to determine the control state of the rotatable element 3802. For example when the rotatable element 3802 is flipped to the vertical position from the horizontal position, the capacitance between the element 3802 and the first electrode 3804 changes from a low value to a much higher value. At the same time, the capacitance between the rotatable element 3802 and the second electrode 3806 changes from a high value to a lower value. In a similar fashion, the capacitance between the second electrode 3806 and the rotatable element 3802 can be used to detect the control state of the when it is in the horizontal position. The magnitude of the "on"-state capacitance is known, and if the element 3802 is somehow improperly positioned in the "on" state, the capacitance may not reach the known value, and a fault may be indicated.

In the device 3800, the electrodes 3804, 3806 may also serve as clamping electrodes as well as for capacitive control state sensing. Alternatively, the device 3800 may include separate electrodes for sensing and clamping. In the case of an array of rotatable elements, e.g., MEMS mirrors, the electrodes for the "off", or horizontal, state detection may be electrically shorted to each other. In such a case, the static part 3803 may comprise a substrate to which the mirrors are mounted. Similarly, the "on", or vertical, state electrodes may comprise a single component with features that define a vertical electrode for each mirror.

FIG. 39 depicts a simplified cross-sectional schematic diagram of an apparatus 3900 according to an embodiment of the present invention. The apparatus generally comprises a MEMS device 3910, and a device controller 3920. The device 3910 typically includes a substrate 3911 and a rotatable element 3912, such as a mirror. The substrate 3911 includes a vertical stop 3915 and a horizontal stop 3917. The rotatable element 3912 rotates about an axis oriented substantially parallel to a plane of the substrate 3911. The rotatable element 3912 may be attached to the substrate 3911 by a torsional flexure 3913. The rotatable element 3912 rotates, e.g. under magnetic actuation, between a vertical position proximate the vertical stop 3915 and a horizontal position proximate the horizontal stop 3917. The substrate 3911 further includes vertical and horizontal electrodes 3914, 3916 proximate the vertical and horizontal stops 3915,

3917. The electrodes 3914, 3916 are typically electrically isolated from each other and from the rotatable element 3912. The controller 3920 typically includes a processor 3921, a fault detector 3922, a state selector 3923, vertical and horizontal capacitance sensors 3924, 3926 and vertical and horizontal power voltage sources 3927, 3929. The state selector 3923 and fault detector 3922 are coupled to the processor 3921. The capacitance sensors 3924, 3926, are coupled to the electrodes 3914, 3916 respectively and to the fault detector 3922. Conditioning electronics 3925V, 3925H, such as amplifiers or analog to digital (A/D) converters, may optionally be coupled between the capacitance sensors 3924, 3926 and the fault detector 3922. In the embodiment shown in FIG. 39, the voltage sources 3927, 3929 are coupled to the electrodes 3914, 3916 respectively. The voltage sources 3927, 3929 supply clamping voltages to the electrodes 3914, 3916 to clamp the rotatable element to the vertical stop 3915 or the horizontal stop 3917. Alternatively, the device 3910 may include separate clamping electrodes coupled to the voltage sources 3927, 3929.

For example, it is often the case that the capacitance sensors are coupled to conditioning electronics that interpret the signals from the capacitance sensors. Such conditioning electronics may include amplifiers, analog-to-digital converters, and the like. It is often desirable to ensure that the conditioning electronics receive signals from the sensors having an acceptable level of noise. The acceptable value of the noise level depends on the circuit and the required precision in the specific application. For very small capacitance signals, e.g., of order $10^{-15}$ farads, this may affect the design of the apparatus.

For example, to reduce the signal to noise ratio, it may be important that the conditioning electronics be located in close proximity to the capacitive sensors. A short distance between the sensors and the electronics reduces the amount of wiring between them, thereby reducing noise. Close proximity between the sensor and the electronics may be ensured by placing the conditioning electronics in the same packaging as the sensor, e.g., on a die adjacent to a die containing a MEMS device with the sensors. The sensors and conditioning electronics may be connected by wire bonding across the die. Alternatively, the conditioning electronics may be integrated into the same die as the MEMS die itself.

Although only a single device 3910 with a rotatable element 3912 is shown in FIG. 39, those of skill in the art will recognize that the device 3910 may include an array containing any number of such devices. Furthermore, the inventive concepts described herein may also be applied to micromirror architectures such as those described in H. Toshiyoshi and H. Fujita, "Electrostatic micro torsion mirrors for an optical switch matrix," J. Microelectromech. Syst., vol. 5, no. 4, 231–7, Dec. 1996 and E. L. Goldstein, and R. W. Tkach, "Free-space micromachined optical switches with sub-millisecond switching time for large-scale optical crossconnects," OFC'98 and IEEE Photonics Technol. Lett., April 1998, both of which are incorporated herein by reference.

The relationship between the position of the rotatable element 3912 and the capacitance values measured by the sensors 3914, 3916 is illustrated in FIGS. 40A–40C. When the rotatable element is in the vertical state, as shown on the left in FIG. 40A, a large capacitance is detected between the rotatable element 3912 and the vertical electrode 3914, and a small capacitance is detected between the rotatable element 3912 and the horizontal electrode 3916 as shown on the left of FIGS. 40B and 40C. This combination of capacitances indicates that the rotatable element 3912 is in an "up" digital control state. When the rotatable element 3912 is switching and is in between the vertical position and the horizontal position (or vice versa), as shown in the middle in FIG. 40A, a small capacitance is detected between the rotatable element 3912 and both the horizontal electrode 3916 and the vertical electrode 3914 as shown in the middle of FIGS. 40B and 40C. When the rotatable element 3912 is in the horizontal position, as shown on the right in FIG. 40A, a large capacitance is detected between the rotatable element 3912 and the horizontal electrode 3916, and a small capacitance is detected between the rotatable element 3912 and the vertical electrode 3914 as shown on the right of FIGS. 40B and 40C. This combination of capacitances indicates that the rotatable element 3912 is in a "down" digital control state. The capacitance can be measured across the same electrical connections that are used to supply the electrostatic clamping voltages from the voltage sources 3927, 3927 and the electrodes 3914, 3916.

The processor 3921 determines the appropriate control state for the rotatable element 3912 and supplies a control signal to the state selector 3923 and the fault detector 3922. The state selector 3923 determines which voltage source 3927, 3929 applies a clamping voltage based on a control signal from the processor. Those of skill in the art will recognize that the state selector 3923 may be inplemented in either hardware, software or a combination of both.

Although two voltage sources 3927, 3929, are depicted in FIG. 39, the control state selector may alternatively be connected to a single voltage source, which is selectively coupled to the electrodes 3914, 3916 by a switch. The fault detector 3922 compares the control signal from the processor to a measured control state determined by measurements from the capacitance sensors 3924, 3926. In either the horizontal or vertical position, the sensors 3924, 3926 can detect exact magnitude of the capacitance to indicate improper clamping of the rotatable element 3912. For example, if a particle (e.g. a piece of dust) lands on one of the clamping surfaces and causes the mirror to clamp at an improper angle to the vertical sidewall, the capacitance detected between the rotatable element 3912 and the vertical electrode 3914 will be different than that normally detected in the vertical control state. In such a situation the fault detector 3922 would signal a fault to the processor 3921. Those of skill in the art will recognize that the fault detector 3922 may be implemented in either hardware, software or a combination of both.

The apparatus 3900 may operate according to a method according to an embodiment of the present invention. The method 4100 is set forth in the flow diagram of FIG. 41. In the method 4100 begins at step 4102 with the provision of an apparatus with a rotatable element and such as the apparatus 3900. Electrodes, such as the vertical and horizontal electrodes 3914, 3916 are provided at step 4104. At step 4106 a capacitance between the rotatable element and one or more of the electrodes is measured, e.g. with sensors such as the sensors 3924, 3926. In the apparatus 3900, the capacitance sensors 3924, 3926 measure the capacitance between the rotatable element 3912 and the electrodes 3914, 3916 to monitor the control state of the rotatable element 3912. Various methods exist for detecting the capacitance between the rotatable element 3912 and the electrodes 3914, 3916. For example, in step 4106, a small AC signal may be superimposed on top of a DC signal that is supplied by one or more of the voltage sources 3927, 3929 for electrostatic clamping. The sensors 3914, 3916 can monitor a current arising from this small AC signal to indicate the capacitance.

An alternative method employs time-division multiplexing of actuation and sense signals. In this scheme, the DC actuation signal is periodically turned off and replaced by a small AC or DC sense signal. The sensors 3914, 3916 measure the sense signal to monitor the capacitance. Preferably, the time-multiplexing is done at a rate much faster than the natural frequency of the device.

The capacitance signals from the sensors 3914, 3916 can be used to properly time the electrostatic clamping signals used for clamping the rotatable element 3912 in its two positions. For example, when the rotatable element 3912 is actuated up to a position near the vertical stop 3915, the processor signals the state selector to apply a voltage to the vertical electrode 3914 to pull the rotatable element 3912 in to the vertical stop 3915 and clamp it there electrostatically. After the rotatable element 3912 is pulled in, the voltage can be reduced to a lower value, since a lower voltage is needed to hold the rotatable element 3912 next to the electrode 3914 than that needed to pull it in. Monitoring of the capacitance signal can allow proper timing of these signals. That is, the clamp voltage would be lowered only when the capacitance value from the vertical capacitance sensor 3924 indicates that the rotatable element 3912 has reached the vertical position.

In the descriptions above, it is assumed that the electrodes used for clamping are also used for sensing. It is also possible to divide the electrode structures into several isolated regions, in which case one set of electrodes can be used for electrostatic clamping or actuation, and another set for capacitive sensing.

Figure 41:
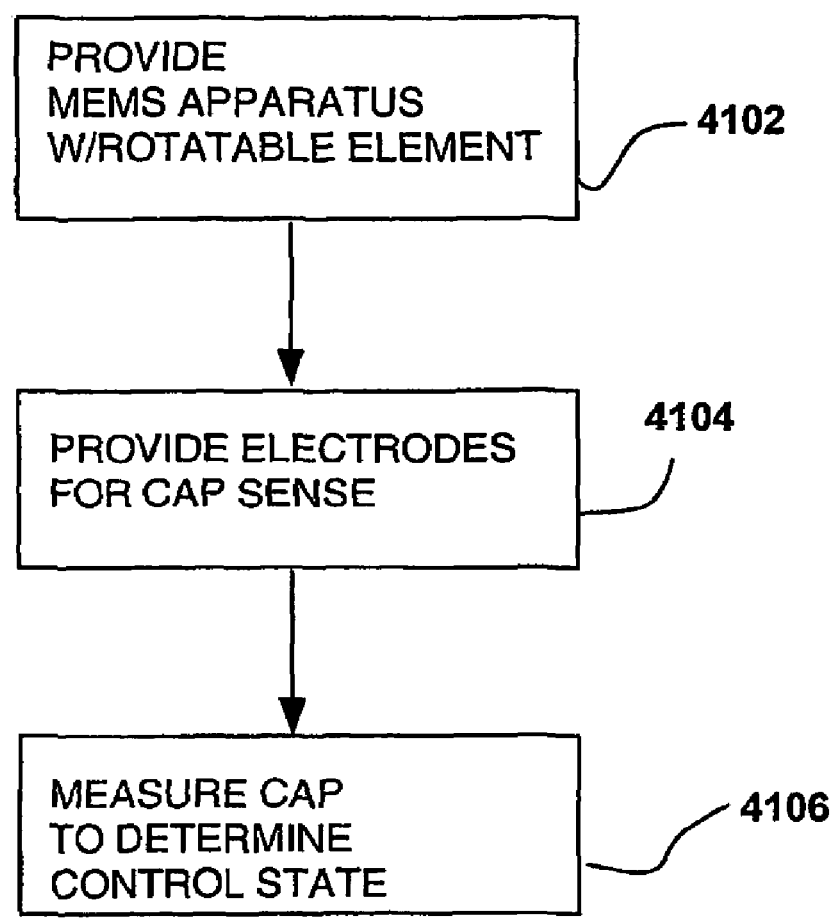
FIG. 41 depicts a simplified timing diagram for operation of a MEMS device according to an embodiment of the present invention.
Figure 42:
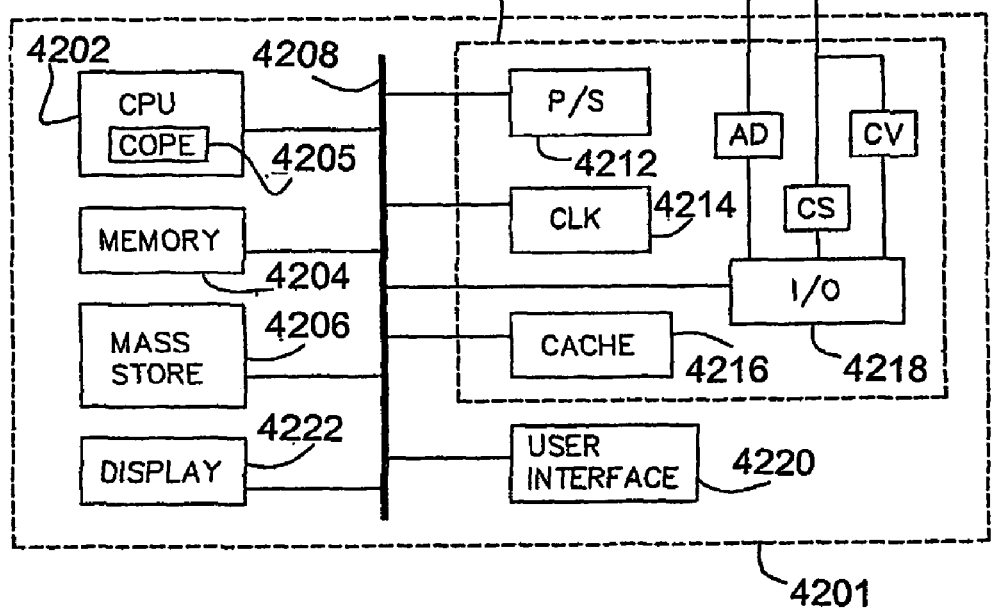
FIG. 42 depicts a block diagram depicting an optical communications system according to an additional embodiment of the invention

FIG. 42 depicts a block diagram depicting an optical communications system 4200 according to an additional embodiment of the invention. In the system 4200, a method having features in common with step 4106 of method 4100 of FIG. 41 is implemented as a computer program code 4205 running on a processor of a computer controlled apparatus having features in common with the apparatus 3900 described above with respect to FIG. 39. In the embodiment shown, the program code 4205 controls the operation of one or more MEMS mirrors M in a crossbar optical switch S. The switch S may have features in common with the type of switch 100 shown in FIG. 1. One or more input fibers IF and output fibers OF are coupled to the switch S. Each mirror M is rotatably coupled to a substrate and actuated by electrostatic or magnetic actuators A. The mirrors M are clamped in the vertical or horizontal position by voltages applied to clamping electrodes CE.

The system 4200 includes a controller 4201. The controller 4201 includes a programmable central processing unit (CPU) 4202 that is operable with a memory 4204 (e.g., RAM, DRAM, ROM, and the like) an optional mass storage device, 4206 (e.g., CD-ROM hard disk and/or removable storage), and well-known support circuits 4210 such as power supplies 4212, clocks 4214, cache 4216, input/output (I/O) circuits 4218 and the like. All of the above elements may be coupled to a control system bus 4208.

The memory 4204 contains instructions that the processor unit 4202 executes to facilitate the performance of the apparatus 4200. The instructions in the memory 4204 are in the form of the program code 4205. The program code may conform to any one of a number of different programming languages. For example, the program code can be written in C+, C++, BASIC, Pascal, JAVA or a number of other languages. The mass storage device 4206 stores data and instructions and retrieves data and program code instructions from a processor readable storage medium, such as a magnetic disk or magnetic tape. For example, the mass storage device 4206 can be a hard disk drive, floppy disk drive, tape drive, or optical disk drive. The mass storage device 4206 stores and retrieves the instructions in response to directions that it receives from the processor unit 4202. The processor unit 4202 operates the apparatus 4200 using data and program code instructions that are stored and retrieved by the memory 4204 and/or the mass storage device 4206. The data and program code instructions may be first retrieved by the mass storage device 4206 from a medium and then transferred to the memory 4204 for use by the processor unit 4202.

The apparatus 4200 may optionally include a user interface 4220, such as a keyboard, mouse, or light pen, coupled to the processor unit 4202 to provide for the receipt of inputs from an operator (not shown). The apparatus 4200 may also optionally include a display unit 4222 to provide information to the operator in the form of graphical displays and/or alphanumeric characters under control of the processor unit 4202.

The control system bus 4208 provides for the transfer of data and control signals between all of the devices that are coupled to the control system bus 4208. Although the control system bus 4208 is displayed as a single bus that directly connects the devices in the processor unit 4202, the control system bus 4208 can also be a collection of busses. For example, the display unit 4222, user interface 4220 and mass storage device 4206 can be coupled to an input-output peripheral bus 4208, while the processor unit 4202 and memory 4204 are coupled to a local processor bus. The local processor bus and input-output peripheral bus are coupled together to form the control system bus 4208.

The system controller 4201 is coupled to the elements of the apparatus 4200, for turning off a source of optical power in accordance with embodiments of the present invention via the system bus 4208 and the I/O circuits 4218. These elements include the following: one or more clamping voltage sources CV and capacitance sensors CS coupled to clamping electrodes CE in the switch S, and one or more actuator drivers AD coupled to the actuators A. For the sake of clarity, connection is shown to only one of the clamping electrodes CE and one of the actuators A. In practice, all the clamping electrodes CE and actuators A could be coupled to the I/O circuits 4218. The system controller 4201 provides signals to the above elements to switch optical signals between the input fibers IF and the output fibers OF.

The steps of the method of the method described above with respect to FIG. 41 could be implemented by a suitable computer program running on the CPU 4202 of the controller 4201. The CPU 4202 forms a general purpose computer that becomes a specific purpose computer when executing programs such as the program 4105 of the embodiment of the method of the present invention depicted in the flow diagram of FIG. 38. Although the invention is described herein as being implemented in software and executed upon a general purpose computer, those skilled in the art will realize that the invention could be implemented using hardware such as an application specific integrated circuit (ASIC), microcontroller or other hardware circuitry. As such, it should be understood that the invention can be implemented, in whole or in part, in software, hardware or both.

Those skilled in the art would be readily able to devise a computer program 4205 to implement step 4106 described above with respect to FIG. 41. The program 4205 is suitable for monitoring and controlling the switch S in accordance with embodiments of the present invention. Although the program 4205 is described herein with respect to a MEMS optical switch, those skilled in the art will recognize that programs embodying the method of the present invention can be applied to any MEMS device.

2. Magnetic State Sensing

An alternative state sensing scheme that may be used in conjunction with equipotential landing pads involves Magnetic state sensing. Magnetic sensors may detect changes in a magnetic field by sensing a change in an electrical, mechanical and/or optical property of the sensor that result from changes in the magnetic field. The change in the electrical, mechanical and/or optical property may depend upon the strength of the magnetic field or the relative position of the field with respect to the sensor. Magnetic sensors include, but are not limited to magnetoresistive sensors, magnetostrictive sensors, Hall-effect sensors, flux sensing coils, magnetostriction sensors and magneto optic sensors.

Magnetoresistive sensors utilize materials having an electrical resistance that changes in response to a change in a magnetic field. Magnetoresistivity in ferromagnetic materials was discovered in 1856 by Lord Kelvin, and has since been used in a variety of magnetic sensors to detect magnetic field strength and direction. The change in resistivity is dependent upon the strength of the magnetic field and the relative orientation of the field with respect to a conduction path through the magnetoresistive material. The change is usually a minimum when the field is perpendicular to the conduction path and is usually a maximum when the field is parallel to the conduction path. As the conduction path of a magnetoresistive sensor changes with respect to an external magnetic field (or vice-versa) the electrical resistance changes.

The Hall effect is based on the deflection of moving electric charges by a magnetic field. In a Hall effect sensor, the electrical property may be a voltage, sometimes referred to as a Hall voltage. The Hall voltage is related to the strength of an electric field, referred to herein as the Hall electric field, that results from the interaction of an electric current with a magnetic field. The Hall electric field is generally directed perpendicular to both the magnetic field and the direction of flow of the electric current through the Hall effect sensor. As the direction of flow of the electric current through the Hall effect sensor changes with respect to an external magnetic field (or vice-versa) the Hall voltage changes.

Flux sensing coils operate on the principle of electromagnetic induction. As the AC magnetic flux through the coil changes a voltage may be induced on the coil. The magnetic flux may change due to a change in intensity of an external magnetic field. Alternatively, the flux may change due to a change in the relative position of the coil with respect to the magnetic field. Flux sensing coils may be characterized by a property known as electrical inductance, which relates the voltage across the coil to the rate of change of electric current through the coil. The inductance of a coil may change, e.g., due to a change in proximity of magnetic material with respect to the coil.

The term magnetostriction refers to the change in the physical dimensions caused by magnetization. Magnetostriction sensors utilize this effect to measure field strength. Magneto optic sensors utilize materials characterized by optical properties that depend on strength and/or orientation of an applied magnetic field. Such optical properties include, but are not limited to, polarizing direction, reflectivity etc. For example, in a Kerr or Faraday rotation, the polarization of optical signals is rotated by an amount that depends on the surface magnetization, which in turn depends on the strength and direction of the applied magnetic field. Thus, the amount of polarization rotation may be used as an indicator of magnetic field strength and/or orientation.

Figure 43:
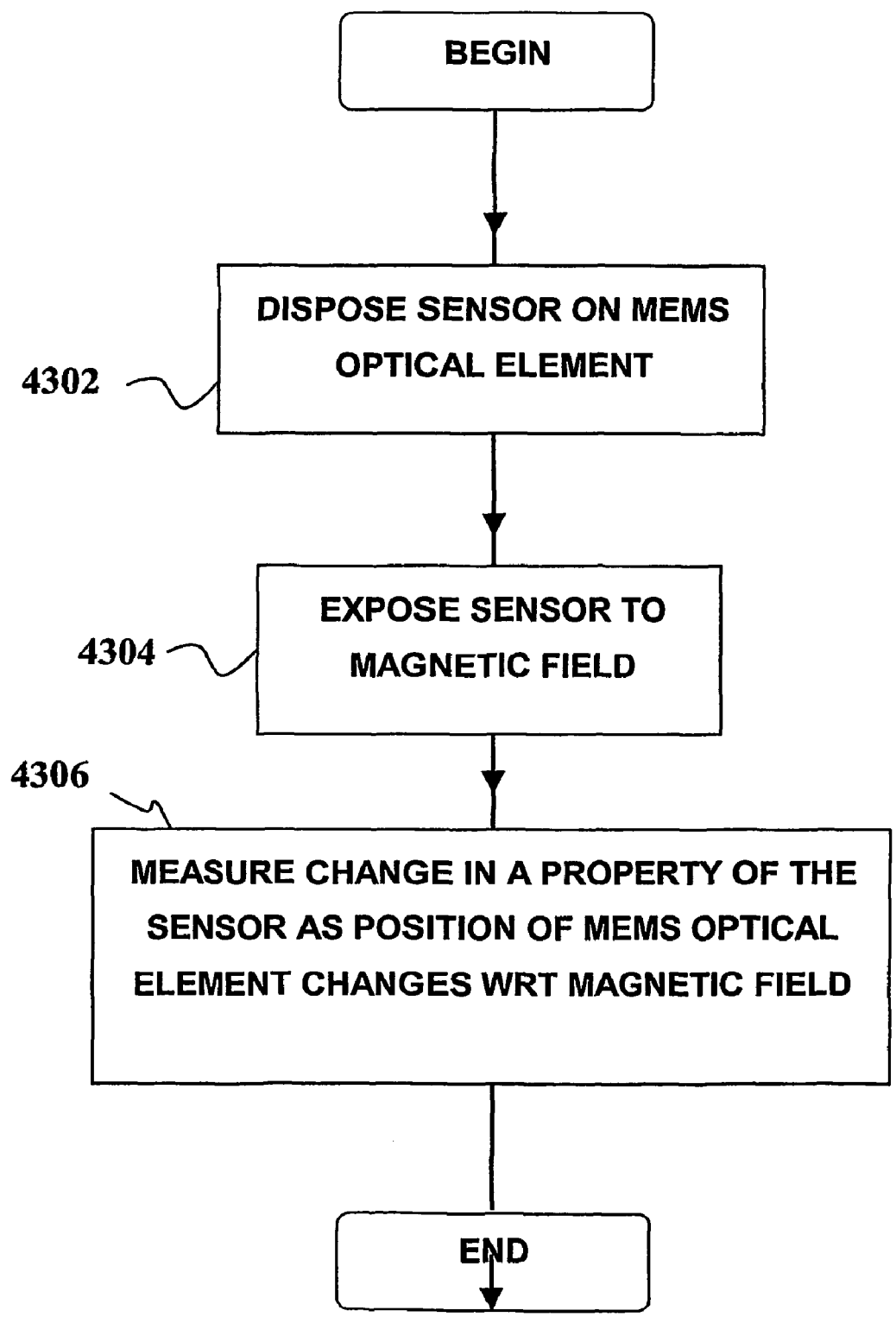
FIG. 43 is a flow diagram of a method for measuring the position of a micro machined optical element using a magnetic sensor according to an embodiment of the present invention FIG. 44A an isometric schematic diagram of an apparatus according to an alternative embodiment of the present invention.

FIG. 43 depicts a flow diagram illustrating an example of a method 4300 for measuring the position of a micro machined (MEMS) optical element according to an embodiment of the invention. At step 4302 a magnetic sensor is disposed on a micro machined optical element. At step 4304 the magnetic sensor is exposed to a magnetic field. At step 4306 a change in an electrical, mechanical and/or optical property of the magnetic sensor is measured as an orientation of the MEMS optical element changes with respect to the magnetic field. As used herein, "position" may refer to relative spatial position, relative angular orientation, or some combination of both. Furthermore, the position of the MEMS optical element may change with respect to the magnetic field if the magnitude or direction of the magnetic field changes with respect to the MEMS optical element. The ON/OFF state of a 2D MEMS optical switch may be determined by comparing the value of the magnetic sensor property measured in step 4306 with one or more predetermined values of the sensor property when the MEMS optical element is known to be in an ON and/or OFF position.

Figure 44A:
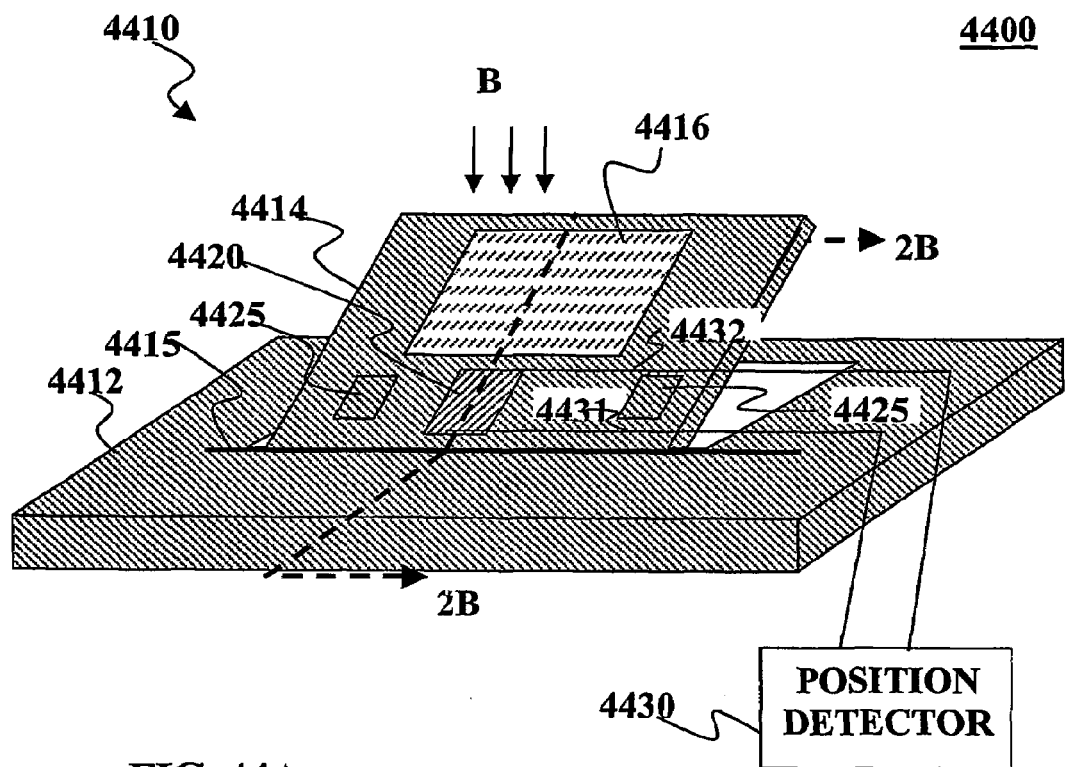
FIG. 44B is a cross-sectional schematic diagram taken along line 2B—2B of FIG. 44A.
Figure 44B:
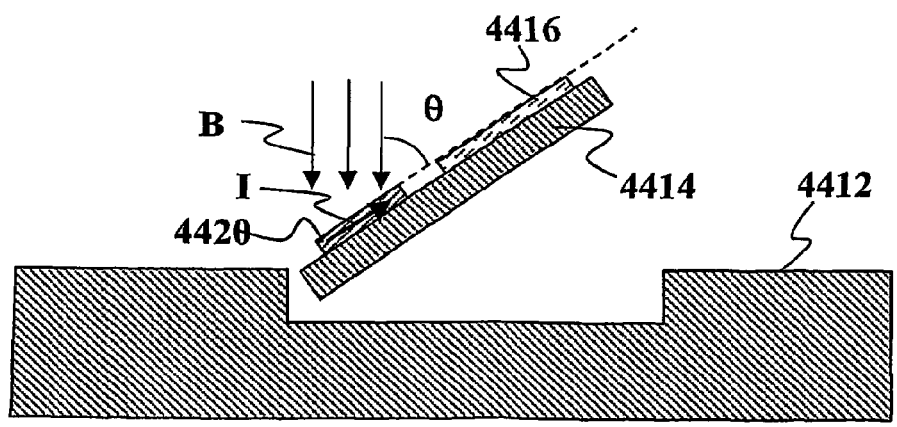

FIGS. 44A–44B depicts schematic diagrams of an apparatus 4400 according to another embodiment of the invention. The apparatus 4400 includes a micro machined optical element 4410 and a magnetic sensor 4420 disposed on the micro machined optical element 4410. The magnetic sensor 4420 may be coupled to a position detector 4430, e.g. by leads 4431, 4432.

By way of example, the micro machined optical element 4410 may include a fixed portion, such as a base 4412, and a movable portion, such as a flap 4414. As used herein, the term "moveable" means capable of movement by translation or rotation or some combination of both. Translation includes translation with respect to one or more axes. Rotation includes rotation with respect to one or more axes. By way of example, the flap 4414 may rotate about an axis 4415. The axis 4415 may be oriented substantially parallel to a plane of the flap 4414. Alternatively, the axis 4415 may be substantially perpendicular to the plane of the flap such that the flap is oriented substantially perpendicular to a plane of the base 4412. The flap 4414 may be coupled to the base e.g. by one or more flexures, so that the flap 4414 is movable out of the plane of the base 4412. The flexures may apply a torsional, or restoring force that returns the flap 4414 to a rest position when an actuating force is removed. Other restoring forces may be applied to flap 4414 to return the flap to the rest position. Such forces may be exerted on flap 4414 by biasing mechanisms that operate via pneumatic, thermal, or magnetic principals, including coils that interact with an external magnetic field, electrostatic elements, such as gap closing electrodes, piezoelectric actuators and thermal actuators. Multiple restoring forces may also be used together, and the forces may operate along the same or opposing directions.

A light-deflecting element 4416 may be disposed on the flap 4414 to deflect one or more optical signals. By way of example, the light-deflecting element 4416 may be a simple plane reflecting (or partially reflecting) surface, curved reflecting (or partially reflecting) surface, prismatic reflector, refractive element, prism, lens, diffractive element, e.g. fresnel lens, a dichroic coated surface for wavelength specific and bandpass selectivity, or some combination of these.

Any conventional means may be used to provide an actuating force to move the flap 4414. For example, the flap 4414 may contain a magnetically active element 4425 to facilitate movement of the flap by interaction with an externally applied magnetic field. The magnetically active element may be a magnetically active material having, e.g. a fixed magnetic moment, i.e., it may be a permanent magnet. Magnetically active materials may include Nickel, Nickel-Iron, Iron-Cobalt, Aluminum-Nickel-Cobalt, Neodymium-Iron-Boron, etc., and, may be deposited in a uniform or stepped pattern. Alternatively, e.g. one or more vertical combdrive actuators may be used to tilt the flap 4414 through a continuous range of angles in a controlled fashion.

The magnetic sensor 4420 may be used to sense the state or position of a flap such as the flap 4414. The magnetic sensor 4420 may operate by sensing a change in an electrical property such as a resistance, reactance, or impedance of the sensor under the influence of a magnetic field B. The magnetic field B may be an external field that actuates movement of the flap by interaction with a magnetic material 4425 on the flap 4414. Alternatively, the magnetic field may be a separate sense magnetic field, e.g. a magnetic field that is produced by the magnetic material 4425. The magnetic sensor 4420 may include, but is not limited to, magnetoresistive sensors including giant magnetoresistance (GMR) sensors, such as spin valves, colossal magnetoresistance (CMR) sensors, anisotropic magnetoresistance (AMR) sensors, magnetic tunnel junction (MTJ) devices, and Hall effect sensors, flux sensing coils, magnetostriction sensors and magneto optic sensors.

By way of example and without loss of generality, the magnetic sensor 4420 may be a magnetoresistive sensor that includes a magnetoresistive material. Examples of magnetoresistive materials Include Cu, Ni, Fe, Co and their alloys, oxides and structures having multiple layers containing one or more of these. A magnetic sensor 4420 in the form of a magneto resistive sensor may be formed by depositing magnetoresistive material and leads on the micro machined optical element 4410. Evaporation and annealing processes may be used for a multiple layer or GMR film. The magnetoresistive material may be deposited by suitable techniques including, but not limited to, sputter deposition, evaporation and electroplating FIG. 44B shows a cross-sectional schematic diagram of the apparatus 4400 taken along line 44B—44B. The flap 4414 may make an angle θ with respect to the magnetic field B. A sense current I flows through the MR sensor 4420. The MR sensor 4420 may have a thickness that is very small compared to its length and width to constrain the sense current I to flow in a path substantially within a plane. The sense current I is directed at an angle θ with respect to the magnetic field B. The sensor may be disposed on the flap 4414 as shown in FIG. 44B, so that the angle θ changes as the flap 4414 rotates with respect to the magnetic field B. Since the electrical property of the MR sensor 4420 depends on both B and θ, changes in the angular orientation of the flap produce corresponding changes in the electrical property of the MR sensor 4420. Alternatively, the flap 4414 may translate with respect to the magnetic field B. If the magnetic field B is non-uniform in either magnitude or direction, changes in the spatial position of the flap 4414 may produce changes in the electrical property of the magnetic sensor 4420.

The position detector 4430 may measure changes in the electrical property of the magnetic sensor 4420 that varies with changes in a magnetic flux through the magnetic sensor 4420. Where, for example, the relevant electrical property of the magnetic sensor is an electrical resistance, the position detector 4430 may include a resistance measuring circuit. Such a circuit may supply a fixed sense current I to the magnetic sensor 4420 and measure changes in the voltage across the magnetic sensor 4420. If the relevant electrical property of the MR sensor 4420 is a Hall voltage, the position detector may supply a fixed current to the opposite ends of the magnetic sensor 4420 and detect the Hall voltage that develops across the width of the detector. The position detector 4430 may be implemented in hardware, software, firmware, or some combination of these. By way of example, the position detector 4430 may be implemented as one or more application specific integrated circuits (ASIC's).

Figure 45A:
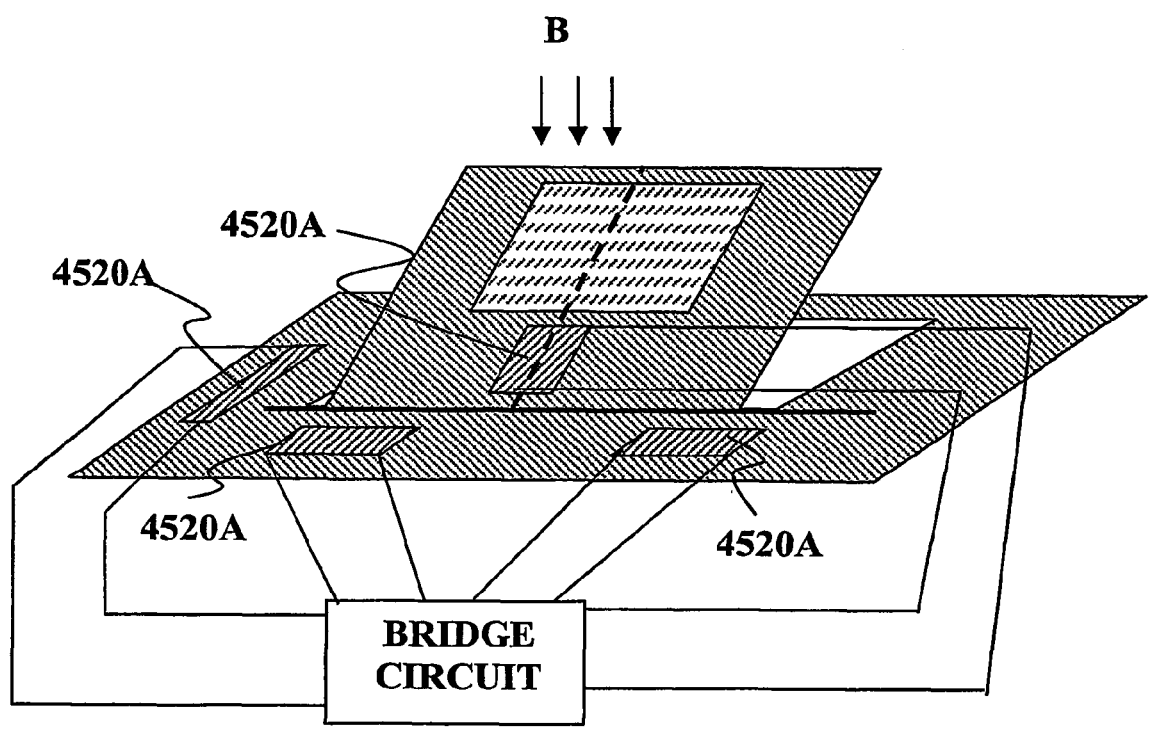
FIG. 45A is an isometric schematic diagram of an apparatus according to an alternative version of an embodiment of the invention.

More than one magnetic sensor may be disposed on the micro machined optical element. Furthermore, the magnetic sensor may be disposed on the fixed portion of the micro machined optical element. By way of example, FIG. 45 depicts an isometric schematic diagram of an apparatus 4500 according to an alternative version of the above-described embodiment of the invention. Apparatus 4500 may include a micro machined optical element 4510 and first, second, third, and fourth magnetic sensors 4520A, 4520B, 4520C, 4520D disposed on the micro machined optical element 4510. The magnetic sensor 4520 may be coupled to a bridge circuit 4530. The optical element 4510 may include a fixed portion 4512 and a moveable portion 4514. The magnetic sensors 4520A, 4520B, 4520C, 4520D may include, but are not limited to, giant magnetoresistance (GMR) sensors, spin valves, colossal magnetoresistance (CMR) sensors, anisotropic magnetoresistance (AMR) sensors, magnetic tunnel junction (MTJ) devices, and Hall effect sensors, flux sensor coils, magnetostriction sensors and magneto optic sensors.

By way of example, the magnetic sensors 4520A, 4520B, 4520C, 4520D may be magnetoresistive (MR) sensors. The magnetoresistive sensors may be formed from a pattern of magnetoresistive material laid out on the micro machined optical element 4510, e.g., by photolithographic techniques. As the position of the movable portion 4514 changes with respect to the magnetic field B during the actuation cycle, the orientation of the sensor 4520A with respect to the magnetic field B also changes, e.g., from a from parallel to a perpendicular orientation. In the version of the embodiment depicted in FIG. 45A the first MR sensor 4520A may be disposed on the movable portion 4514 of the micro machined element 4510 and the other three sensors 4520B, 4520C, 4520D disposed on the fixed portion 4512. As the angular orientation of the movable portion 4514 changes with respect to a magnetic field B an electrical property of the first sensor 4520A on the movable portion 4514 changes correspondingly as described above. The electrical properties of the other three sensors 4520B, 4520C, 4520D, however, remain substantially fixed as the angular orientation of the movable portion changes with respect to the magnetic field B. The properties of all four sensors 4520A, 4520B, 4520C, 4520D change in proportion to changes in the magnetic field B. Thus, if all four sensors 4520A, 4520B, 4520C, 4520D are appropriately coupled to the bridge circuit 4530 an output of the bridge circuit may be made sensitive to changes in the angular orientation of the movable portion 4514 of the micro machined optical element 4510, but substantially insensitive to changes in the magnetic field B.

Figure 45B:
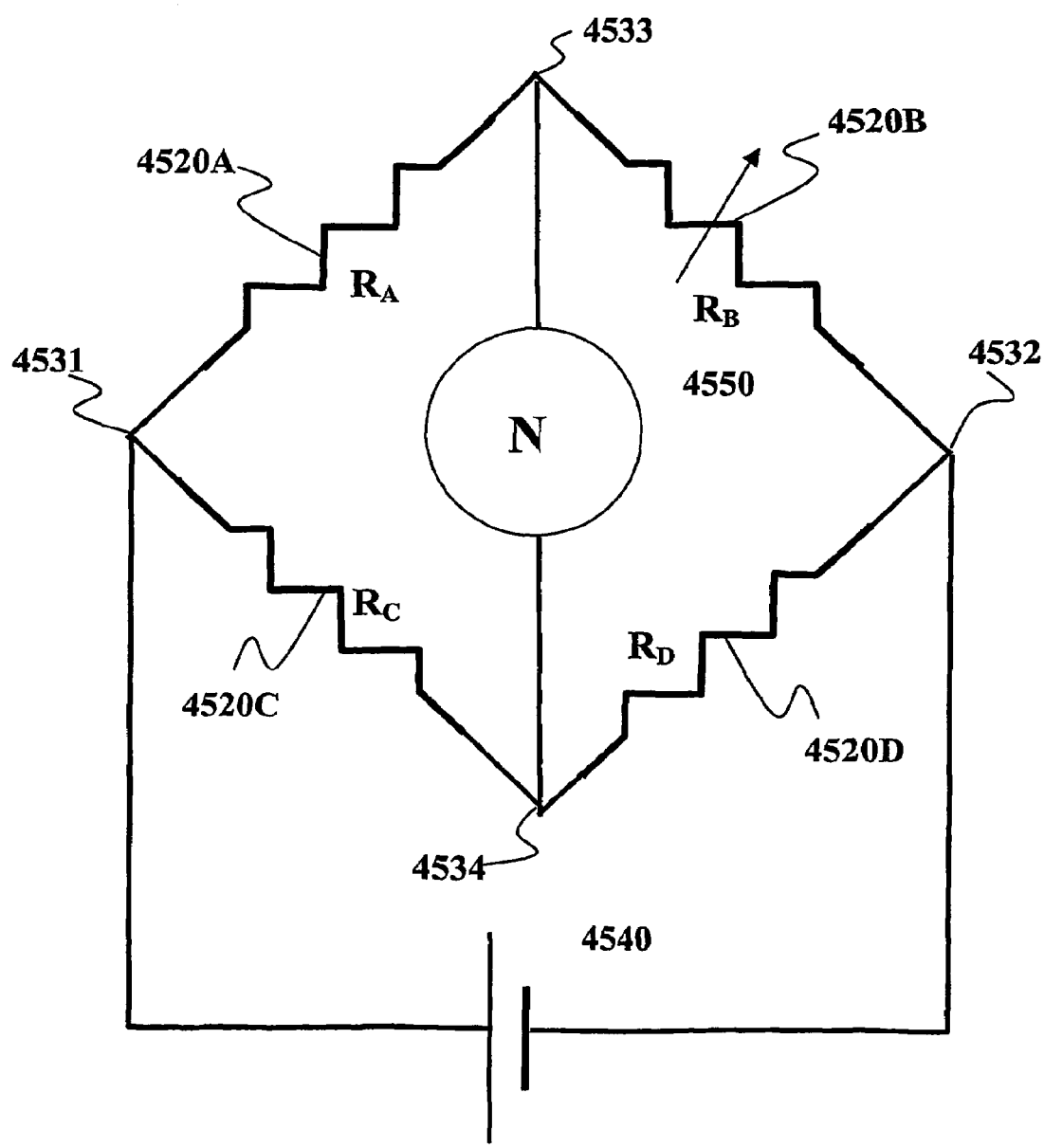
FIG. 45B is a schematic diagram of a Wheatstone bridge circuit that may be used with the apparatus of FIG. 45A.

FIG. 45B illustrates a schematic diagram of an example of a bridge circuit 4530' that may be in conjunction with the apparatus 4500. Although the following relates to the use of a bridge circuit with magnetoresistive sensors, bridge circuits may also be used with other magnetic sensors such as Hall effect sensors, flux sensing coils, magnetostriction sensors and magneto optic sensors. The four magnetoresistive sensors 4520A, 4520B, 4520C, 4520D may be connected in a Wheatstone bridge fashion with one sensor 4520A being disposed on the movable portion 4514 of the micro machined optical element 4510.

By way of example, each of the four magnetoresistive sensors 4520A, 4520B, 4520C, 4520D may be respectively characterized by an electrical resistance $R_A$, $R_B$, $R_C$, $R_D$ that changes in response to changes in the magnetic field B. The first and third magnetoresistive sensors 4520A, 4520C may be electrically coupled at a first junction 4531. The second and fourth magnetoresistive sensors 4520B, 4520D may be electrically coupled at a second junction 4532. The first and second magnetoresistive sensors 4520A, 4520B may be electrically coupled at a third junction 4533. The third and fourth magnetoresistive sensors 4520C, 4520D may be electrically coupled at a fourth junction 4534. A current source 4540 may be coupled between the first and second junctions 4531, 4532, and null detector (N) 4550 may be electrically coupled between the third and fourth junctions 4533, 4535. The null detector 4550 may be regarded as a sensitive electric current detector. By way of example, the resistance of the circuit between the second and third junctions, e.g., $R_B$, may be varied to change the current through the null detector 4550. When the current through the null detector 4550 is zero, it can be shown that the resistance of the magnetoresistive sensor 4520A may be given by:

$$R_A = \frac{R_C R_B}{R_D}$$

Since $R_A$, $R_C$, $R_C$, $R_D$, are dependent magnetic field B changes in the magnetic field B tend to cancel out. However, in this example, only $R_A$ depends on the angle θ. Thus, the bridge circuit 4530' may capture information regarding the angular position of the movable portion 4514 of the micro machined optical element 4510. Although the foregoing discussion describes measurement of electrical resistance, Wheatstone bridge circuits may be utilized to measure other electrical properties such as Hall voltages. Other bridge circuits, such as Mueller bridge circuits may be used with the apparatus 4500 to measure the resistance or other electrical property of one or more magnetic sensors. Furthermore, a single magnetic sensor may be coupled to a bridge circuit to sense a change in resistance or other relevant electrical property. One or more magnetic sensors can be employed as sense elements in a feedback loop to control the mirror angle, and to incorporate a diagnostic routine to inform a user of switch level malfunctions in the event that the control loop fails to move the mirror to the desired position.

Figure 46:
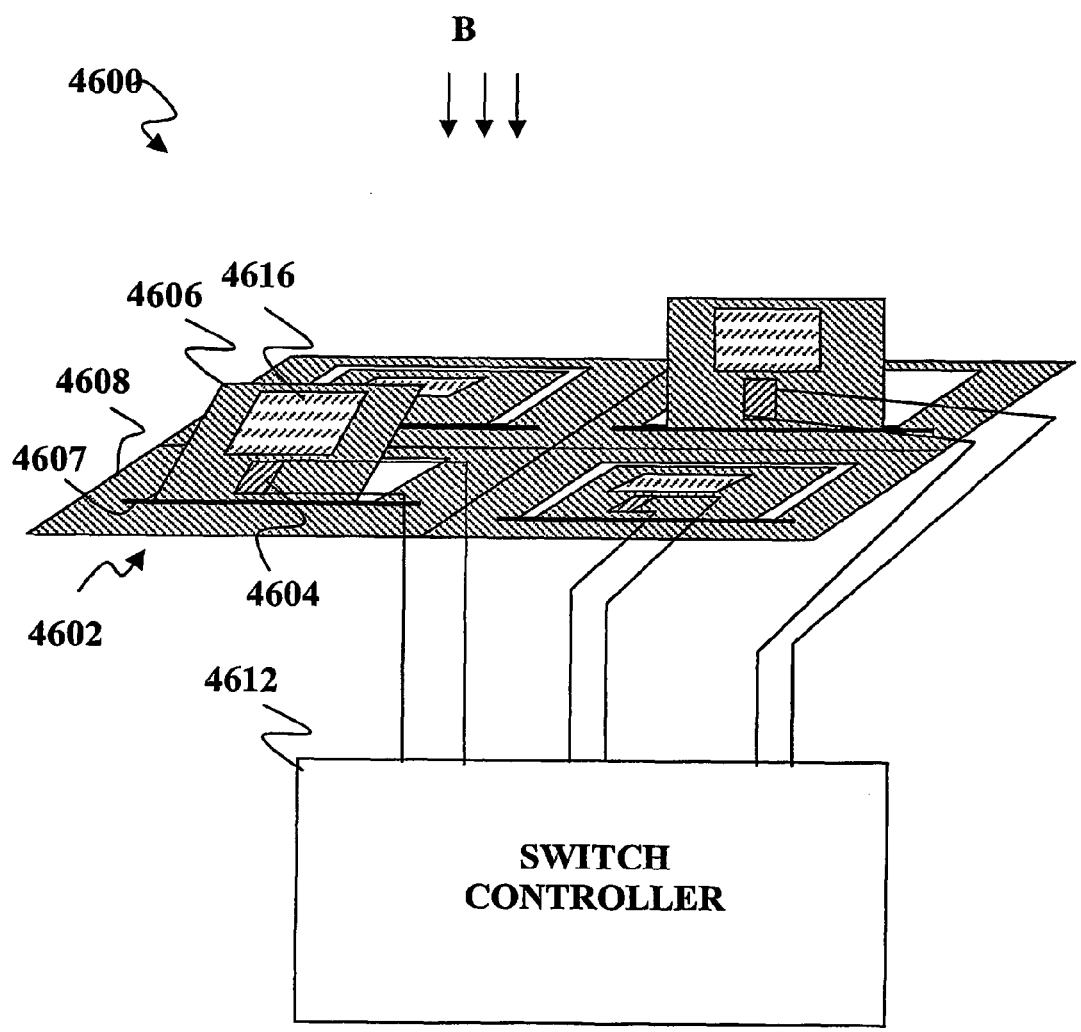
FIG. 46 is an isometric schematic diagram of a MEMS optical switch according to another embodiment of the invention.

Embodiments of the present invention can be used to measure the angular position of the scanning MEMS micro mirrors used in fiber-optic switches for optical communication systems. FIG. 46 depicts an isometric schematic diagram of an example of a MEMS optical switch 4600. According to another embodiment of the invention, switch 4600 may generally includes a plurality of micro machined optical elements 4602 and magnetic sensors 4604. The magnetic sensors 4604 may include, but are not limited to the various types of sensors described above, such as giant magnetoresistance sensors, colossal magnetoresistance sensors, anisotropic magnetoresistance sensors, magnetic tunnel junction devices, Hall effect sensors, flux sensing coils, magnetostriction sensors, magneto optic sensors and the like. Each micro machined optical element 4602 may include a movable portion 4606. The sensors 4604 may be disposed on the movable portions 4606 as described above. By way of example, the movable portion may rotate about an axis 4607 relative to a fixed portion 4608. The fixed portion 4608 may be a base common to all of the micro machined optical elements 4602.

The movable portions 4606 may include a light deflecting elements 4616. By way of example, the light-deflecting element 4616 may be a simple plane reflecting (or partially reflecting) surface, curved reflecting (or partially reflecting) surface, prismatic reflector, refractive element, prism, lens, diffractive element, e.g. fresnel lens, a dichroic coated surface for wavelength specific and bandpass selectivity, or some combination of these. The light deflecting elements 4616 may deflect optical signals to selectively couple the signals from one optical fiber to another. It must be stated that movable portion 4606 is shown for example purposes only, that a plurality of movable element designs exist, and the present invention may be used on various MEMS optical mirror designs that utilize a movable optical element. The sensors 4604 may be coupled to a switch controller 4612. The switch controller 4612 may be implemented in hardware, software, firmware, or some combination of these. By way of example, the switch controller 4612, may be implemented as one or more application specific integrated circuits (ASIC's). The switch controller 4612 may receive information on the angular position of the movable portions of the micro machined optical elements 4602 from the sensors 4604. The switch controller may include a feedback loop to control the angle of the movable portions. Alternatively, the switch controller 4612 may incorporate a diagnostic routine to inform a user of switch level malfunctions in the event that the control loop fails to move the micro machined optical element 4602 to a desired position.

In some versions of the above-described embodiments of the invention, the magnetic sensor may be placed on a fixed portion of a micro machined optical element. FIGS. 47A–47E depict several alternative versions of this embodiment. In these versions, a magnetic material is characterized by a permanent magnetic moment is disposed on a moveable portion and the magnetic sensor and its associated leads are disposed on a nearby fixed portion. The magnetic material may produce a magnetic flux that passes through a magnetoresistive sensor, Hall effect sensor or coil wherein the flux changes as the position of the magnetic material changes with respect to the sensor. Changes in flux through the sensor may cause changes an electrical property of the sensor, e.g. electrical resistance, Hall voltage or inductance. An advantage of this configuration is that an electrical connection to the moveable portion is not required. This greatly simplifies the manufacture of the apparatus and improves the robustness of its operation.

Figure 47A:
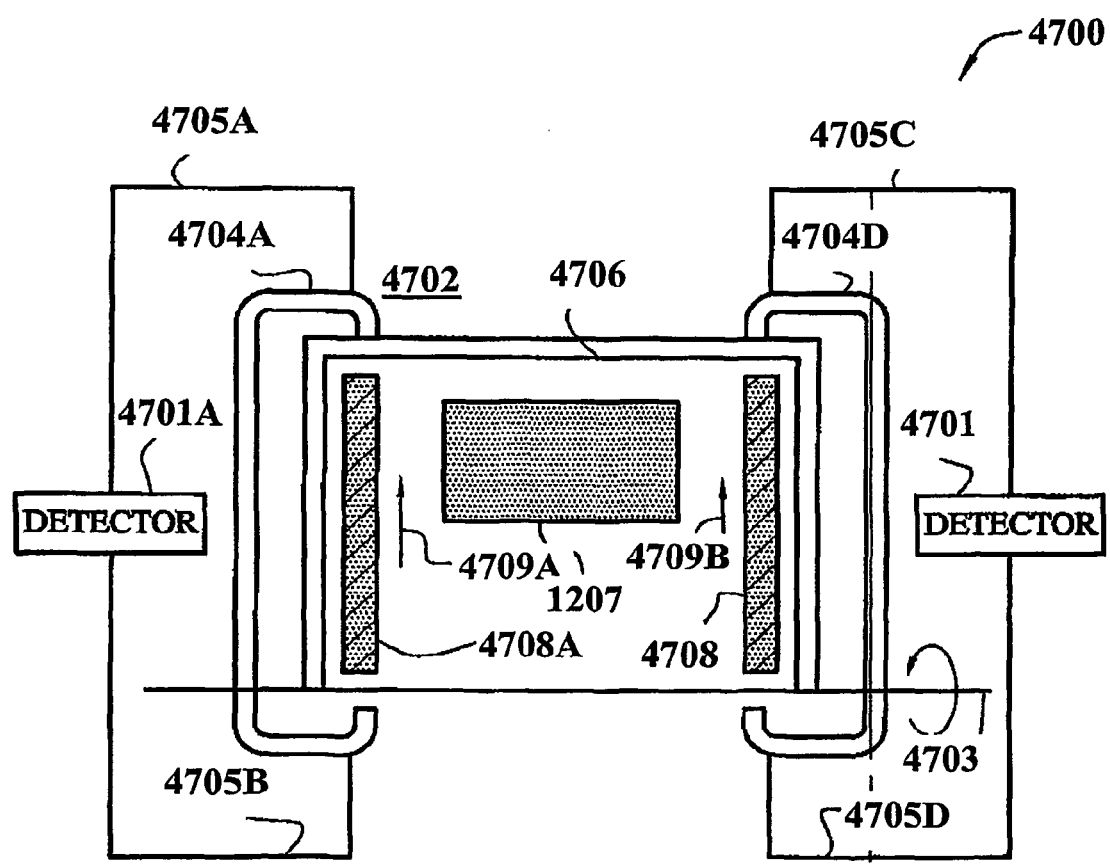
FIG. 47A is a plan view schematic diagram of an apparatus according to another alternative version of an embodiment of the invention.

FIG. 47A depicts a plan view of an apparatus 4700 according to another alternative versions of the above-described embodiment of the invention. The apparatus 4700 generally comprises a micro machined optical element having a fixed portion in the form of a substrate 4702 and a moveable portion in the form of a flap 4706. The flap is movable, e.g. rotatable with respect to an axis 4703. The flap may include a light-deflecting element 4707 One or more magnetic sensors 4704A, 4704B are disposed on the substrate 4702 proximate the flap 4706. One or more magnetic elements 4708A, 4708B are disposed on the flap 4706 near the sides thereof proximate the sensors 4704A, 4704B. The sensors 4704A, 4704B may be connected to detectors 4701A, 4701B through leads 4705A, 4705B, 4705C, 4705D. In the embodiment shown in FIG. 47A the sensors 4704A, 4704B and the magnetic materials 4708A, 4708B are oriented substantially parallel to each other and substantially perpendicular to the rotation axis 4703.

The magnetic elements 4708A, 4708B may be magnetically active materials having, e.g. a fixed magnetic moment, i.e., they may be permanent magnets. Magnetically active materials may include Nickel, Nickel-Iron, Iron-Cobalt, Aluminum-Nickel-Cobalt, Neodymium-Iron-Boron, etc., and, may be deposited in a uniform or stepped pattern. The magnetic elements 4708A, 4708B may alternatively include one or more coils that carry electric current to provide a magnetic moment. Each magnetic element 4708A, 4708B may be characterized by a magnetic moment having a direction indicated by the arrows 4709A, 4709B. In the embodiment depicted in FIG. 47B the magnetic moments of the magnetic elements 4708A, 4708B are oriented substantially perpendicular to the axis 4703. As the flap 4706 rotates about the axis 4703 the change in the relative position and/or orientation of the magnetic field produced by the magnetic elements 4708A, 4708B with respect to the sensors 4704A, 4704B causes a change in the magnetic flux passing through the sensors 4704A, 4704B. The change in flux causes a change in an electrical property of one or more of the sensors 4704A, 4704B.

In a preferred embodiment, the sensors 4704A, 4704B may have a C-shape that includes a gap. The sensors 4704A, 4705B "wrap around" the magnetic elements 4708A, 4708B. As the position of the flap 4706 changes with respect to the substrate 4702 the amount of magnetic flux produced by the magnetic elements 4708A, 4708B that is intercepted by the sensors 4704A, 4704B changes. Where the sensors 4704A, 4704B are magnetoresistive sensors, the change in intercepted flux produces a change in one or more sense signals detected at the detectors 4701A, 4701B. In the particular version of the above-described embodiment shown in FIG. 47A, the magnetic flux is a maximum when the flap 4706 is substantially parallel to the substrate 4702. In this configuration, the magnetic elements 4708A, 4708B are disposed within the gaps in the sensors 4704A, 4704B.

Figure 47B:
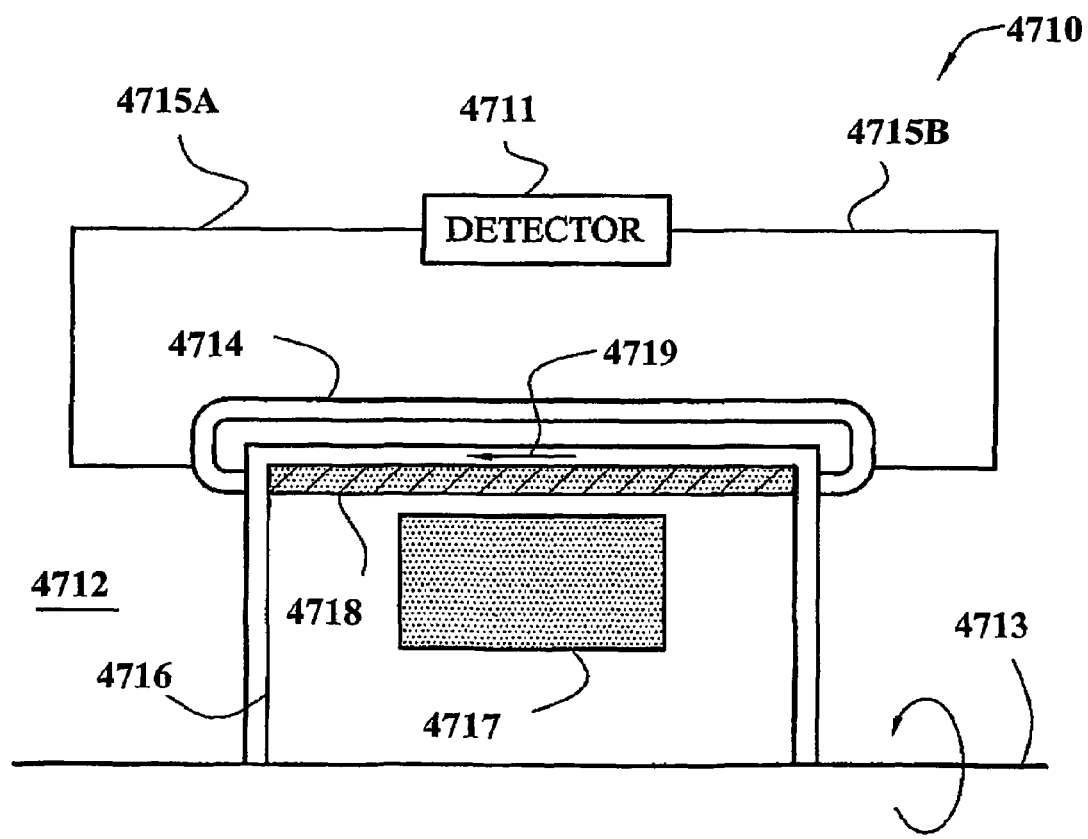
FIG. 47B is a plan view schematic diagram of an apparatus according to another alternative version of an embodiment of the invention.

FIG. 47B depicts a plan view of an apparatus 4710 according to another alternative version of the above-described embodiment of the invention. The apparatus 4710 is a variation on the apparatus 4700 of FIG. 47A. The apparatus 4700 generally comprises a micro machined optical element having a fixed portion in the form of a substrate 4712 and a moveable portion in the form of a flap 4716. A light-deflecting element 4717 may be disposed on the flap 4716. The flap 4716 is movable, e.g. rotatable with respect to an axis 4713. A magnetic sensor 4714 may be disposed on the substrate 4712 proximate an end of the flap 4716. A magnetic element 4718 may be disposed on the flap 4716 proximate the sensor 4714. The magnetic moment of the magnetic element 4718 may be oriented substantially parallel to the axis 4713, as indicated by the arrow 4719. As in FIG. 47A the magnetic sensor 4714 may be in the form of a magnetoresistive element having a C-shape with a gap. In the particular embodiment shown in FIG. 47A the magnetic element lies within the gap when the gap when the flap 4716 is substantially parallel to the substrate 4712. The magnetic sensor 4714 may be coupled to a detector 4711, e.g., by leads 4715A, 4715B.

Figure 47C:
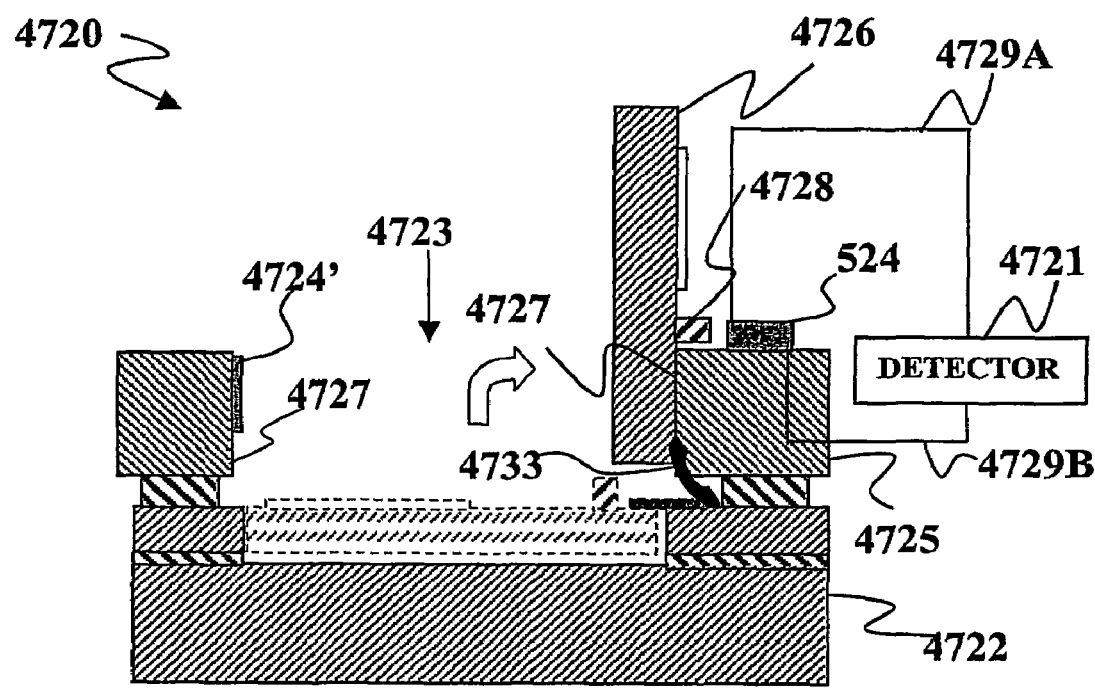
FIG. 47C is a cross-sectional schematic diagram of an apparatus according to another alternative version of an embodiment of the invention.

Some micro machined optical elements may use a top chip design to provide a sidewall for orienting the flap in an up or "on" position. FIG. 47C depicts a cross-sectional view of an apparatus 4720 according to another alternative version of the above-described embodiment of the invention. The apparatus 4720 may be assimilated as a variation on those described with respect to FIGS. 47A–47B. The apparatus 4720 may generally comprises a micro machined optical element having fixed portions in the form of a base 4722 and a top chip 4725. The micro machined optical element has a moveable portion in the form of a flap 4726.

In some applications such a two-chip approach is used to align the optical element in an "up" or "on" position with the flap 4726 oriented substantially perpendicular to a plane of the base 4722. The flap 4726 may be formed from one or more layers of the substrate 4722. In an "off" or down-position (shown in phantom), the flap 4726 is substantially parallel to the base 4722. The flap 4726 may be attached for movement with respect to the substrate 4722 by one or more flexures 4733. By way of example, the base 4722 may be a silicon-on-insulator (SOI) substrate. The top-chip 4725 has an opening 4723 with perpendicular sidewalls 4727. The term "sidewall" as used herein refers generally to any surface that provides a reference stopping plane for the flap 4726. Although a sidewall 4727 that is part of the substrate is shown in FIG. 47C the sidewall may alternatively be part of the substrate 4722 or part of a separate structure formed on of the substrate 4722 or on the top chip 4725.

The top chip 4725 is aligned with the substrate 4722 such that flap aligns with the opening 4723 and the substrate 4722 and top-chip 4725 are bonded together. The opening 4723 receives the flap 4726 when the flap is in an "on" state, i.e., substantially perpendicular to a plane of the substrate 4722. The flap 4726 may be clamped against a sidewall 4727 of the top chip 4725 when the flap is in the "on" state as shown in FIG. 47C. When the top-chip 4725 is properly aligned and bonded to the substrate 4722 the sidewalls 4727 of the openings 4723 can serve as reference stopping planes to fix the up-position of the flap. In addition, the sidewalls 4727 may also serve as electrodes to hold the mirrors in the up-position by electrostatic attraction. A "top chip" having openings with almost perfectly perpendicular sidewalls may be formed, e.g., by etching a <110> silicon wafer with an anisotropic etchant.

One or more magnetic sensors 4724 may be disposed on the top chip 4725 proximate the flap 4726. Although FIG. 47C shows the sensor 4724 disposed on a surface of the top chip 4725, a sensor 4724' may alternatively be disposed on the sidewall 4727. The sensors 4724, 4724' may be coupled to a detector 4721, e.g., via leads 4729A, 4729B. A magnetic element 4728, such as a magnetic material, may be disposed on the flap 4726 to provide a sense magnetic field that is detected by the sensors 4724, 4724'. Alternatively one or more of the sensors 4724, 4724' may be disposed on the flap 4726 and the magnetic material may be disposed on the substrate 4722, the top chip 4725 or the sidewalls 4727. It need be stated that the top chip associated with each micro machined optical element may also be comprised of two high-aspect-ratio deep vertical walls separated by an air gap.

Figure 47D:
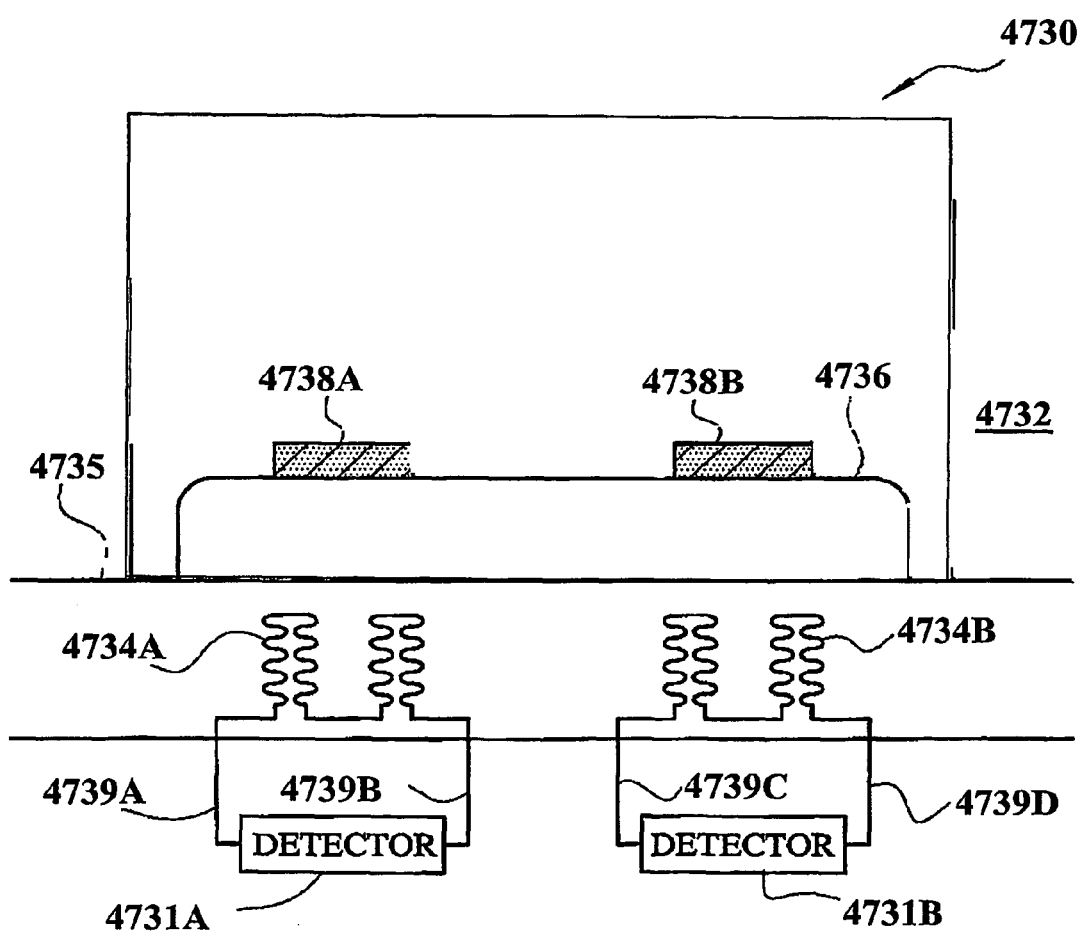
FIG. 47D is a plan view schematic diagram of an apparatus according to another alternative version of an embodiment of the invention.
Figure 47E:
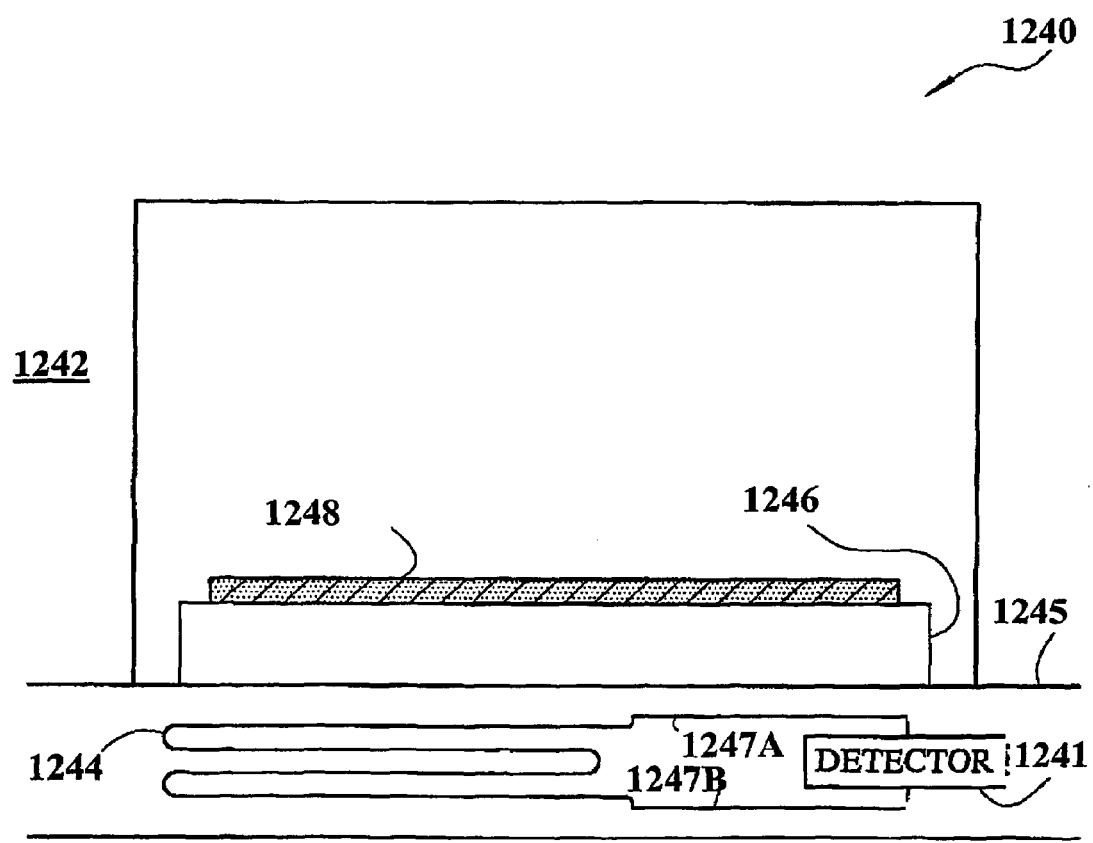
FIG. 47E is a plan view schematic diagram of an apparatus according to another alternative version of an embodiment of the invention.

Several orientations of the sensors and magnetic elements are possible. Two particular configurations are depicted in FIG. 47D and FIG. 47E. FIG. 47D depicts a plan view of an apparatus 4730 according to another alternative versions of the above-described embodiment of the invention. The apparatus 4730 generally comprises a micro machined optical element having fixed portions in the form of a substrate 4732 and a top chip 4735. The micro machined optical element includes a moveable portion in the form of a flap 4736. One or more magnetic sensors 4734A, 4734B are disposed on the top chip 4735 proximate the flap 4736. The sensors 4734A, 4734B may be coupled to a detector 4731, e.g., via leads 4739A, 4739B. The sensors 4734A, 4734B may be in the form of serpentine coils of magnetic material.

The serpentine shape allows a greater length for the sensors, which increases their sensitivity to changes in magnetic flux. One or more magnetic elements 4738A, 4738B are disposed on the flap 4736 near the sides thereof. The magnetic elements 4738A, 4738B may be positioned such that they are proximate the sensors 4734A, 4734B when the flap 4736 is clamped against the top chip 4735. In this position, the magnetic flux though the sensors 4734A, 4734B from the magnetic elements 4738A, 4738B may be maximized.

FIG. 47E depicts a plan view of an apparatus 4740 according to another alternative version of the above-described embodiment of the invention. The apparatus 4740 generally comprises a micro machined optical element having fixed portions in the form of a substrate 4742 and top chip 4745. The micro machined optical element may include a moveable portion in the form of a flap 4746. A magnetic sensor 4744 may be disposed on the top chip 4745 proximate the flap 4746. The magnetic sensor 4744 may be coupled to a detector 4741, e.g. through leads 4747A, 4747B. The magnetic sensor 4744 may be in the form of a serpentine pattern of magnetoresistive material having features in common with the serpentine patter described with respect to FIG. 47D. One or more magnetic elements 4748 may be disposed on the flap 4716 proximate an end thereof. The magnetic element 4748 may be positioned on the flap 4746 such that it is proximate the magnetic sensor 4744 when the flap is in an "on" position.

Other variations are possible on the above embodiments. For example, the magnetic sensor element may include an inductive coil disposed on either a fixed or moveable portion of a micro machined optical element. Changes in the position of the moveable portion may lead to changes in an inductance of the coil. The change in inductance may be correlated to the change in position. Changes in inductance may be less susceptible to noise than changes in capacitance.

Figure 48:
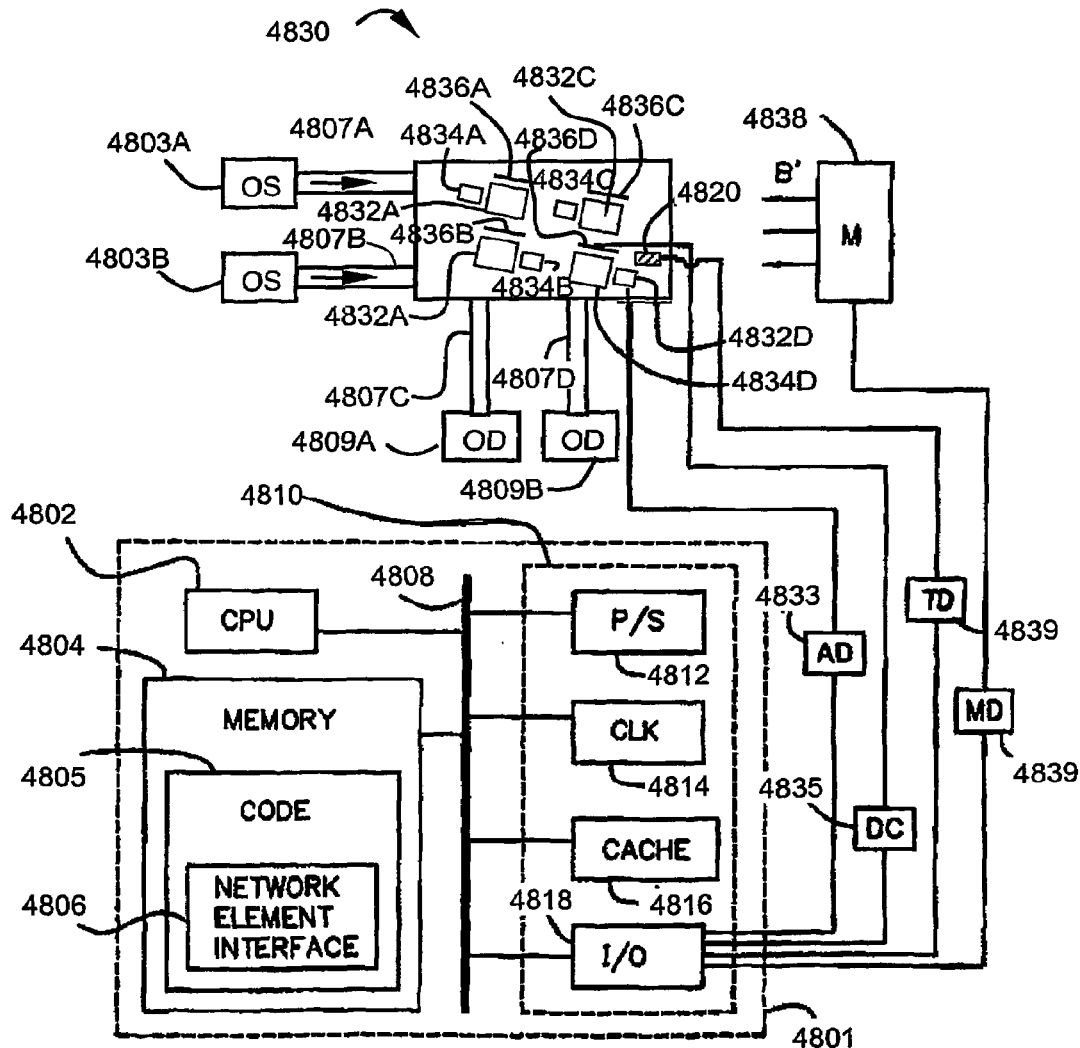
FIG. 48 depicts an example schematic diagram of an optical switching system according to another embodiment of the present invention.

FIG. 48 depicts a block diagram depicting an optical communications system 4800 according to another embodiment of the invention. In the system 4800, a method having features in common with the method 4300 of FIG. 43 may be implemented as a computer program code 4805 running on a processor of a computer controlled apparatus having features in common with the MEMS optical switch 400 described above with respect to FIG. 4. In the embodiment shown, the program code 4805 controls the operation of one or more MEMS optical elements 4832A, 4832B, 4832C, 4832D in an optical switch 4830. Although the program 4805 is described herein with respect to a MEMS optical switch, those skilled in the art will recognize that programs embodying the method of the present invention may be applied to any MEMS device. The optical elements 4832A, 4832B, 4832C, 4832D may have features in common with the optical elements described above. The optical switch 4830 may have features in common with the type of switch 4600 shown in FIG. 46. By way of example, the switch 4830 may be a 2D MEMS optical switch. Each optical element 4832A, 4832B, 4832C, 4832D may include a moveable portion that is moveably coupled to a substrate and actuated by, for example, electrostatic, pneumatic thermal, acoustic or magnetic actuators 4834A, 4834B, 4834C, 4834D. The optical elements 4832A, 4832B, 4832C, 4832D may be clamped in vertical or horizontal position by voltages applied to clamping electrodes (not shown).

One or more magnetic sensors 4836A, 4836B, 4836D may be respectively coupled to moveable and/or fixed portions of the optical elements 4832A, 4832B, 4832C, 4832D. The magnetic sensors 4836A, 4836B, 4836C, 4836D may be of any of the types described above.

The magnetic sensors 4836A, 4836B, 4836C, 4836D sense changes in the position or state of the optical elements 4832A, 632B, 4832C, 4832D with respect to a magnetic field B' provided, e.g., by a magnet 4838. If the actuators 4834A, 4834B, 4834C, 4834D are magnetic actuators, the magnetic field B' may be the same magnetic field that drives the actuators. Alternatively, the magnetic field B' may be a separate sense magnetic field. In some embodiments, a single magnet 4838 may be used to actuate all the optical elements 4832A, 4832B, 4832C, 4832D. In such a situation, the actuators 4834A, 4834B, 4834C, 4834D may include electrodes for clamping moveable portions of the optical elements 4832A, 4832B, 4832C, 4832D in their respective "ON" or "OFF" states. The switch 4830 may optionally include a temperature sensor 4820 disposed in proximity to switch 4830 or positioned in thermal contact with a portion of the switch, e.g. one or more of the optical elements 4832A, 4832B, 4832C, 4832D. The temperature sensor may produce a signal that is proportional to a temperature of the switch 4830. By way of example, the temperature sensor 4820 may be a thermocouple, thermistor, infrared (IR) temperature sensor, etc.

One or more input fibers 4807A, 4807B and output fibers 4807C, 4807D may be optically coupled to the optical switch 4830. Optical sources (OS) 4803A, 4803B may provide optical signals to the input fibers 4807A, 4807B while optical detectors (OD) 4809A, 4809D may be optically coupled to the output fibers 4807C, 4807D to establish, for example, that the micro machined optical elements in the switch are in a known state. Alternatively, the optical sources and detectors may be replaced with optical transceivers to allow two-way signal traffic through the switch 4830.

A switching sub-system 4800 may typically include a switch 4830 combined with a controller 4801. The controller 4801 may be a self contained microcontroller such as the PICK Microchip, or controller 4801 may be configured to include a CPU 4802, memory 4804 (e.g., RAM, DRAM, ROM, and the like), clock 4814 and well-known support circuits 4810 such as power supplies 4812, input/output (I/O) functions 4818 coupled to a control system bus 4808. The memory 4804 may contain instructions that the processor unit 4802 executes to facilitate the performance of the apparatus 4800. The instructions in the memory 4804 may be in the form of the program code 4805. The code 4805 may conform to any one of a number of different programming languages such as Assembly, C++, JAVA or a number of other languages. The controller 4801 typically operates the apparatus 4800 through I/O functions 4818 in response to data and program code instructions stored and retrieved by the memory 4804.

The CPU 4802 may be coupled to the elements of the system 4800 via the system bus 4808 and the I/O functions 4818. The elements of system 4800 may include the following: one or more detector circuits (DC) 4835 coupled to one or more of the magnetic sensors 4836A, 4836B, 4836C, 4836D, and one or more actuator drivers (AD) 4833 coupled to one or more of the actuators 4834A, 4834B, 4834C, 4834D. If the magnet 4838 is an electromagnet, a magnet driver (MD) 4837 may be coupled to the magnet. For the sake of clarity, connection is shown to only one of the magnetic sensors 4836D and one of the actuators 4834D. In practice, all the magnetic sensors 4836A, 4836B, 4836C, 4836D and actuators 4834A, 4834B, 4834C, 4834D may be coupled to the I/O functions 4818. One or more clamping voltage sources may be optionally coupled between clamping electrodes in the switch 4801 and the I/O functions 4818. The optical sources 4803A, 4803B and the optical detectors 4809A, 4809B may also be coupled to the I/O functions 4818 and system controller 4801 may provide control to switch optical signals between the input fibers 4807A, 4807B and the output fibers 4807C, 4807D. The support circuits 4810 may also include a temperature detector (TD) 4839 coupled to the temperature sensor 4820 and the I/O functions 4818.

It should be stated that depending on the configuration or selection of controller 4801 and system 4800, the conditioning circuits, including actuator driver 4833, temperature detector 4839, magnetic driver 4837 and/or detector circuit 4835 may be implemented in software form, e.g., within code 4805, such that I/O functions 4818 may directly connect to each respective switch component.

The system 4800 may be a subsystem or component of a network element (not shown). The network element may be part of a network (not shown). The microcontroller 4801 may include network element interface 4806 which may be implemented in software e.g. in a subroutine in memory 4804 or hardware to allow the system 4800 to communicate with the network element. Such communication may include, but is not limited to, switching commands issued from the network element to the system 4800 and switch state data from the system 4800 to the network element.

Certain steps of the method described above with respect to FIG. 43 may be implemented by a suitable computer program code 4805 running on the CPU 4802 of the controller 4801. The CPU 4802 may form a general-purpose computer that becomes a specific purpose computer when executing programs such as the program 4805. Although the invention is described herein as being implemented in software and executed upon a general purpose computer, those skilled in the art will realize that the invention could be implemented using hardware such as an application specific integrated circuit (ASIC), microcontroller or other hardware circuitry. As such, it should be understood that the invention can be implemented, in whole or in part, in software, hardware or both.

A computer program 4805 may be devised to implement steps 4304 and 4306 described above with respect to FIG. 43. The program 4805 is suitable for monitoring and controlling the position or state of the optical elements 4803A, 4803B, 4803C, 4803D of the optical switch 4801 in accordance with embodiments of the present invention. By way of example, the program 4805 may implement fault detection in the system 4800. For example, suppose that only when the optical element 4832B is in an "ON" state, optical element 4832B deflects optical signals from input fiber 4807B to output fiber 4807C. The state of optical element 4832B may be determined by sending an optical signal towards optical element 4832B from the source 4803B to input fiber 4807B and monitoring the optical signal at output fiber 4807C with optical detector 4809A. If the optical signal from the optical source 4803B is detected by the optical detector 4809A optical element 4832B is presumably in the "ON" state. While the optical element 4832B is known to be in the "ON" state, the property of the magnetic sensor associated with thereto may be recorded through I/O function 4818 and stored in a look-up table in memory 4804. This step may occur when the magnet 4838 is turned on to provide a sense field for the magnetic sensors 4836A, 4836B, 4836C, 4836D or when the magnet 4838 is turned on to perform a switching event. Alternatively, a signal from the magnetic sensor 4836B disposed proximate the optical element 4832B may be measured when the movable element associated with the magnetic sensor 4836B is in a known state.

Signals from sensors 4836 may be measured in batch or selectively addressed in response to code 4805 and through I/O functions 4818 when they are in a known state.

The position of optical element 4832B changes when it moves from the "ON" state to the "OFF" state. Consequently, the magnetic sensor 4836B may produce a different signal when the optical element 4832B is in the OFF state. The other magnetic sensors 4836A, 4836C, 4836D may also produce different signals. In a manner similar to that described above, a set of signals from the sensors 4836A, 4836B, 4836C, 4836D may be correlated to the "OFF" state of the optical element 4832B. In a similar fashion, the known "ON" and "OFF" states of the other optical elements 4832A, 4832C, 4832D may be correlated to measured signals from the magnetic sensors 4836A, 4836B, 4836C, 4836D.

These signals from the magnetic sensors 4836A, 4836B, 4836C, 4836D may be organized by the program 4805 as a set of predetermined signals, e.g. in a look-up table stored in memory 4804. The program 4805 may index the aforementioned look-up table after reading the value or values associated with the magnetic sensor property to determine that the state of the switch is configured according to the requests of network element interface 4806.

The properties of the magnetic sensors 4836A, 4836B, 4836C, 4836D may be temperature dependent. Consequently, signals from the magnetic sensors 4836A, 4836B, 4836C, 4836D may drift as the temperature of the switch 4830 changes. To compensate for such drift, the program 4805 may include instructions for temperature compensation. By way of example, such instructions may include measuring the signal from the magnetic sensors 4836A, 4836B, 4836C, 4836D for the "ON" and off states of the optical elements 4832A, 4832B, 4832C, 4832D at different temperatures measured by the temperature sensor 4820. The program may then determine ranges for the values of the magnetic sensor signals that correspond to the "ON" and "OFF" states. If, over a certain temperature range, the two ranges do not overlap the state of an optical element may be determined by measuring that magnetic sensor signal to see whether it falls in the "ON" range or the "OFF" range.

It must be stated that the look-up table storing the predetermined magnetic sensor property values associated with each micro machined movable element, may be configured to allow a test value to fall within a range of predetermined values for added stability. For example, the magnetic sensor property values read into memory 4804 through I/O functions 4818, when the optical element is in a known state to achieve the predetermined value for the lookup table, may be configured in code 4805 such that test values read into memory 4804 through I/O functions 4818 when the optical element is not in a known state may be substantially equal to the lookup values in the table. This approach results in added stability and may be used to compensate for temperature variation effects.

If there is substantial overlap between the "ON" and "OFF" ranges it may be desirable to correct for thermal drift in real time. The program 4805 may correct for thermal drift by relating the measured magnetic sensor signals in the "ON" and "OFF" states to temperature measurements made during operation of the switch 4830. The relationship may be stored in the form of a look-up table. Alternatively, the relationship may be in the form of a temperature correction equation. For example, in the case of a linear relationship between temperature and magnetic sensor signal, the program may calculate a temperature drift coefficient. The temperature drift coefficient may be used to adjust the predetermined magnetic sensor signals for changes in temperature.

Alternatively, the system controller 4801 may be coupled to a temperature regulator (not shown) coupled, e.g. through the I/O circuits 4818. The program 4805 may instruct the temperature regulator to maintain the temperature of the switch 4830 within a desired temperature range in response to temperature measurements from the temperature sensor 4820. Preferably, the desired temperature range is sufficiently narrow that any thermal drift of magnetic sensor signal may be neglected. Furthermore, the system 4800 may employ some combination of thermal drift correction and temperature regulation to compensate for changes in temperature.

It should also be stated that magnetic sensors may be connected together e.g. through a bridge circuit and the output of the connected sensors may be batch read by the controller 4801 to determine the individual state of each movable portion in the batch of elements. This can be accomplished by designing or tuning the sensors to produce a unique value in each known ON and OFF state. For example, a magnetoresistive element associated with each micro machined optical element may be designed to produce a unique prime resistance value when turned ON or OFF. Magnetic sensors may be connected in series or parallel and grouped according to, but not limited, rows or columns. As so, the program code 4805 may engage in a row or column select to pull the combined sensor property value into memory for post processing by the CPU. Program code 4805 may then perform data processing on the recorded property value to discern the individual state of all member optical flaps contained in group of sensors. Memory 4804 may store the predetermined prime values associated with the plurality of sensors and the program 4805 may engage in an process whereby the recorded value of the combined sensor group is compared against various prime number combinations associated with the group, until a match is found. When a match is determined, the micro-machine optical elements associated with the match prime numbers set will share the same ON or OFF state, and the individual states of the batch group can be determined. While the above is a complete description of several embodiments of the present invention, it is possible to use various alternatives, modifications and equivalents.

H. Mems Cap

A critical performance parameter of 2D MEMS free-space optical switches is the switching time. The switching time may be regarded as the time it takes for a given MEMS mirror to switch from an "OFF" state to an "ON" state or vice versa. For high performance switches, it is desirable to make the switching time as short as possible. Certain of the obstacles to improved switching times arise from the design of the MEMS mirrors themselves. Stiction is one such obstacle. In addition to stiction, a drag force, referred to as "squeeze film damping," may increase the switching time of the MEMS mirror. This type of drag may result from a fluid such as air trapped between the MEMS mirror and the underlying substrate. Increased switching times due to stiction and squeeze film damping lead to slower switching speeds and poor switch performance.

Figure 49:
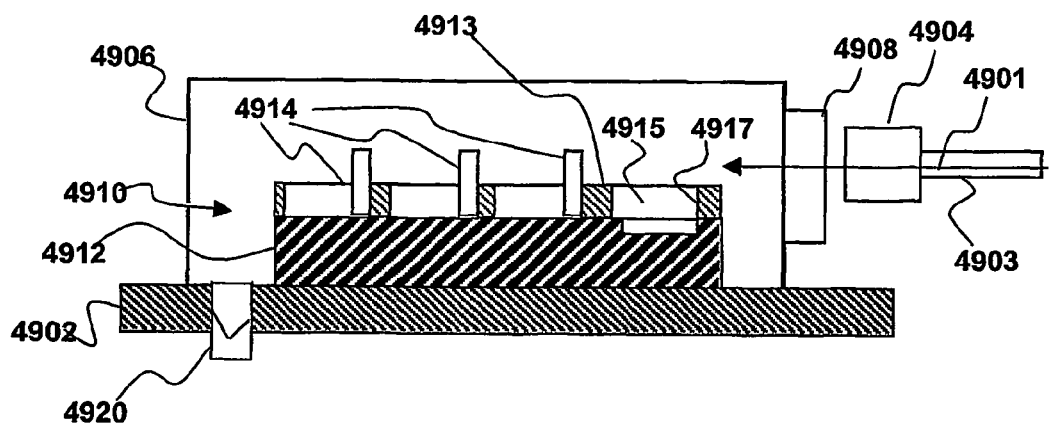
FIG. 49 depicts a simplified side cross-sectional schematic diagram of an enclosed MEMS apparatus according to an embodiment of the invention.

Additional embodiments of the present invention may overcome stiction and squeeze film damping by incorporating an apparatus for hermetically sealing MEMS devices with a cap assembly having optical windows perpendicular (or nearly perpendicular) to the plane of the MEMS substrate. MEMS devices that utilize equipotential landing pads may incorporate such an enclosure. The MEMS device may be an optical switch having one or more MEMS elements, such as movable mirrors that rotate or translate to deflect light from one or more optical fibers. Alternatively, the MEMS device may include elements to modify phase, focus, or direction of the input optical beams. The dimensions of the enclosure closely match the dimensions of the MEMS device such that the device itself is enclosed, but fibers or lenses that are optically coupled to the device remain outside the enclosure. As shown in FIG. 49, the MEMS package 4900 generally includes a mount 4902, which may be ceramic, FR4, or otherwise, to which a MEMS device 4910 is attached, e.g., by die bonding, and an enclosure 4906 having one or more optical elements such as a window 4908. Optical signals 4901 may be coupled to the MEMS device 4910 from an optical fiber 4903 via the window 4908 and a collimator 4904, such as a graded refractive index (GRIN) lens. The window 4908 may be angled to restrict undesired coupling of reflected light back into the fibers or the MEMS device itself.

The enclosure 4906 may be bonded to the mount 4902 in such a way as to provide a hermetically sealed environment within the enclosure 4906. The enclosure 4906 may be a cap assembly consisting of a ring-frame with cut-outs for windows, a top-cap hermetically attach to a ring-frame, and optical windows that are hermetically attached to the ring-frame. In another option, the enclosure 4906 may be fabricated as a single piece. The window 4908 may be attached to the enclosure 4906 using solder, glass-frit, glass-to-metal seal, or another method. In another option the enclosure 4902 may include an entire ring-frame fabricated of an optically transparent material where the window 4908 would be inherent in the ring-frame. The enclosure 4906 may be evacuated, e.g., through a sealable passage 4920 in the mount 4902, to provide improved switching performance as described below. As used herein, the term evacuated describes a situation in which the atmospheric pressure has been reduced below an ambient atmospheric pressure. By way of example, and without loss of generality, the ambient pressure of the earth's atmosphere is approximately 760 Torr at mean sea level.

The MEMS device 4910 generally includes a substrate 4912, and an array of MEMS optical elements 4914 moveably attached to the substrate. By way of example each of the MEMS device 4910 may include an N×N or N×M array of MEMS optical elements 4914, where N and M are integers. By way of example, each MEMS optical element 4914 may be in the form of a flap attached to the substrate 4912 by one or more flexures (not shown). The MEMS optical elements 4914 may include light-deflecting elements such as simple plane reflecting (or partially reflecting) surfaces, curved reflecting (or partially reflecting) surfaces, prismatic reflectors, refractive elements, prisms, lenses, diffractive elements, e.g. fresnel lenses, dichroic coated surfaces for wavelength specific and bandpass selectivity, or some combination of these. In a particular embodiment, the optical elements 4914 may include reflective surfaces so that may act as MEMS mirrors. The MEMS optical elements 4914 may move between an "OFF" position and an "ON" position under the influence of an actuating force, such as a magnetic force. By way of example the MEMS optical elements 4914 may be oriented substantially parallel to the substrate 4912 in the "OFF" position and substantially perpendicular to the substrate 4912 in the "ON" position. In the "ON" position, the MEMS optical elements 4914 deflect the optical signals 4901. The device 4910 may further include clamping surfaces to orient and retain the MEMS optical elements 4914 in the "ON" position. Such clamping surfaces may be provided by a "top chip" 4913 having openings 4915 that may receive the optical elements 4914. The openings 4915 may include sidewalls 4917 that provide the clamping surfaces. The sidewalls 4917 provide reference stopping-planes for the MEMS optical elements 4914. Alternatively, the top-chip 4913 may include clamping surfaces in the form of a single vertical wall or two vertical walls with a hole therebetween to allow light to pass. Such a vertical wall or walls may be higher than the MEMS optical elements 4914. A voltage may be applied between individual optical elements 4914 and the top chip 4913 to electrostatically clamp the optical elements 4914 in the "ON" position. The optical elements 4914 may be electrically insulated from the sidewalls 4917 by an insulating gap, such as an air gap.

Figure 50:
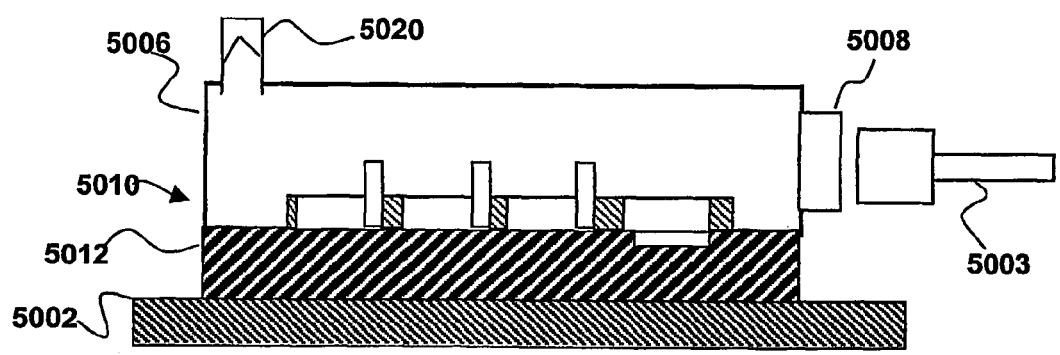
FIG. 50 depicts a simplified side cross-sectional schematic diagram of an enclosed MEMS apparatus according to an alternative embodiment of the invention.

In an alternative embodiment depicted in FIG. 50, an apparatus 200 may, include an enclosure 206 that is directly bonded to a substrate 212 of a MEMS device 5010 having features in common with the MEMS device 4910 of FIG. 49. The enclosure 5006 may include an optical element such as a window 5008. The window 5008 may be angled to restrict undesired coupling of reflected light back into one or more optical fibers 5003 or the MEMS device 5010 itself. The enclosure 5006 may be bonded to the substrate 5012 in such a way as to provide a hermetically sealed environment within the enclosure 5006. The enclosure 5006 may be a cap assembly consisting of a ring-frame with cutouts for the window 5008, a top-cap hermetically attached to a ring-frame, and optical windows that are hermetically attached to the ring-frame. In another option, the enclosure 5006 may be fabricated as a single piece. The window 5008 may be attached to the enclosure 5006 using solder, glass-frit, glass-to-metal seal, or another method. In another option the enclosure 5002 may include an entire ring-frame fabricated of an optically transparent material where the window 5008 would be inherent in the ring-frame. The enclosure 5006 may be evacuated e.g., through a sealable passage 5020 in a top of the enclosure 5006, to provide improved switching performance as described below.

Figure 51:
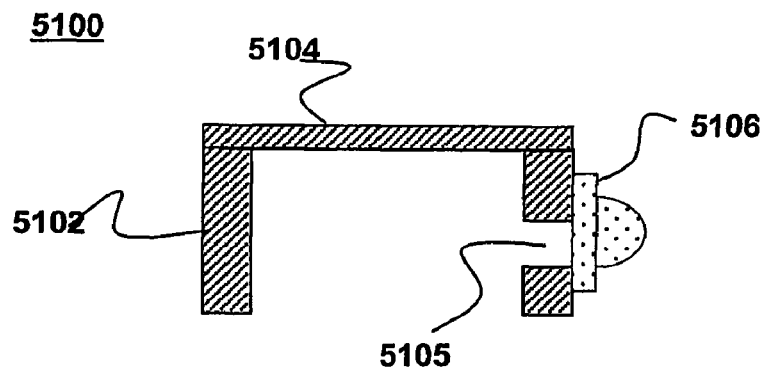
FIG. 51 depicts a side cross section of an enclosure in the form of a cap assembly with an optical element attached to the side-wall of the cap according to an embodiment of the present invention.

Although FIG. 49 and FIG. 50 include enclosures with windows as optical elements, other optical elements may be incorporated into the enclosures. For example, FIG. 51 depicts a side cross-section of an enclosure in the form of a cap assembly 5100 having a ring frame 5102 a top cap 5104 and one or more optical elements 5106. The cap assembly 5100 may be hermetically sealed to a mount as described above with respect to FIG. 49 and FIG. 50. The ring frame 5102 has one or more cutouts 5105 on one or more sidewalls that receive the optical elements 5106. Optical signals may travel through the ring frame 5102 via the optical elements 5106 and the cutouts 5105. The top-cap 5104 may be hermetically attached to the top of the ring-frame 5102. The optical elements 5106 may be made of glass, silicon, ceramic, or other optically transmissive materials. The optical elements 5106 may be attached to the ring-frame 5104 using solder, glass-frit, glass-to-metal seal, and other methods. The optical elements 5106 may be windows, simple refractive surfaces, partially reflective surfaces, curved refracting (or partially reflecting) surfaces, prisms, lenses, diffractive elements, e.g. fresnel lenses, dichroic coated surfaces for wavelength specific and bandpass selectivity, or some combination of these. If the optical elements 5106 are lenses, they may be fiber lens arrays, graded refractive index (GRIN) lenses, or one or more arrays micro-lenses. The optical elements 5106 may be hermetically attached to the sidewalls of the ring-frame 5102 at the cutouts 5105. Such sealing is simpler, higher yielding, less expensive, and more reliable than sealing optical fibers e.g. using metallization.

Although a separate ring frame and top-cap are depicted in FIG. 51, the ring-frame 5102 and the top-cap 5104 may alternatively be fabricated as a single piece. The cap assembly 5100 may be attached to an underlying substrate so as to align the optical elements 5106 to the components inside the cap within the required tolerance. The environment within the cap assembly 5100 may be evacuated or partially evacuated to reduce the atmospheric pressure within the space enclosed between the cap assembly and the substrate. Optical fibers may be aligned to the optical elements 5106 of the cap assembly 5100 and secured in place.

Figure 52:
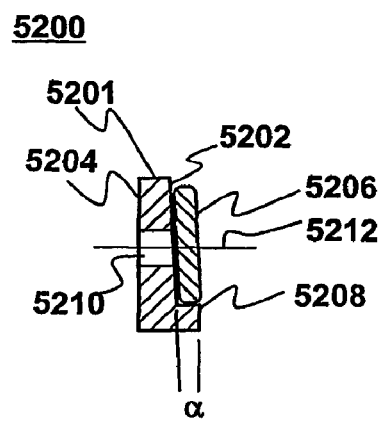
FIG. 52 depicts a side cross section of a portion of an enclosure having sidewall assembly with a window, attached to a recessed, angled surface according to an embodiment of the present invention.
Figure 53:
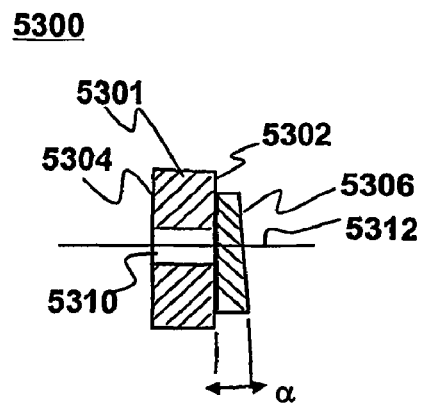
FIG. 53 depicts a side cross section of a portion of an enclosure having sidewall assembly with a window, attached to a recessed, angled surface according to an embodiment of the present invention.

As described above, optical elements, such as the windows 4908, 5008 may be tilted with respect to an optical axis to minimize back-reflection and interference effects. FIGS. 52 and 53 depict possible arrangements for the windows that may be used with the apparatus of FIGS. 49–51. In FIG. 52, a package sidewall assembly 5200 includes a sidewall 5201 having a front surface 5202 and a back surface 5204. A window 5206 is attached to the front surface 5202. The window 5206 allows optical signals to pass, either selectively by wavelength or over a broad-band of wavelengths. The window 5206 can be made from a multitude of glass or ceramic types, Quartz, Sapphire, silicon, and other optically transmissive materials, with or without an anti-reflective coating. The window 5206 may be attached by soldering, bonding, epoxy, glass frit, and the like.

The window 5206 may be partly aligned and supported by an optional ledge 5208 projecting from the front surface 5202. The sidewall 5201 includes an opening 5210 that is aligned with an optical plane 5212 for optical signals that travel through the window 5206. The window 5206 may be angled with respect to the optical plane or axis 5212 along which optical signals travel to reduce undesired back-reflection effects of signals. One of the surfaces 5202, 5204 of the sidewall 5201 may be angled to angle the window 5206. The angled surface can be either the innermost or outermost surface of the sidewall 5201. Furthermore, the angled surface can be recessed, to provide support and alignment for the window 5206. The sidewall 5201 does not necessarily have to be part of a package assembly. The window 5206 can be pre-attached to a frame if preferred, with the frame being attached to the angled sidewall. The ends, sides, or surface of the windows can be used for attachment to the sidewall or frame. If preferred, the angled sidewall could be manufactured from glass or other optically transmissive materials, becoming the window.

In the embodiment shown in FIG. 52, the front surface 5202 may be tilted with respect to the back surface 5204 by an angle $\alpha$, e.g., about 3°. The front surface 5202 of the sidewall 5201, may be angled, either by machining, molding, or forming, at an angle suitable to minimize the back reflection of coherent light through the attached window 5206, while providing the ledge 5208 as an acceptable surface for window attachment. The window 5206 may be a flat window attached to the angled front surface 5202. In the example shown in FIG. 52 the front surface 5202 is the outside wall of the package assembly 5200. The sidewall 5201 may be a ring-frame, drawn tub, cap, or other package configuration of an enclosure such as those described above with respect to FIG. 49 and FIG. 50. The window 5206 may alternatively be attached to an inside wall, recessed or not, hermetically sealed or not, forming an integral enclosure as described above with respect to FIG. 49 and FIG. 50.

Alternatively, as shown in FIG. 53, a package assembly 5300 may include wedged window 5306 may be attached to a sidewall 5301 having substantially parallel front and back surfaces 5302, 5304 to provide the desired angle α. The wedged window 5306 reduces the back reflection of coherent light through the attached window 5306. Of course, some combination of angled sidewall and wedged window is also possible.

Figure 54:
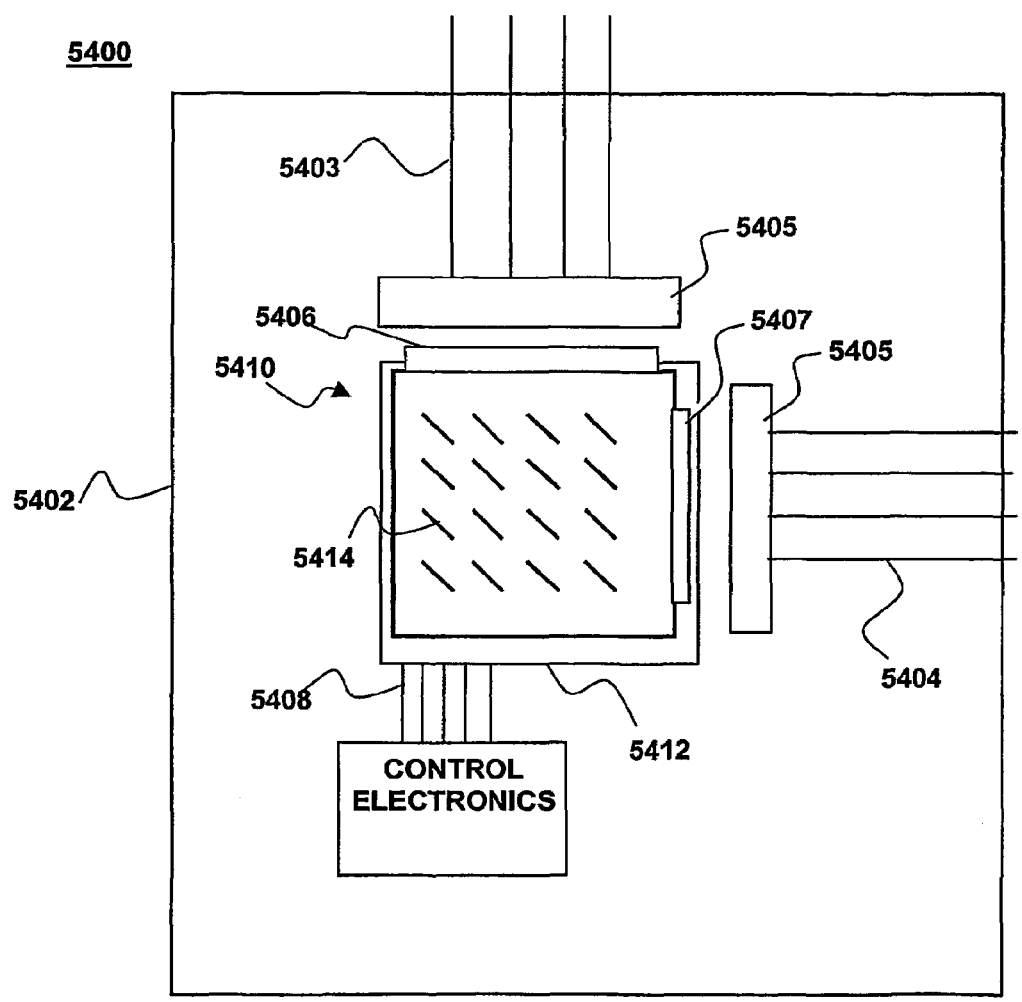
FIG. 54 depicts a simplified block diagram of a MEMS module according to an alternative embodiment of the invention.

Enclosed MEMS devices of the types shown in FIG. 49 and FIG. 50 with package assemblies of the types shown in FIGS. 51–53 may be incorporated into an inventive MEMS module 5400 as shown in FIG. 54. The module 5400 generally includes a mount 5402. The mount 5402 is essentially a board or base to which the elements of the module 5400 are attached. The mount 5402 may be made of ceramic, FR4, or another material. A MEMS device 5410, such as an optical switch, and control electronics 5420 are attached to the mount. The MEMS device 5410 includes an enclosure 5412 having vertical sidewalls with optical elements 5406, 5407 such as windows or lens arrays as described above. In the embodiment shown, the MEMS device 5410 is an optical switch having an array of moveable mirrors 5414. The switch may be used to selectively couple optical signals between one or more input fibers 5403 and one or more output fibers 5404. The fibers 5403, 5404 may be attached to the mount by conventional fiber mounts 5405, 5409 such as V-groove arrays and the like. The control electronics 5420 may be electrically coupled to the MEMS device 5410, e.g. by one or more control lines 5408.

Figure 55:
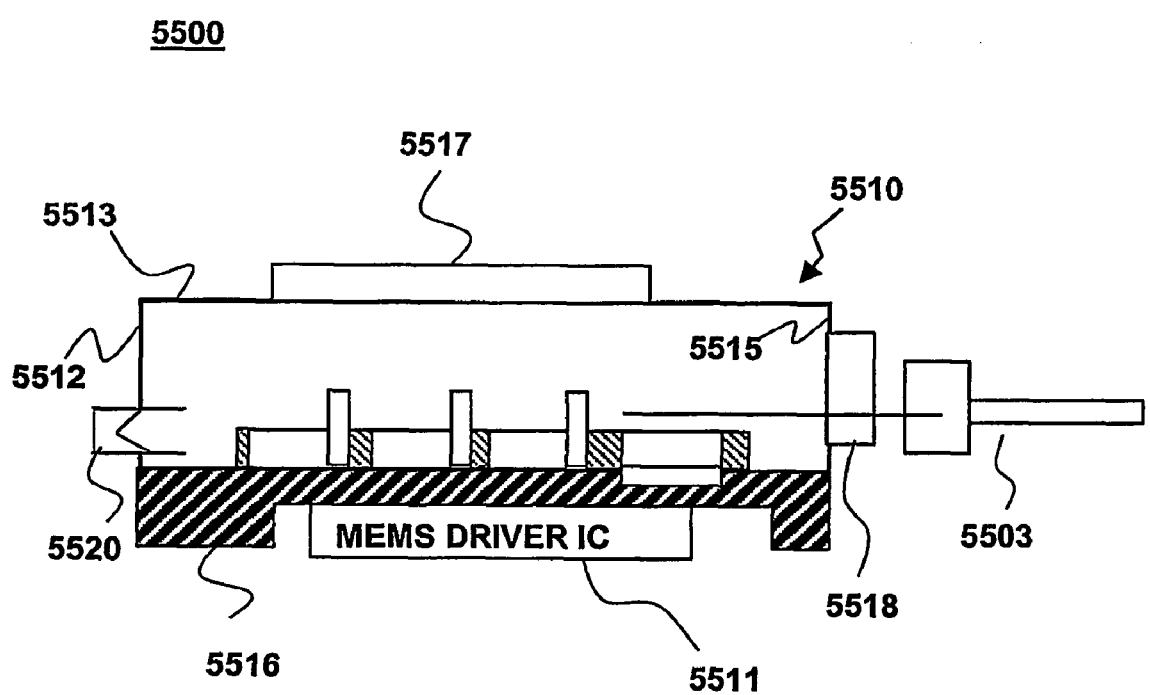
FIG. 55 depicts a simplified side cross-sectional schematic diagram of an enclosed MEMS device according to an alternative embodiment of the invention.

An alternative MEMS module 5500, which is a variation on the module 5400, is depicted in FIG. 55. In this embodiment, a MEMS device 5510 is enclosed by an enclosure 5512 as described above. The MEMS device 5510 includes a device driver chip 5511 mounted to a backside of a MEMS substrate 5516. The driver chip 5514 controls the MEMS device 5510, e.g. via control lines 5508 or other connectors that pass through the substrate 5516. Such a device provides a completely sealed interchangeable module for use with larger MEMS modules. The enclosure 5512 may optionally include an optical element, e.g., in the form of a transparent window 5517 that is parallel to the plane of the substrate 5516 of the MEMS device 5510, e.g. on a top side 5513 of the enclosure to facilitate inspection of the device. The enclosure 5512 may also include a second optical element 5518 that is attached to a sidewall 5515. By way of example, the second optical element may be a window, lens or lens array as described above. The second optical element may facilitate transmission of optical signals 5501 between an externally mounted optical fiber 5503 and the MEMS device 5510. The enclosure 5512 may be evacuated, e.g., through a sealable passage 5520 in the sidewall 5515, to improve switching performance as described below.

Figure 56:
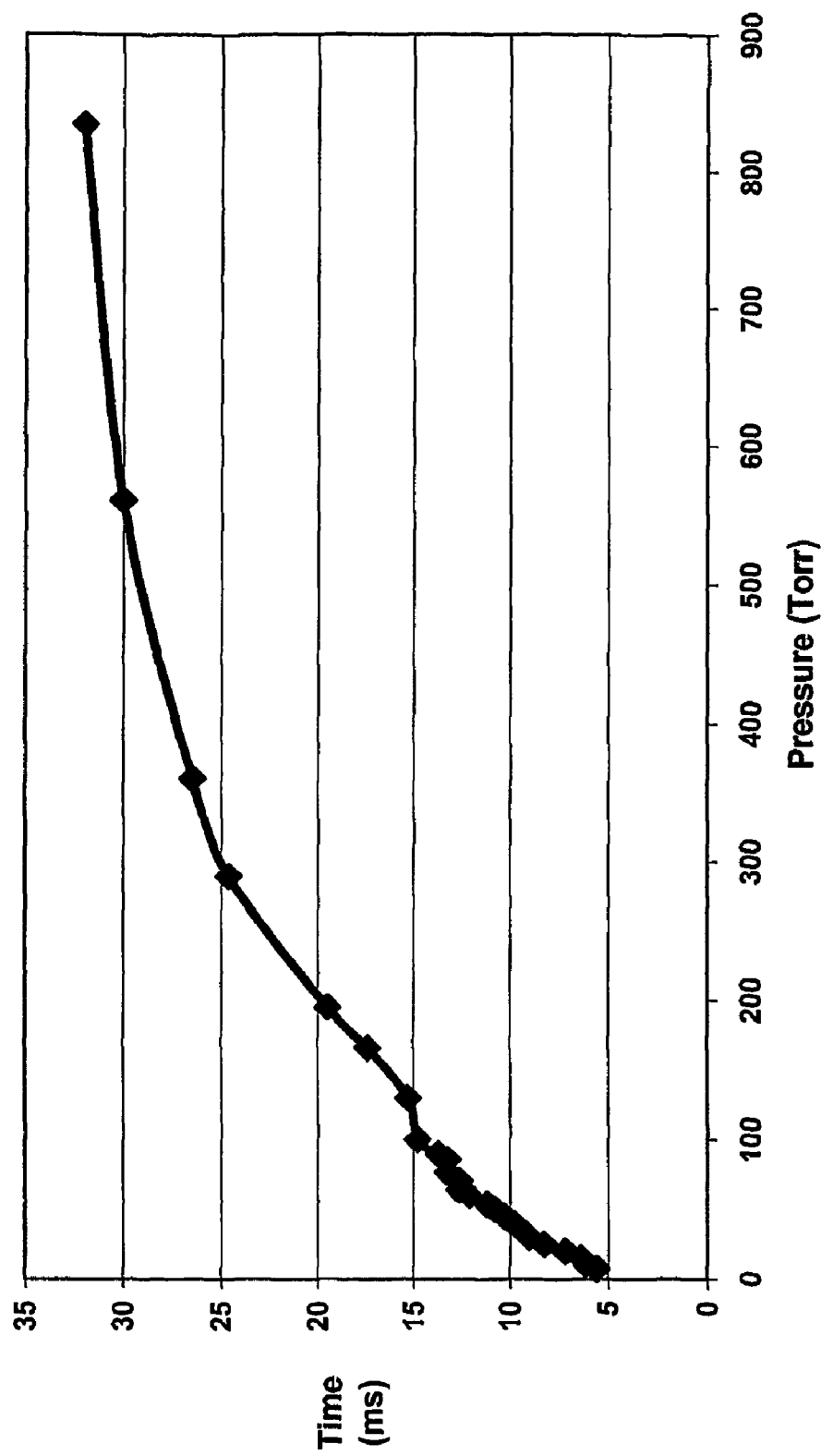
FIG. 56 depicts a graph of pressure versus switching time for a MEMS device.

As described above, embodiments of the invention may include an evacuated enclosure that is hermetically sealed. The inventors have discovered that the switching time of a MEMS device may be greatly reduced by evacuating, or partially evacuating the environment surrounding the device. FIG. 56 depicts a graph of the rising time versus pressure for a MEMS device having features in common with those described herein. As used herein, the rising time is the time that it takes a MEMS optical element to move from an "OFF" position to an "ON" position. The particular device used was a magnetically actuated MEMS optical switch. It is desirable to reduce this time as much as possible in high speed switching applications. FIG. 56 shows that as the atmospheric pressure decreases in the environment containing the device, the switching time also decreases. For example, as the pressure decreased from about 800 Torr to about 100 Torr, the switching time decreased from about 30 ms to about 15 ms, a 50% reduction. Further reduction in pressure below about 100 Torr reduced the switching time to a little more than 5 ms.

Figure 57:
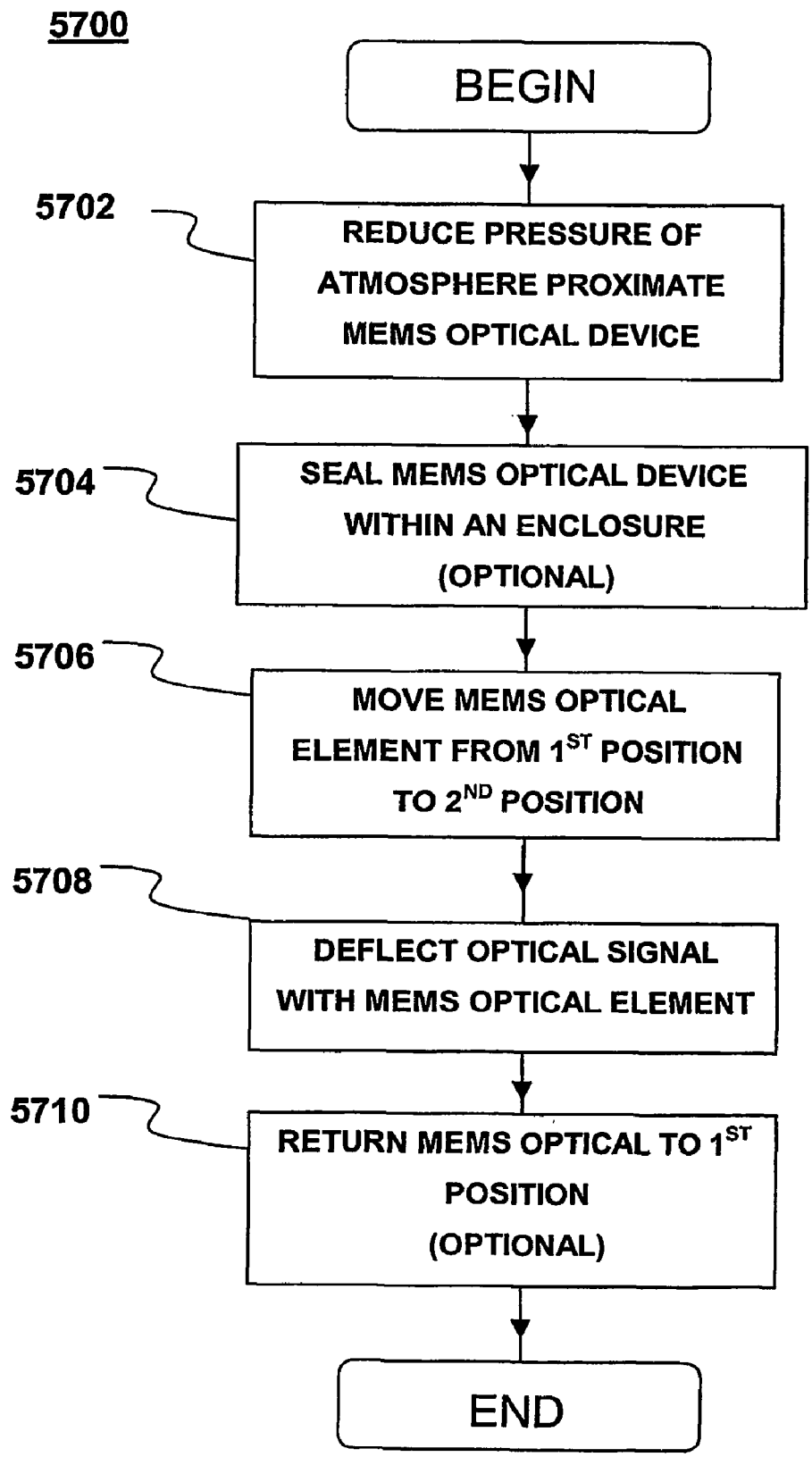
FIG. 57 depicts a flow diagram of a high-speed optical switching method according to an embodiment of the invention.

Encouraged by experimental data like that shown in FIG. 56 the inventors have developed a method for high speed optical switching. FIG. 57 depicts a flow diagram illustrating the steps of the method 5700. At step 5702, the atmospheric pressure proximate a MEMS optical device is reduced to some desired level. The MEMS optical device may be one of the types described above. In particular, the MEMS optical device may be an optical switch having one or more moveable MEMS optical elements of any of the types described above with respect to FIG. 49. The amount of pressure reduction depends on the desired switching time as can be seen from FIG. 56. There are several possible methods of reducing the atmospheric pressure. For example, an enclosure may be attached to the device as described above and coupled to an evacuating device, such as a vacuum pump. The pump may remove air or other gas from within the enclosure through a passage that may later be sealed after the enclosure has been sufficiently evacuated. Alternatively, the enclosure may be hermetically attached to the device in an evacuated environment. Furthermore, the device may operate in an evacuated environment. At optional step 5704, the MEMS optical device may be hermetically sealed within the enclosure as described above. At step 5706 the MEMS optical element moves from a first position to a second position. As can be seen from FIG. 56 this may be accomplished very quickly depending upon how much the pressure has been reduced. At step 5708, while in the second position, the MEMS optical element deflects an optical signal from a first optical path to a second optical path. The MEMS optical element may return to the first position at optional step 5710.

Variations on a device with the inventive equipotential landing pad structure are depicted in FIGS. 58A–64. In an embodiment of the invention, depicted in FIG. 58A, a basic device 5800 includes a device layer 5802 and at least one landing pad 5804 protruding from an underside 5806 of device layer 5802. Landing pad 5804 is attached to device layer 5802 by a plug 5808 passing through an opening 5810 in device layer 5802. The landing pad provides a smaller contact area 5812 than an area of underside 5806. The smaller contact area serves to reduce stiction between device 5800 and an underlying substrate 90. Stiction may also be reduced by proper choice of the material comprising landing pad 5804.

Device 5800 may be any type of electromechanical device. Suitable devices include side-actuated motors, and electromagnetically or thermally actuatable mirrors for optical switches. Device layer 5802 is typically a semiconductor material such as silicon, although other possible materials including metals and dielectrics may also be used.

Depending on the specific application, landing pad 5804 may be made from a dielectric material, such as silicon nitride, or a metal, such as Tungsten, titanium nitride or the like. Alternatively the landing pad may be made from polycrystalline silicon or other similar material.

Figure 58A:
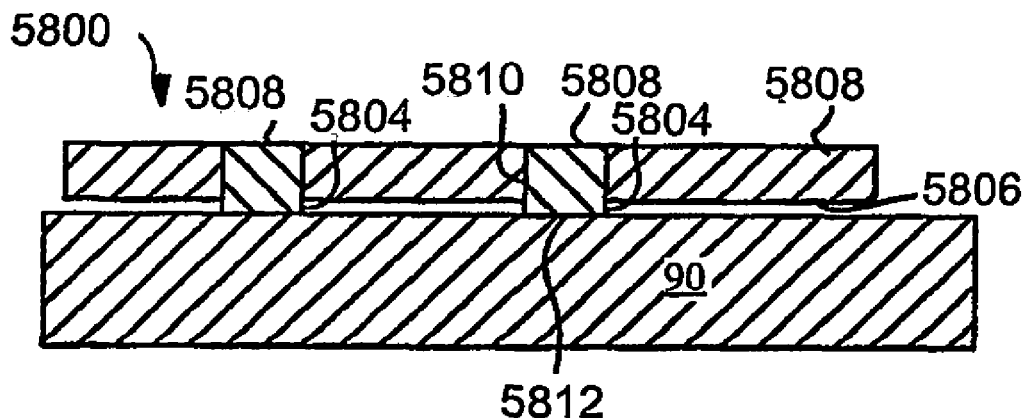
FIG. 58A depicts a landing pad structure according to an embodiment of the present invention.
Figure 58B:
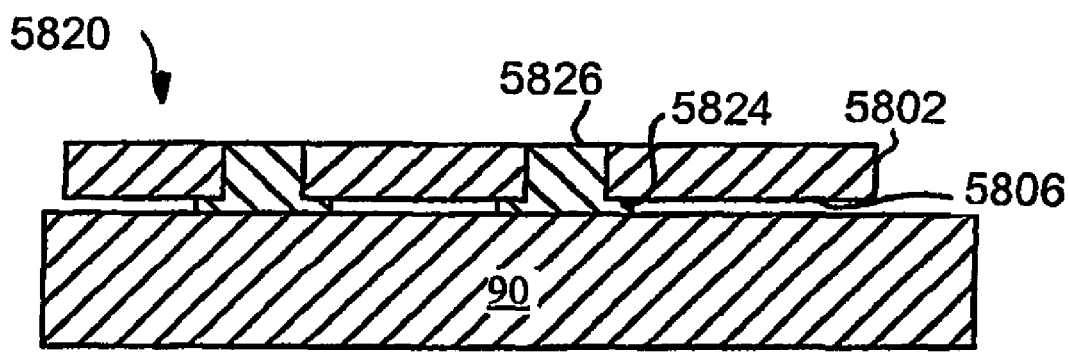
FIG. 58B depicts a landing pad structure according to an embodiment of the present invention.
Figure 58C:
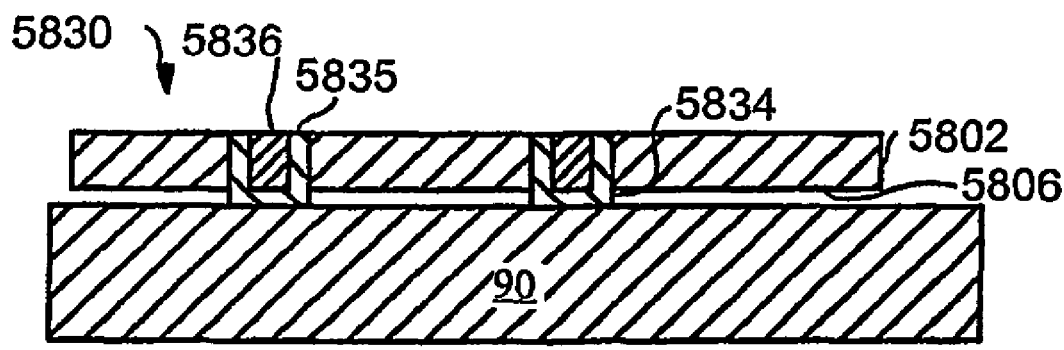
FIG. 58C depicts a multilayer landing pad structure according to an embodiment of the present invention.
Figure 58A:
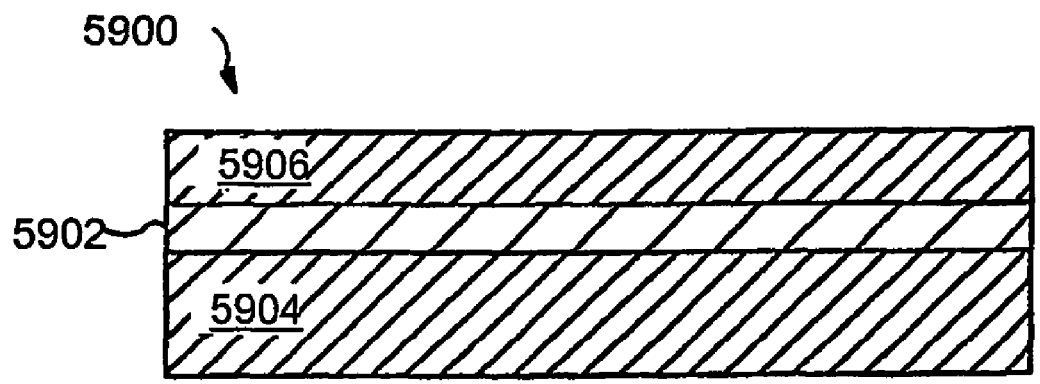

Two variations on the basic device 5800 are depicted in FIGS. 58B and 58C. FIG. 58B depicts a second embodiment of the invention. The basic structure of the device in this embodiment shares features in common with device 5800 of FIG. 58A. In this embodiment, a device 5820 includes at least one landing pad 5824 having a diameter greater than a plug 5826. This type of device can be fabricated using wet processing, which is a lower cost process than dry processing. FIG. 58C depicts another embodiment, in which a device 5830 includes at least one landing pad 5834 comprised of two or more separate layers 5835 and 5836. Generally, layers 5835 and 5836 are made from different materials. For example, layer 5835, which contacts substrate 5812, may be a dielectric layer. For example, layer 5836, may be a conductive material, which is part of an electrode structure. Layer 5835 insulates layer 5836 from electrical contact with substrate 5812.

Figure 59B:
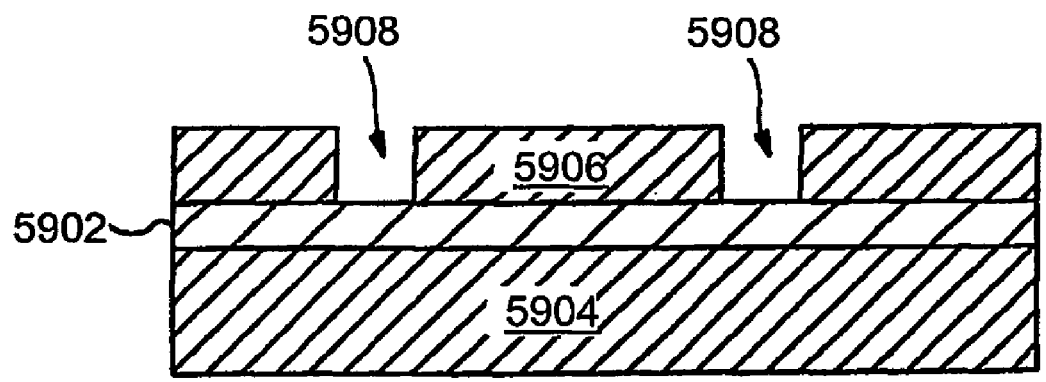

The devices depicted in FIGS. 58A–58C may be fabricated by an inventive method according to another embodiment of the invention. The basic steps of the method are depicted in FIGS. 59A–59E. FIG. 59A depicts the basic substrate 5900 from which the device is made.

Substrate 5900 generally includes a sacrificial layer 5902 disposed between a base layer 5904 and a device layer 5906. The substrate may be formed by a silicon on insulator (SOI) fabrication process. When an SOI substrate is used, sacrificial layer 5902 is typically an oxide formed by oxidizing a silicon base layer 5904. Such a structure is sometimes referred to as silicon on oxide (SOI). Alternatively, sacrificial layer 5902 may be a nitride layer, in which case the structure is sometimes referred to as silicon on nitride. Other possible configurations for substrate 5900 include silicon on polymer, glass on silicon, glass on nitride and other multiple-layer substrates.

Next one or more vias 5908 are formed through device layer 5906 all the way to sacrificial layer 5902 as shown in FIG. 59B. Vias 5908 may be formed in device layer 5906 by dry etch processes, such as reactive ion etching (RIE) or wet etch processes, e.g., anisotropic etching of Si with KOH. In such etch processes, sacrificial layer 5902 often resists attack by etchants used to form vias 5908 and therefore acts as an etch stop. Alternatively, vias 5908 may be laser drilled or formed by local oxidation (LOCOS) and oxide etch.

Figure 59C:
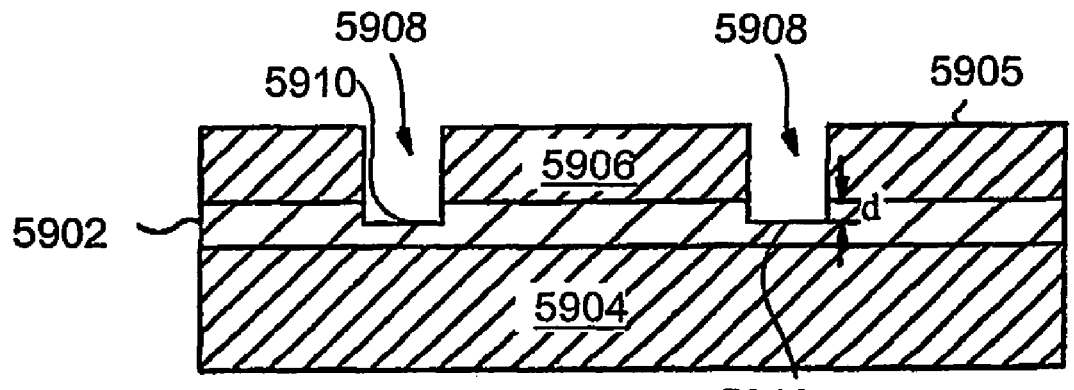
Figure 58A:
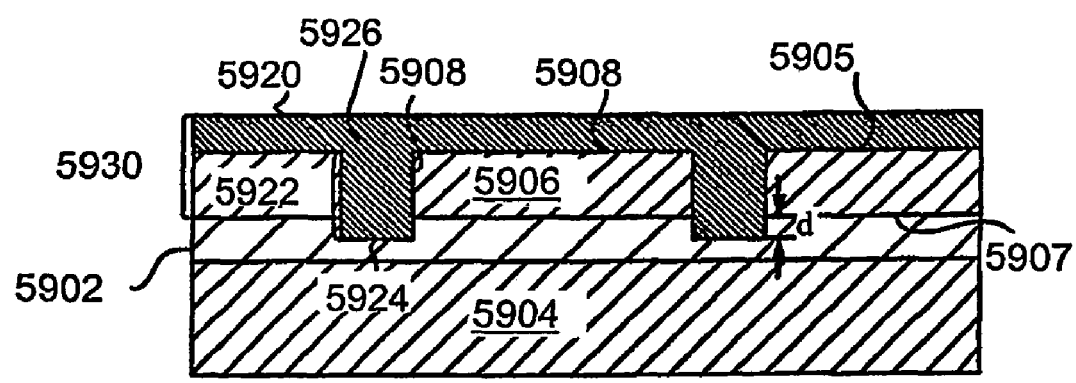
Figure 59B:
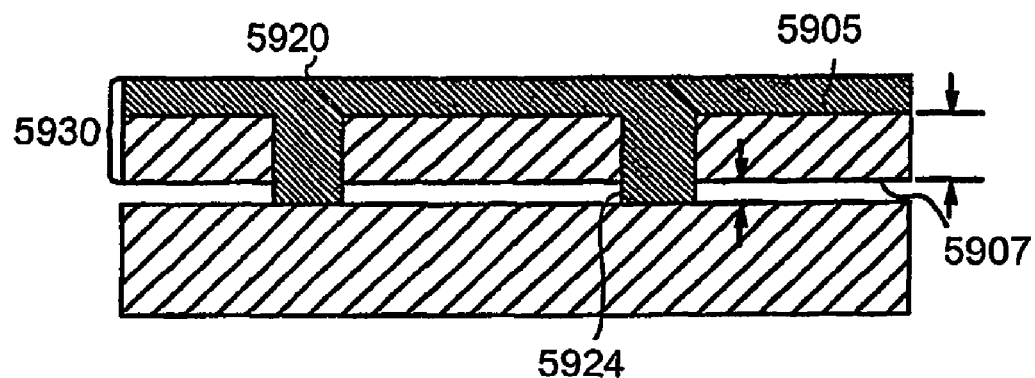

After vias 5908 have been formed in device layer 5906 sacrificial layer 5902 is partially etched as shown in FIG. 59C. The etching of sacrificial layer 5902 forms one or more depressions 5910 having a depth d at locations corresponding to locations of vias in the device layer. A different etch process than that used to form vias 5908 may be used to form depressions 59580. By whatever process they are formed, depressions 5910 do not penetrate all the way through to base layer 5904. In other words the depth d of the depressions is less than the thickness t of sacrificial layer 5902.

After forming depressions 5910, vias 5908 and depressions 5910 are filled with a layer landing pad material 5920 as shown in FIG. 59D. Layer 5920 may optionally be planarized down to a top surface 5905 of device layer 5906, e.g. by chemical mechanical polishing (CMP). Filling depressions 5910 and vias 5908 forms a structure 5922 having one or more landing pads 5924 protruding from an underside 5907 of device layer 5906. Each landing pad 5924 is connected to structure 5920 by a plug 5926 of material that fills via 5908. The depth d of depressions 5910 determines the thickness of landing pads 5924. If depressions 5910 are formed such that they undercut device layer 5906, e.g., by isotropic etching. Landing pad 5924 can have a larger diameter than a diameter of plug 5926 resulting in a landing pad structure similar to that shown in FIG. 58B. The landing pad structure shown in FIG. 58C may be fabricated by partially etching plugs 5926 and filling the resulting void with a layer of material. In a particular embodiment landing pad material 5920 is deposited inside vias 5908 to a thickness of at least one-half the diameter of a widest via 5908 to ensure that the landing pad material 5920 plugs the vias.

Pad material layer 5920 and device layer 5906 generally comprise a device 5930. After landing pad material 5920 has been deposited, sacrificial layer 5902 is removed to release device 5930 as shown in FIG. 59E. Sacrificial layer 5902 may be removed by any suitable method, such as wet etch or other isotropic etch process.

Figure 60A:
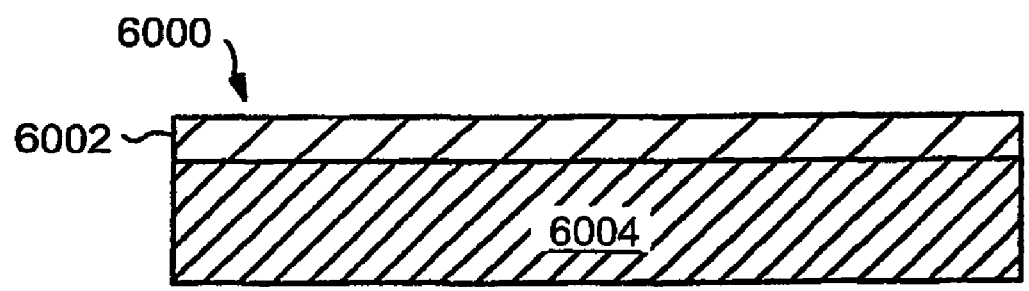
FIGS. 60A–60E depict fabrication of a device according to an embodiment of the present invention.

Devices of the type shown in FIGS. 58A–58C may alternatively be fabricated by a method according to another embodiment of the invention. The basic steps of the method are depicted in FIGS. 60A–60E. FIG. 60A depicts a basic substrate 6000 from which the device is made. Substrate 6000 generally includes a sacrificial layer 6002 disposed on top of a base layer 6004. Substrate 6000 may be formed by a silicon-on-insulator (SOI) fabrication process, e.g. by oxidizing a silicon base layer 6004. Alternatively, an oxide or nitride layer may be deposited on top of base layer 6004. Other possible configurations for substrate 6000 include silicon on polymer, glass on silicon, glass on nitride and the like.

Figure 60B:
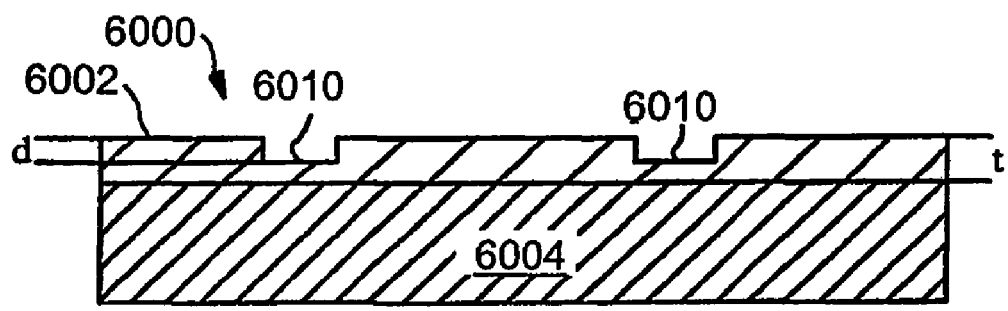

Next sacrificial layer 6002 is partially etched to form one or more depressions 6010 as shown in FIG. 60B. Depressions 6010 having a depth d that is less than the thickness t of sacrificial layer 6002.

Figure 60C:
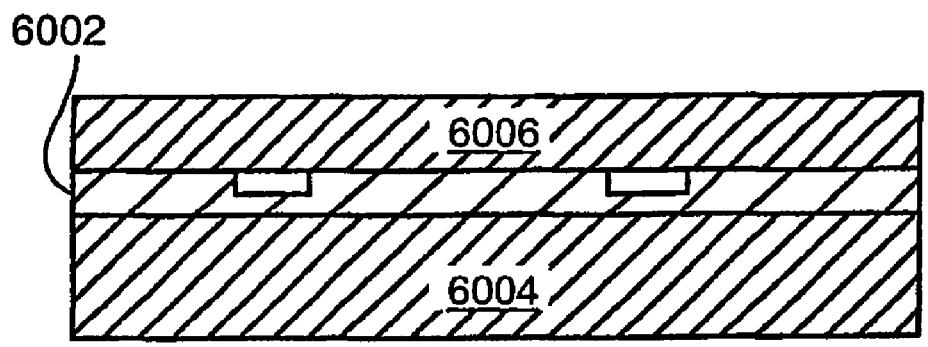

After depressions 6010 have been formed, a device layer 6006 is bonded to sacrificial layer 6002 as shown in FIG. 60C. Device layer 6006 may be any suitable material depending on the desired application. In a specific embodiment, device layer 6006 is a layer of silicon.

Figure 60D:
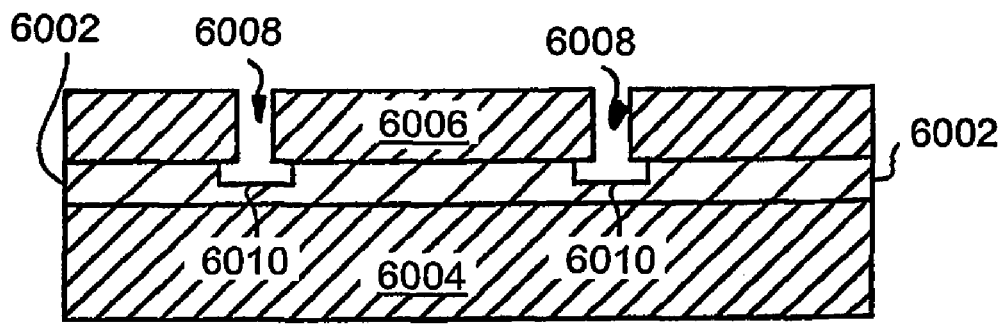

Next one or more vias 6008 are formed through device layer 6006 all the way through to depressions 6010 in sacrificial layer 6002 as shown in FIG. 60D. Vias 6008 may be formed in device layer 6006 by dry etch processes, such as reactive ion etching (RIE) or wet etch processes, e.g., anisotropic etching of Si with KOH as described above. Alternatively, vias 6008 may be laser drilled or formed by local oxidation (LOCOS) and oxide etch. In the embodiment shown, depressions 6010 have a diameter that is greater than a diameter of vias 6008. Alternatively, the diameter of depressions 6010 may be the same as or smaller than the diameter of vias 6008.

Figure 60E:
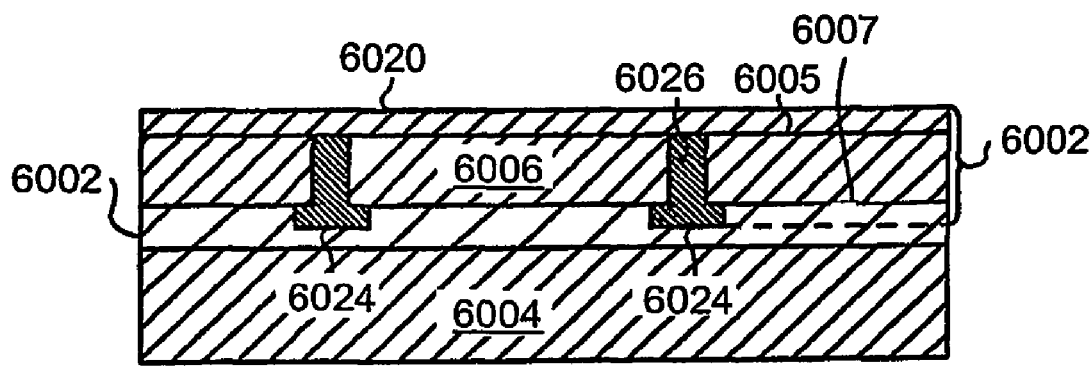

After vias 6008 have been formed in device layer 6006, vias 6008 and depressions 6010 are filled with a layer landing pad material 6020 as shown in FIG. 60E. Layer 6020 may optionally be planarized down to a top surface 6005 of device layer 6006, e.g. by chemical mechanical polishing (CMP). Filling depressions 6010 and vias 6008 forms a structure having one or more landing pads 6024 protruding from an underside 6007 of device layer 6006. Each landing pad 6024 is connected to the structure by a plug 6026 of material that fills via 6008. The depth d of depressions 6010 determines the thickness of landing pads 6024. Because depressions 6010 have larger diameters that vias 6008, landing pads 6024 have a larger diameter than plugs 6026 resulting in a landing pad structure similar to that shown in FIG. 58B.

Figure 60F:
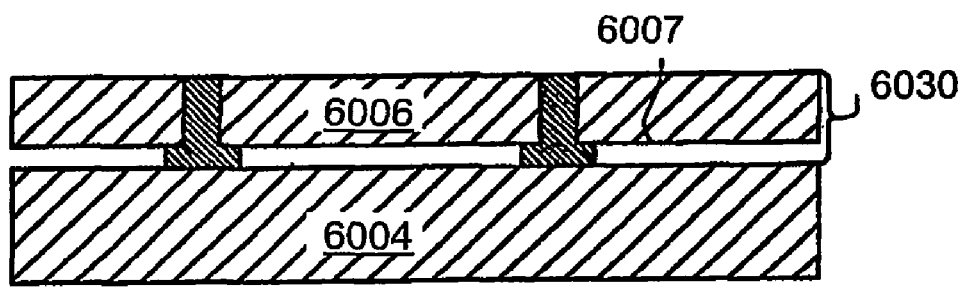

Pad material layer 6020 and device layer 6006 generally comprise a device 6030. After landing pad material 6020 has been deposited, sacrificial layer 6002 is removed to release device 6030 as shown in FIG. 60F. Sacrificial layer 6002 may be removed by any suitable method, such as wet etch or other isotropic etch process.

Figure 61A:
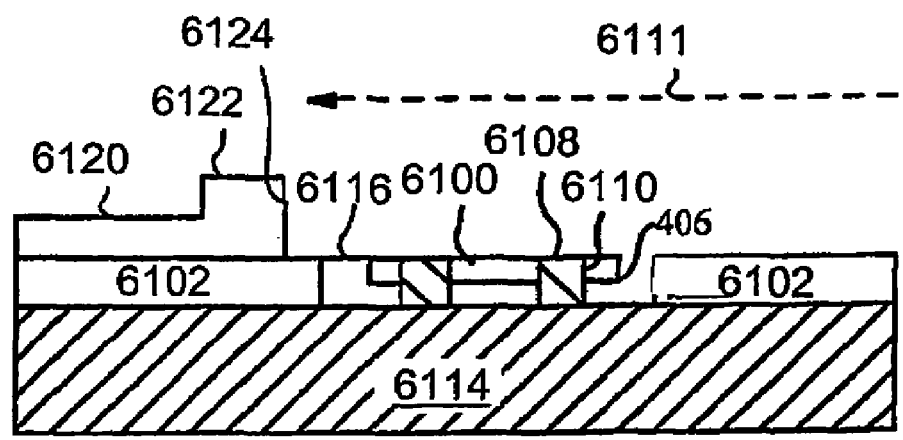
FIGS. 61A–61B depicts a microelectromechanical mirror element according to an embodiment of the present invention.

Another embodiment of the present invention includes an electromechanically actuatable mirror element of a type used in optical fiber switching arrays. Micromechanical elements are described in U.S. Provisional Patent application Ser. No. 60/123,496 to Berhang Behin, Kam Lau and Richard Muller, titled "Global Mechanical Stop for Precise Mirror Positioning'"" which is incorporated herein by reference. An example of an embodiment of such a mirror element 6100 according the present invention is depicted in FIG. 61A. Mirror element 6100 generally is formed from a device layer 6102 as described above with respect to FIGS. 59A–59E or 60A–60F. At least one landing pad 6104 protrudes from an underside 6106 of mirror element 6100. Landing pad 6104 is attached to mirror element 6100 by a plug 6108 passing through an opening 6110 in mirror element 6100. Landing pad 6104 provides a smaller contact area 6112 that serves to reduce stiction between mirror element 6100 and an underlying substrate 6114. Stiction may also be reduced by proper choice of the material comprising landing pad 6104.

Figure 61B:
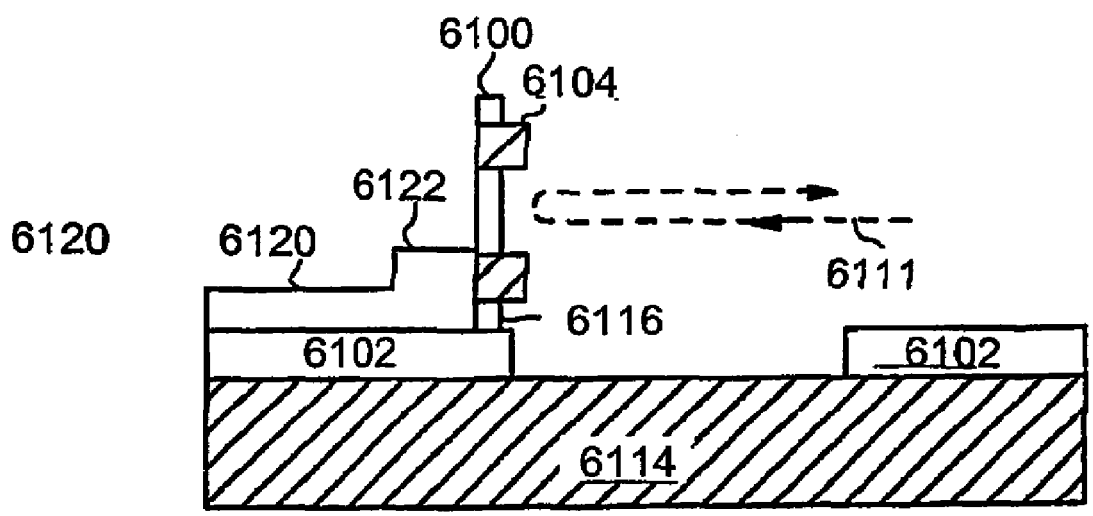

Mirror element 6100 may be attached to mirror layer 6102 via one or more compliant flexures 6116. Such a mirror element can be actuated between an 'on' position, at which it intercepts an optical beam 6111 as shown in FIG. 61B, and an 'off' position, at which it allows optical beam 6111 to pass as shown in FIG. 61A. A second chip 6120 containing vertical sidewall 6122 may be positioned on top of the chip containing mirror 6100, so that when flipped vertically by application of a magnetic field, mirror 6100 can be pulled in to the sidewall by application of an electrostatic force. Electrostatic clamping to a precise vertical clamping surface 6124 on a sidewall 6126 defines the mirror position accurately and reproducibly when it is in the 'on' position. To ensure that all mirrors in an array have the same 'on' angle, the clamping surfaces for different mirrors may be constructed at the same angle on a single substrate. This provides a global mechanical positioning mechanism for a field of actuated mirrors.

Mirror element 6100 and the clamping surfaces are typically constructed from electrically conductive material. Landing pads 6104 made of an insulating material may prevent electrical contact between the mirrors and the clamping surfaces when the two conductive surfaces are brought together.

Flexures 6116 allow mirror element 6100 to move out of a plane defined by mirror layer 6102 as shown in FIG. 61B. Mirror actuation may be performed by applying an external magnetic field that interacts with a magnetic material on the mirror element 6100. Lateral compliance of the torsional flexures 6116 reduces the electric field necessary to pull the mirror to sidewall 6122, and allows mirror element 6100 to make contact with sidewall 6122 at three or more points when sufficient electrostatic field is applied. After mirror element 6100 is electrostatically clamped to sidewall 6122, the magnetic field can be switched on and off without affecting the mirror position. Once the electrostatic field is turned off, torsional flexures 6116 pull mirror element 6100 back to its horizontal position by torsional flexures 6116. A horizontal magnetic field may also be employed to aid in actuating mirror element 6100 back to the horizontal position.

Mirror 6100, in the horizontal position, can be clamped electrostatically to substrate 6114 to prevent it from responding to an external field. Selective electrostatic clamping of mirrors in both the vertical and horizontal positions allows individual addressing of mirrors belonging to an array and subject to the same external magnetic field.

Mirror 6100 and the top chip 6120 may be fabricated by silicon microfabrication techniques such as polycrystalline-silicon surface-micromachining process. The top chip 6120 containing the sidewalls 6122 may be fabricated by anisotropic etching of (110)-oriented Si. Such a method ensures angular uniformity of the sidewalls over the area of the top chip. Furthermore, mirror 6100 may be fabricated from a silicon on insulator (SOI) substrate by either of the two methods described above.

Figure 62A:
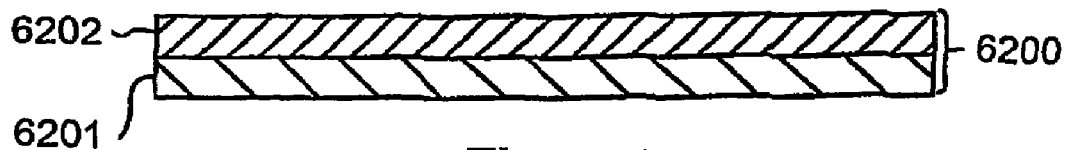
FIGS. 62A–62F depict fabrication of a device according to an embodiment of the present invention.

Devices of the type shown in FIGS. 58A–58C and 61 may alternatively be fabricated by a method according to another embodiment of the invention. The basic steps of the method are depicted in FIGS. 62A–62F. FIG. 62A depicts a substrate 6200 from which the device is made. Substrate 6200 generally comprises a device layer 6201 and a landing pad material layer 6202. Device layer 6201 may be any suitable material depending on the desired application. In a specific embodiment, device layer 6201 is a layer of silicon. Landing-pad material layer 6202 may be deposited or formed on a surface of device layer 6201 by any conventional means.

Figure 62B:
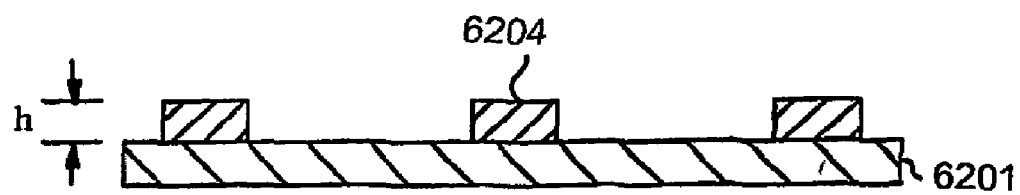

Next landing-pad material layer 6202 is partially etched to form one or more landing pads 6204 having a height h as shown in FIG. 62B. Landing pads 6204 may be formed by any suitable technique such as reactive ion etching (RIE) or wet etch processes, e.g., anisotropic etching of silicon with KOH as described above. Alternatively, landing pads 6204 may be ion milled or formed by local oxidation (LOCOS) and oxide etch.

Figure 62C:
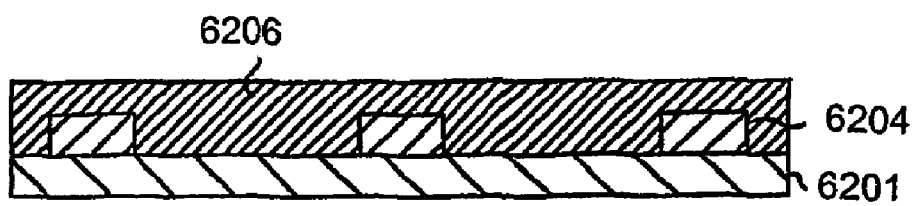

Next, a sacrificial layer 6206 is deposited over landing pads and substrate 6200 as shown in FIG. 62C. Typically, sacrificial layer 6206 includes an oxide. Alternative sacrificial layers include nitrides, glasses and polymers. Sacrificial layer 6206 is typically planarized, e.g. by CMP to a thickness t. Preferably, height h of landing pads 6204 is less than thickness t of sacrificial layer 6206 so that landing pads 6204 are not exposed. If the landing pads 6204 may have different heights t is preferably greater than the height of the tallest landing pad.

Figure 62D:
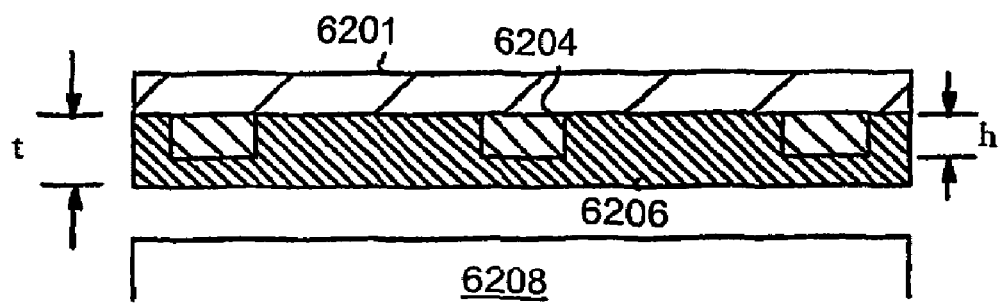
Figure 62E:
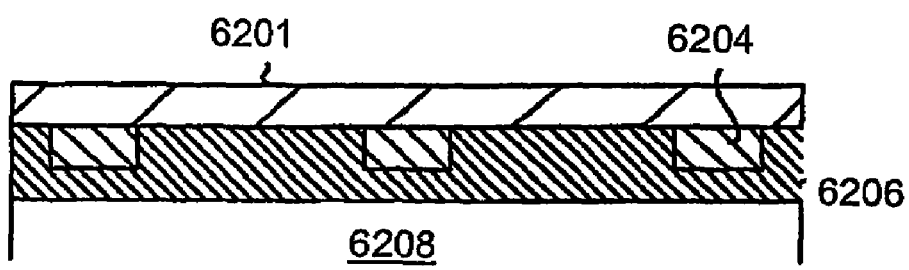

After sacrificial layer 6206 has been planarized, substrate 6200 may be inverted so that sacrificial layer 6206 faces a base layer 6208 as shown in FIG. 62D. As a result of this step, landing-pads 6204 protrude from an underside 6209 of substrate 6200. Next, substrate 6200 is bonded to base layer 6208 via sacrificial layer 6206 as shown in FIG. 62E.

Figure 62F:
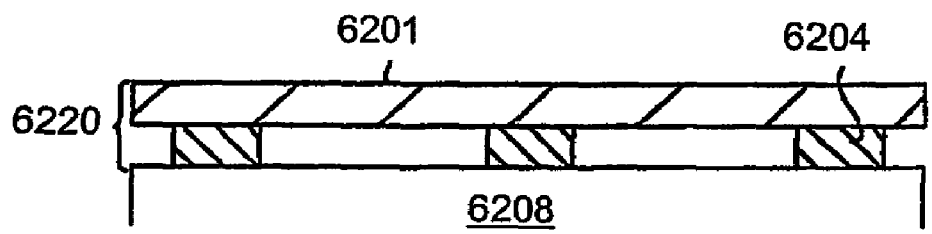

Device layer 6201 and landing pads 6204 generally comprise a device 6220, which may be released by removing sacrificial layer 6206 as shown in FIG. 62F. Sacrificial layer 6206 may be removed by any suitable method, such as wet etch or other isotropic etch process.

Figure 63A:
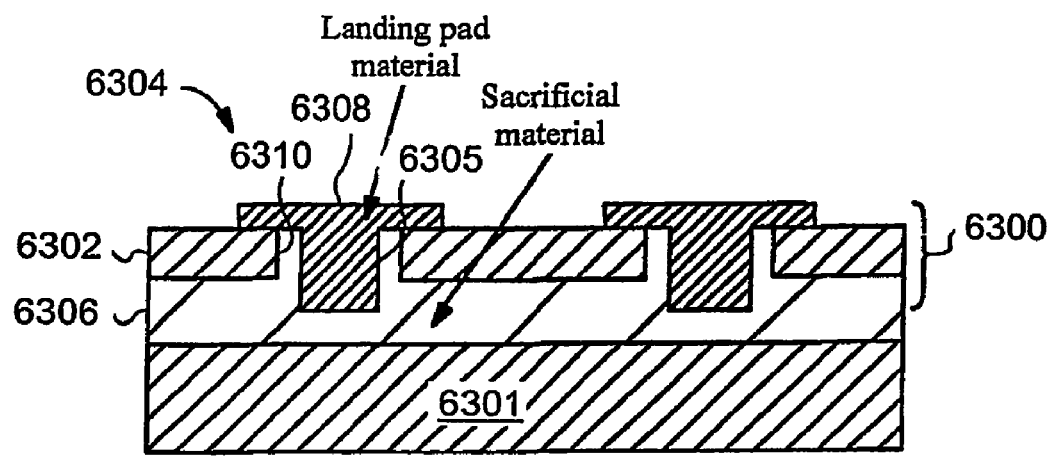
FIGS. 63A–63B depict fabrication of a device according to an embodiment of the present invention.
Figure 63B:
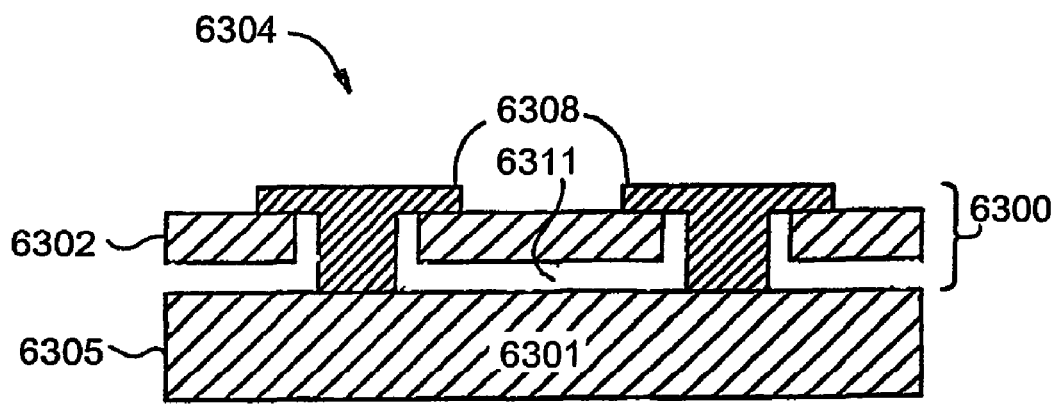

Other variations on the above described devices and fabrication methods are possible. For example, in another embodiment of any of the above-described fabrication methods may be used to fabricate a device having landing pads with "air-spaced" standoffs. The device 6300, depicted in FIGS. 63A–63B, includes a device layer 6302 and at least one landing pad 6304 protruding from an underside 6306 of device layer 6302. Landing pad 6304 has a plug 6305 that protrudes through an opening 6310 in device layer 6302. Landing pad 6304 is attached to device layer 6302 by a flange 6308. The landing pad 6304 provides a smaller contact area 6312 than an area of underside 6306. Plug 6305 generally has a diameter that is smaller than a diameter of opening 6310. This configuration produces a gap 6311 between plug 6305 and device layer 6302. The resulting structure provides an air-spaced standoff. Flanges 6310 on neighboring landing pads 6304 may be isolated from each other as shown in FIGS. 63A–63B. Alternatively, neighboring landing pads 6304 may protrude from a common layer of landing pad material.

Device 6300 may be manufactured on a substrate 6301 according to any of the methods described above. For example, FIG. 63A depicts the device 6300 prior to removal of a sacrificial layer 6320. FIG. 63B depicts the device 6300 after removal of a sacrificial layer 6320.

Figure 64A:
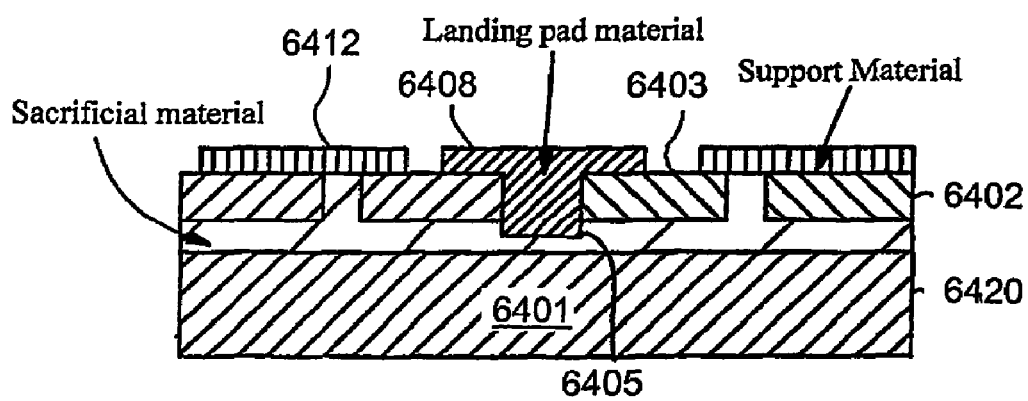
FIGS. 64A–64B depict fabrication of a device according to an embodiment of the present invention.
Figure 64B:
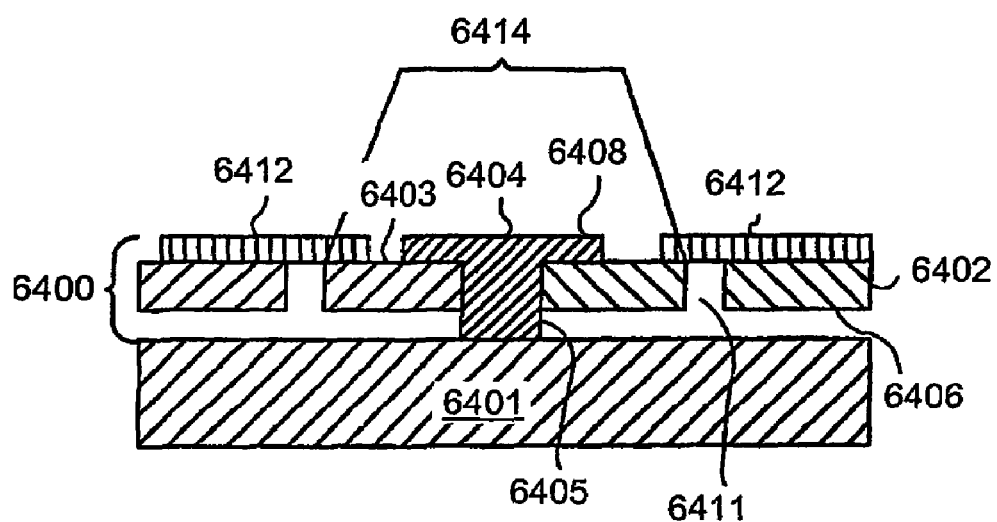

In another embodiment of the invention, a device 6400 may be manufactured with one or more standoffs separated from the rest of the device layer as depicted in FIGS. 64A–64B. The device 6400 is typically manufactured on a substrate 6401 having a sacrificial layer 6420 as shown in FIG. 64A. The device 6400 includes a device layer 6402 and at least one landing pad 6404 protruding from an underside 6406 of device layer 6402. Landing pad 6404 has a plug 6405 that protrudes through an opening 6410 in a standoff region 6403 of device layer 6402. Landing pad 6404 is attached to standoff region 6403 by a flange 6408. One or more trenches 6410 formed in device layer 6402 separate standoff region 6403 from the rest of device layer 6402. During fabrication, sacrificial layer 6420 mechanically supports device layer 6402, standoff region 6403 and landing pad 6404. A layer of support material 6412, formed over trenches 6410 provides a connection between standoff region 6403 and the rest of device layer 6402. Standoff region 6403 and landing pad 6404 form a separated standoff 6414 when sacrificial layer 6420 is removed, as shown in FIG. 64B. Support material 6412 provides a mechanical structural support for standoff 6414 and device layer 6402 after sacrificial layer 6420 is removed. Such a configuration is useful, for example, in applications where it is desirable to electrically isolate standoff 6414 from device layer 6402.

While the above is a complete description of the preferred embodiments of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. An optical cross-connect switch, comprising:
   a base;
   a flap having a bottom portion movably coupled to the base such that the flap is movable with respect to a plane of the base from a first orientation to a second orientation; and
   one or more electrically conductive landing pads connected to the flap, wherein the one or more landing pads are electrically isolated from the flap and electrically coupled to be equipotential with a landing surface, wherein at least one landing pad is substantially parallel to the flap.

2. The switch of claim 1, wherein the base further includes at least one cantilevered anti-stiction bar.

3. The switch of claim 1 or 2, wherein a magnetic field is used to create a first actuation force to manipulate the flap.

4. The switch of claim 1 or 2, wherein an acoustic pulse is used to create a first actuation force to manipulate the flap.

5. The switch of claim 1 or 2, wherein a pneumatic pressure is used to create a first actuation force to manipulate the flap.

6. The switch of claim 1, 2, 3, 4 or 5 further including a stop configured to contact a portion of the flap in a contact area sized so that, upon application of an electrostatic bias between the flap and the stop, a sufficient second force holds the flap against the stop.

7. The switch of claim 6 wherein stop is comprised of two vertical walls.

8. The switch of claim 6 or 7 wherein the stop includes a sidewall made of silicon and having crystalline orientation of <111>.

9. The switch of claim 1, 2, 3, 4, 5, 6, 7 or 8 further including a microcontroller electrically coupled to the flap to enable the flap to be grounded or held at a voltage potential.

10. The switch of claim 9, wherein the microcontroller also controls the first actuation force.

11. The switch of claim 9, further comprising a magnet assembly electrically coupled to the microcontroller and sized less than 0.5" in width, said magnet assembly positioned to surround the switch and provide magnetic force along both a Z and an X axis, wherein the microcontroller also controls the magnet assembly and wherein the first actuation force is magnetic.

12. The switch of claim 9, 10 or 11 wherein the microcontroller stores the state of the flap and capacitive sensing is used to confirm that the flap is in the correct state.

13. The switch of claim 9, 10, 11 further including a magnetoresistive element coupled to the flap, wherein the microcontroller stores the state of the flap and magnetoresistive sensing is used to confirm that the flap is in the correct state.

14. The switch of claim 13 further including a magnetoresistive element coupled to the base, wherein the microcontroller stores the state of the flap and magnetoresistive sensing is used to confirm that the flap is in the correct state.

15. The switch of claim 13 or 14 further including a magnetoresistive element coupled to the stop, wherein the microcontroller stores the state of the flap and magnetoresistive sensing is used to confirm that the flap is in the correct state.

16. The switch of claim 6, 7 or 8, further including a charge-storing circuit electrically coupled between the stop and an electrical ground, an isolator element electrically coupled between the clamping surface and a source of clamping voltage, wherein the isolator element is configured to electrically isolate the source of clamping voltage from the clamping surface in the event of a power failure.

17. The switch of claim 16 wherein the isolator element is an opto-isolator or a low leakage diode.

18. The switch of claim 16 or 17, wherein the charge-storing circuit includes a capacitor.

19. The switch of claims 1, 2, 3, 4, 5, 6, 7, 8, 9, 10, 11, 12, 13, 14, 15, 16, 17 or 18, further including an enclosure for sealing the flap and having one or more sidewalls, an optical element coupled to at least one of the sidewalls, wherein at least one of the one or more sidewalls or the optical element includes a surface that is angled with respect to an optical plane.

20. The switch of claim 18, wherein the enclosure is evacuated.

21. The switch of claim 18, wherein the enclosure is filled with a gas.

22. The switch of claim 9, 10, 11, 12, 13, 14 or 15 wherein the microcontroller also monitors voltage levels and engage a signal transmission in the event of a power failure.

23. The switch of claim 16, 17, 18, 19 or 20 further including a microcontroller to monitor voltage levels, whereby the microcontroller may engage a signal transmission in the event of a power failure.

24. The switch of claim 9, 10, 11, 12, 13, 14 or 15, further including a stop configured to contact a portion of the cantilever in a contact area sized so that, upon application of an electrostatic bias between the flap and the stop, a sufficient second force holds the flap against the stop; and a charge-storing circuit electrically coupled between the stop and an electrical ground, an isolator element electrically coupled between the clamping surface and a source of clamping voltage, wherein the isolator element is configured to electrically isolate the source of clamping voltage from the clamping surface in the event of a power failure.

* * * * *